United States Patent
Jung et al.

(10) Patent No.: US 11,762,493 B2
(45) Date of Patent: Sep. 19, 2023

(54) DATA PROCESSING TERMINALS AND RELATED METHODS IN LOCK, INTERMEDIATE, AND UNLOCK MODES

(71) Applicants: Jaelark Jung, Goyang-si (KR); Jaekyu Lee, Gunpo-si (KR); Youngtack Shim, Seoul (KR)

(72) Inventors: Jaelark Jung, Goyang-si (KR); Jaekyu Lee, Gunpo-si (KR); Youngtack Shim, Seoul (KR)

( * ) Notice: Subject to any disclaimer, the term of this patent is extended or adjusted under 35 U.S.C. 154(b) by 723 days.

(21) Appl. No.: 16/323,861

(22) PCT Filed: Aug. 23, 2017

(86) PCT No.: PCT/KR2017/009220
§ 371 (c)(1),
(2) Date: Feb. 7, 2019

(87) PCT Pub. No.: WO2018/038536
PCT Pub. Date: Mar. 1, 2018

(65) Prior Publication Data
US 2021/0286863 A1    Sep. 16, 2021

Related U.S. Application Data

(60) Provisional application No. 62/379,599, filed on Aug. 25, 2016.

(51) Int. Cl.
*G06F 3/048* (2013.01)
*G06F 3/041* (2006.01)
(Continued)

(52) U.S. Cl.
CPC .......... *G06F 3/0416* (2013.01); *G06F 3/0488* (2013.01); *G06F 3/167* (2013.01);
(Continued)

(58) Field of Classification Search
CPC ...... G06F 3/0416; G06F 3/0488; G06F 3/167; G06F 21/32; G06F 2203/04808;
(Continued)

(56) References Cited

U.S. PATENT DOCUMENTS

| 2003/0097596 | A1* | 5/2003 | Muratov | ............... G06F 21/575 |
| | | | | 713/189 |
| 2006/0156028 | A1* | 7/2006 | Aoyama | .................. G07C 9/33 |
| | | | | 713/186 |

(Continued)

FOREIGN PATENT DOCUMENTS

| JP | 2013-179379 A | 9/2013 |
| JP | 2016-038622 A | 3/2016 |

(Continued)

OTHER PUBLICATIONS

International Search Report dated Dec. 7, 2017, issued to International Application No. PCT/KR2017/009220.

(Continued)

*Primary Examiner* — Aleksey Olshannikov
(74) *Attorney, Agent, or Firm* — Stein IP, LLC

(57) ABSTRACT

The disclosure relates to various data processing terminals capable of operating in different modes each of which is granted with different authorities to access hardware or software elements of the terminals. More particularly, a terminal includes a lock system operating in a lock mode and a main system operating in an unlock mode, and erases an entire or a selected portion of results obtained by running operations in the lock mode, when a terminal switches from a lock mode to an unlock mode with greater access authority. Because potentially malicious computer codes which may be impregnated into such results are erased before switching to an unlock mode, the terminal enhances an integrity and a security of a terminal, and improves privacy of a user by (Continued)

preventing loss or unintended disclosure of private data stored in a terminal.

28 Claims, 15 Drawing Sheets

(51) Int. Cl.
*G06F 3/0488* (2022.01)
*G06F 3/16* (2006.01)
*G06F 21/32* (2013.01)
*G06V 40/10* (2022.01)
*G06V 40/12* (2022.01)
*G06V 40/14* (2022.01)
*G06V 40/16* (2022.01)
*G06V 40/18* (2022.01)

(52) U.S. Cl.
CPC .... *G06F 21/32* (2013.01); *G06F 2203/04808* (2013.01); *G06V 40/10* (2022.01); *G06V 40/12* (2022.01); *G06V 40/14* (2022.01); *G06V 40/16* (2022.01); *G06V 40/18* (2022.01)

(58) Field of Classification Search
CPC ..... G06F 2221/2113; G06F 2221/2143; G06F 21/31; G06F 21/6218; G06F 21/74; G06F 3/048; G06F 21/30; G06F 21/50; G06F 21/604; G06V 40/10; G06V 40/12; G06V 40/14; G06V 40/16; G06V 40/18
See application file for complete search history.

(56) References Cited

U.S. PATENT DOCUMENTS

| | | | |
|---|---|---|---|
| 2009/0067079 A1 | 3/2009 | Al-Azzawi | ...................... 360/62 |
| 2009/0312055 A1 | 12/2009 | Liu | ............................... 455/558 |
| 2012/0291101 A1* | 11/2012 | Ahlstrom | ................ H04W 4/50 726/4 |
| 2015/0363587 A1* | 12/2015 | Ahn | ....................... G06F 9/4418 726/19 |
| 2016/0048693 A1* | 2/2016 | Uner | ..................... G06F 21/604 713/189 |

FOREIGN PATENT DOCUMENTS

| | | |
|---|---|---|
| JP | 2016-066189 A | 4/2016 |
| KR | 10-2014-0051470 A | 5/2014 |
| WO | WO 2016/053923 A1 | 4/2016 |

OTHER PUBLICATIONS

Written Opinion of the International Searching Authority dated Dec. 7, 2017, issued to International Application No. PCT/KR2017/009220.

* cited by examiner

DATA PROCESSING TERMINALS AND RELATED METHODS IN LOCK, INTERMEDIATE, AND UNLOCK MODES

CROSS-REFERENCE TO RELATED APPLICATIONS

This application is a national stage of International Application No. PCT/KR2017/009220, filed Aug. 23, 2017, which claims the benefit of priority to U.S. Provisional Application No. 62/379,599, filed Aug. 25, 2016, in the U.S. Patent and Trademark Office, the disclosures of which are incorporated herein in their entireties by reference.

TECHNICAL FIELD

This disclosure relates to various data processing terminals which may operate in at least one hierarchy which may in turn defines therein multiple modes of operation, where such terminals grant users with different access authorities in each of such modes. Upon receiving proper user inputs (or sub-inputs), the terminals may allow a user to switch from a current mode to a new mode, where the current mode may include a powered-off state (i.e., a terminal is not communicable and its display unit is therefore turned off), an off-state (i.e., a terminal is communicable and, therefore, a powered-on state, but its display unit is turned off), and one of such modes (i.e., a powered-on state and an on-state in which a display unit is turned on) defined in the hierarchy, and where a new mode may include the powered-off state, the off-state, the on-state, and one of such modes also defined in the hierarchy. This disclosure also relates to various units and their hardware or software elements of such terminals capable of allowing or denying a user to switch from a current mode to a new mode. This disclosure further relates to various configurations of such units and their hardware and software elements to enable and to embody such mode switching.

This disclosure also relates to various methods of providing such data processing terminals which can operate in different modes of operation, various methods of operating such terminals in such modes, various methods of switching from a current mode to a new mode, and various methods of granting a user with one of multiple access authorities such that a user may switch to a new mode from a current mode or that a user may drive a certain hardware or software element in a certain mode.

This disclosure also provides various methods of setting up various hierarchies each of which defines different modes of operation therein, various methods of arranging such modes of operation in a hierarchy, and various methods of assigning identical, similar, different or comparable access authorities to each of such modes. This disclosure also provides various methods of granting (or denying) a user to switch to a certain mode from a current mode, or to switch from one mode to another in a certain hierarchy, various methods of granting (or denying) an access to a certain hardware or software element of a terminal based on the access authorities assigned to each of such modes, various methods of establishing various hierarchies of multiple modes, or the like.

Based thereupon, this disclosure provides various data processing terminals capable of providing a user with enhanced security, improved integrity, or heightened privacy by including therein at least one main system and at least one lock (or intermediate) system. A main system may generally include various hardware and software elements with which a user can run various unlock operations in an unlock mode, while a lock (or intermediate) system may generally include at least one hardware or software element which is physically or operationally isolated or blocked from the main system. Therefore, any result obtained by driving the hardware or software element of a lock or main system in a lock mode may not adversely affect the hardware or software element of a main system. Because of such physical or operational isolation, a terminal may allow a user to run almost any operation in a lock (or intermediate) mode using a lock (or intermediate) system, without having to risk any security, integrity or privacy of a main system.

To this end, this disclosure provides various data processing terminals which may include such main and lock systems, various configurations of various units or their hardware or software elements of such main and lock systems, various methods of physically or operationally isolating a lock (or intermediate) system from a main system (or vice versa), or various configurations for completely (or partially) isolating a lock (or intermediate) system from a main system (or vice versa). This disclosure also discloses various methods of ensuring physical or operational isolation between such main and lock (or intermediate) systems, various methods of erasing (or semi-erasing) potentially risky or undesirable results which may reside in a lock (or intermediate) system before, while, or after a user may switch from a lock (or intermediate) mode to an unlock mode, or the like.

Further exemplary aspects, embodiments, and examples of various data processing terminals and their related methods are disclosed below along with appended figures.

BACKGROUND ART

As prior art data processing devices (such as, e.g., smartphones, mobile phones, tablet computers, personal digital assistants, web pads, or the like) are equipped with top-notch processors (powerful than ever) and memories of ever-increasing capacities, users get more and more dependent thereupon and addicted thereto. In addition, prior art data processing devices are generally equipped with communication capabilities so that users may replace not only their telephones but also their desk-top computers or laptop computers with such devices. Therefore, it is not surprising to see more users store and carry their most precious and private data in such portable data processing devices, with the hope of fully enjoying various conveniences offered by such devices.

Commensurate with the advent of hardware and software technologies associated with mobile communication, more hackers are tempted to plant malicious viruses into seemingly benign software applications or contents, and to massively circulate them in the web, hoping that unwary users would allow the viruses to be impregnated into main systems of the users' data processing devices. Once being impregnated, the viruses would allow the hackers to access and steal personal or financially valuable data of the users.

Accordingly, whenever a user may access and download such malicious applications or contents to the device without comprehending risks associated therewith, the user incurs damages such as, e.g., an exposure or a loss of precious financial data stored in the main system of the device, an accidental revelation of their most private and embarrassing data, or a mal-functioning device, all caused by malicious viruses migrated into the main system of their devices. Some hackers go even further to impregnate ransomware and block the users from accessing data stored in their own devices, until the victims pay money to the hackers.

Even conservative or wary users are encountered with such situations frequently. For example, the user may be asked (or required) to access unfamiliar websites and to download software applications or contents from the web. Of course, the best policy is to not do so. However, the users may have to do so, particularly when they do not have any other choices, when they are in an emergency or in a rush, or the like.

Such security concerns usually hinder the conservative or wary users from fully utilizing their data processing devices. For example, when a user visits a new website and finds attractive contents, he or she hesitates to open a new application or to download contents therefrom, due to the fear that their precious data stored in their devices may fall into the hands of the hackers.

Users of such data processing devices have other reasons to protect their main systems of the devices, for the main system (e.g., its main memory unit) typically contains the users' most personal data which the users do not want to disclose to others or do not want to share with others. Of course, conventional authentication programs may prevent such from happening to some extent. However, the users are often forced to use their devices in an open environment, while risking disclosure of whatever contents may be kept in the main memory unit of their main systems.

A user may also resort to currently available vaccine programs to confirm whether a downloaded application or content may include any malicious viruses. However, many viruses are designed to escape from the vaccine programs. Even when the users may find out that the downloaded application contains damaging viruses, it is usually too late to take any remedial actions, for it is usually only after such viruses have successfully migrated into the main systems of their devices.

In other words, whatever advanced security means may be developed and incorporated into such a device to protect a user, hackers are almost always able to come up with a new tool or an advanced algorithm which can effectively neutralize the security means. As a matter of fact, considering that almost everything in a data processing device operates in a digital domain, it is no wonder to realize that hackers can do almost everything they want to accomplish, given enough time to catch up. It is, accordingly, important to realize that the best or optimal policy for the users to protect their own data stored in their data processing devices may be to [1] not access suspicious websites, [2] not download any such malicious applications or contents into the device, or the like. Of course, this policy usually does not help, for there is no foolproof protocol to find out in advance which websites are suspicious or which contents include such viruses.

As discussed above, there is an impending need for a data processing terminal to provide a user with enhanced security, improved integrity, and heightened privacy. Of course, the enhanced security, improved integrity, and heightened privacy should not compromise the user convenience which a terminal is intended to provide. A user may find it most convenient when a data processing terminal can provide enhanced security, improved integrity, and heightened privacy, when a terminal can do so without requiring a user to provide many separate user inputs, without consuming a long period of time, or without sacrificing seamless operations of the terminal.

DISCLOSURE OF INVENTION

Solution to Problem

Various data processing terminals of this disclosure aim to provide their users with the enhanced security, the improved integrity, and the better data protection, while maintaining or improving a convenience of seamless capabilities by employing at least "four features" which may be "independent" of each other or which may be "interdependent" on each other, based upon configurational or operational characteristics of a terminal or upon such characteristics of various hardware or software elements of a main system of a terminal.

The first of such features is to provide a user with "at least two different modes" of operation each of which is granted with different access authority to drive a hardware or software element of a main system. As a result, a user may operate a terminal in one mode such as an unlock mode when a user processes reliable data, but may operate a terminal in another mode such as a lock mode when a user processes unreliable data. The second of such features is the "physical isolation" or "operational isolation" of a main (or lock) system from a lock (or main) system of a terminal.

The third of such features is the "erase (or semi-erase) operation" with which a terminal can erase all (or some) results obtained by running various lock operations with a lock system in a lock mode before such results may affect any hardware or software element of a main system of a terminal. To this end, a terminal may run an erase (or semi-erase) operation in one of various timings as defined above. Finally, the fourth of such features is the inclusion of a "mode-switching input unit" with which a user may conveniently switch from one mode to another mode, simply by providing a terminal with a user input which includes at least one mode-switching (user) sub-input, and without having to turn off a display unit of a terminal and then to turn it on again.

Various objectives, advantages, and benefits of various data processing terminals of this disclosure as well as related methods of providing and using such terminals will be described below, starting with definitions of terms and phrases to be used throughout this disclosure.

MODE FOR THE INVENTION

1. Definitions

Figure 1A:
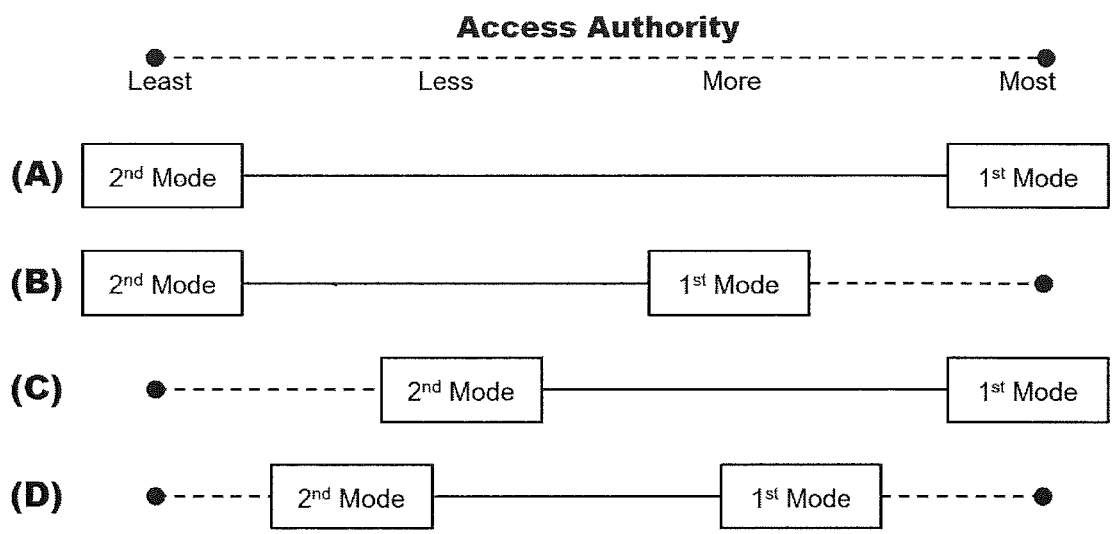
FIG. 1A is a schematic diagram of exemplary modes of operation of various hierarchies exemplified along a line of an access authority.

As described above, various data processing terminals of this disclosure may operate in multiple different (or sometimes identical or similar) modes of operation, each of which is granted by the terminals with different (or sometimes identical or similar access authorities). In addition, such terminals may allow their users to switch from a current mode to a new mode, while providing the users with the enhanced security, improved integrity, and heightened privacy.

It is appreciated throughout this disclosure that various numerals disposed between square brackets "["and" ]" such as, e.g., [1] or [2], mean that they are alternatives. Accordingly, "examples of devices include [1] a plate, [2] a cup, or the like" means that a device may be a plate, a cup, or other equivalents of the device.

1-1. Accessible Hardware or Software Elements

Each data processing terminal is equipped with multiple hardware elements and multiple software elements therein. Among those elements, when a terminal may allow a user to neither directly drive nor directly modify a certain hardware or software element for operational or security reasons, this element is to be referred to as a "non-accessible" hardware or software element within the scope of this disclosure. A microprocessor, a wireless transmitter, a wireless receiver, a firmware, and a kernel are typical examples of such non-accessible hardware or software elements. In addition, a software element which is stored not in an accessible user space of a terminal but in a protected kernel space of the terminal is other examples of the non-accessible elements.

However, when a manufacturer terminal allows a user to directly drive a certain hardware or software element with a user input, this element is referred to as an "accessible" hardware or software element of a main system of a terminal. For example, an input unit, a memory unit, a software application (or "app"), or an O/S with which a user can run various operations are typical examples of the accessible software or hardware elements. In addition, when a terminal provides a user with various user interfaces (e.g., a graphical user interface, a text-based interface, or another user interface), the hardware or software element which can be driven by a user by manipulating such user interfaces are other examples of the accessible hardware or software elements.

In this regard, when a data processing terminal grants a user with a certain access authority in a certain mode of operation, the user may [1] access all accessible hardware or software elements, or [2] access not all but only some of the accessible hardware or software elements. In each of the above [1] and [2], the terminal may also grant the user [3] to drive an entire "portion" of a certain accessible hardware or software element, or [4] to drive not the entire portion but only a restricted "portion" of a certain accessible hardware or software element. In the case of [4], a user may drive the certain accessible hardware or software element in a restricted "extent" such that the user may drive only some but not all portions of the element or may drive the element not with all available options but only with restricted "options."

Accordingly, a terminal may grant a user to switch from a current mode to a new mode upon receiving a proper user input. The terminal may then grant the user [1] to "access" at least one accessible hardware or software element, [2] to "drive" the element, [3] to "run" a certain operation by driving such an element, [4] to "perform" a certain function by driving the element, or the like, based on the access authority which the terminal grants to the user in the new mode. In contrary, a terminal may deny a user [5] from switching from a current mode to a new mode, e.g., when the terminal does not authorize a user input. In this case, [6] the user may get stuck in the current mode or [7] the terminal may switch to the off-state or the powered-off state. In the case of [6], the terminal may keep allowing the user to drive those hardware or software elements which are accessible in the current mode but may continue to block the user from driving other hardware or software elements which may only be accessible in the new mode.

It is appreciated that a user can "access" or "drive" at least one accessible hardware or software element only when a terminal grants the user with proper access authorities in a certain mode but that, even in such a mode, the user cannot access or drive non-accessible hardware or software elements. In this regard, when a terminal or user is said to access or to drive a certain hardware or software element, it is presumed that the hardware or software element is an "accessible" hardware or software element, unless otherwise specified. It is further appreciated that "to 'drive' an element" is [1] to be synonymous with "to 'drive' at least one accessible hardware or software element" and [2] to collectively include "to 'drive' at least one accessible hardware element" and/or "to 'execute' at least one accessible software element" hereinafter.

1-2. Main System vs. Lock System

A data processing terminal of this disclosure includes at least one main system and at least one lock system. In addition, a terminal may also include at least one optional intermediate system. In general, a terminal grants the greatest (or most) access authority to a user using the main system in an unlock mode, while granting the least access authority to a user using a lock system in a lock mode. A terminal may also grant an intermediate access authority to a user who uses the intermediate system in an intermediate mode, where the intermediate access authority is less than that of the main system but greater than that of the lock system.

As used herein, a "main system" refers to a system which a user uses to operate a data processing terminal in an unlock mode (of operation) which a terminal actually defines in a certain hierarchy. A main system may typically be a system which a user uses to operate a terminal in an "unlock mode" as will be described below. In this context, a main system is the system which is granted by the terminal the greatest access authority in a certain hierarchy. The main system includes at least one accessible hardware element and/or at least one accessible software element.

A terminal grants the greatest (or most) access authority when a user uses a main system in an unlock mode, thereby allowing a user to drive the greatest number (or all) of the accessible hardware elements of a main system and/or the greatest number (or all) of the accessible software elements of a main system. In this regard, a "main system" is synonymous with an "unlock system" in this disclosure. In addition, a main system or an unlock system operates in an unlock mode which is actually defined in a certain hierarchy by a terminal and which is actually granted with the most access authority in the hierarchy by the terminal.

In contrary, a "lock system" refers to another system which a user uses to operate a data processing terminal in a lock mode (of operation) which a terminal actually defines in a certain hierarchy. The lock system generally corresponds to a system which a user uses to operate a terminal in a "lock mode" as will be defined below. In this context, a lock system is a system which is granted with the least access authority in a certain hierarchy in which the lock mode is defined. A terminal may provide a lock system with at least one hardware or software element of its own, or may not provide any of such elements. A terminal may (or may not) allow a lock system to drive at least one accessible hardware or software element of a main system.

A lock system may be "physically" or "operationally" "isolated" from a main system for various security, integrity or privacy reasons as will be described below. It is appreciated that such "physical or operational" "isolation or blocking" is abbreviated as "isolation" or "blocking" for simplicity of illustration.

Therefore and in one case, when a user uses a lock system in a lock mode, a terminal may not grant a user with any access authority to various accessible elements of a main system through such isolation or blocking. Therefore, a user may neither access nor drive any accessible hardware or software element of a main system in a lock mode. Because a user cannot recruit any accessible hardware or software element of a main system in a lock mode, a lock system itself may preferably include at least one hardware or software element of its own accessible in the lock mode such that a user may access and drive such an element of a lock system and may run various operation in a lock mode. In this respect, a lock system is deemed to have the least access authority to the accessible hardware or software elements of a main system.

In another case, when a user uses a lock system in a lock mode, a terminal may grant the user with a minimum access authority to a main system such that, e.g., a user can only drive a minimum number of such accessible hardware or software elements of a main system, while operating a lock system in a lock mode. Although a terminal may allow a user to recruit (e.g., access or drive) at least one accessible hardware or software element of a main system in a lock mode, a terminal may completely (or partly) prevent a user (or lock system) [1] from storing any result into a main system or [2] from modifying any element of a main system through such isolation or blocking. As a result, the terminal may prevent (or at least minimize) a main system from being adversely affected or from being degraded by a lock system. In this case, because a user can recruit only a minimum number of the accessible hardware or software element of a main system in a lock mode, a lock system may [1] include at least one hardware or software element of its own to run various lock operations, or [2] not include any accessible element therein, while relying on a main system to run such lock operations. In this respect, this lock system may be deemed to have some (but not all) access authority to those accessible hardware or software elements of a main system.

In yet another case, when a user uses a lock system in a lock mode, a terminal may rather grant a user with a full access authority to a main system such that, e.g., a user can drive all accessible hardware or software elements of a main system while operating a lock system in a lock mode. However, a terminal may completely (or partly) prevent a user (or lock system) [1] from storing any results into a main system or [2] from modifying any element of a main system through such isolation or blocking. As a result, a terminal may still prevent (or at least minimize) a main system from being adversely affected or degraded by a lock system as well. In this case, because a user can recruit all accessible hardware or software elements of a main system while operating a lock system in a lock mode, the lock system may [1] still include at least one hardware or software element of its own, or [2] not include any element of its own, while completely depending upon a main system to run such lock operations in a lock mode. In this respect, this lock system may be deemed similar or (almost) identical to a main system.

1-3. Access Authority

As used herein, an "access authority" refers to an authority which a terminal grants (or assigns) to a user who operates a terminal with a certain system in a certain mode of operation. More particularly, an "access authority" refers to an authority which a terminal grants to a user to access a certain number of such accessible hardware or software elements of a main system. For example, a terminal may grant a user to access all, only some, or none of such accessible elements of a main system. When a terminal grants a user with access authority to a certain accessible hardware or software element of a main system, it is appreciated that a user can [1] "drive" the element, [2] "run" a certain operation by driving the element, and [3] "perform" a certain function by running the operation. It is appreciated that, depending upon the nature of such access authority, a user may have the access authority to drive such an element of a main system [1] by operating a main system in an unlock mode or [2] by operating a lock (or intermediate) system in a lock (or intermediate) mode. When this disclosure refers to access authority to a hardware or software element of a lock system, such access authority will be referred to as the access authority to access the element [1]

by a lock (or intermediate) system in a lock (or intermediate) mode or [2] by a main system in an unlock mode.

Therefore, unless otherwise specified, "access authority" of this disclosure refers to the access authority [1] to "access" at least one of the accessible hardware and/or software elements of a main system while operating a main system in an unlock mode or while operating a lock (or intermediate) system in a lock (or intermediate) mode, [2] to "drive" the hardware or software element while operating such a system in such a mode, [3] to "run" at least one operation by driving the element while operating such a system in such a mode, and then [4] to "perform" a certain function by running such an operation while operating such a system in such a mode. Only when the disclosure mentions access authority to at least one hardware or software elements of a lock system, such access authority refers to the access authority to [1] access at least one of such accessible lock elements of a lock system while operating a lock (or intermediate) system in a lock (or intermediate) mode or while operating a main system in an unlock mode, [2] to drive the elements while operating such a system in such a mode, [3] to run at least one operation while operating such a system in such a mode, and [4] to perform a certain function by running at least one operation while operating such a system in such a mode.

1-4. Modes (of Operation) and Access Authorities

As used herein, a "mode (of operation)" or simply a "mode" refers to an operational state of a data processing terminal, where a user can access a certain number of accessible hardware or software elements of a main system of a terminal. A terminal allows a user [1] to "advance" to a new mode from its "powered-off state" (i.e., when a terminal is powered off and is not communicable and, accordingly, its display unit is or has been turned off), [2] to "advance" to a new mode from its "off-state" (i.e., when a terminal is powered on and communicable, but its display unit is or has been turned off), [3] to "switch" from a current mode to a new mode while in an "on-state" (i.e., when a terminal is powered on and communicable, and its display unit is or has been turned on), [4] to "advance" to its off-state from one mode (i.e., in the on-state), or [5] to "advance" to its powered-off state from one mode (i.e., in the on-state), in response to a suitable user input provided to an input unit of a terminal by a user. For simplicity of illustration, to "switch modes (of operation)" or "mode switching" collectively refers to any of the above [1] to [5] hereinafter.

It is appreciated that a terminal may not allow a user to access any accessible hardware or software element of a main system in a certain mode such as, e.g., a lock mode or a certain most-restricted mode as will be defined below. In contrary, a terminal may allow a user to access all accessible hardware or software elements of a main system in another mode such as, e.g., an unlock mode or a most-unrestricted mode as will be defined below. It is appreciated that an "off-state" may be referred to as an "inactive state" and that an "on-state" may be referred to as an "active state," where a terminal is communicable and not completely powered off in any of such states. In contrary, when a terminal is powered off and not communicable, such a state is to be referred to as a "powered-off state" hereinafter. Of course, a display unit of a terminal is also turned off in the powered-off state.

When a user drives a certain accessible "hardware" element of the terminal, it is deemed that [1] a user may be able to drive all electrical, optical, mechanical, or magnetic "portions" of the element, or that [2] a user may only drive a certain number (but not all) of such portions of the element. Similarly, when a user executes a certain accessible "software" element of a terminal, it is also deemed that a user may be able to execute the software element [1] while using all available "options" of the software element, or [2] while using some but not all of such options.

As used herein, a "restricted mode (of operation)" or simply a "restricted mode" refers to a mode of operation, where a terminal does not allow a user to drive all accessible hardware or software elements of a main system of a terminal. Therefore, a "restricted mode" refers to various modes of operation each of which is granted by a terminal with access authority which falls short of the greatest (or full) access authority to drive all accessible hardware and software elements of a main system.

As used herein, a "more-restricted mode (of operation)" or simply a "more-restricted mode" refers to a mode of operation in which a user cannot drive all accessible hardware and/or software elements of a main system of a terminal, and in which a user may be allowed to drive a less number of such elements of a main system than in a reference restricted mode. In this regard, the "more-restricted mode" can be referred to as a "less-unrestricted mode (of operation)" when compared with the reference restricted mode. This more-restricted mode may be deemed as one of various restricted modes when compared to an unrestricted mode of operation.

A "most-restricted mode (of operation)" or simply a "most-restricted mode" refers to a mode of operation, where a user can drive the least number (or none) of the accessible hardware or software elements compared with the rest of various restricted modes defined in a hierarchy. In this respect, the "most-restricted mode" can also be referred to as a "least-unrestricted mode (of operation)" when compared with the reference restricted mode. Therefore, in a certain most-restricted mode, a user may not be able to drive any of the accessible hardware and software elements at all. This most-restricted mode may be deemed as one of various restricted modes when compared to an unrestricted mode of operation.

As used herein, an "unrestricted mode (of operation)" or simply an "unrestricted mode" refers to another mode of operation in which a user cannot drive all accessible hardware or software elements of a main system of a terminal, but in which a user can drive a greater number of the accessible hardware or software elements than a reference restricted mode. Therefore, an "unrestricted mode" may refer to various modes of operation which are granted with access authority falling short of the greatest (or full) access authority to such elements, but each of which is granted with access authority which is greater than the access authorities granted to any of the restricted modes.

Similarly, a "more-unrestricted mode (of operation)" or simply a "more-unrestricted mode" refers to a mode of operation in which a user cannot drive all accessible hardware or software elements of a main system of a terminal, but in which a user can drive a greater number of the accessible hardware or software elements than a reference restricted mode or than the above unrestricted mode. Therefore, a "more-unrestricted mode" can also be referred to as a "less-restricted mode (of operation)" when compared with that reference mode. This more-unrestricted mode may also be deemed as one of various unrestricted modes.

Similarly, a "most-unrestricted mode (of operation)" or simply a "most-unrestricted mode" refers to a mode of operation in which a user can drive the greatest number of (or all) accessible hardware or software elements of a main system of a terminal, when compared with a reference mode (or the rest of other modes). Therefore, a "most-unrestricted mode" can be referred to as a "least-restricted mode (of operation)" when compared to that reference mode (or the rest of other modes) in a hierarchy. It is appreciated, in a most-unrestricted mode, that a user may be able to drive all accessible hardware or software elements. Of course, this most-unrestricted mode may be deemed as one of various unrestricted modes.

It is appreciated that various modes such as, e.g., [1] a most-restricted mode, [2] a more-restricted mode, [3] a restricted mode, [4] an unrestricted mode, [5] a more-unrestricted mode, and [6] a most-unrestricted modes are defined in a relative context. Accordingly, when aligning such modes along a line of access authority where access authority increases from left to right, the above mode [1] is positioned at the far-left end of the line, the above mode [6] is positioned at the far-right end of the line, and the above modes from [2] to [5] are positioned between the modes [1] and [6] and from left to right.

FIG. 1A is a schematic diagram of exemplary modes of operation of various hierarchies. More particularly, FIG. 1A exemplifies various restricted and unrestricted modes as defined above, where each mode is represented along a line of an "Access Authority" and where a scope or a breath of access authority granted to each mode is represented as a position along the line. As shown in exemplary panels (A), (B), (C), and (D) of the figure, a terminal defines two modes such as a $1^{st}$ mode ($MD_1$) and a 2nd mode ($MD_2$), and a terminal operates in either of $MD_1$ or $MD_2$. A terminal also grants greater access authority to a user in $MD_1$ (positioned on the right side of the "Access Authority" line) than in $MD_1$ (positioned on the left side of the same line).

As manifest in FIG. 1A, a terminal can define an infinite number of different (or same) modes along the "Access Authority" line. However, a terminal actually defines only two modes, $MD_1$ and $MD_2$. Therefore, a terminal may allow a user [1] to switch to either of such modes from an off-state, or [2] to switch from one mode to the other of $MD_1$ and $MD_2$. In other words, a terminal of FIG. 1A "actually defines" only two different modes along the "Access Authority" line, although a terminal may have been able to define hundreds of different or same modes along the line.

In the panel (A), a terminal may operate in $MD_1$ or $MD_2$ while allowing a user to switch from one mode to the other in response to a proper user input. As shown in the figure, a terminal actually defines $MD_1$ at the far-right end of the Access Authority line (which corresponds to a hierarchy in which a terminal operates). Therefore, this $MD_1$ corresponds to the most-unrestricted (or least-restricted) mode. A terminal also actually defines $MD_2$ at the far-left end of the same line (or the hierarchy) and, therefore, this $MD_2$ corresponds to the most-restricted (or least-unrestricted) mode. Because a terminal grants a user with the greater access authority in $MD_1$ than in $MD_2$, a user can drive a greater number of the accessible hardware or software elements of a main system in $MD_1$ than in $MD_2$.

In the panel (B), a terminal similarly defines $MD_1$ and $MD_2$, where $MD_2$ is defined at the far-left end of the line of the Access Authority as in the panel (A). Therefore, this $2^{nd}$ mode corresponds to the most-restricted mode as well. Although a terminal defines $MD_1$ on the right side of $MD_2$ along the same Access Authority line, this $MD_1$ is not defined exactly at the far-right end of the same line, but on the left side of the far-right end. As a result, a terminal does not define $MD_1$ as the most-unrestricted mode in this hierarchy. Therefore, a user in this $MD_1$ cannot access all accessible hardware or software elements with access authority which a terminal would have granted to the most-unrestricted mode. Rather, a terminal grants $MD_1$ with the access authority which is greater than that granted to $MD_2$ but which is less than that would have been granted to the most-unrestricted mode. In this regard, $MD_1$ may be regarded as the more-unrestricted mode, but not as the most-unrestricted mode.

In the panel (C), a terminal similarly defines $MD_1$ and $MD_2$, where $MD_1$ is defined at the far-right end of the line of the Access Authority as in the panel (A). Therefore, this $MD_1$ corresponds to the most-unrestricted mode of a hierarchy. Although a terminal defines $MD_2$ on the left side of $MD_1$ along the same Access Authority line, $MD_2$ is not defined exactly at the far-left end of the same line, but on the right side of the far-left end. As a result, a terminal does not define $MD_2$ as the most-restricted mode in this hierarchy. Therefore, a user in $MD_2$ can access the accessible hardware or software elements with the access authority which is greater than the one which a terminal would have granted to the most-restricted mode. In this regard, this $MD_2$ may be referred to as the more-restricted mode, but not as the most-restricted mode.

In the panel (D), a terminal defines $MD_1$ and $MD_2$, where $MD_1$ is defined at a distance from the far-right end of the line of the Access Authority as in the panel (B), while $MD_2$ is also defined at a distance from the far-left end of the same line as in the panel (C). Therefore, $MD_1$ may be referred to not as the most-unrestricted mode but as the more-unrestricted mode, while $MD_2$ may be referred to not as the most-restricted mode but as the more-restricted mode.

As discussed hereinabove, a terminal may theoretically define numerous modes of operation along the line of the Access Authority, e.g., starting from a mode with the least access authority (i.e., the most-restricted mode) and ending at another mode with the most access authority (i.e., the most-unrestricted mode), while defining an infinite number of intermediate modes therebetween. Due to various security, integrity, or privacy reasons, however, a terminal (or its manufacturer or a user) may choose to not define such most-unrestricted mode or most-restricted mode in a certain hierarchy. The panels (B) and (D) of FIG. 1A are such exemplary hierarchies in which a terminal does not define a most-unrestricted modes at the far-right end of the Access Authority line, whereas the panels (C) and (D) are such exemplary hierarchies in which a terminal does not define a most-restricted modes at the far-left end of the same line.

In such cases, each hierarchy cannot cover the full line of the Access Authority, i.e., cannot extend starting from the very far-right end of the Access Authority line all the way to the far-left end of the same line. Rather, each hierarchy may cover only a portion of a full length of the Access Authority line, and may not define either the most-unrestricted mode or the most-restricted mode, or both. In this regard, this disclosure introduces an "unlock mode" and a "lock mode" which may or may not correspond to the above "most-unrestricted mode" and "most-restricted mode," respectively, depending upon whether or not a terminal "actually defines" a mode in the far-right end and the far-left end of the line of the Access Authority.

As used herein, a "lock mode (of operation)" or simply a "lock mode" corresponds to a mode of operation which a terminal actually defines at the most left side of the line of the Access Authority. Therefore, when a terminal defines a lock mode at the far-left end of the Access Authority line as shown in the panels (A) and (B) of FIG. 1A, this lock mode coincides with the "most-restricted mode" as defined above. Therefore, the mode with the least access authority which is actually granted to a user by a terminal operating in the hierarchy of the panel (A) or (B) is the lock mode which also corresponds the most-restricted mode of the same hierarchy.

In contrary, when a terminal defines a lock mode away from the far-left end of the same line as depicted in the panels (C) and (D) of FIG. 1A, a lock mode then corresponds not to a most-restricted mode but to a "more-restricted mode" or a "restricted mode." Therefore, the mode with the least access authority which is actually granted to a user by a terminal operating in the hierarchy of the panel (C) or (D) is another lock mode which is granted with more access authority than the one granted to the most-restricted mode. As a result, a user who operates a terminal in this lock mode of the hierarchy of the panel (C) or (D) can access a greater number of the accessible hardware or software elements than a user who operates the same terminal in the lock mode of the hierarchy of the panel (A) or (B).

Similarly, an "unlock mode (of operation)" or simply an "unlock mode" refers to a mode of operation which a terminal actually defines at the most right side of the line of the Access Authority. Accordingly, when a terminal defines the unlock mode at the far-right end of the Access Authority line as shown in the panels (A) and (C) of FIG. 1A, this unlock mode then coincides with the "most-unrestricted mode" as defined above Therefore, the mode granted with the greatest access authority by a terminal operating in the hierarchy of the panel (A) or (C) is the unlock mode which also corresponds to the most-unrestricted mode of the same hierarchy.

In contrary, when the terminal defines the unlock mode away from the far-right end of the same line as shown in the panels (B) and (D) of FIG. 1A, an unlock mode then corresponds not to a most-unrestricted mode but to a "more-unrestricted mode" or "unrestricted mode" as defined above. Therefore, the mode granted with the most access authority by a terminal operating in the hierarchy of the panel (B) or (D) is another unlock mode which is granted with less access authority than the one granted to the most-unrestricted mode. As a result, a user who operates a terminal in this lock mode of the hierarchy of the panel (B) or (D) can only access a less number of the accessible hardware or software elements than a user who operates the same terminal in the unlock mode of the hierarchy of the panel (A) or (C).

It is appreciated that various exemplary modes in FIG. 1A are granted with access authorities which overlap each other and that different scopes of such access authorities are characterized as positions along the line of the Access Authority in FIG. 1A. Such overlapping scopes of various modes of operation in FIG. 1A can be represented in different ways as well.

Figure 1B:
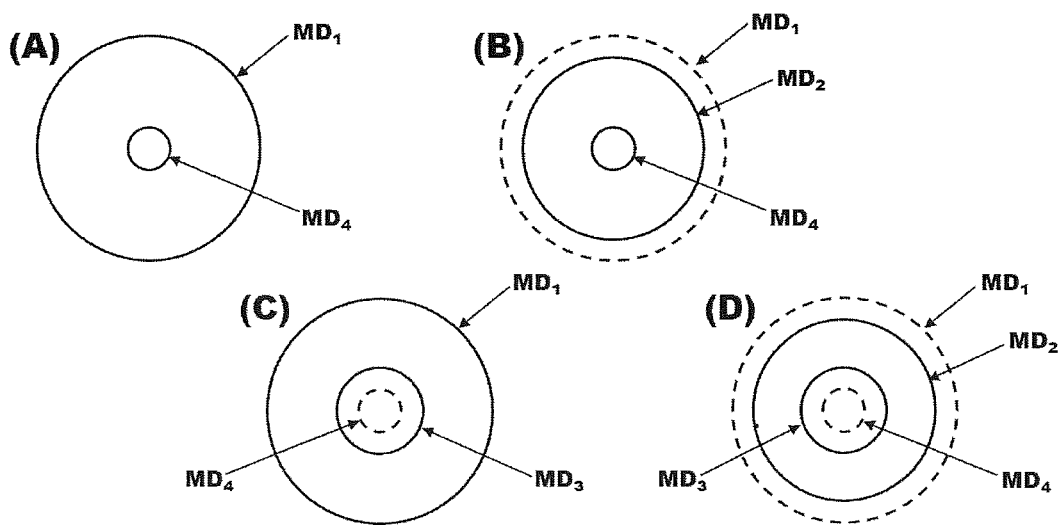
FIG. 1B is a schematic diagram of exemplary modes of operation of various hierarchies shown as circles.

For example, FIG. 1B is a schematic diagram of exemplary modes of operation of various hierarchies, where each mode is represented as a circle, and where a scope or a breath of an access authority in each mode is represented as a radius, a diameter or a size of each circle. In each panel of FIG. 1B, an outer-most circle represents the "most-unrestricted mode" which can be defined by a terminal, and that an inner-most circle represents the "most-restricted mode" which can also be defined by a terminal. In addition, a circle in a solid line is a mode which a terminal "actually defines" in a hierarchy and in which a user can "actually operate" a terminal. In contrary, a circle in a dotted line is a mode which a terminal can but does not actually define in a certain hierarchy due to, e.g., various security, integrity, or privacy reasons.

For example and in the panel (A) of FIG. 1B, a terminal defines a pair of modes, $MD_1$ and $MD_4$, in an exemplary hierarchy, where $MD_1$ is the unlock mode, while $MD_4$ is the lock mode. Because a terminal defines the unlock mode, $MD_1$, as the outer-most circle, this unlock mode coincides with the "most-unrestricted mode." Therefore, a terminal grants $MD_1$ with the greatest access authority, while enabling a user who operates a terminal in $MD_1$ to drive the greatest number of (or all) such accessible hardware or software elements of a main system.

A terminal of the panel (A) also defines a lock mode, $MD_4$, as the inner-most circle. Therefore, the lock mode of the hierarchy of the panel (A) coincides with the "most-restricted mode" and, as a result, the terminal grants $MD_4$ with the least access authority, thereby allowing a user who operates a terminal in $MD_4$ to drive only a few (or none) of such accessible hardware or software elements. In this regard, the exemplary hierarchy of the panel (A) of FIG. 1B is the same as that of the panel (A) of FIG. 1A. In addition, it is manifest from the panel (A) that $MD_1$ overlaps $MD_4$. In other words, a user who operates a terminal in $MD_1$ can drive each and every hardware and software element which a user can operate the same terminal in $MD_4$.

In the panel (B) of FIG. 1B, a terminal defines a pair of modes $MD_2$ and $MD_4$, where $MD_4$ is the same as that in the panel (A) of FIG. 1B. Therefore, $MD_4$ is again the lock mode which corresponds to the "most-restricted mode" of the hierarchy. In contrary, a terminal actually defines $MD_2$ in the solid line as the largest circle of the hierarchy, while not actually defining $MD_1$ which is, therefore, in the dotted line. Accordingly, $MD_2$ corresponds not to a "most-unrestricted mode" but to a "more-unrestricted mode" or an "unrestricted mode." As a result, a user in $MD_2$ can drive only a few (but not all) of such accessible hardware or software elements which would have been drivable in $MD_1$. In this regard, the exemplary hierarchy of the panel (B) of FIG. 1B is the same as that of the panel (B) of FIG. 1A. Again, it is manifest from the panel (B) that $MD_2$ overlaps $MD_4$. In other words, a user who operates a terminal in $MD_2$ can drive each and every hardware and software element which a user can operate the same terminal in $MD_4$.

In the panel (C) of FIG. 1B, a terminal defines a pair of modes $MD_1$ and $MD_3$, where $MD_1$ is the same as that in the panel (A) of FIG. 1B. Therefore, $MD_1$ is the unlock mode which also corresponds to the "most-unrestricted mode" of the hierarchy. In contrary, a terminal defines $MD_3$ in the solid line as the smallest circle of the hierarchy, while not actually defining $MD_4$ which, therefore, is in the dotted line. Accordingly, $MD_3$ corresponds not to the "most-restricted mode" but to the "more-restricted mode" or the "restricted mode." As a result, a user in $MD_3$ can drive only a few (but not all) of such hardware or software elements accessible in $MD_1$, but can drive each and every hardware or software element which is accessible in $MD_4$. In this regard, a hierarchy of the panel (C) of FIG. 1B is the same as that of the panel (C) of FIG. 1A. In addition, it is manifest from the panel (C) that $MD_3$ overlaps $MD_4$ as well.

In the panel (D) of FIG. 1B, a terminal defines the lock mode ($MD_3$) and the unlock mode ($MD_2$) each of which is the same as those of the panels (C) and (B), respectively. Accordingly, the unlock mode, $MD_2$, corresponds not to the "most-unrestricted mode" but to the "more-unrestricted mode" or the "unrestricted mode." Similarly, the lock mode, $MD_3$, corresponds not to the "most-restricted mode" but rather to the "more-restricted mode" or the "restricted mode." As a result, a terminal grants the user in $MD_2$ with the access authority which is less than the one in $MD_1$ but greater than the one in $MD_3$. Similarly, the terminal grants the user in $MD_3$ with another access authority which is greater than the one in $MD_4$ but less than the one in $MD_2$.

As manifest from the panel (D), $MD_2$ overlaps $MD_3$ such that a user who operates a terminal in $MD_2$ can drive each and every hardware and software element which a user can operate the same terminal in $MD_3$.

Although each exemplary terminal of FIGS. 1A and 1B defines two modes with different access authorities, a terminal may define more than two modes in a certain hierarchy of modes. For example, a terminal may define more than two modes, where a $3^{rd}$ mode ($MD_3$) is a lock mode which is actually granted with the least access authority by a terminal in a certain hierarchy, where $MD_1$ is an unlock mode which is actually granted with the greatest access authority by the same terminal in the same hierarchy, and where $MD_2$ is an intermediate mode actually granted with the access authority which is less than that of $MD_1$ but greater than that of $MD_3$.

In this regard, an "intermediate mode (of operation)" or simply an "intermediate mode" corresponds to a mode of operation which a terminal actually defines along the line of the Access Authority of a certain hierarchy and which lies between a lock mode and unlock mode. The terminal grants an intermediate mode with the access authority which is [1] less than the access authority that a terminal actually grants to an unlock mode of the same hierarchy and [2] greater than the access authority that a terminal actually grants to a lock mode of the same hierarchy.

A terminal may define [1] a single intermediate mode or [2] any number of such intermediate modes along the Access Authority line. When a hierarchy defines multiple intermediate modes, such modes may be termed as a "semi-unlock mode" or a "less-unlock mode," a "semi-lock mode" or a "less-lock mode," or the like, where the semi-unlock mode or less-unlock mode is the mode to which a terminal grants such access authority which is less than that of the unlock mode, and the semi-lock mode or less-lock mode is the mode to which a terminal grants such access authority which is greater than that of the lock mode.

It is appreciated that various intermediate modes may be defined in a relative context. Accordingly, a terminal may define a more-unlock mode or a more-lock mode. For simplicity purposes, however, it is appreciated that such intermediate modes only include the semi-unlock mode or less-unlock mode, and the semi-lock mode or less-lock mode, and that the semi-lock mode or the less-lock is deemed to have the access authority which is less than the access authority of the semi-unlock mode or the less-unlock mode.

As discussed above, various modes of FIG. 1A or FIG. 1B are characterized as having "overlapping access authorities." In other words, a terminal grants a user with different access authorities in an unlock mode and in a lock mode in such a way that a user in an unlock mode of a certain hierarchy can drive not only [1] those hardware or software elements which the user can drive in a lock mode of the same hierarchy but also [2] at least one additional hardware or software element which the user cannot drive in the lock mode due to lack of access authorities. In addition, when a terminal defines two modes with such overlapping access authorities, such modes are to be referred to as "overlapping modes" hereinafter.

Rather, a terminal may define a hierarchy in which a terminal grants a lock mode with an access authority such that [1] at least a portion of the access authority granted to a lock mode is shared by another access authority granted to an unlock mode of the same hierarchy but [2] at least a portion of the access authority granted to the lock mode is not shared by that of the unlock mode. That is, a user in an unlock mode of a certain hierarchy can drive at least one but not all of such hardware or software elements which a user can drive in a lock mode of the same hierarchy. As used herein, such access authorities are referred to as "partly overlapping access authorities" and such modes are to be referred to as "partly overlapping modes" hereinafter.

In contrary, a terminal may define a different hierarchy in which a terminal defines multiple modes in a certain hierarchy with different access authorities which do not overlap each other at all. That is, a user in an unlock mode cannot even drive any hardware or software element which the user can drive in a lock mode of the same hierarchy. As used herein, such access authorities are defined as "non-overlapping access authorities" and such modes are to be referred to as "non-overlapping modes" hereinafter. It is appreciated that, despite such non-overlapping features, a user in an unlock mode can still drive a greater number of such accessible hardware or software elements than the user in a lock mode.

As will be explained below, a terminal (or user) may employ such overlapping modes, partly overlapping modes or non-overlapping modes in a certain hierarchy for different reasons. For example, when a terminal defines multiple, overlapping modes each of which is granted with different access authorities, a user can drive more accessible hardware or software elements in an unlock mode (while optionally providing additional passwords or authentication user sub-inputs), but a user may drive less hardware or software elements when the user operates a terminal in a lock mode. Another exemplary use of the overlapping modes includes a situation where a user drives all accessible hardware or software elements in an unlock mode for personal matters, whereas the user drives a limited number of such hardware or software elements in a lock mode, thereby preventing a complete access to personal data stored in a main system. Accordingly, the security, the integrity, and the security of a main system of a terminal may be maintained.

In contrary, when multiple users share a single terminal, the users may set up a hierarchy in which each user can operate a terminal in his own modes in such way that such modes do not overlap other modes defined for other users at all. Therefore, although a user may not operate a terminal in other user's modes, the user can prevent other users to operate a terminal in his own modes as well. That is, each user can independently drive his or her own accessible elements, while not allowing others to drive his or her own elements. Other variations of such overlapping, partly overlapping, or non-overlapping modes will be provided in a greater detail below.

Figure 1C:
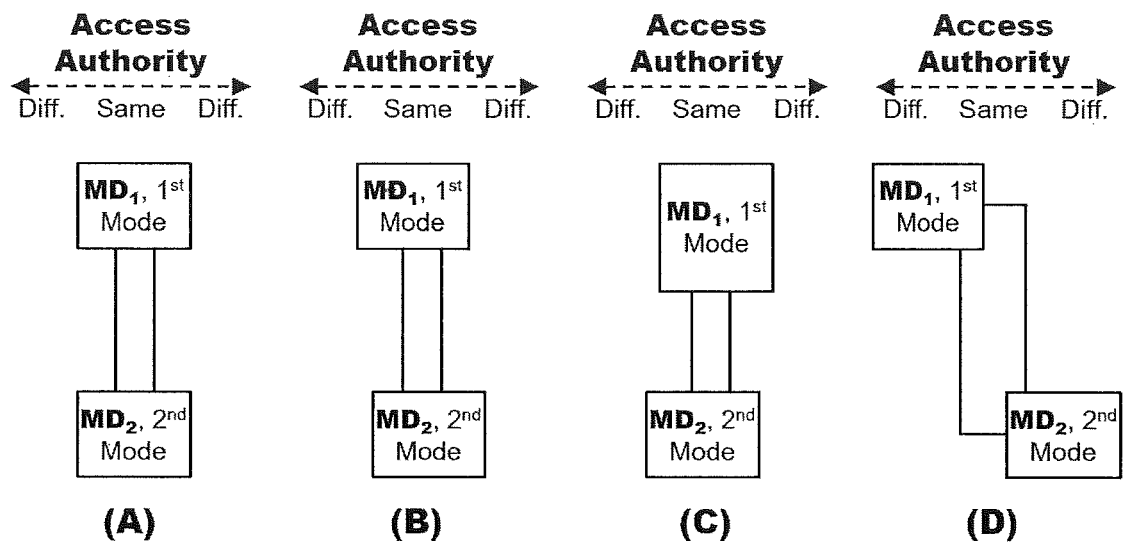
FIG. 1C is a schematic diagram of such overlapping, partly overlapping, or non-overlapping access authorities.

FIG. 1C is a schematic diagram of such overlapping, partly overlapping, or non-overlapping access authorities, where a terminal of each panel actually defines two modes such as, e.g., $MD_1$ (e.g., an unlock mode) and $MD_2$ (e.g., a lock mode), and where the terminal operates in either of $MD_1$ and $MD_2$. It is appreciated that overlapping features of $MD_1$ and $MD_2$ are represented by a lateral (or horizontal) position of such modes along the line of the Access Authority such that, the more such modes are located near the center of the Access Authority line, the access authorities of such modes overlap each other to a greater extent. In contrary, the farther off such modes are from the center of the line of the Access Authority in opposite directions, the access authorities of such modes may overlap each other to a less extent. It is also appreciated that a scope of the access authority which is granted by a terminal to each mode is represented by a height of a rectangle of each mode.

In the panel (A) of FIG. 1C, a terminal actually defines $MD_1$ and $MD_2$ represented by the rectangles with similar or identical heights. Therefore, a terminal is deemed to grant $MD_1$ and $MD_2$ with the access authorities with similar or identical scopes. That is, a user may drive a similar or identical number of such accessible hardware or software elements in either mode. Such $MD_1$ and $MD_2$ are also located approximately along a center of the Access Authority line. Because $MD_1$ and $MD_2$ overlap each other, they are the overlapping modes as well.

In the panel (B) of FIG. 1C, a terminal actually defines $MD_1$ and $MD_2$ represented by the rectangles similar to those of the panel (A) and, therefore, a terminal is deemed to grant $MD_1$ and $MD_2$ with access authorities with similar or identical scopes. However, $MD_1$ and $MD_2$ are located not along a center of the Access Authority line, but slightly away from its center. Therefore, $MD_1$ and $MD_2$ are deemed to be in the partly overlapping modes granted with partly overlapping access authorities by the terminal. That is, a user in either mode may drive at least one common accessible hardware or software element, but a user may drive a camera in $MD_1$ but not in $MD_2$, may execute a scheduling application in $MD_2$ but not in $MD_1$, or the like.

In the panel (C) of FIG. 1C, a terminal actually defines $MD_1$ and $MD_2$, where a rectangle of $MD_1$ is taller than that of $MD_2$. Therefore, a terminal is presumed to grant a greater access authority to $MD_1$ than to $MD_2$. In addition, $MD_1$ and $MD_2$ are located not along a center of the line of the Access Authority, but slightly away from its center. Therefore, $MD_1$ and $MD_2$ are deemed to be the partly overlapping modes.

In the panel (D) of FIG. 1C, a terminal actually defines $MD_1$ and $MD_2$, while granting such modes with the access authorities which do not overlap each other at all. Accordingly, whatever hardware or software elements a user can drive in $MD_1$ (or $MD_2$), the user cannot drive such elements in $MD_2$ (or $MD_1$), respectively. Therefore, $MD_1$ and $MD_2$ are deemed to be the non-overlapping modes.

Figure 1D:
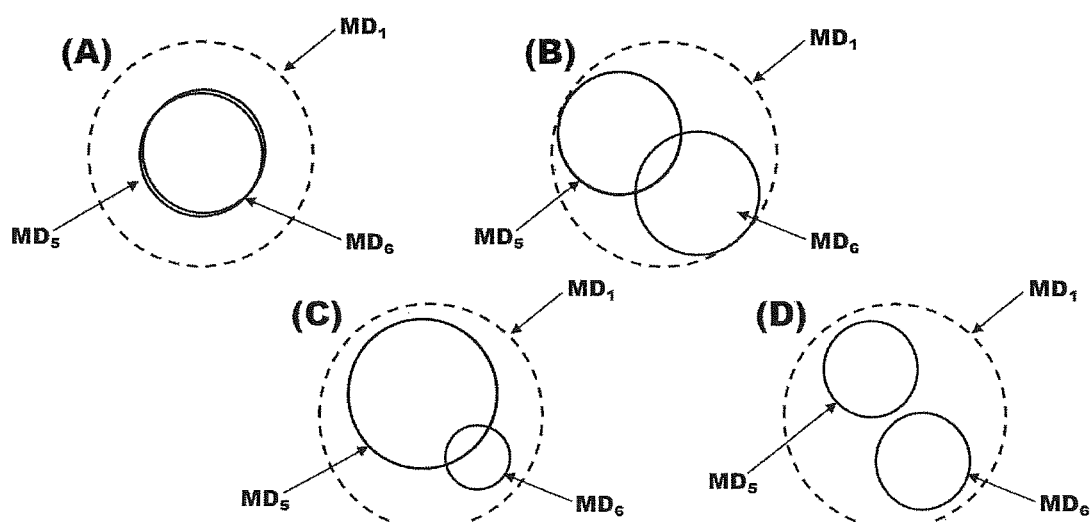
FIG. 1D is a schematic diagram for quantifying such overlapping, partly overlapping, and non-overlapping access authorities.
Figure 2A:
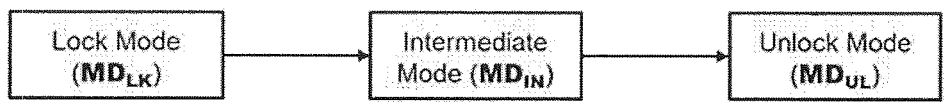
FIGS. 2A and 2B are schematic diagrams of exemplary series hierarchies.
Figure 2B:
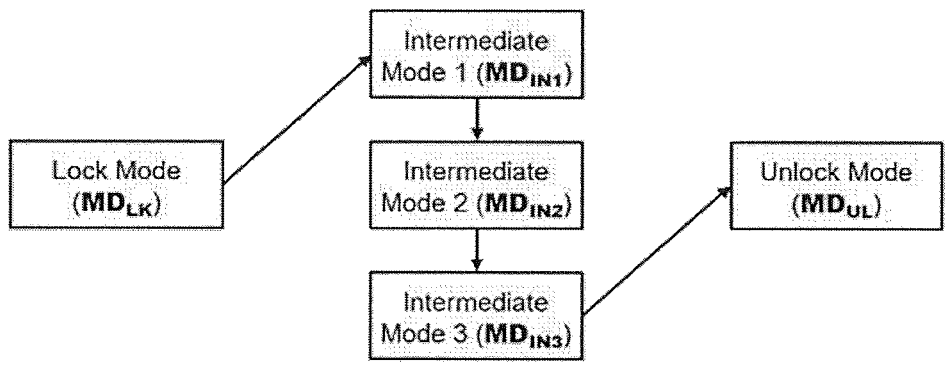
Figure 2C:
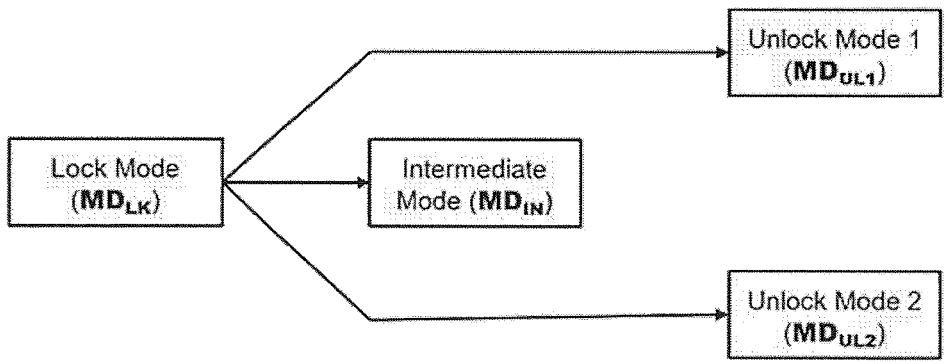
FIGS. 2C and 2D are schematic diagrams of exemplary parallel hierarchies.
Figure 2D:
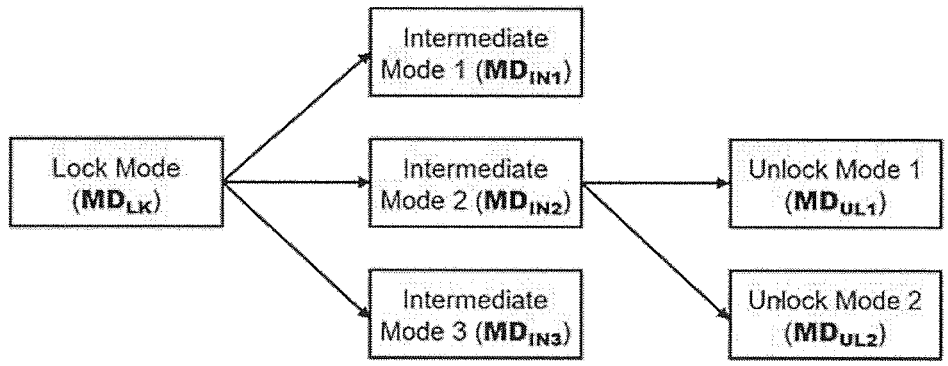
Figure 2E:
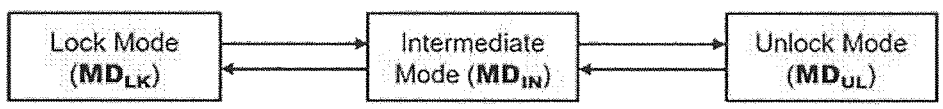
FIGS. 2E and 2F are schematic diagrams of exemplary circulating hierarchies.
Figure 2F:
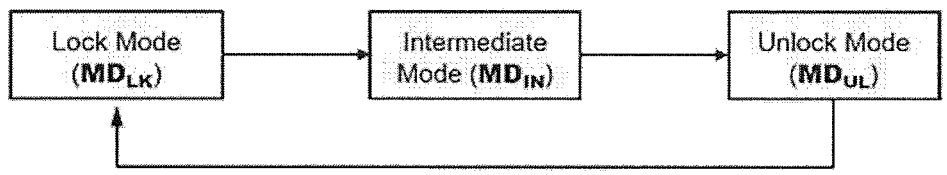
Figure 2G:
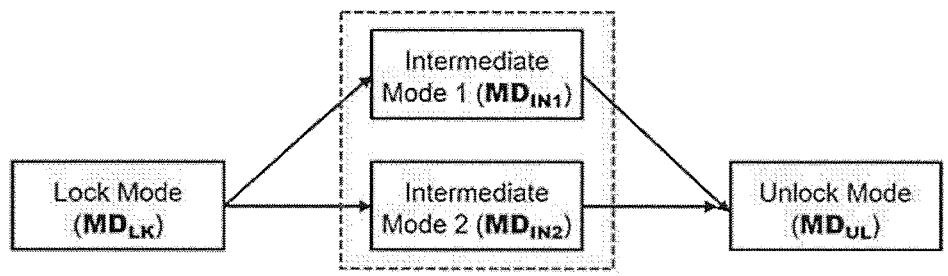
FIGS. 2G and 2H are schematic diagrams of exemplary hybrid hierarchies.
Figure 2H:
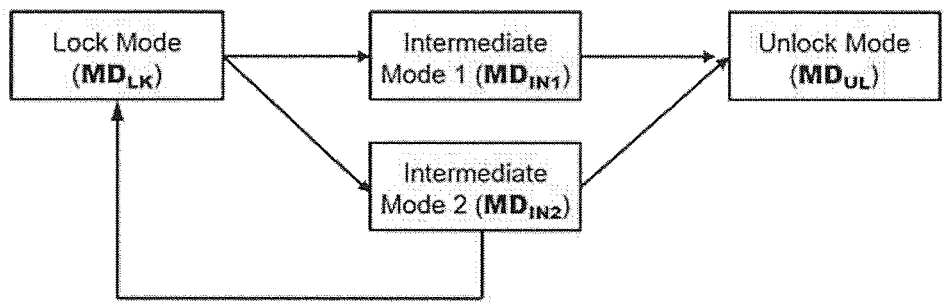

FIG. 1D is a schematic diagram for more examples of the overlapping, partly overlapping, and non-overlapping access authorities for various modes of operation, where each circle denotes each mode of a certain hierarchy, and where a radius, diameter or area of each circle describes a scope of an access authority which a terminal grants to each mode. It is appreciated, similar to those of FIG. 1B, that [1] each outer-most circle of each panel corresponds to a "most-unrestricted mode" which can be defined by a terminal, [2] each inner-most circle of each panel corresponds to a "most-restricted mode" which can also be defined by a terminal, [3] any circle in a solid line is a mode which a terminal actually defines in a certain hierarchy, and [4] any circle in a dotted line means a mode which a terminal could have but does not actually define in the hierarchy due to the security, integrity, or privacy reasons. Therefore, an outer-most (or largest) circle in the solid line means an unlock mode of a certain hierarchy, while an inner-most (or smallest) circle in the solid line means a lock mode of the same hierarchy. It is also appreciated in FIG. 1D that a location of each circle represents which particular hardware or software elements a user can drive in each mode.

In this context, a terminal of the panel (A) of FIG. 1D defines two modes, $MD_5$ and $MD_6$, where one mode may overlap the other or such modes are substantially identical to each other, while having substantially identical access authorities. Therefore, $MD_5$ and $MD_6$ are the overlapping modes, and correspond to $MD_1$ and $MD_2$ of the panel (A) of FIG. 1C, [1] where $MD_5$ and $MD_6$ may correspond to an unlock mode and a lock mode (or vice versa), or [2] where both $MD_5$ and $MD_6$ may be deemed as the unlock (or lock) modes. It is appreciated that, in either of $MD_5$ or $MD_6$, a terminal grants a user with the access authority which is less than that which a terminal would have granted in the most-unrestricted mode (i.e., the outer-most circle in a dotted line).

In contrary, a terminal of the panel (B) of FIG. 1D defines two modes, $MD_5$ and $MD_6$, where each mode partly overlaps the other so that $MD_5$ and $MD_6$ include at least one common portion but that each of $MD_5$ and $MD_6$ includes at least one different portion which is not overlapped by the other. Accordingly, $MD_5$ and $MD_6$ are the partly overlapping modes, and correspond to $MD_1$ and $MD_2$ of the panel (B) of FIG. 1C. Similar to those of the panel (A) of the same figure, $MD_5$ and $MD_6$ [1] may respectively correspond to an unlock mode and lock mode (or vice versa), or [2] may be deemed as the unlock (or lock) modes. It is appreciated that, in either of $MD_5$ or $MD_6$, a terminal grants a user with the access authority which is less than the access authority which a terminal would have granted in the most-unrestricted mode (i.e., the outer-most circle in a dotted line).

A terminal of the panel (C) of FIG. 1D also defines two modes, $MD_5$ and $MD_6$, which are similar to those of the panel (B), but which have different scopes of access authorities. Accordingly, $MD_5$ and $MD_6$ are also the partly overlapping modes which are similar to the $1^{st}$ and $2^{nd}$ modes of the panel (C) of FIG. 1C. In addition, because the circle of $MD_5$ is bigger than that of $MD_6$, $MD_5$ may be deemed as an unlock mode, and $MD_6$ may be deemed as a lock mode.

A terminal of the panel (D) of FIG. 1D defines two modes, $MD_5$ and $MD_6$, where each mode does not overlap the other at all and, therefore, there exists no common access authority therebetween. Accordingly, $MD_5$ and $MD_6$ are the non-overlapping modes, and correspond to $MD_1$ and $MD_2$ of the panel (D) of FIG. 1C. Because $MD_5$ and $MD_6$ have substantially identical diameter or area, a user may drive a substantially identical number of the accessible hardware or software elements in either mode, although those elements a user can drive in $MD_5$ are different from those elements a user can drive in $MD_6$.

As exemplified above, a terminal may operate in a hierarchy which "actually defines" only two modes such that one mode with less access authority corresponds to a "lock mode," and that another mode with more access authority corresponds an "unlock mode." In addition and as shown in the panels (A), (B), (D) of FIG. 1D, either mode may be deemed as either an unlock mode or a lock mode [1] when a terminal grants such modes with substantially identical access authorities or [2] when a terminal defines such modes as the non-overlapping modes.

A terminal may also set up a hierarchy which "actually defines" more than two modes of operation. In this case, a mode granted with the least access authority may correspond to a "lock mode," a mode granted with the greatest access authority may correspond to an "unlock mode," while a mode granted with intermediate access authority may correspond to an "intermediate mode." In addition and as defined above, a lock mode may be [1] a most-restricted mode or [2] a more-restricted mode or a restricted mode granted with the access authority greater than that granted to the most-restricted mode (had a terminal defined the most-restricted mode in the same hierarchy). An unlock mode may similarly be [1] a most-unrestricted mode or [2] a more-unrestricted mode or an unrestricted mode granted with the access authority less than that granted to the most-unrestricted mode (had a terminal defined the most unrestricted mode in the same hierarchy).

A terminal may define [1] multiple unlock modes with a single lock mode and an optional intermediate mode, [2] multiple lock modes with a single unlock mode and an optional intermediate mode, [3] multiple lock modes and at least one unlock mode, without any intermediate mode, [4] multiple unlock modes and at least one lock mode, without any intermediate mode, or the like. More examples of various hierarchies follow in the next definition of a "hierarchy" and various types thereof.

1-5. Types of Hierarchies

As defined above, a "mode (of operation)" or simply a "mode" refers to an operational state of a data processing terminal, where a user can access a certain number of accessible hardware or software elements of a main system of a terminal. In this context, a "hierarchy (of operation)" or simply a "hierarchy" means a set of at least two modes which a terminal actually defines (e.g., along a line of an access authority or on a domain of an access authority) and to each of which a terminal grants preset access authority to accessible hardware and/or software elements of a main system of the terminal.

For example, a terminal (or a user) may define [1] at least one unlock mode and at least one lock more in a $1^{st}$ hierarchy, [2] at least two unlock modes with no lock mode in a $2^{nd}$ hierarchy, [3] at least two lock modes with no unlock mode in a $3^{rd}$ hierarchy, [4] at least one unlock mode, at least one intermediate mode, and at least one lock mode in a $4^{th}$ hierarchy, or the like. It is appreciated that at least two unlock modes may be granted with the identical or at least substantially similar access authorities and, accordingly, that such modes as well as their access authorities are completely overlapping each other. To the contrary, at least two unlock modes may be granted with the partly overlapping or non-overlapping access authorities. The same applies to at least two lock modes or at least two intermediate modes as well.

Once a terminal (or a user) sets up a certain hierarchy and defines certain modes in the hierarchy, a terminal may [1] advance to a certain mode defined in a hierarchy from a powered-off state or an off-state of a terminal, [2] switch to a new mode defined in a hierarchy from a current mode also defined in the hierarchy, or [3] to advance to a powered-off state or an off-state from a current mode. To this end, a terminal (or a user) may set up various hierarchies based on the needs, and may actually define various modes in each of such hierarchies. Following examples explain various types of such hierarchies.

As used herein, a "series hierarchy" refers to a hierarchy where [1] multiple modes of operation are arranged in a series manner, and [2] a user can switch from one mode to a neighboring mode when a terminal receives a proper user input from a user. Following figures are exemplary series hierarchies, in which a terminal actually defines at least two modes, and in which those modes positioned on a right side of a hierarchy (i.e., a "forward direction" or an "upstream") are deemed to have greater access authorities than those positioned on a left side of the hierarchy (i.e., a "backward direction" or a "downstream").

FIG. 2 is a schematic diagram of exemplary hierarchies (of modes) each defining multiple modes along a line of an Access Authority (not shown in the figure) and each granting more access authorities to the modes along a forward direction than other modes along a backward direction. As used herein and for simplicity of illustration, a "forward direction" or an "upstream" means a direction toward a right side of the figure and that a "backward direction" or a "downstream" means a direction toward a left side of the figure.

In the panel (A) of FIG. 2, a terminal sets up a hierarchy which defines three modes, $MD_{LK}$, $MD_{IN}$, and $MD_{UL}$, each corresponding to a lock mode, an intermediate mode, and an unlock mode, respectively. As described in the figure, three modes are arranged in a series manner. Therefore, a terminal may allow a user to switch to $MD_{LK}$ when a user supplies a $1^{st}$ user input to a terminal in an off-state, to switch from $MD_{LK}$ to $MD_{IN}$ (in a forward direction represented by an arrow pointing to the right) as a user provides a $2^{nd}$ user input, and then to switch from $MD_{IN}$ to $MD_{UL}$ (in a forward direction represented by another arrow pointing to the right) when the user provides a $3^{rd}$ user input. When the user provides an additional user input, a terminal may then stay in $MD_{UL}$, for the terminal does not allow the user to switch to any new mode from $MD_{UL}$.

When a user turns off a display unit of a terminal, a terminal switches to an off-state. When a user provides a $1^{st}$ user input thereafter, a terminal may repeat the processes of the above paragraph, while allowing a user to switch to a certain mode, and then to switch to a new mode in response a $2^{nd}$ user input.

In the panel (B) of FIG. 2, a terminal sets up a hierarchy which defines five modes such as $MD_{LK}$, $MD_{IN1}$, $MD_{IN2}$, $MD_{IN3}$, and $MD_{UL}$, where a terminal grants greater access authorities to such modes in the above order and where $MD_{IN1}$, $MD_{IN2}$, and $MD_{IN3}$ are intermediate modes each of which is granted with the access authority greater than that to $MD_{LK}$ but less than that to $MD_{UL}$. Because five modes are arranged in a series manner, operating a terminal in the hierarchy of the panel (B) are similar to those in the hierarchy of the panel (A).

It is appreciated in the panels (A) and (B) that a terminal may allow a user to switch modes in different manners. For example, a terminal may switch from a current mode to a neighboring mode in a forward direction of a hierarchy, as exemplified in directions of such arrows connecting adjacent modes. Therefore, a terminal may switch from $MD_{LK}$ to $MD_{IN1}$, then to $MD_{IN2}$, then to $MD_{IN3}$, and then to $MD_{UL}$, whenever a terminal receives a user input. This mode switching is to be referred to as a "series switching" hereinafter. Conversely, a terminal may switch from a current mode to another mode which is not necessarily adjacent to the current mode upon receiving a user input, where this mode switching is to be referred to as a "selective switching" thereafter. It is appreciated in the series or selective switching that a terminal may only switch modes along the lines and the arrows defined in the hierarchy.

It is appreciated in the panels (A) and (B) that those mode positioned at the far-right end and the far-left end of a hierarchy are connected to only one neighboring mode, but that those modes positioned between the opposing ends of the hierarchy are connected to a pair of neighboring modes. In other words, no mode in the series hierarchy may be connected to more than two neighboring modes. In addition, no mode in the series hierarchy may branch or bifurcate into more than one mode, and no modes in the series hierarchy may merge into one mode either.

To the contrary and as used herein, a "parallel hierarchy" refers to a hierarchy [1] where multiple modes of operation are arranged in a parallel manner (i.e., at least one mode branches or bifurcates into multiple modes or at least two modes merge into one mode) and [2] where a user can switch from one mode to a neighboring mode when a terminal receives a proper user input from a user. Following figures provide a few exemplary parallel hierarchies in which the modes positioned in a forward direction are deemed to have greater access authorities than those in a backward direction.

In the panel (C) of FIG. 2, a terminal sets up a hierarchy which defines four modes such as two unlock modes ($MD_{UL1}$ and $MD_{UL2}$), a single intermediate mode ($MD_{IN}$), and a single lock mode ($MD_{LK}$), while defining a single bifurcation or branch in $MD_{LK}$. As is the case with the panels (A) and (B) of FIG. 2, a terminal switches from its off-state to $MD_{LK}$ upon receiving a $1^{st}$ user input from a user. In this parallel hierarchy, a user may then switch from $MD_{LK}$ to one of $MD_{UL1}$, $MD_{IN}$, or $MD_{UL2}$, depending upon a $2^{nd}$ user input or, more particularly, depending upon a mode-switching (user) sub-input ($UI_{SWT}$) which is included in the $2^{nd}$ user input. When a user provides a $3^{rd}$ user input thereafter, a terminal may not switch to another mode, because none of $MD_{UL1}$, $MD_{IN}$, or $MD_{UL2}$ are connected to another mode either in the forward or backward direction.

In the panel (D) of FIG. 2, a terminal sets up a hierarchy defining six modes such as a single lock mode ($MD_{LK}$), three intermediate modes ($MD_{IN1}$, $MD_{IN2}$, and $MD_{IN3}$, and two unlock mode ($MD_{UL1}$ and $MD_{UL2}$), while including a pair of branches in $MD_{LK}$ and $MD_{IN2}$. Therefore, in such branches, a terminal may have to receive a specific user input which may in turn include specific $UI_{SWT}$ which helps a terminal determine which new mode to switch to according to the hierarchy. Other operations of a terminal of the panel (D) are similar to those according to the panel (C).

It is appreciated various panels of FIG. 2 that each mode in a series hierarchy may be connected to at least one adjacent mode in either a forward direction or a backward direction, but may not be directly connected to other non-adjacent modes. Therefore, a user can switch from one mode to an adjacent mode when a user supplies a proper user input to a terminal. In addition, a series hierarchy does not include therein any "branch" which connects one mode of operation to at least two neighboring modes in a parallel manner either in the forward or backward direction. By the same token, a series hierarchy does not include therein any "merger" which connects at least two modes into a single neighboring mode.

In contrary, at least one branching mode in a parallel hierarchy may branch or bifurcate into multiple modes. As a result, at least one mode in a parallel hierarchy may be connected to at least two neighboring modes in a forward (or backward) direction. In addition, at least two modes in a parallel hierarchy may also merge into a single neighboring mode in a forward (or backward) direction. Therefore, a terminal defines multiple parallel paths from at least one mode in either a forward or backward direction, and may switch from one mode to one of multiple neighboring modes depending upon a user input. As a result, a parallel hierarchy may include [1] a single starting mode and multiple ending modes, [2] multiple starting modes and a single ending mode, or [3] multiple starting modes and multiple ending modes, with or without any intermediate mode therebetween.

As discussed above, the hierarchies of panels (A) to (D) can be characterized in such a way that a terminal may switch modes from one mode with less access authority to another mode with greater access authority. Accordingly, when a user reaches an unlock modes of the panels (A) to (D) or the intermediate modes of the panels (C) and (D), a user cannot switch to another mode in a forward direction. In this case, a user may turn off a display unit and switch a terminal from its on-state to an off-state (e.g., putting a terminal into sleep). Thereafter, when a user provides another user input with a terminal in an off-state (e.g., "waking up" a terminal), a terminal may switch to a lock mode. In this context and as used herein, a "non-circulating hierarchy" refers to a hierarchy where a terminal allows a user to switch modes [1] only in a forward direction (i.e., from a mode with less access authority to another mode with greater access authority) but [2] not in an opposite, backward direction (i.e., from a mode with greater access authority to another mode with less access authority), whether the hierarchy may be series or parallel.

It is appreciated that all of the above exemplary hierarchies are set up on the assumption that a user desires to start to operate a terminal in a lock (or intermediate) mode granted with less access authority, and then to switch to an unlock mode granted with greater access authority. However, another user may desire to start to operate a terminal in an unlock mode granted with greater access authority and then to switch to a lock (or intermediate) mode granted with less access authority. In this arrangement, a "non-circulating hierarchy" may mean another hierarchy where a terminal allows a user to switch modes [1] only in a backward direction but [2] not in a forward direction, either in a series hierarchy or in a parallel hierarchy. For simplicity of illustration, various examples of this disclosure relate to those users who desire to start operating a terminal in a lock mode and then to switch to an optional intermediate mode, and then to switch to an unlock mode, unless otherwise specified.

In contrary and as used herein, a "circulating hierarchy" refers to a hierarchy where a terminal allows a user to switch modes ( 1) not only in a forward direction (i.e., from a mode granted with less access authority to another mode with greater access authority) (2) but also in a backward direction (i.e., from a mode granted with greater access authority to another mode with less access authority), whether a hierarchy may be series or parallel. Depending upon availabilities of such mode switching in the backward direction, the circulating hierarchy may be referred to as a "completely circulating hierarchy" or as a "partly circulating hierarchy" as well. Following figures show some exemplary circulating hierarchies in which the modes positioned in a forward direction have greater access authorities than those positioned in a backward direction.

In the panel (E) of FIG. 2, a terminal sets up a hierarchy which defines a lock mode ($MD_{LK}$), an intermediate mode ($MD_{IN}$), and an unlock mode ($MD_{UL}$). A terminal may also switch modes in a forward direction. Therefore, the hierarchy of the panel (E) is similar to that of the panel (A) of the same figure. Unlike that of the panel (A), however, a terminal may also switch modes in a backward direction upon receiving a proper user input, e.g., from $MD_{UL}$ to $MD_{IN}$, and from $MD_{IN}$ to $MD_{LK}$. Therefore, the hierarchy of the panel (E) is a completely circulating hierarchy.

In the panel (F) of FIG. 2, a terminal similarly sets up a hierarchy which defines one $MD_{LK}$, one $MD_{IN}$, and one $MD_{UL1}$, and which may switch modes in a forward direction. The terminal may also switch modes in a backward direction upon receiving a proper user input as well, e.g., from $MD_{UL}$ directly to $MD_{LK}$, but not through $MD_{IN}$. In this context, the hierarchy of the panel (E) is a partly circulating hierarchy.

Unlike the series and parallel hierarchies, some hierarchies may arrange various mode in such a way that they may be viewed as a combination of a series hierarchy as well as a parallel hierarchy. As used herein, a "hybrid hierarchy" refers to an arrangement of multiple modes ( 1) where at least two modes connect to each other as a series hierarchy, or (2) where the hierarchy includes at least one branch or at least one merger as a parallel hierarchy. Following figures are a few exemplary hybrid hierarchies in which the modes positioned in a forward direction are deemed to be granted with greater access authorities than those in a backward direction.

In the panel (G) of FIG. 2, a terminal sets up a hierarchy which defines four modes such as $MD_{LK}$, $MD_{IN1}$, $MD_{IN2}$, and $MD_{UL}$. The hierarchy may be viewed as a series hierarchy in that a user may switch from $MD_{LK}$ to $MD_{IN1}$ (or $MD_{IN2}$), and then to $MD_{UL}$. However, $MD_{LK}$ branches into $MD_{IN1}$ and $MD_{IN2}$, while $MD_{IN1}$ and $MD_{IN2}$ merge into $MD_{UL}$. As a result, this hierarchy may be viewed as a hybrid hierarchy which is non-circulating as well, for a terminal does not allow a user to switch modes in a backward direction.

In the panel (H) of FIG. 2, a terminal sets up a hierarchy which defines four modes which are identical to those of the panel (G) of the same figure, and which are connected to each other as are the modes of the panel (G). The hierarchy of the panel (H), however, also includes one more path which allows a terminal to switch from $MD_{IN2}$ to $MD_{LK}$. As a result, the hierarchy may be viewed as a hybrid hierarchy which is partly circulating, for a terminal may switch modes in a backward direction, starting from $MD_{IN2}$ to $MD_{LK}$.

A terminal may also set up different hierarchies which may include more complicated series, parallel or hybrid arrangements. A terminal may further set up various hierarchies which may be circulating or non-circulating, where details of such hierarchies will be provided below in conjunction with detailed configurations of various main and lock systems.

A user may use the aforementioned hierarchies for various purposes. In one case, a single user may set up a hierarchy and may define multiple modes therein such as, e.g., [1] a single $MD_{UL}$ in which a user may operate a lock system and access all accessible hardware and software elements of the main system, [2] a single $MD_{LK}$ in which a user may operate a lock system which may include therein a lock viewer, an optional lock memory unit, or an optional lock CPU unit, [3] at least one $MD_{IN}$ in which a user may operate an intermediate system and access some but not all units of a lock or main system, or the like. Depending upon the needs of a user, a terminal [1] may not define any $MD_{IN}$ in a hierarchy, [2] may define multiple $MD_{UL}$'s each of which may be granted with the same or different access authority, or [3] may define multiple $MD_{LK}$'s each of which may be granted with the same or different access authority.

In addition to defining various modes in a hierarchy, a terminal may [1] physically or operationally isolate or [2] completely or partly isolate various units of a main system from a lock system. A terminal may run an erase (or semi-erase) operation in one of various erasure timings. Therefore, a terminal may enhance the security of a main system from a lock system, maintain the integrity of a main system against a lock system, and better protect safety of data stored in a main system.

A single user may use such multiple modes of operation in a hierarchy for different purposes. For example, a user may operate a terminal in each mode for a different purpose such as, e.g., [1] operating a terminal in an unlock mode for personal matters, while driving all hardware or software elements of a main system and accessing all data stored therein, [2] operating a terminal in a lock mode for business, while driving a minimum number of such hardware or software elements of a main system and accessing a minimum amount of data stored therein, or [3] operating a terminal in an intermediate mode for those matters which may be half personal and half business, while capable of driving some but not all hardware or software elements of a main system of a terminal and accessing some but not all data stored therein.

A single user may use such multiple modes defined in a hierarchy in different situations as well. For example, a user may physically or operatively couple his or her terminal to another electrical device and manipulate the device with his or her terminal. More particularly, when a user has to share the device with other people, there may always exist a danger that some malicious viruses implanted into the device may migrate into the user's terminal, thereby [1] degrading the security or integrity of the terminal or [2] stealing personal or financial data of a user which are stored in its main system. By operating a terminal in a lock mode when coupling a terminal with the device and then running an erase (or semi-erase) operation in one of the erasure timings, the terminal may ensure that any virus which has successfully migrated into the terminal may be erased anyway before the user operates the terminal in an unlock mode. Followings include more examples of usages of such terminals in such situations.

In one example, a user may physically or operationally couple a terminal with a vehicle and assist the vehicle with the terminal to arrive at a certain destination. For example, a user may manipulate a vehicle by driving the hardware or software elements of a main (or lock) system of a terminal or by providing data from terminal to a computer system of the vehicle. Examples of such vehicles may include an automobile of various shapes and sizes, a motor cycle, a bicycle, an airplane, a helicopter, a drone, a boat, a ship, or the like.

In one case, a user may operate a terminal in an unlock mode when a user manipulates his or her own vehicle, while driving various elements of a main (or lock) system or while using all data stored therein. As far as a user has not been careless, there is not much danger that malicious viruses reside inside a computer system of the user's own vehicle. Accordingly, it may be generally safe to couple the user's terminal to the vehicle and to operate the terminal in an unlock mode, while completely or partly isolating a main system of the terminal from the computer system of the vehicle.

In another case when a vehicle is shared by the family members or co-workers of a user, the danger may be higher than the case of the preceding paragraph, for careless children or co-workers may have downloaded some suspicious files from an unreliable website. Therefore, a user may operate a terminal in an intermediate mode when a user manipulates a vehicle which is shared with others who are acquainted with the user but who may not be completely reliable, e.g., by driving some but not all elements of a main (or lock) system of a terminal and accessing some but not all data stored therein, by driving a hardware or software element of an intermediate system, or the like.

In yet another case when a vehicle is shared by other people who are not acquainted with a user, the danger may be pretty high that some malicious viruses may already have been impregnated into a computer system of the vehicle. When such vehicles are rent cars, share cars, or other publicly used vehicles, such a danger may be impending. In this case, a user may operate a terminal in a lock mode while manipulating the vehicle e.g., by driving only those hardware or software elements of a lock system and by accessing only those data stored in a lock system. At the same time, a terminal may isolate a main system of a terminal from a vehicle computer system, thereby preventing those malicious viruses which had been impregnated into a computer system of the vehicle from adversely affecting the main system.

In another example, a user may physically or operationally couple a terminal with a computer and assist the computer with his or her terminal to obtain desired outcomes. For example, a user may manipulate a computer by driving the hardware or software elements of a main (or lock) system of a terminal or by providing data from terminal to the computer. Examples of such computers may include any computer which is to be shared with others and which is located in a public PC station, a public pub, a school PC laboratory, or the like. Various arrangements provided in the previous example of the preceding paragraphs may similarly be applied in this example as well.

In one case, a user may operate a terminal in an unlock mode when a user manipulates a user's own computer, while driving various elements of a main (or lock) system or while transporting all data stored in a terminal to the computer. As far as a user has not been careless, there is not much danger that malicious viruses reside inside the user's own computer. Therefore, it may be generally safe to couple the user's terminal with the user's computer and to operate the terminal in an unlock mode, while completely or partly isolating a main system of the terminal from the computer.

In another case when a computer is to be shared by the family members or co-workers of a user, the danger may be higher than the case of the preceding paragraph. Therefore, a user may operate a terminal only in an intermediate mode when a user manipulates the computer, e.g., by driving some but not all elements of a main (or lock) system of a terminal and accessing some but not all data stored therein, by driving a hardware or software element of an intermediate system, or the like.

In yet another case when a computer is shared by other people who are not acquainted with a user, the danger may be pretty high that some malicious viruses may already have been impregnated into the computer. In this case, a user may operate a terminal in a lock mode while manipulating the computer e.g., by driving only those hardware or software elements of a lock system and by accessing only those data stored in a lock system. At the same time, a terminal may isolate a main system of a terminal from the computer, thereby preventing those malicious viruses which had been impregnated into a computer system of the vehicle from adversely affecting the main system.

Similar or same arrangements provided in the two previous examples may also be applied in other situations. In another example, a user may operate a terminal only in a lock (or intermediate) mode when a user couples his or her terminal with a control console of a public video game center or a public sport pub, and may play a videogame or virtual sport, while manipulating his or her terminal in a lock mode, an intermediate mode, or an unlock mode, depending upon the potential danger of the terminal being adversely affected by such a control console. That is, whenever a user physically or operationally couples a terminal to an external electrical device or external network and whenever a user is not 100% comfortable about the security of the device or network, a user may operate the terminal in a lock mode or in another restricted mode, and may then run an erase (or semi-erase) operation before he or she switches to the unlock mode.

As explained above, each of such hierarchies provide different benefits to a user, in terms of user convenience, terminal security, or the like. It is appreciated, however, that an advantage in user convenience or seamless features may be offset, e.g., by an increased risk of decreasing the terminal security or integrity. For example, such circulating hierarchies may provide benefits to some users.

For example, when a user operates a terminal in an unlock mode, a user may hesitate to download a file from an unfamiliar website, for that file may include malicious viruses therein. In this case, a user can switch back from an unlock mode to an intermediate mode, and then to a lock mode therefrom, and can download a file from an unknown website, without having to worry about any potential detrimental effects from the downloaded contents or files, for a main system of a terminal may be isolated from a lock system operating in a lock mode.

As discussed in the preceding paragraph, a circulating hierarchy provides a means to a user in such a way that a user who is operating a terminal in an unlock mode may switch to another mode granted with less access authority, without having to turn off a display unit (i.e., switching back to an off-state), and then turning on the display unit (i.e., switching to a lock mode which may be a default mode in an on-state). Accordingly, a terminal may maximize flexibility in mode switching.

This does not mean that a non-circulating hierarchy does not provide any benefit to a user. Rather, the non-circulating hierarchy provides additional safety to a terminal, for it inherently prevents a user to switch from an unlock mode to a lock (or intermediate) mode. Of course, this additionally built-in security may be offset by an inconvenience in switching modes in a backward direction.

Accordingly, a terminal may set up various hierarchies each of which defines various modes therein in such a way that a user may enjoy operating the terminal, while optimizing the security and/or integrity of a terminal, and while better protecting privacy of personal data stored in a main system of a terminal. In general, setting up such a hierarchy and defining various modes therein are a matter of selection for one of ordinary skill in the relevant art and, therefore, further details are omitted herein.

1-6. Deleting vs. Erasing

Whenever a terminal (more particularly, its CPU unit or its O/S) drives various elements, a terminal may tend to leave various data, files, or folders behind. As used herein, "results" mean those data, files, or folders which are left behind after (or while) operating a lock (or intermediate) system in a lock (or intermediate) mode.

As used herein, "delete" refers to operations of "removing direct pointers" to certain data sectors in which any results (which are desired to be deleted) reside or are stored. It is appreciated, however, that such results may be usually represented residually, even after such "deleting," through data remanence. In addition, such results may be recovered by others even after a simple 'delete" operation. In other words, when a terminal runs lock operations by a lock system in a lock mode, some results are obtained and reside in the lock system. Therefore, even when a terminal switches from the lock mode to an unlock mode after deleting such results from the lock system, some results may be still left behind in a terminal. When malicious viruses are included in such results, such viruses may then be able to enter a main system while a user operates a terminal in an unlock mode, and may adversely affect the main system.

Accordingly, a simple deleting operation may not be enough to prevent a main system of a terminal (or various accessible hardware or software elements of the main system) from being contaminated or adversely affected by such results which are obtained by running lock operations with a lock system in a lock (or intermediate) mode and which may reside in the lock system even after such deleting.

In contrary, "erase" as used herein refers to operations of "purging results" in a memory unit(s), while leaving such memory unit(s) operable. That is, an "erase operation" or "erasure" not only deletes such direct pointers but also purges remnant results which may reside or be stored in a memory unit (or sector). Accordingly, the erased (or purged) results cannot be generally recovered by others. In addition, even when such results can be recovered by a skillful artisan, the process is extremely difficult. Accordingly, an "erase operation" may be typically required in order to achieve enhanced security of a data processing terminal, which is one of various objectives of the terminals of this disclosure.

It is appreciated that various data processing terminals of this disclosure allow a user to erase all or some of such results (e.g., text, images, or files) which may be obtained by running lock (or intermediate) operations with a lock (or intermediate) system in a lock (or intermediate) mode. As will be explained in greater detail below, a lock system may include at least one lock memory unit in which a lock system may temporarily or permanently store such results. For this reason, various lock memory units (or sectors) hereinafter may refer to such memory units (or sectors) which reside in a lock system. However, the lock memory units (or sectors) may also refer to those memory units (or sectors) which reside in a main system but which may be recruited by a lock system in a mode other than an unlock mode.

In contrary to such "erase" and as used herein, "semi-erase" is defined as an operation of "purging some but not all results" which are obtained by running lock (or intermediate) operations with a lock (or intermediate) system in a lock (or intermediate) mode and which may be stored or reside in a lock memory unit(s). Because a semi-erase operation may erase some but not all results, at least some results may then be stored in a lock memory unit (or sector), while leaving the lock memory unit (or sector) operable. In other words, a "semi-erase operation" or "semi-erasure" purges only a portion of such results (including their remnant results) obtained by running lock (or intermediate) operations with a lock (or intermediate) system in a lock (or intermediate) mode, while leaving the rest of such results intact in such memory unit(s), with or without an active storing operation.

It is appreciated that a terminal (more precisely, its main, intermediate, or lock system) may run such erasure or semi-erasure over various hardware elements of a main, intermediate, or lock system. For example, such a terminal may run such erasure (or semi-erasure) over a main memory unit of a main system, an intermediate memory unit of an intermediate system, or a lock memory unit of a lock system. A terminal may also run such erasure (or semi-erasure) over a "temporary memory sector" of a main, intermediate, or lock system, where examples of the temporary memory sector may include [1] a data buffer, [2] a cache, [3] a clipboard, or [4] a recycle bin of the main, intermediate, or lock system.

As used herein, "erased results" refers to those results which are erased by a terminal when a terminal allows a user [1] to switch from a lock mode (or a current mode which may not be a lock mode) to a new mode or [2] to switch from an on-state of a terminal to an off-state thereof. Such erased results collectively refer to erased texts, erased images, erased files, erased folders, erased software applications, and other erased results [1] which are obtained by running a lock (or intermediate) operation with a lock (or intermediate) system in a lock (or intermediate) mode, and [2] which reside (or which have been residing) in a lock (or intermediate) system.

It is appreciated that, when this disclosure includes a clause "prevent a main system from the erased results," it does not connote that a terminal protects a main system from the results after having erased such results. Rather, it means that the terminal protects a main system by erasing such results and that a terminal may not have been able to protect a main system from such results unless a terminal has erased such erased results. By the same token, "to-be-erased results" are synonymous with the "erased results," except that the former is used to refer to those results which are currently mixed with "to-be-stored results" but which are to be erased later.

As used herein, "stored results" refers to those results which are not erased by a terminal but stored therein, e.g., in a lock system or in a main system. Therefore, the "stored results" corresponds to a difference between all of such results obtained by running lock (or intermediate) operations in a lock (or intermediate) mode and the erased results. By the same token, "to-be-stored results" are synonymous with the "stored results," except that the former is used to refer to those results which are currently mixed with "to-be-erased results" but which are to be saved later.

Instead of such erasure or semi-erasure, a terminal may "format" or "reformat" a certain hardware element or may even "initialize" such an element. A terminal may run such formatting or initialization operations in certain cases such as, e.g., [1] when a certain period has passed since the lase formatting or initialization, [2] when a terminal may detect, in its memory unit or its temporary memory sector, suspicious data, codes, or files which may include malicious viruses, [3] when a terminal may detect a mal-functioning hardware or software element, or the like.

Because such formatting or initialization may be viewed as special cases of such erasure (or semi-erasure), a terminal may also run such formatting or initialization operations in one of various erasure timings. In addition, similar to such erasure and semi-erasure, a terminal may [1] "completely" format or initialize a certain hardware element or [2] "partly" format or initialize such an element.

As a terminal formats or initializes a certain hardware element, all software elements which had been loaded onto the element may also be removed. Therefore, upon formatting or initializing a lock system, a terminal may manipulate which data or computer codes in a lock system are to be removed.

In one case, a terminal may remove only those data which have been stored or residing in a lock memory unit and a temporary lock memory sector by partial formatting or partial initialization, while excluding a lock O/S or lock (software) applications from such removal. To this end, a terminal may [1] store a lock O/S, a lock software application, or others in safe space such as, e.g., a lock BIOS (i.e., a basic input output system) or another memory space which is to be excluded from such partial formatting or partial initialization, [2] designate certain memory sectors which are to be formatted or initialized by a terminal, while excluding other sectors from such partial formatting or partial initialization. Because a lock system still includes a viable lock O/S or a lock software application therein, the terminal may be able to operate in a lock mode immediately after such partial formatting or partial initialization.

In another case, a terminal may remove all data all computer codes which have been stored or residing therein by a (complete) formatting or a (complete) initialization.

Accordingly, a terminal even removes a lock O/S and lock (software) applications including a lock viewer. Because a lock system does not include a viable lock O/S or lock software applications therein, the terminal may not operate anymore in a lock mode, immediately after such (complete) formatting or (complete) initialization. As a result, a terminal may have to reload a lock O/S or a necessary lock (software) application into a lock system.

In another case, when a lock system does not include a lock O/S but does include a lock (software) application, a lock system may not drive the application by itself, and may have to rely on a main CPU unit or a main O/S to drive the lock application. When a terminal partly formats or initializes a lock system, a main system may drive the lock application immediately after such formatting or initialization with its main CPU unit or a main O/S. However, when a terminal completely formats or initializes a lock system, a main system may have to reload the lock application onto a lock system, and may help a lock system run lock operations. When a lock system includes a lock (software) application as well as a driver capable of driving the application, this case is similar to the above lock system with a lock CPU unit and, therefore, further details are omitted herein.

1-7. Display Unit and Display Surface

A data processing terminal includes at least one (main) display unit which in turn defines at least one "displace surface" for displaying a "static image (e.g., a picture)" or a "dynamic image (e.g., a video clip)" thereon, where the image may be in black-and-white, in color, or a combination thereof. Therefore, a display unit displays on a display surface static images of, e.g., one or more [1] characters, [2] words, [3] texts, [4] drawings, [5] pictures or [6] other static images of objects or persons. A display unit may also display dynamic images of, e.g., [1] video games, [2] video clips, or [3] dynamic images of characters, words, texts, drawings, cartoons, objects or persons, or the like.

A terminal may store such static or dynamic images therein and display such images one by one, may receive such images from an external source such as, e.g., an add-on device, a portable device, another terminal, a website, or the like. In the latter cases, a terminal may display such images [1] only after acquiring them, [2] concurrently with acquiring them, or the like. It is appreciated that a "display surface" refers to a "portion" of a display unit which is a hardware element of a main system of a terminal. Because a user may drive a display unit to display such static or dynamic images, a display unit may be deemed as one of the accessible hardware element of a main system as well.

A single display surface may define a single "segment" where the display surface then becomes identical to the display segment. However, when a display surface defines "multiple segments" thereon, a display unit may be able to display different static or dynamic images on different segments concurrently or sequentially.

Similarly, a terminal may include multiple display units, where such display units may have the same shapes, sizes, or functions. Alternatively, such display units may have different shapes, sizes or functions, and may be implemented in different locations of a terminal. In the latter example, one display unit may be used as a "major display unit," while another display unit may serve as a "minor display unit" or a supplemental display unit. It then follows that each of multiple display units may include display surfaces of which shapes and sizes may be identical (or similar) to each other or different from each other.

As will be explained below, various notice units of this disclosure may serve as one of multiple display units, where such notice units may have the same, similar or different capability of displaying the static or dynamic images in color, in a certain resolution, or the like. Because a notice unit serves to provide a visual notice signals to a user, the notice unit [1] may be smaller than a display unit, [2] may display simple static or dynamic images than a display unit, or the like. When desirable, a single display unit may use a portion of its display surface as a notice unit as well.

When a terminal includes multiple display unit, the terminal may drive each of such multiple display units [1] concurrently, [2] sequentially, [3] temporarily independent of each other, or the like. For example, a terminal may [1] turn on a $1^{st}$ display unit whenever a $2^{nd}$ display unit is turned on, [2] turn off a $1^{st}$ display unit whenever a $2^{nd}$ display unit is turned on, [3] turn on or off at least two display units in a certain sequence, or [14] turn on or off each display unit independently. As will be explained in the following Section, a terminal may recruit a display unit to constantly display routine data such as, e.g., a time, date, or the like. In addition, a terminal [1] may recruit the same software elements to drive each of multiple display units, or [2] may recruit different software elements to drive each of such display units.

In contrary to such examples where a terminal includes at least one display unit, a terminal may not include any display units therein. Such a terminal may instead be configured to be releasably coupled to an external display device which is a separate device from the terminal. With this arrangement, a terminal of this disclosure may be provided in a more compact shape and size. Of course, a terminal which includes at least one display unit may also be configured to operationally couple with an external display device to supplement a display unit of a main system of a terminal.

1-8. Screen

As used herein, a "screen" refers to an image which a terminal displays on a "display surface" of a display unit. The screen [1] may be in a black-and-white mode or a color mode, [2] may be in a 2-D mode or a 3-D mode, or [3] may provide a 2-D image, a 3-D image, a hologram image, or the like. It is appreciated that the screen may be static (i.e., not changing over time) or dynamic (i.e., changing over time). In this context, a screen may include a single "window" or multiple windows in each of which a user may run different (software) elements of a main system of a terminal.

When or after a display unit is turned on (i.e., a terminal is in its on-state), a screen becomes available on a display surface of a display unit, and a user may be able to see the screen on the display surface. Therefore, a screen may be an image of whatever is displayed on the display surface, and such a screen may include [1] one or more static images of characters, words, texts, drawings, pictures or static images of objects or persons, [2] dynamic images of a video game, or [3] dynamic images such as video clips or other dynamic images of objects or persons. Depending upon its content, the screen may include at least one advertisement, a content, a warning, an instruction, or the like. Accordingly, a screen may also include an "unlock (or home) screen" which is displayed in an unlock mode, a "lock screen" which is displayed in a lock mode, and an "intermediate screen" which is displayed in an intermediate mode.

As used herein, a display unit which displays only images related to "routine data" is deemed to be "turned off" and to be in an "off-state" within the scope of this disclosure. By the same token, when a terminal includes a major display unit and a minor display unit and when the major display unit is turned off but the minor display unit displays only routine data, such display units are deemed to be turned off, and in its off-state within the scope of this disclosure. In addition, when a terminal incorporates a single display unit which includes a major section and a minor section therein, a display unit is deemed to be turned off when a major section is turned off but a minor section displays only routine data.

In general, the routine data refer to those obtainable without running an operation in response to a user input.

Such routine data may typically relate to various information about, e.g., a date, a time, a clock, a stopwatch, a battery charge, a temperature, a weather, a wireless connection, an armed alarm, an arrival of a new email or message, an incoming call, a notice of an upcoming event, or the like. In addition, when a terminal may display routine data or other information on a display unit while keeping "at least 80% of the pixels" of such a display unit turned off, this display unit is also deemed to be turned off and to be in an off-state within the scope of this disclosure.

1-9. Concurrent and Sequential

As used herein, "concurrence" is synonymous with "simultaneity," and refers to an occurrence, a happening, or an existence of multiple operations (or steps) at the same time. Similarly, "concurrent" or "concurrently" is synonymous with "simultaneous" or "simultaneously." Thus, a user is deemed to provide multiple user inputs concurrently when such user inputs are provided to one or more input units at the same time. Accordingly, when a user provides multiple user inputs concurrently, the user is deemed to provide the user inputs in such a way that there exists at least one common clock cycle of a processor of the terminal in which the user provides such multiple user inputs. That is, such multiple user inputs overlap each other in at least one common clock cycle, and such multiple user inputs are not completely separated by any temporal gap therebetween.

Similarly, a terminal is deemed to run multiple operations (or their steps) concurrently, when the operations (or steps) are run at the same time. Accordingly, when a terminal runs multiple operations (or steps) concurrently, the terminal is deemed to run such operations (or steps) in such a way that there exists at least one common clock cycle of a processor of a terminal in which the terminal runs both of such operations (or steps). That is, such multiple operations (or steps) overlap each other in at least one common clock cycle, and such multiple operations (or steps) are not completely separated by any temporal gap therebetween.

Figure 3:
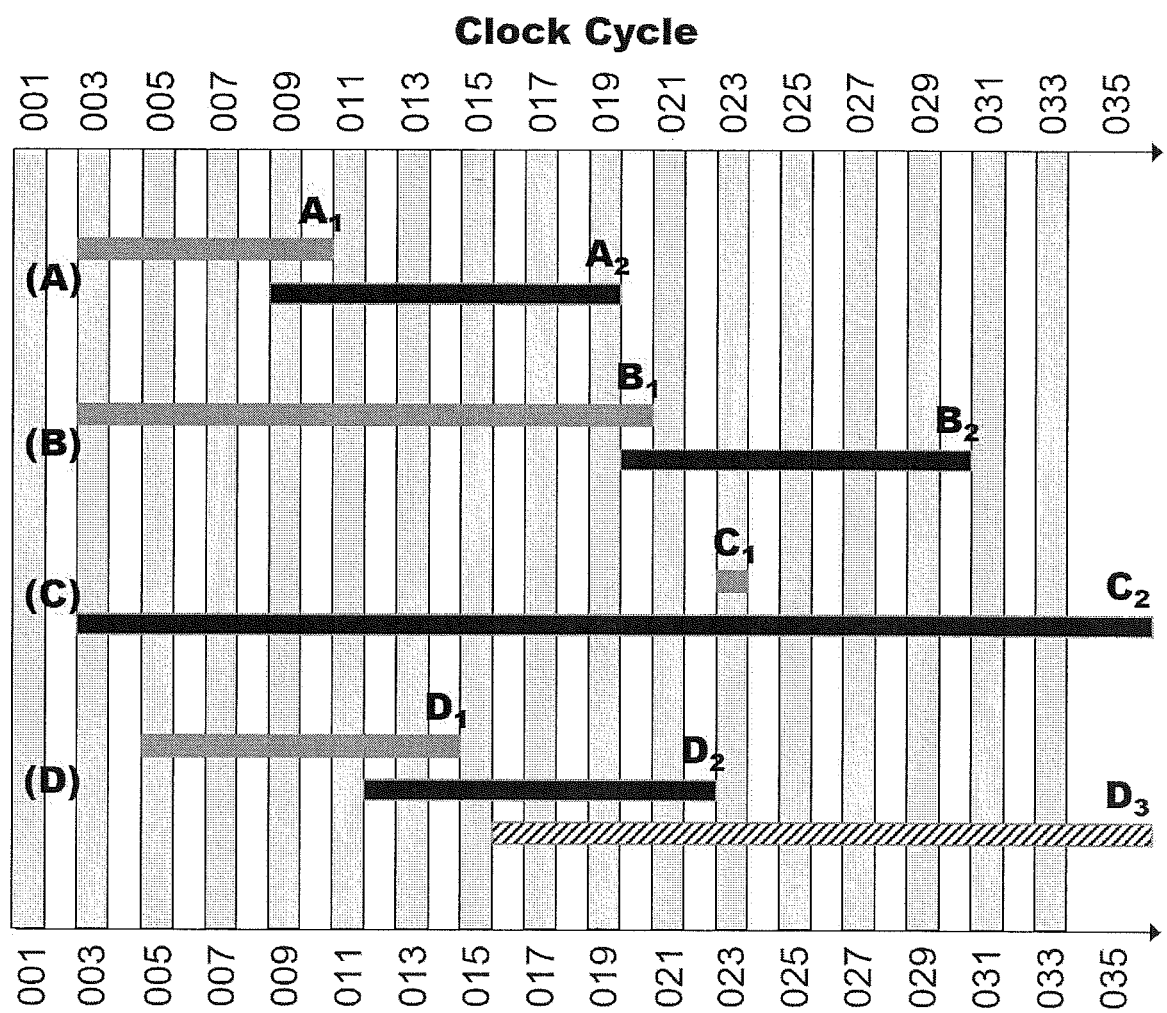
FIG. 3 is a schematic diagram of exemplary concurrent operations (or steps) presented along clock cycles of a processor.

FIG. 3 is a schematic diagram of exemplary concurrent operations (or steps) which are presented along clock cycles of a processor of a data processing terminal. In the panel (A) of FIG. 3, a processor of a terminal (or just simply a terminal) runs the operation (or step) $A_1$, starting from a clock cycle 003 and ending at a clock cycle 010 (i.e., a duration of 8 clock cycles). In addition, the terminal runs the operation (or step) $A_2$, starting from a clock cycle 009 and ending at a clock cycle 019 (i.e., a duration of 11 clock cycles). According to the above definition, this terminal is deemed to "concurrently" run the operations (or steps) $A_1$ and $A_2$, for both of the operations (or steps) overlap each other in two common clock cycles 009 and 010.

In the panel (B) of FIG. 3, a terminal runs the operation (or step) $B_1$, starting from a clock cycle 003 and ending at a clock cycle 020 (i.e., a duration of 18 clock cycles), and the terminal also runs the operation (or step) $B_2$, starting from a clock cycle 020 and ending at a clock cycle 030 (i.e., a duration of 11 clock cycles). By the above definition, this terminal is deemed to "concurrently" run the operations (or steps) $B_1$ and $B_2$, for both operations (or steps) $B_1$ and $B_2$ overlap each other in a single common clock cycle 020.

In the panel (C) of FIG. 3, a terminal runs the operation (or step) $C_1$, starting and ending at a clock cycle 023 (i.e., one clock cycle), and the terminal also runs the operation (or step) $C_2$, starting from a clock cycle 003 and ending at a clock cycle 090 (i.e., 88 clock cycles). This terminal is deemed to "concurrently" run the operations (or steps) $C_1$ and C2, because both operations (or steps) overlap each other in the single common clock cycle 023, even though the operation (or step) $C_1$ lasts only a tiny portion of the operation (or step) $C_2$.

In the panel (D) of the figure, a terminal runs the operation (or step) $D_1$, starting at a clock cycle 005 and ending at a clock cycle 014 (i.e., 10 clock cycles), runs the operation (or step) $D_2$, starting from a clock cycle 012 and ending at a clock cycle 022 (i.e., 11 clock cycles), and runs another operation (or step) $D_3$, starting from a clock cycle 016 and ending at a clock cycle 1,015 (i.e., 1,000 clock cycles). Therefore, the terminal is deemed to [1] "concurrently" run the operations (or steps) $D_1$ and $D_2$, for they overlap each other in the common clock cycles 12, 13, and 14, and [2] "concurrently" run the operations (or steps) $D_2$ and $D_3$, because they overlap each other in the common clock cycles 16 to 22. However, the terminal is not deemed to "concurrently" run the operations (or steps) $D_1$ and $D_3$, for they do not overlap each other in any common clock cycle. Rather, the operations (or steps) $D_1$ and $D_3$ are separated by a temporal gap which corresponds to the clock cycle 15.

It is appreciated, however, that the concurrency among at least three operations (or steps) is defined such that a terminal is deemed to run such operations (or steps) concurrently as far as there is no temporal gap during a period which starts from a beginning of the earliest-beginning operation (or step) and which ends at an ending of the last-ending operation (or step). According to this definition, a terminal of the panel (D) of FIG. 3 is deemed to "concurrently" run three operations (or steps) $D_1$, $D_2$, and $D_3$, because a terminal runs the three operations (or steps) for a period which begins with the beginning of $D_1$ and which end with the ending of $D_3$ and because there is no single clock cycle during the period in which a terminal does not run any of $D_1$, $D_2$, and $D_3$.

As used herein, a "sequence" refers to a certain order in which a terminal runs multiple operations (or steps) one at a time or one after another. Similarly, "sequentially" means that a terminal runs the operations (or steps) in a preset order one at a time, with at least one temporal gap between such multiple operations (or steps). As used herein, "sequentially" is synonymous with "one at a time," "consecutively," or "successively." Therefore, a terminal is deemed to sequentially run the operations (or steps) $D_1$ and $D_3$ of the panel (D) of FIG. 3, with at least one temporal gap therebetween.

1-10. User Input

As used herein, a "user input" refers to an input which is provided to at least one input unit of a terminal by a user who directly or indirectly manipulates at least one portion of the input unit. A user may provide the user input with his or her body part(s) or with a non-user object such as a stylus, a pen, or the like. For simplicity of illustration, when "a user provides" a user input to at least one input unit of a terminal, it collectively refers that a user may [1] use "at least one body part of the user," [2] use "at least one non-user object which can be recognized by an input unit" of a terminal, [3] allow a terminal to obtain biometric information of a user, [4] allow a user to obtain electromagnetic waves or acoustic waves related to user, or the like.

In one example, a user may "directly manipulate" at least a portion of an input unit of a data processing terminal. In one case, a user may directly provide a user input by "moving" at least one movable portion of the input unit or by "touching or contacting" at least a portion of the input unit [1] with a user body part, [2] a non-user object, or the like. In the case of such moving, a user may move the movable portion for a preset period (of time) or for another period of his choice. In the case of such contacting, a user may [1] maintain a contact between the portion of the input unit and a user body part (or a non-user object) for a preset period of time, or [2] maintain a contact while moving the body part or non-user object and, therefore, changing a position of such a contact.

In another example, a user may "indirectly provide" a user input by "providing waves" to an input unit of a data processing terminal, without having to directly manipulate a portion of the input unit. In one case, a user may emit to the input unit [1] electromagnetic waves which carry information related to a user input such as, e.g., an image of a user, wave characteristics (e.g., amplitudes, frequencies, phase angles, or phase lags) or other information, or [2] acoustic waves which carry information related to a user input such as, e.g., a user voice, a sound generated by a user body part, or the like. Therefore, when an input unit acquires an image of a user for authenticating a face, an iris, or a retina, such an image is deemed as a user input. Similarly, when an input unit acquires a voice of a user for voice authentication, the voice is deemed as a user input.

As used herein, a "user input" includes "at least one (user) sub-input" therein. When a user supplies a user input to an input unit, an input unit is to "receive" a user input, and a sensor of the input unit is to "acquire" a (user) sub-input from a user input. Therefore, when a user input includes only one (user) sub-input therein, the user input corresponds to the (user) sub-input. Conversely, when a user input includes therein multiple (user) sub-inputs, a single input unit or multiple input units receive the user input, while a single sensor or multiple sensors (of a single input unit or multiple input units) acquire the (user) sub-inputs therefrom. For simplicity of illustration, a "user input" and a "(user) sub-input" are collectively referred to as the user input throughout this disclosure, unless otherwise specified. In addition, a "(user) sub-input" may be abbreviated as a "sub-input."

Depending on configurational and operational characteristics of an input unit, a user may provide various types of user inputs. A user may provide some of such user inputs by his or her direct manipulation of the input unit, whereas a user may provide others of such user inputs not by such direct manipulation of the input unit but by indirectly providing various user inputs to the input unit.

A user input of this disclosure may be classified based upon its type or nature. A "$1^{st}$ type user input" relates to a "mechanical user input" which is provided to at least a portion of an input unit by directly manipulating the portion. Examples of the $1^{st}$ type user input includes, e.g., "moving" (e.g., pressing, pushing, pulling, translating, sliding, rotating, pivoting, or otherwise moving) at least a portion of the input unit, "touching (or contacting)" the portion, and a combination thereof.

Examples of the $1^{st}$ type user input may also include "mechanical biometric information" of the user, where examples of such $1^{st}$ type user input may include a blood pressure or a heart rate measured in a certain position of the user, a blood flow rate measured similarly, other cardiovascular information, a breathing rate in rest or during exercise, a respiratory flow rate, other respiratory information, or other biometric information related to skeletal or muscular body parts. As defined above, such mechanical user inputs include therein at least one mechanical (user) sub-input.

The $1^{st}$ type user input further relates to a "static feature" or a "dynamic feature" of the mechanical user input. Examples of this $1^{st}$ type user input include, e.g., a force associated with a movement or a contact of at least a portion of an input unit (a scalar or a vector), a velocity of the movement (a scalar or a vector), an acceleration of such a movement (a scalar or a vector), a displacement of the portion due to the movement (a scalar or a vector), a direction of the force, velocity, acceleration or movement, a direction of the contact, a duration of the above, a number of applications thereof, a temporal overlap therebetween, a temporal gap therebetween, or the like. The $1^{st}$ type user input may also include a "mechanical property" of a user body part or that of a non-user object which is used to provide the $1^{st}$ type user input to the portion of the input unit, where examples of such $1^{st}$ type user input may include various mechanical properties such as, e.g., an elasticity, a roughness, various moduli, or the like. An amplitude or a frequency of a force exerted onto a sensor of an input unit is an example of this $1^{st}$ type user input.

A "$2^{nd}$ type user input" relates to an "electrical user input" which is an "electrical signal" provided to at least a portion of an input unit capable of receiving the $2^{nd}$ type user input and acquiring an electrical (user) sub-input therefrom. For example, a user may use a certain pen, a wearable device as explained above, or other portable devices to generate and provide a certain direct current (DC) or alternating current (AC) electrical signal to the input unit, may use another terminal to generate and provide the electrical signal, or the like. A user may also provide "electrical biometric information" of his body part as the $2^{nd}$ type user input, where these user inputs may include, e.g., an electrocardiogram (ECG), an electromyogram (EMG), an electroencephalogram (EEG), or any other electrical signals measured in a certain position of the body.

The $2^{nd}$ type user input further relates to a "static feature" or a "dynamic feature" of the electrical user input. Examples of this $2^{nd}$ type user input may include an electrical current or voltage, its magnitude, its phase angle or phase lag, its frequency, its wavelength, its flux (a scalar or a vector), or the like. The $2^{nd}$ type user input may also include an "electrical property" of a user body part or a non-user object which is used to provide the $2^{nd}$ type user input to a proper portion of the input unit, where examples of the $2^{nd}$ type user input may include various electrical properties such as resistivity of the body part or object, its conductivity, its capacitance, its permittivity, its dielectric property, its thermoelectricity, or the like, where such properties may be measured in a constant electric or magnetic field or where such properties or their changes may be measured in a varying electric or magnetic field. A fingerprint of a user monitored by a capacitive sensor of a capacitive input unit is an example of this $2^{nd}$ type user input.

A "$3^{rd}$ type user input" relates to an "magnetic user input" which is a "magnetic signal" provided to at least a portion of an input unit capable of receiving the $3^{rd}$ type user input and acquiring a magnetic (user) sub-input therefrom. For example, a user may use a certain pen, a wearable device as explained above, or other portable devices to generate and provide a certain direct current (DC) or alternating current (AC) magnetic signal to the input unit, may use another terminal for generating and providing the magnetic signal, or the like. A user may also provide various "magnetic biometric information" of his or her body part as the $3^{rd}$ type user input, where the $3^{rd}$ type user inputs may similarly include, e.g., a magnetocardiogram (MCG), a magnetomyogram (MMG), a magnetoencephalogram (MEG), or any other magnetic signals measured in a certain position of the body.

The $3^{rd}$ type user input may also relate to a "static feature" or a "dynamic feature" of the magnetic user input. Examples of this $3^{rd}$ type user input may include a magnitude of its magnetic B-field or H-field, its direction, a number of magnetic poles therein, its phase angle or phase lag, its frequency, its wave-length, its flux (a scalar or a vector), or the like. The $3^{rd}$ type user input may also include a "magnetic property" of a user body part or a non-user object which is employed to provide the $3^{rd}$ type magnetic user input to the portion of the input unit, where the $3^{rd}$ type user input may include various magnetic properties such as, e.g., a magnetic polarity, a magnetic permeability, a magnetic susceptibility, or the like, where such properties may be measured in a constant electric or magnetic field or where such properties or changes in such properties may be measured in a varying electric or magnetic field.

A "$4^{th}$ type user input" relates to an "electromagnetic user input" which is "electromagnetic waves" emitted to at least a portion of an input unit capable of receiving the $4^{th}$ type user input and acquiring an electromagnetic (user) sub-input included therein. For example, a user may use a certain pen, a wearable device (e.g., a watch, a ring, a necklace, a bracelet, a lens, or glasses), or other portable devices to emit such electromagnetic waves to the input unit, may use another data processing terminal to emit such waves, or the like. In addition, the user may provide an "image of a body part" such as a face, an iris, a retina or another body part, or an "image of a non-user object" to the input unit, where such images may be provided to the input unit in a range of the visible electromagnetic waves, UV rays, IR rays, or other electromagnetic waves of specific frequency ranges. It is appreciated that the $4^{th}$ type user input provided as such images may include still images, video clips, or a combination thereof, and that the $4^{th}$ type user input may correspond to as an "optical user input" as well, particularly when such $4^{th}$ type user inputs employ visible light rays.

The $4^{th}$ type user input may also relate to a "static feature" or a "dynamic feature" of the electromagnetic user input. Examples of this $4^{th}$ type user input may include a magnitude of such waves, their phase angle, their phase lag, their wave-length, their frequency, their flux (a scalar or a vector), or the like. When the $4^{th}$ type user input relates to the above images, examples of this $4^{th}$ type user input may include a color (e.g., its hue, value, and intensity) of such images, their contrast, their sizes, contents included in such images, arrangement of such images, orientation of such images, or the like. As defined above, this $4^{th}$ type electromagnetic user input includes therein at least one electromagnetic (user) sub-input.

A "$5^{th}$ type user input" relates to an "acoustic user input" which is "acoustic waves" emitted to at least a portion of an input unit capable of receiving the $5^{th}$ type user input and acquiring an acoustic (user) sub-input included therein. For example, a user may use a certain pen, a wearable device (e.g., a watch, a band, a ring, a necklace, a bracelet, an earring, a lens, a nail, a glove, a helmet, a hat, a belt, a goggle, glasses, or a shoe), or other devices portably worn by a user and to emit such electromagnetic waves to the input unit, or may use another data processing terminal to emit such waves. In addition, the user may provide the input unit with his or her "voice" or a "body sound" using his or her body parts such as, e.g., clapping, finger snaps, or the like. The user may also provide a "non-user sound" to the input unit, where such sounds may be provided to the input unit in a range of audible sound waves, ultrasonic waves or other acoustic waves of specific frequency ranges.

The $5^{th}$ type user input may also relate to a "static feature" or a "dynamic feature" of the acoustic user input. Examples of this $5^{th}$ type user input may include a magnitude of such waves, their phase angle, their phase lag, their wave-length, their frequency, their flux (a scalar or a vector), or the like. When the $5^{th}$ type user input relates to the above voice or body sound, examples of this $5^{th}$ type user input may include a duration, a tone, an envelope, a location of a source thereof, or the like. As defined above, this $5^{th}$ type acoustic user input includes therein at least one acoustic (user) sub-input.

In addition to the above, the user input may also include temporal changes of any the above user inputs such as, e.g., a change in a movement pattern over time, a temporal change in an intensity of force exerted to the input unit over time, or the like. The user input may further include spatial changes of the above user inputs such as, e.g., a change in positions of contact between the user's body part and an input unit, a change in distribution of force applied to a certain area of an input unit, or the like.

1-11. Single User Input

Like the definition of "concurrent" provided in Section 1-9, a "single concurrent effort" is [1] synonymous with a "single simultaneous effort" and [2] abbreviated as a "single effort," unless otherwise specified. Accordingly, a "single effort" or a "single concurrent effort" includes [1] one effort exercised by a user, and [2] multiple (identical or different) efforts exercised by a user at the same time. That is, for multiple efforts to be concurrent, there exists at least one common clock cycle of a processor of a terminal in which a user exercises such multiple efforts and, therefore, such multiple efforts overlap each other in at least one common clock cycle. When a user exercises more than two efforts, concurrency of such efforts may be determined based on the definition of concurrency as provided in Section 1-9, and as exemplified in FIG. 3.

Unless otherwise specified, a "user input" is synonymous with a "single user input" throughout this disclosure. Accordingly, a "user input" or a "single user input" means an input which a user provides to at least a portion of at least one input unit of a data processing terminal, when a user provides at least one of the $1^{st}$, $2^{nd}$, $3^{rd}$, $4^{th}$, and/or $5^{th}$ type user inputs to the portion of the input unit by exercising a "single effort" through the direct manipulation, indirect manipulation or other manipulations of at least a portion of the input unit as explained in Section 1-10. That is, when a user provides multiple user inputs concurrently by exercising a single effort, such user inputs are deemed as a single user input. In contrary, when a user exercises multiple efforts to provide multiple user inputs not concurrently (i.e., sequentially), such user inputs do not qualify as a single user input.

Therefore, each of [1] a single $1^{st}$ type user input and [2] a single $3^{rd}$ user input qualifies as a (single) user input provided to an input unit by a (single) concurrent effort by a user. In addition, [1] two $1^{st}$ type user inputs qualify as a (single) user input, when a user provides both user inputs by a (single) concurrent effort, [2] three $5^{th}$ type user inputs qualify as a (single) user input, when a user provides such three user inputs by a (single) concurrent effort, and [3] one $1^{st}$ type user input and three $4^{th}$ type user inputs can also qualify as a (single) user input, as far as a user provides such four user inputs by a (single) concurrent effort.

Put in different contexts, a user may press a $1^{st}$ input unit with his finger and move his finger over the $1^{st}$ input unit. If the user moves his finger while maintaining such pressing (e.g., without detaching the finger from the input unit), such pressing and moving qualify as a single (concurrent) effort by the user, for the user exercises such pressing and moving over at least one common clock cycle of a processor of a terminal. However, when there exists a temporal gap between such pressing and moving (e.g., pressing, detaching, and then moving), such pressing and moving may not quality as the single (concurrent) effort, unless the temporal gap is less than 1.5, 1.0, 0.5, or 0.3 second, which will be explained in greater below in conjunction with a definition of "multiple quick efforts" which is to be provided in Section 1-12.

In another example, a user may touch a $2^{nd}$ input unit and provide an image of his face to a $3^{rd}$ input unit (e.g., by staring at a camera). When the user provides the image while maintaining the touching, such touching and providing qualify as a single (concurrent) effort as far as there exists at least one common clock cycle in which the user exercises such touching and providing at the same time. In other words, such touching and providing are a single concurrent effort, for there is no temporal gap between such touching and providing.

In another example, a user may press a $1^{st}$ input unit with a $1^{st}$ finger and touch a $4^{th}$ input unit with a $2^{nd}$ finger. Such pressing and touching can also qualify as a single (concurrent) effort by the user, as far as there exists at least one common clock cycle in which the user performs such pressing and touching, or as far as there is no temporal gap between such pressing and touching.

It is to be understood that a user lives in a world counted by the seconds, hours, days, weeks, months, years, and decades, whereas a terminal or its processor operates in another world of nano- or pico-seconds. Based on the foregoing, definitions about "concurrence" and "sequence" regarding various operations (or steps) run by a processor of a terminal may need to be modified when such operations (or steps) are used in conjunction with a user input, particularly in conjunction with an effort which is exercised by a user input and which takes a certain amount of time. For example, a user cannot provide a user input or a (user) sub-input to a terminal instantaneously (e.g., within one or several clock cycles), but can at best provide the user input or (user) sub-input over a certain period of time such as, e.g., within 0.1 second to 1.0 second, which would easily amount to several millions of clock cycles of a processor.

Figure 4:
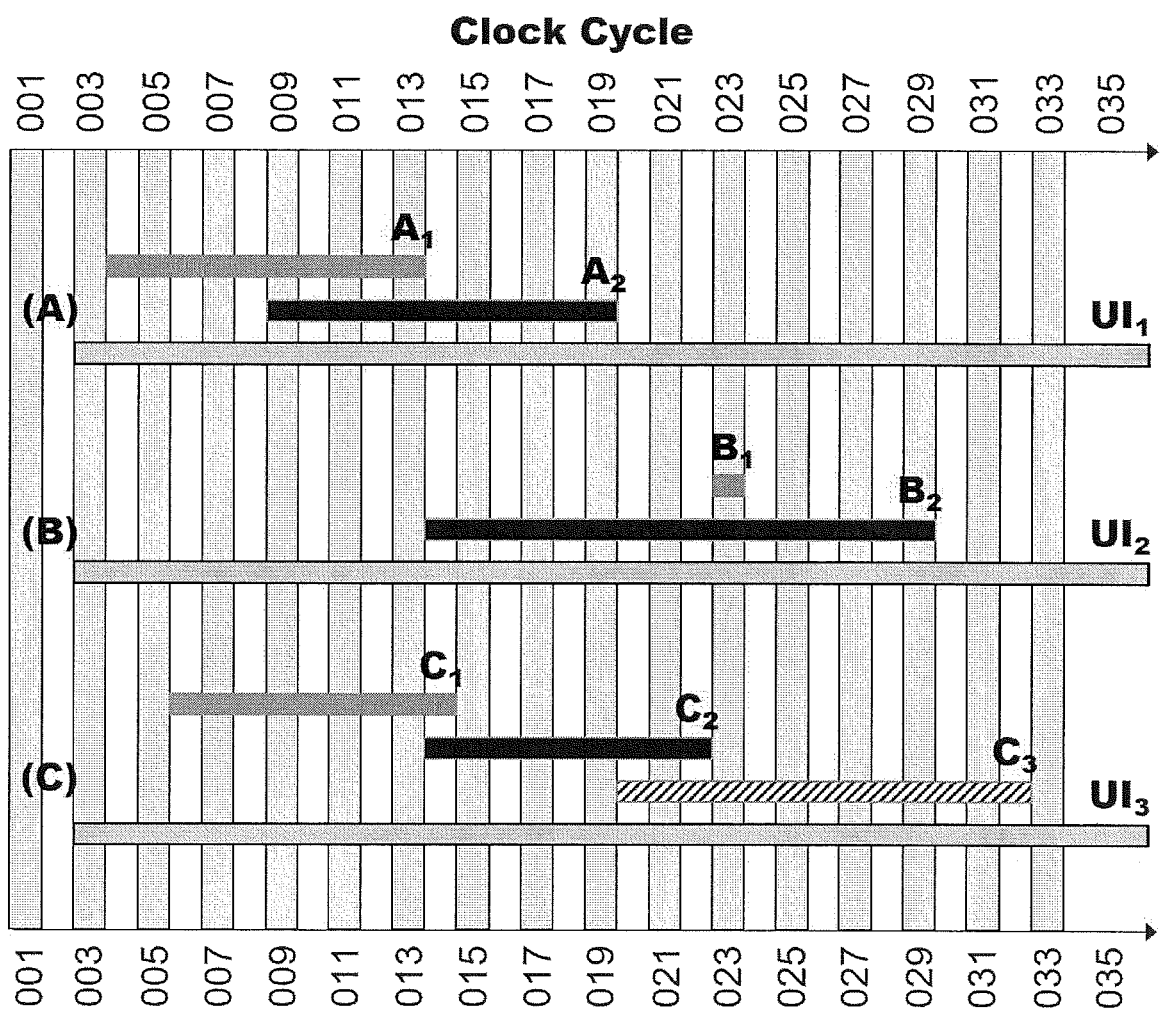
FIG. 4 is a schematic diagram of exemplary concurrent operations (or steps) presented along clock cycles of a processor in view of a user input.

To illustrate such characteristics, FIG. 4 describes a schematic diagram of exemplary concurrent operations (or steps) presented along clock cycles of a processor of a data processing terminal in view of a user input. In the panel (A) of FIG. 4, a terminal or its processor (simply a terminal) runs the operation (or step) $A_1$ during the clock cycles from 004 to 013, and also runs the operation (or step) $A_2$ during the clock cycles from 009 to 019. By the above definition, this terminal is deemed to "concurrently" run the operations (or steps) $A_1$ and $A_2$, because both steps overlap each other in five common clock cycles 009 and 013. In addition, a user provides a user input (UI1) during the clock cycles from 003 to 1,000,003 (now shown in the figure). Because the period of providing UI1 includes the periods of running the operations (or steps) $A_1$ and $A_2$, a terminal is deemed to run such operations $A_1$ and $A_2$ concurrently in view of the user input UI1.

In the panel (B) of FIG. 4, a terminal runs the operation (or step) $B_1$ at a clock cycle 023, and also runs another operation (or step) $B_2$ during the clock cycles from 014 to 029. Thus, this terminal is deemed to "concurrently" run the operations (or steps) $B_1$ and $B_2$. When a user provides a user input (UI2) during the clock cycles from 003 to 1,000,003, a terminal is deemed to run such operations $B_1$ and $B_2$ concurrently in view of the user input UI2, for the period of providing UI2 includes the periods of running the operations (or steps) $B_1$ and $B_2$.

In the panel (C) of the figure, a terminal runs the operation (or step) $C_1$ from a clock cycle 006 to a clock cycle 014, runs the operation (or step) $C_2$ from a clock cycle 014 to a clock cycle 022, and runs another operation (or step) $C_3$ from a clock cycle 020 to a clock cycle 032. Therefore, the terminal is deemed to [1] "concurrently" run the operations (or steps) $C_1$ and $C_2$, and [2] "concurrently" run the operations (or steps) $C_2$ and $C_3$. However, the terminal is deemed to not "concurrently" run the operations (or steps) $C_1$ and $C_3$, for they do not overlap each other in any common clock cycle.

When a user provides a user input (UI3) during the clock cycles from 003 to 1,000,003, the period of providing UI3 includes the periods of running the operations (or steps) $C_1$, $C_2$, and/or $C_3$. Accordingly, a terminal may be deemed to concurrently run the operations $C_1$ and $C_2$ in view of the user input UI3, to concurrently run the operations $C_2$ and $C_3$ in view of the user input UI3, to concurrently run the operations $C_3$ and $C_1$ in view of the user input UI3, and to concurrently run all of such operations $C_1$, $C_2$, and $C_3$ in view of the user input UI3, It is appreciated that a user may exercise a single effort in various ways. In one example, a user may exercise an "active single effort" by performing an active action or a voluntary action in providing a single user input to an input unit, where examples of such active single efforts may include [1] mechanical, electrical, magnetic, or optical manipulation of at least a portion of an input unit through an active action of a user, [2] providing images or voices to an input unit through an active action of a user (e.g., voluntarily staring at a camera to provide an image or actively talking to a microphone), or the like.

In another example, a user may exercise a "passive single effort" or an "inactive single effort" by passively or involuntarily providing a single user input to an input unit. For example, a terminal may receive a single user input and acquire at least one (user) sub-input therefrom even when a user does not actively or voluntarily take any action. Therefore, when a terminal obtains an image of an eye of a user who is not actively staring at a camera of a terminal and processes the image as a user input, a user may be deemed to exercise a passive single effort to provide a single user input to the terminal. Similarly, when a terminal obtains a user voice while he or she is talking to another person and uses such voice as a user input without user's knowing, a user may also be deemed to exercise an inactive single effort. In addition, when a terminal obtains environmental sounds without requiring a user to record such sounds, and uses such sounds as a user input, a user may further be deemed to exercise a passive single effort. Within the scope of this disclosure, a "single effort" is defined to collectively include not only to an "active single effort" but also a "passive single effort" therein.

1-12. Multiple Quick Efforts

As defined in Section 1-11, a "user input" or a "single user input" means an input which a user provides to at least one input unit of a terminal by exercising a "single effort." However, a user may repeat an identical "quick effort" more than once to provide a certain user input, where examples of such repeated efforts may include quick double clicks, double taps, triple clicks, triple taps, or the like. By definition, such multiple clicks or taps are separated from each other by temporal gaps and, therefore, such quick clicks or quick taps may not qualify as a single user input.

In reality, however, a user repeats such multiple quick clicks (or taps) to provide a terminal with a single preset user input, and a terminal may recognize such multiple quick efforts as a single preset user input such that, e.g., a terminal receives a user input for running a $1^{st}$ operation in response to a single tap, but receives a different user input for running a $2^{nd}$ operation in response to double taps. In such cases, the "multiple quick efforts" are deemed to qualify as a "user input" or a "single user input" when a user repeats such efforts quickly, within a certain period of time such as 1.5, 1.0, 0.5, or 0.3 second. In addition, when a terminal may recognize a single user input when a user repeats such multiple efforts within 1.7, 2.0, 3.0 seconds, such multiple quick efforts are also deemed as a user input or a single user input, depending upon a control setting.

In contrary to such multiple quick clicks or taps which are repetitions of the same effort, multiple quick efforts may include different efforts exercised by a user, usually by using different body parts, by using different non-user objects, by applying different user inputs concurrently to different input units, or the like. For example, a user may manipulate a portion of a $1^{st}$ input unit once (e.g., a button), while speaking to a $2^{nd}$ input unit (e.g., a microphone) concurrently. Such touching and speaking can then qualify as a single user input, as far as the touching and speaking overlap in at least one common clock cycle. Even when a user touches the portion of the $1^{st}$ input unit and then speaks to the $2^{nd}$ input unit after a certain period (i.e., a temporal gap), such touching and speaking can also qualify as a single user input when the gap is less than 1.5, 1.0, 0.5, or 0.3 second.

In another example, a user may press a portion of a $3^{rd}$ input unit (e.g., a touchscreen) once with a stylus (or a pointer), while staring at a $4^{th}$ input unit (e.g., a camera) concurrently. Such pressing and staring can qualify as a single user input as well. Even when a user presses the portion of the $3^{rd}$ input unit and then stares at the $4^{th}$ input unit after a certain period (i.e., a temporal gap), such pressing and staring may still qualify as a single user input when the gap is less than 1.5, 1.0, 0.5, or 0.3 second.

In yet another example, a user may exercise multiple efforts by repeating the same effort, while manipulating a static or dynamic feature of such efforts. Examples of such features may include, but not limited to, a length of the efforts, an extent (or strength) of the efforts, a direction thereof, a temporal gap between two neighboring efforts, a temporal overlap along two adjacent efforts, a number of the efforts, a sequence of the efforts, or the like. Therefore, while pressing a portion of an input unit, a user may press such a portion harder, may shift a direction of pressing, may repeat pressing without detaching a hand therefrom, or the like, thereby providing different and unique quick actions which a terminal may recognize as a different and unique single user input.

1-13. (User) Sub-Inputs

As used herein, a "(user) sub-input" or simply a "sub-input" is an element of a user input which causes an input unit to generate a "control signal." Therefore, a "(user) sub-input" or a "sub-input" is defined as a basic element of a user input. To acquire such (user) sub-inputs, an input unit includes at least one sensing element (i.e., a sensor), where configurational or operational characteristics of such a sensor may depend upon a nature of a (user) sub-input to monitor. Accordingly, when a $1^{st}$ input unit is to receive a mechanical, $1^{st}$ type user input, the $1^{st}$ input unit may preferably include a mechanical sensor capable of acquiring a mechanical (user) sub-input included in the user input. Alternatively, when a $2^{nd}$ input unit is to receive acoustic, $5^{th}$ type user input, the $2^{nd}$ input unit may preferably include an acoustic sensor capable of acquiring an acoustic (user) sub-input included in the user input.

A user input of this disclosure may include therein at least one of multiple (user) sub-inputs such as [1] a mode-switching (user) sub-input ($UI_{SWT}$), [2] an activation (user) sub-input ($UI_{ACT}$), [3] an authentication (user) sub-input ($UI_{THEN}$), and [4] an auxiliary (user) sub-input ($UI_{AUX}$). In this context, when an input unit "receives a user input," it is presumed that a proper sensor (or a sensing element) of the input unit "acquires at least one (user) sub-input" from the user input.

More particularly, when a user provides a user input to advance to one mode from an off-state of a terminal or to switch from a current mode to a new mode, it is deemed that the user input includes $UI_{SWT}$ and may optionally include at least one of other (user) sub-inputs such as $UI_{ACT}$, $UI_{THEN}$, and $UI_{AUX}$. Therefore, upon receiving a user input including $UI_{SWT}$, a terminal acquires $UI_{SWT}$ therefrom, and runs a mode-switching operation in order to switch to at least one mode which is selected from a set of multiple modes (of operation) which are included in a certain hierarchy and each of which is actually defined by a terminal. As will be described below, however, a terminal may switch modes in response to a user input which does not include any $UI_{SWT}$ as well, e.g., when such mode switching is conditioned upon other operations such as, an authentication operation, an activation operation, or the like.

It is appreciated that a user may preferably include a certain number of (user) sub-inputs in a single user input. In response to receiving such a user input or in response to acquiring such (user) sub-inputs, a terminal may run various operations. Therefore, a $1^{st}$ number of such (user) sub-inputs included in the user input is typically equal to a $2^{nd}$ number of operations which are to be run by a terminal in response to the user input.

It is appreciated, however, that the above $1^{st}$ number may not necessarily be the same as the above $2^{nd}$ number in some cases. In one case, a terminal may automatically run (or start to run) an authentication operation upon (or in response to) acquiring $UI_{SWT}$. In another case, a terminal may turn on (or start to turn on) a display unit in response (or upon) acquiring $UI_{SWT}$. In such cases, the $1^{st}$ number is less than the $2^{nd}$ number. To the contrary, the $1^{st}$ number may be greater than the $2^{nd}$ number. In one case, a terminal may acquire $UI_{ACT}$, $UI_{THEN}$, and $UI_{SWT}$ from a single user input, and then may turn on a display unit and switch to a certain mode only when a user passes the user authenticating. When a user fails the user authenticating, a terminal may stay in an off-state or in a current mode, without running any other operation. In this case, a terminal ends up running only one operation, despite acquiring three (user) sub-inputs.

It then follows that the above $1^{st}$ number may be equal to, greater than or less than the above $2^{nd}$ number. In addition, it then also follows that, even when the $1^{st}$ number is equal to the $2^{nd}$ number, the operations run by a terminal may not correspond to each of such (user) sub-inputs provided to a single or multiple input units.

1-13-1. Activation (User) Sub-Input (UIACT)

A $1^{st}$ of various exemplary (user) sub-inputs is [1] an "activation (user) sub-input ($UI_{ACT}$)," [2] an "activation sub-input ($UI_{ACT}$)," or [3] simply $UI_{ACT}$, all of which "activate" a terminal by causing the terminal to run an activation (or turning-on) operation and by causing the terminal to turn on its display unit in response to (receiving) the user input or to (acquiring) $UI_{ACT}$. For simplicity of illustration, an input unit for receiving $UI_{SWT}$ is to be referred to as an "activation input unit" hereinafter, while a sensor of the activation input unit is to be referred to as an "activation sensor" hereinafter.

When a terminal includes multiple display units, $UI_{ACT}$ may cause a terminal to turn on at least one or all display units. Because a terminal executes (or starts to execute) at least one unexecuted (or remaining) step of an operation of turning on a display unit once acquiring $UI_{ACT}$, the terminal (more particularly, its CPU unit, its O/S, or its software application) may neither run an activation operation nor turn on a display unit without $UI_{ACT}$.

An activation input unit may use any conventional activation sensor which can generate a control signal which in turn can be recognized by a terminal as $UI_{ACT}$ and which can cause a terminal to run an activation operation. Accordingly, the activation input unit may operate mechanically, electrically, optically or magnetically, while generating a mechanical, electrical, optical or magnetic control signal with its activation sensor in response to $UI_{ACT}$. It is appreciated that a terminal does not always require $UI_{ACT}$ to run an activation operation and to turn on a display unit, for an activation operation may be conditioned upon other operations. For example, a terminal may turn on a display unit whenever a user passes an authentication operation, regardless of whether or not an input unit has received a user input including $UI_{ACT}$.

A user may provide $UI_{ACT}$ in various timings such as, e.g., [1] concurrently with one of $UI_{SWT}$, $UI_{THEN}$, and $UI_{AUX}$, [2] when providing a single concurrent user input (e.g., by manipulating a single input unit or by manipulating multiple input units concurrently), [3] when providing multiple non-concurrent user inputs (e.g., by sequentially manipulating multiple input units or by sequentially manipulating different portions of an input unit), or the like. A user may concurrently provide $UI_{ACT}$ along with at least one of $UI_{SWT}$, $UI_{ACT}$ or $UI_{ACT}$, e.g., by concurrently manipulating [1] a single input unit, [2] multiple input units, or [3] at least two parts of a single input unit.

1-13-2. Authentication (User) Sub-Input (UITHEN)

A $2^{nd}$ exemplary (user) sub input is [1] an "authentication (user) sub input ($UI_{THEN}$)," [2] an "authentication sub input ($UI_{THEN}$)" or [3] simply $UI_{THEN}$, all of which "authenticate" a user by causing a terminal to run at least one authentication operation in response to [1] (receiving) a user input or [2] (acquiring) $UI_{THEN}$. For simplicity of illustration, an input unit for receiving $UI_{THEN}$ is to be referred to as an "authentication input unit" hereinafter, while a sensor of the authentication input unit is to be referred to as an "authentication sensor" hereinafter.

When a terminal includes multiple input units assigned to user authentication, $UI_{THEN}$ may cause a terminal to drive at least one (or all) of such input units. Because the terminal executes (or starts to execute) at least one unexecuted (or remaining step) of an authentication operation once acquiring $UI_{THEN}$, the terminal (i.e., its CPU unit, O/S, or software application) may not run any authentication operation without $UI_{THEN}$.

An authentication input unit may employ any conventional authentication sensor which can generate a control signal which in turn can be recognized by a terminal as $UI_{THEN}$ and which can cause a terminal to run at least one authentication operation. Accordingly, the authentication input unit may operate mechanically, electrically, optically or magnetically, while generating various mechanical, electrical, optical or magnetic control signals with its authentication sensor in response to $UI_{THEN}$. It is appreciated that a terminal does not always require $UI_{THEN}$ to run an authentication operation, particularly when an authentication operation is conditioned upon other operations. For example, even when a terminal does not receive a user input including UI THEN therein, the terminal may run an authentication operation and authenticate a current user, [1] whenever a terminal is to switch modes in response to acquiring $UI_{SWT}$, [2] whenever a user attempts to switch to a new mode which is granted with more access authority than a current mode, [3] following a preset execution sequence of an O/S or a software=application, or the like.

A terminal may use various user-related or user-irrelevant information as $UI_{THEN}$. For example, $UI_{THEN}$ may be, may correspond to, or may accompany at least one of following "biometric information" of a user such as, e.g., [1] an image of a body part (e.g., a fingerprint, a hand, a palm, a wrist, an iris, a retina, an eye, an ear, a nose, a face, another body part, blood vessels, a distribution pattern of such vessels, a blood flow rate, a blood flow pattern, or the like), [2] electrical (including resistive, conductive, or capacitive) signals representing or related to biometric information of a user, [3] optical or magnetic signals representing or related to biometric information of a user, [4] a user sound (including a voice, a finger snap, or a clap) or other sounds related to such biometric information, or [5] physiological features (e.g., body temperature, blood pressure, an ECG, a heart rate, other cardiovascular features, a breathing rate, breathing sound, other respiratory features, gastrointestinal features such as a movement of stomach or intestines, an EMG, an EEG, or other skeletal or muscular features). In addition, $UI_{THEN}$ may be, may correspond to, or may accompany at least one of the following "dynamic biometric information" of a user such as, e.g., [1] a displacement or a movement of a body part, [2] a velocity thereof, [3] an acceleration, [4] its position in a 2-D plane or in a 3-D space, [5] a gesture of a body part, or the like.

A terminal may use non-biometric information as $UI_{THEN}$ as well. For example, $UI_{THEN}$ may be, may correspond to, or may accompany information regarding a password or a pass code, a non-user image, a non-user sound, a non-user light, non-user acoustic or electromagnetic waves, or the like. A terminal may also use its own static or dynamic feature as $UI_{THEN}$. For example, a terminal may monitor a displacement or a movement of its part, its velocity or an acceleration, its position, a number of movements, a sequence of the movements, a duration of the movements, its orientation (e.g., facing up or down, tilted at an angle, or the like), or any other related information, and use such features as $UI_{THEN}$, and authenticate a user based thereon. As far as there exists mutual agreement between a terminal and a user, any information may be recruited as $UI_{THEN}$.

A user may provide $UI_{THEN}$ through various manipulations such as, e.g., [1] by manipulating a single portion of an authentication input unit, [2] by manipulating multiple portions of a single authentication input unit, or [3] by manipulating at least two portions of at least two authentication input units, where such manipulating in [2] or [3] may be concurrent, sequential or a combination thereof. A user may provide $UI_{THEN}$ in various timings such as, e.g., concurrently with [1] providing either $UI_{SWT}$ or $UI_{ACT}$, [2] providing both of $UI_{SWT}$ and $UI_{ACT}$, [3] providing all of such $UI_{SWT}$, $UI_{ACT}$, and $UI_{AUX}$. To this end, a user may [1] include multiple sub-inputs in a single user input and provide that user input to a single input unit, [2] include multiple sub-inputs in multiple user inputs and provide the user inputs to a single input unit either concurrently or sequentially, [3] include multiple sub-inputs in multiple user inputs and provide them to multiple input units either concurrently or sequentially, or the like.

A user may exercise an "active single effort" by performing a voluntary action to provide $UI_{THEN}$ to an input unit, where examples of such voluntary actions may include [1] swiping a finger over an authentication input unit or pressing such an input unit with a finger to provide $UI_{THEN}$ about a fingerprint, [2] staring at a camera to provide $UI_{THEN}$ about an image of an iris, a retina, or a face, [3] talking to a microphone to provide $UI_{THEN}$ about a user's voice, or the like. A user may exercise "multiple active quick efforts" by performing multiple voluntary actions to provide $UI_{THEN}$ as well.

In the alternative, a terminal may acquire at least one $UI_{THEN}$ on its own without necessarily requiring a user to take an active action. Accordingly, a terminal may take an image of an eye of a user, may obtain a user voice, or may record environmental sounds, and then acquire $UI_{THEN}$ from the image, voice, or sounds, regardless of whether or not [1] a user voluntarily stares at a camera, [2] a user speaks only to a terminal, without talking to a $3^{rd}$ person on the other line, or the like. In such cases, a user may be deemed to exercise a "passive single effort" by performing an involuntary action to provide $UI_{THEN}$ to an input unit Once an input unit of a terminal receives a (single) user input from a user, a sensor of the input unit acquires $UI_{THEN}$ therefrom. In response thereto, a terminal (i.e., its processor, its O/S or its software application) may then start to execute program codes of an authentication application, and determines whether or not a current user may pass the user authenticating. More particularly, a terminal may [1] execute "comparing steps" of the authentication application by comparing $UI_{THEN}$ with biometric information of a user which is pre-stored in the terminal, and [2] execute "determining steps" of the authentication application by determining whether a current user passes (i.e., a "pass") or fails (i.e., a "fail") the user authenticating.

1-13-3. Mode-Switching (User) Sub-Input (UISWI)

A $3^{rd}$ exemplary (user) sub-input is [1] a "mode-switching (user) sub-input ($UI_{SW1}$)," [2] a "mode-switching sub-input ($UI_{SWT}$)" or [3] simply $UI_{SWT}$, all of which "switch" a mode of operation by causing a terminal [1] to advance to one mode from an off-state or a powered-off state, or [2] to switch from a current mode to a new mode in response [1] to (receiving) a user input or [2] to (acquiring) $UI_{SWT}$, where a terminal may switch modes in one of various "mode-switching timings" as will be explained below. Because a terminal may execute (or start to execute) at least one unexecuted (or remaining) step of a mode-switching operation once acquiring $UI_{SWT}$, a terminal (more particularly, its processor, its O/S, or its software application) may not run any mode-switching operation without $UI_{SWT}$.

It is appreciated that an input unit for receiving $UI_{SWT}$ is referred to as a "mode-switching input unit" hereinafter, while a sensor of the mode-switching input unit is to be referred to as a "mode-switching sensor" hereinafter. In addition and as defined in Section 1-4, to "switch modes" or "mode switching" collectively refers to any of the following mode switching such as, e.g., [1] to "advance" to a certain mode from its "powered-off state," [2] to "advance" to a certain mode from its "off-state," [3] to "switch" from a current mode to a new mode while in an "on-state" (i.e., when a terminal is communicable and not completely powered off, and its display unit is or has been turned on), [4] to "advance" to an off-state from one mode (i.e., in the on-state), or [5] to "advance" to a powered-off state from one mode (i.e., in the on-state).

A terminal selects a new mode based on $UI_{SWT}$ by referring to a "matching list" which matches each of multiple mode-switching (user) sub-inputs (multiple $UI_{SWT}$'s) with each of multiple modes of operation which have been defined in a certain hierarchy by a user (or a terminal). Because multiple $UI_{SWT}$'s and multiple modes (defined in a certain hierarchy) are already listed in the matching list, a step of selecting a new mode from $UI_{SWT}$ may be simply a step of locating a correct entry (i.e., one of multiple pre-defined modes which corresponds to the acquired $UI_{SWT}$) from a matching list based on another entry (i.e., one of $UI_{SWT}$'s provided by a user). Accordingly, the step of selecting a correct entry from the matching list may be different from determining steps which are involved in a user authentication operation where a terminal compares $UI_{THEN}$ with a pre-stored authentication information, for $UI_{THEN}$ provided by a user may not be correct, or for $UI_{THEN}$ provided by a user may not match pre-existing information stored in a terminal.

A user may supply various $UI_{SWT}$'s in various ways. For example, a user may provide certain $UI_{SWT}$ by [1] a $1^{st}$ movement of at least one movable portion of a mode-switching input unit, [2] a $2^{nd}$ movement of at least one user body part on (or over) at least one portion of the input unit, while maintaining a mechanical, electrical, magnetic or optical contact between the body part and the portion of the input unit, [3] a $3^{rd}$ movement of a non-user object on (or over) at least one portion of the input unit, while maintaining a mechanical, electrical, magnetic or optical contact between the non-user object and the portion of the input unit, [4] a $4^{th}$ movement of at least one body part (or non-user object) on (or over) at least one portion of the input unit, where the body part (or non-user object) is positioned away from the input unit at a certain distance, or the like. A terminal may acquire different $UI_{SWT}$'s by varying [1] a type, a nature, or a pattern of such $1^{st}$, $2^{nd}$, $3^{rd}$ or $4^{th}$ movements, [2] an extent, a magnitude or an amplitude of such $1^{st}$, $2^{nd}$, $3^{rd}$ or $4^{th}$ movement, [3] a direction of at least one of such $1^{st}$, $2^{nd}$, $3^{rd}$ or $4^{th}$ movement, [4] a sequence of at least two of such movements where such movements [4-1] may be different from each other or [4-2] may be a repetition of the same movement, [5] static or dynamic features of such movements or those features related to such movements, or the like.

A user may provide $UI_{SWT}$ to a mode-switching input unit with a single user input which may optionally include other (user) sub-inputs therein. Alternatively, a user may provide $UI_{SWT}$ to an input unit while supplying multiple user inputs to one portion of the input unit or to multiple portions of the same input unit, where at least one of the user inputs may include $UI_{SWT}$ therein. Alternatively, a user may provide $UI_{SWT}$ to multiple input units, where at least one of such user inputs includes $UI_{SWT}$ and where at least one of the input units may serve as a mode-switching input unit. When a user provides multiple concurrent user inputs, it does not matter in which user input $UI_{SWT}$ is to be included, for a terminal can acquire not only $UI_{SWT}$ but also another sub-input concurrently with each other. However, when a user provides multiple user inputs sequentially, a user may include $UI_{SWT}$ in a $1^{st}$ user input, particularly when a user may desire to seamlessly switch modes along with, e.g., turning on a display unit, running user authenticating, or the like.

Upon or after acquiring $UI_{SWT}$, a mode-switching sensor of the input unit may generate a control signal and send the control signal to another unit of the terminal. The terminal may execute (or start to execute) at least one remaining (or unexecuted) step of the above selecting step, and may run (or start to run) the remaining steps of a "mode-switching operation."

As described above, a user may provide $UI_{SWT}$ to a terminal by incorporating $UI_{SWT}$ into a single user input by manipulating at least one portion of the input unit with a single body part (or a single non-user object). In this case, a terminal may acquire $UI_{SWT}$ by various arrangements as described above. When a user provides $UI_{SWT}$ by incorporating such into a single user input by manipulating at least two body parts (or at least two non-user objects), a terminal may similarly acquire $UI_{SWT}$ by various arrangements as described above.

It is appreciated that a terminal may receive a single user input (e.g., when a user exercises a "single effort"), and concurrently acquire multiple (user) sub-inputs incorporated therein. A terminal may also receive multiple concurrent user inputs (e.g., when a user exercises "multiple concurrent (or quick) efforts"), and concurrently acquire multiple (user) sub-inputs included therein. Furthermore, when a user provides multiple non-concurrent (i.e., sequential) user inputs, a terminal may concurrently acquire multiple (user) sub-input included therein from time to time. Detailed features of these arrangements are as follows.

In one example, a user may manipulate at least a portion of an input unit, e.g., by pressing, pushing, pivoting, rotating or otherwise moving at least one movable portion of the input unit, or by contacting or touching at least one stationary or movable portion of an input unit with a user's body part or with a non-user object. In response thereto, an input unit receives a single user input, and acquires at least one (user) sub-input therefrom, concurrently or sequentially. It is appreciated that these arrangements as well as other following arrangements of this Section apply to all of the sub-inputs of this disclosure.

In other words, a single user input may result from a single effort which may require one or multiple actions of a user such as, e.g., [1] when a user positions a finger or another body part proximate to at least one sensor of an input unit, [2] when a user activates an authentication sensor of an authentication input unit by providing a fingerprint, an iris, or other user biometric information, [3] when a user contacts a movable (or stationary) portion of an input unit or pressing at least a portion thereof, or [4] when a user activates a tactile sensor or other activation sensors of an input unit to wake up a terminal (i.e., turning on a display unit). That is, even when a user actively exercise multiple actions, such numerous actions may quickly take place, like a series of multiple sequence processes in such a minute time scale.

In one case, after a user concurrently presses a $1^{st}$ portion of an input unit (providing $UI_{SWT}$) and contacts a $2^{nd}$ portion of another input unit ($1^{st}$ contact, providing a $UI_{THEN}$) user may detach a finger from the $2^{nd}$ portion, and may then contact the same $2^{nd}$ portion or a different $3^{rd}$ portion of the same or a different input unit ($2^{nd}$ contact, providing $UI_{AUX}$). In this case, multiple efforts and multiple user inputs may still qualify as a "single user input," [1] as far as a user maintains such pressing during such detaching and $2^{nd}$ contacting, [2] as far as there exists at least one temporal overlap between such pressing and $2^{nd}$ contacting, or the like.

In another example, a terminal may instead receive multiple non-concurrent as well as non-overlapping user inputs (i.e., sequential). However, such a terminal may still concurrently acquire multiple (user) sub-inputs. In one case, a terminal may receive sequential user inputs when a user, e.g., [1] detaches all body parts (or non-user objects) from at least one portion of an input unit during such manipulation, or [2] detaches all body parts (or non-user objects) from the portion of the input unit before a user completes such manipulation. Even when a terminal receives such sequential user inputs, a terminal may still acquire multiple sub-inputs concurrently, e.g., [1] when a terminal starts to acquire such multiple sub-inputs only after the terminal completes to receive all sequential user inputs, [2] when a terminal conditions acquisition of some (user) sub-inputs upon acquiring a certain (user) sub-input, or the like.

That is, when a user provides at least one input unit with multiple concurrent user inputs while including $UI_{SWT}$ in one of such user inputs, a terminal may acquire $UI_{SWT}$ by various arrangements as described above. In one case, a user may manipulate a $1^{st}$ input unit, and then manipulate the same (or different) input unit after a certain period of time, thereby providing multiple non-concurrent, non-overlapping user inputs. However, a terminal may be configured in such a way that the terminal may not start to acquire various sub-inputs until a user finishes providing all user inputs. Accordingly, when a terminal starts to acquire various sub-inputs thereafter, the terminal may be able to acquire such sub-inputs concurrently.

In another case, when a user first touches a $1^{st}$ portion of an input unit, detaches a user body part from the $1^{st}$ portion (providing $UI_{THEN}$), and then presses a $2^{nd}$ portion of the same or different input unit (providing $UI_{ACT}$), such multiple efforts may lead to providing multiple user inputs. In this case, a terminal may acquire a $1^{st}$ sub-input before the user detaches the user body part, and may acquire a $2^{nd}$ sub-input only after the user presses the input unit. Acquiring such multiple sub-inputs may still be deemed concurrently, [1] as far as a user provides the $2^{nd}$ portion within a certain period such as, e.g., 1.5, 1.0 or 0.5 second, or [2] as far as a terminal configures acquisition of such multiple sub-inputs to overlap over at least one clock cycle of a terminal.

In general, concurrently providing multiple user inputs or concurrently including multiple (user) sub-inputs from such multiple user inputs may be important, for [1] concurrently receiving multiple user inputs or [2] concurrently acquiring multiple sub-inputs is beneficial in running various operations by a terminal in a seamless manner. However, the reverse may hold as well. For example, even when a terminal may concurrently acquire multiple (user) sub-inputs, the terminal may rather sequentially acquire various (user) sub-inputs included in such user inputs. As an example, when running a $2^{nd}$ operation based on a $2^{nd}$ (user) sub-input may be conditioned upon an outcome of running a $1^{st}$ operation based on a $1^{st}$ (user) sub-input, concurrently acquiring both of the $1^{st}$ and $2^{nd}$ (user) sub-inputs may not be critical in maintaining seamless feature of the terminal. Accordingly, the terminal may be able to acquire such $1^{st}$ and $2^{nd}$ sub-inputs sequentially, without hampering seamless features of the terminal.

1-14. Input Units

As used herein, an "input unit" refers to a hardware element of a main system of a terminal. More particularly, an input unit receives at least one of the above $1^{st}$ type to 9th type user inputs. A terminal may recruit any prior art mechanical, electrical, magnetic, and/or optical device as an input unit, as far as [1] the device can receive at least one of the above user inputs, and [2] the device can include at least one prior art sensor capable of acquiring at least one (user) sub-input which is included in that user input received by the input unit.

When a certain input unit is designated to receive $UI_{ACT}$, the input unit is referred to as an "activation input unit" which includes at least one "activation sensor" therein. When a certain input unit is designated to receive $UI_{THEN}$, the input unit is referred to as an "authentication input unit" which includes at least one "authentication sensor" therein. Similarly, when a certain input unit is designated to receive $UI_{SWT}$, the input unit is referred to as an "mode-switching input unit" which includes at least one "mode-switching sensor" therein. A terminal may also include an additional input unit which can receive a user input which includes therein another (user) sub-input for running operations other than the above authenticating, activation, or mode-switching operations. Such an input unit is referred to as an "auxiliary input unit" which includes therein at least one "auxiliary sensor" capable of acquiring an "auxiliary (user) sub-input ($UI_{AUX}$)."

An input unit may directly receive a user input, may directly acquire a sub-input, or may receive a user input and thereafter acquire one or more sub-inputs by extracting at least one sub-input from the user input. That is, a terminal may receive a user input and acquire a sub-input therefrom concurrently or sequentially, depending upon a presence or an absence of any temporal overlap therebetween. Alternatively, a $1^{st}$ input unit may only receive a user input and, thereafter, a $2^{nd}$ input unit may acquire one or more sub-inputs by extracting the sub-inputs from the user input.

A sensor of an input unit acquires at least one (user) sub-input from at least one user input and, therefore, an input unit may generally include as many sensors as a number of sub-inputs included in a user input. Of course, an input unit may include a smaller number of sensors than a number of sub-inputs included in the user input, e.g., [1] when a terminal runs more than one operation in response to acquiring a single sub-input, [2] when a terminal runs a $2^{nd}$ operation which is conditioned upon an outcome from running a $1^{st}$ operation, or the like.

When a terminal acquires multiple sub-inputs using multiple input units, each input unit may be equipped with one or more sensors as well. It is appreciated that an input unit may acquire such sub-inputs in a 1-to-1 matching, a 1-to-n matching, a m-to-1 matching or a m-to-n matching, where 'm' and 'n' are integers and where 'm' may be greater than, equal to or less than 'n' as well.

Depending upon a nature or a type of an input unit or upon a number of user inputs required to run operations by a terminal, an input unit may receive a user input(s) when a user directly or indirectly manipulate at least a portion of the input unit. For example, a terminal only includes a single input unit and receives [1] multiple user inputs of the same or similar types, [2] multiple user inputs of different types, or [3] both of such user inputs of [1] and [2] in a combination. Alternatively, a terminal may include multiple input units of the same or different types and, therefore, may receive different types of user inputs or acquire different types of sub-inputs either concurrently, sequentially or in a combination with different input units.

It is appreciated that any hardware element of a terminal capable of receiving any of such $1^{st}$ type to 9th type user input may serve as an input unit and, therefore, may qualify as an input unit of this disclosure. Accordingly, when a terminal includes a touchscreen, a gyroscope, or a force transducer, each of such hardware elements may serve as a separate input unit, where the touchscreen acquires $UI_{THEN}$, a gyroscope acquires $UI_{SWT}$ from a position of a user, a movement thereof, or a gesture thereof, or where a force transducer acquires $UI_{ACT}$ from a magnitude of a force associated with a user input. Such sensors may instead acquire sub-inputs differently or such sensors may acquire the sub-inputs from measured values of the above position, movement, force, or the like.

A terminal may recruit various prior art input units examples of which may include, but not be limited to those described in U.S. Pat. No. 5,463,388 (assigned to AT&T), U.S. Pat. No. 7,479,949 (assigned to Apple, Inc.), U.S. Pat. No. 8,392,340 (assigned to Apple, Inc.), U.S. Pat. No. 8,542,206 (assigned to Apple, Inc.), U.S. Pat. No. 8,279,182 (assigned to Samsung), U.S. Pat. No. 8,554,275 (assigned to LG), or the like. Other prior art input units may also be implemented into various terminals of this disclosure as well.

1-15. (Software) Application

As used herein, a "software element" of a main system of a terminal collectively refers to [1] a man O/S), or [2] a main (software) application, and the software element is synonymous with an "accessible software element." A software element typically means a set of computer instructions or programs. As used herein, a "(software) application" or simply an "application" refers to one of software elements of a terminal, and also means a set of computer instructions or programs designed [1] to run a certain operation, or [2] to perform a specific function. It is appreciated that a (software) application is driven by a CPU unit, by an O/S, or by another application, and that driving a (software) application leads to running a certain operation or performing a specific function. It is also appreciated that driving a (software) application may accompany driving at least one hardware element as well.

As used herein, a "(software) application" is deemed to not include an "O/S" and, therefore, to be different from the O/S. A manufacturer or a distributor of a terminal may implement at least one (software) application into a terminal before sale. Alternatively, a user may download at least one application into a terminal after purchase. An O/S or an already-implemented application may also download a new "application" from various sources such as, e.g., an external memory device, a website, or the like.

An application may provide a user with various options such that the user may select different options in driving the application to run different operations or to perform different functions. Therefore, when a terminal grants a user with access authority to drive a certain application, a terminal may also allow a user to use all available options or to use only certain selected options, depending upon a mode in which a user operates a terminal, access authority granted thereto, or the like.

1-16. Run an Operation

It is a terminal [1] which "drives" various hardware or software element of a main system, and [2] which "runs" various operations using a main system or a lock system. In particular, driving an O/S, at least one (software) application, or a CPU unit of a terminal leads to running various operations. For illustration purposes, "an O/S, a (software) application, or CPU of a terminal" may be referred to as a "terminal" in this disclosure. Therefore, a terminal may run an operation by driving at least one portion of its CPU, O/S, or (software) application. For illustration purposes, a phrase "run an operation" is deemed to be synonymous with "run at least one operation" or "run at least one pre-determined operation."

To "run an operation" may typically include therein at least one of multiple steps such as, e.g., [1] at least one step of retrieving data which have been pre-stored in a terminal, [2] at least one step of retrieving a system setting or a user preference related to running an operation, [3] at least one step of preparing at least one hardware element ready to run an operation (e.g., erasing a volatile or non-volatile memory unit, erasing at least a portion of results obtained by running lock operations, getting electrical power supply ready, or the like), [4] at least one step of supplying electrical power to a hardware element, [5] at least one step of driving the element (e.g., manipulating a hardware element or executing computer instructions of a software element to perform a function), [6] at least one step of storing data obtained from driving the element, [7] at least one step of storing, utilizing, or erasing results obtained from such driving, or the like.

To this end, a terminal may employ one or more arrangements such as, e.g., [1] a terminal may retrieve data (or results) from a memory unit of a main (or lock) system, [2] a terminal may clear a memory unit of a main (or lock) system before driving a hardware or software element, [3] a terminal may supply electrical power to at least one hardware element, thereby rendering the element ready to run an operation, [4] a terminal may drive at least one software element [4-1] by executing a set of computer instructions or [4-2] by dividing the computer instructions to two or more sections and executing such sections sequentially, concurrently or in a combination thereof, or the like. Regardless of the above differences, an "operation" may be deemed to "have been on hold" or to "be on hold" as far as a terminal may not proceed to execute any unexecuted or remaining steps of a (software) application which are required to "run" a certain operation.

Once receiving a user input or in response to the user input, a terminal may drive (or start to drive) at least one hardware or software element, and may run (or start to run) at least one operation. Alternatively, a terminal may drive at least one $1^{st}$ hardware or software element in response to receiving a $1^{st}$ user input, and may then run a $2^{nd}$ operation automatically (or on its own), even without receiving a $2^{nd}$ user input to run the $2^{nd}$ operation, where an example may include a terminal which drives a $2^{nd}$ element and runs a $2^{nd}$ operation upon obtaining a certain outcome from running a $1^{st}$ operation with a $1^{st}$ element. This arrangement is referred to as driving a $2^{nd}$ element and running a $2^{nd}$ operation "conditioned upon" driving a $1^{st}$ element and running a $1^{st}$ operation.

In this disclosure, a terminal may drive a hardware or software element [1] upon receiving (or in response to) a user input and/or [2] in response to (or upon) acquiring at least one (user) sub-input. For example, a terminal may "run an activation operation" in response to $UI_{ACT}$, may "run an authentication operation" in response to $UI_{THEN}$, or may "run a mode-switching operation" in response to $UI_{SWT}$. Because a single user input may include more than one (user) sub-input, a terminal may drive multiple elements, and may run multiple operations upon receiving a single user input, where such multiple elements or operations may be identical to or different from each other.

1-17. Mode-Switching Operation in a Single Screen

As used herein, to "run at least one mode-switching operation" or simply to "run a mode-switching operation" is synonymous with [1] "switching modes," [2] "mode switching," or [3] simply "switching." As described above, such "mode switching" is an operation which causes a terminal to switch from a current mode to a new mode, where a terminal defines such modes in a hierarchy and, therefore where the current mode or new mode may include [1] each and every mode defined in the hierarchy, [2] an off-state, [3] a powered-off state, or the like. It is appreciated that an on-state is also implicitly included in the current or new mode, for any lock mode, any intermediate mode, and any unlock mode are in the on-state. In addition, a powered-on state is also implicitly included in the current or new mode, for any lock mode, any intermediate mode, and any unlock mode are in the powered-on state.

A "mode switching" or running a mode-switching operation may include multiple steps therein. For example, a mode switching may include the steps of, e.g., [1] starting to run a mode-switching operation, [2] selecting at least one new mode based upon $UI_{SWT}$ from a matching list of multiple pre-defined modes defined in a certain hierarchy, [3] taking an action when $UI_{SWT}$ does not match any of multiple modes listed in the matching list, [4] switching from a current mode to a new mode, and [5] completing to run a mode-switching operation.

In general, a terminal may run various mode-switching operations in various ways. For simplicity of illustration, various mode-switching operations may be classified based upon several factors such as, e.g., [1] whether a terminal is (or has been) in a powered-off state or in a powered-on state before mode switching, [2] whether a terminal is (or has been) in an off-state or in an on-state before mode switching, [3] whether a terminal runs an authentication operation in conjunction with (e.g., before, concurrently or after) such mode switching, or the like.

In one example, when a terminal in its off-state receives a user input including $UI_{SWT}$, a terminal advances to a new mode based upon $UI_{SWT}$, where the new mode is selected from a matching list, and where the matching list may match each of multiple modes defined in a certain hierarchy with each of multiple $UI_{SWT}$'s acquired by a terminal. As used herein, such mode of switching to a new mode is to be referred to as a "$1^{st}$ type switching modes" or "$1^{st}$ type mode switching" hereinafter.

When a terminal employs a user authentication, a terminal may advance to different modes depending upon an outcome from such authentication. In one case, a terminal may advance to an unlock mode and display an unlock (or home) screen when a user passes the user authenticating. When a user fails the authentication, a terminal [1] may advance to a lock mode (or a different default mode) and display a lock screen (or a default screen), or [2] may remain in the off-state, without displaying any screen on a display unit.

In this case, a terminal may first acquire $UI_{THEN}$ from a user input, and then acquire $UI_{SWT}$ only when a user passes such authentication. Alternatively, a terminal may acquire $UI_{THEN}$ and $UI_{SWT}$ concurrently, regardless of whether or not a user may pass the authenticating.

In another case, a terminal in an on-state may receive a user input including $UI_{SWT}$. A terminal may then switch from a current mode to a new mode by, e.g., selecting the new mode from the matching list based upon $UI_{SWT}$. As used herein, such mode switching of switching a new mode from a current mode is to be referred to as a "$2^{nd}$ type switching modes" or "$2^{nd}$ type mode switching" hereinafter.

When a terminal employs a user authentication, a terminal may switch to a new mode depending upon an outcome from such user authenticating. In one case, a terminal may switch to an unlock mode and display an unlock (or home) screen when a user passes the user authenticating. When a user fails such authenticating, however, a terminal [1] may switch to a lock mode (or a different default mode) and display a lock screen (or a different default screen), [2] may remain in the lock mode wile displaying a lock screen when a current mode is a lock mode, or [3] may switch to an off-state by turning off its display unit. Alternatively, a terminal may first acquire $UI_{THEN}$ from a user input, and may then acquire $UI_{SWT}$ only when a user passes such authenticating. In the alternative, a terminal may acquire $UI_{THEN}$ and $UI_{SWT}$ concurrently, regardless of whether or not a user may pass the authenticating.

1-18. Mode-Switching Operation in Multiple Screens

Various mode-switching operations of the preceding Section typically relate to a terminal which drives a single display unit and which displays a single screen or window thereon. Accordingly, such a terminal allows a user to run operations in one mode at a time, regardless of how may modes a terminal defines in a certain hierarchy. As a result, whenever a user switches to a new mode from a current mode, a user cannot run any operation which may only be accessible in the current mode anymore. However, when a terminal allows the user to use multiple screens (or windows) on a single display unit or multiple display units concurrently, the terminal may allow a user to use options which may be different from those in the preceding Section.

In one example, a terminal may allow a user to use at least two screens such that a user may use a $1^{st}$ screen to run operations in a lock (or intermediate) mode, whereas a user may use a $2^{nd}$ screen for running the same or different operations in an unlock mode. A terminal operating in this arrangement may allow a user to switch modes in any manner as described above and below, so that a user may switch from one screen (which is designated to operate in one mode) to another screen (which is designated to operate in a different mode) by providing $UI_{SWT}$ to a mode-switching input unit. Alternatively, a user may manually select a desired mode by moving a cursor in a non-touch-type display unit, or by moving a body part with respect to a display unit such as a prior art touchscreen.

Accordingly, a user may run various operations in either screen by switching from one to the other, just like a user hops from one window to another of a computer with a mouse. This arrangement may provide a user with enhanced security and improved integrity of a main system of a terminal, by entirely or partially isolating a lock (or intermediate) system of a terminal from a main system, thereby preventing any results residing in a lock (or intermediate) system from contaminating or deteriorating a main system. However, this arrangement may not be able to preserve privacy of data in a main system, for a lucky unauthorized user who sneaks into a lock (or restricted) mode may see whatever is displayed on another screen operating in an unlock (or unrestricted) mode.

Accordingly, a terminal may run an erase (or semi-erase) operation in various timings. In one case, a terminal runs such erasure or semi-erasure whenever a user switches from a $1^{st}$ screen (operating in a $1^{st}$ mode granted with less access authority) to a $2^{nd}$ screen (operating in a $2^{nd}$ mode with more access authority) but not vice versa. In the alternative, a terminal may run the erasure (or semi-erasure) whenever a user may switch modes, regardless of those access authorities granted to a current mode or a new mode. In addition, a terminal may run such erasure or semi-erasure, only when a user terminates to operate in a lock (or intermediate) mode and closes the screen (or window) designated thereto. Alternatively, a terminal may request a user to confirm such erasure or semi-erasure, or may ask a user to confirm such erasure or semi-erasure. Synchronization of such erasure (or semi-erasure) with other operations is feasible, as far as such arrangements may be easy to implement into a terminal or as far as a user may easily run such an erasure or semi-erasure therein.

It is appreciated that a terminal with multiple screens may employ user authenticating when a user may switch from one screen to another. More particularly, when a terminal switches from a lock (or intermediate) mode to an unlock mode, a terminal may run an authentication operation to confirm whether a current user has access authority to advance to the unlock mode.

A terminal may also allow a user to temporarily minimize at least one screen on a display unit while operating a terminal, where such a screen [1] may be designated to a lock (or intermediate) mode, or [2] may be selected by a user to run various lock (or intermediate) operations in a lock (or intermediate) mode. In this arrangement, a terminal may run such erasure or semi-erasure in one of various erasure timings.

A user may minimize one of multiple screens to run various lock (or intermediate) operation for various reasons. In one example, when a user minimizes a screen in a lock (or intermediate) mode with an intention to resume operation again in a lock (or intermediate) mode, a terminal may not run such erasure (or semi-erasure). When a user attempts to maximize the screen, a terminal may require an additional user authentication. Alternatively, a terminal may require a user to store to-be-stored results before such minimization, particularly when the user intends to use such to-be-stored results in the following session.

It is appreciated that the above arrangements for synchronizing the erasure (or semi-erasure) with switching the screens may be applied to a screen which may be designated to an unlock mode. In other words, although a user who operates a terminal in an unlock mode has already been authenticated as an authorized user, the synchronization between the screens and such erasure (or semi-erasure) may also provide a user with further enhanced security and improved integrity of a main system of a terminal, along with even heightened privacy of data stored in a main system.

1-19. Authentication Operation

As used herein, to "run at least one authentication operation" or simply to "run an authentication operation" is synonymous with "user authenticating" or "authenticating" hereinafter. As also used herein, an "authentication operation" refers to an operation with which a terminal checks or determines [1] whether or not a current user is an authorized user, [2] whether or not a current user may have access authority to drive a certain hardware or software element of a main system of a terminal, [3] whether or not a current user may run a certain operation, [4] whether or not a current user may use certain options while driving a certain hardware or software element, or the like. To this end, a terminal compares acquired $UI_{THEN}$ of a current user with authentication information which is already stored in the terminal (i.e., a pre-stored $UI_{THEN}$).

To "run an authentication operation" may typically include therein at least one of multiple steps such as, e.g., [1] at least one step of getting an authentication input unit and its authentication sensor ready, [2] at least one step of receiving a user input using the input unit, [3] at least one step of acquiring $UI_{THEN}$ from the user input using the authentication sensor, [4] at least one step of "comparing" acquired $UI_{THEN}$ with pre-stored $UI_{THEN}$ or other authentication information [5] at least one step of "determining" whether a user passes (i.e., a "pass") or fails (i.e., a "fail") the user authenticating, [6] at least one step of terminating an authentication operation, or the like. When desirable, such "authenticating" may also include at least one step of temporarily or permanently "storing (to-be-stored) results" involved in the above steps [1] to [6] in an available memory unit (or sector). For example, a terminal may store [1] the acquired $UI_{THEN}$, [2] differences between the acquired $UI_{THEN}$ and pre-stored $UI_{THEN}$, or [3] an outcome such as the "pass" or the "fail", where such [1] to [3] may be in the form of texts, files, or folders, and where such [1] to [3] are to be collectively referred to as "results" as defined above.

A terminal may run only a single authentication operation or may instead run multiple different authentication operations either concurrently or sequentially. A terminal may include multiple authentication sensors to run a fingerprint authentication operation, a face authentication operation, a hand (or palm) authentication operation, an iris (or retina) authentication operation, a voice authentication operation, an authentication operation based on a pattern of a blood vessel(s) or other physiological features, or the like.

A terminal may employ different arrangements to run authentication operations such that, e.g., [1] a terminal renders at least one authentication sensor ready when a terminal turns (or starts to turn) on a display unit, or [2] a terminal renders (or starts to render) an authentication sensor ready while a display unit remains turned off. A terminal may render an authentication sensor ready upon (or in response to) acquiring $UI_{THEN}$ or other sub-inputs. Alternatively, a terminal may render an authentication sensor ready only after acquiring $UI_{THEN}$. A terminal may then use $UI_{THEN}$ for the user authenticating or may extract other information for authenticating from the user input.

Regardless of differences in detailed arrangements, however, an "authentication operation" is deemed to be on hold (or to have been on hold) [1] until a terminal receives a user input, [2] until a terminal acquires $UI_{THEN}$, [3] until a terminal acquires other (user) sub-inputs, or [4] as far as a display unit remains turned off. That is, at least one unexecuted (or remaining) step of an authentication operation may not be executed [1] until a terminal receives a user input or acquires $UI_{THEN}$ (or other sub-inputs), or [2] while a display unit remains turned off. Therefore, until a terminal acquires $UI_{THEN}$ (or other sub-inputs) or while a display unit remains turned off, an authentication operation may be deemed to be on hold.

Once acquiring $UI_{THEN}$, a terminal executes (or starts to execute) at least one unexecuted (or remaining) step of an authentication operation so that a terminal may run at least one authentication operation which has been on hold. As a result, execution of such steps may lead to performing at least one specific function assigned to the authentication operation.

Various biometric or non-biometric information may be used as $UI_{THEN}$. Examples of such biometric information which may be used as $UI_{THEN}$ may include an image of a body part (e.g., a fingerprint, a hand, a palm, a wrist, an iris, a retina, an eye, an ear, a nose, a face, other body parts, blood vessels, or their distribution pattern) which may be captured by various image acquisition units of a terminal such as, e.g., a camera or a scanner. Further examples of such biometric information may include electric or magnetic features related to the body part, where a pattern of electrical conductance of a body part is one example, and where further details thereof have been described above.

Other examples of the biometric information may include, e.g., a sound (including a voice of a user or that of a non-user), various physiological features of a user (or a non-user) such as, e.g., cardiovascular features (an average blood pressure, a blood pressure measured at a certain location, or a heart rate), respiratory features (a breathing rate, or a breathing sound), gastrointestinal features (a movement of stomach or intestines, or the like), other physiological features of a user, or a user's other physiological conditions. A terminal may also incorporate various conventional sensors to monitor the above biometric information such as, e.g., a pressure sensor, a thermometer, or a flow rate sensor.

Other examples of biometric information may also include user's dynamic biometric information such as, e.g., a displacement (or a movement of) a body part, a velocity thereof, its acceleration, its position in a 2-D plane or a 3-D space, a gesture, or the like. In addition, other conventional non-biometric information may be used for authenticating a current user, where examples of such non-biometric information may include, but not limited to, a password, a pass code, a pass gesture, a movement pattern, or the like.

1-20. Activation Operation

As used herein, an "activation operation" means an operation to switch (or to start to switch) a terminal from an off-state (i.e., a state in which a terminal is communicable and not completely powered off, but in which its display unit is or has been turned off) to an on-state (i.e., another state in which a terminal is communicable and not completely powered off, and in which its display unit is turned on). Therefore, an "activation operation" also means an operation to switch (or to start to switch) a display unit from an off-state to an on-state, and is synonymous with [1] an "operation of turning on a display unit" while (or when) a display unit is (or has been) turned off, or [2] an "operation of switching a display unit from an off state to an on state."

By the same token and as used herein, to "run an activation operation" is synonymous with to "run an operation of turning on a display unit" while (or when) a display unit is (or has been) turned off. Thus, to run an activation operation is synonymous with "turning on a display unit" or simply "turning on."

An "activation operation" or "turning on a display unit" may include one or more of multiple steps such as, e.g., [1] at least one step of acquiring an activation (user) sub-input ($UI_{ACT}$) or other (user) sub-inputs when desirable, [2] closing an electrical switch of a display unit or otherwise rendering the display unit ready to be turned on, [3] supplying an electric current to a display unit, [4] selecting a default screen to be displayed on a display unit when a display unit is turned on from an off-state, [5] displaying a new screen on a display unit or replacing or overlaying a current screen with a new screen when a terminal may switch modes, or the like. A terminal may also employ different arrangements for such "turning on" such as, e.g., [1] a terminal may render a screen ready while a display unit is turned off such that a display unit displays a pre-selected screen concurrently with being turned on, [2] a terminal may select a certain screen to be displayed on a display unit only after acquiring $UI_{ACT}$, [3] a terminal may receive a screen to be displayed from an external device or an external source (such as, e.g., a website or a cloud), [4] a terminal may change a pre-selected screen randomly or in a certain order, or the like.

Regardless of such differences in detailed arrangements, however, an "activation operation" is deemed to be on hold (or to have been on hold) while (or as far as) a display unit remains (or is) turned off. That is, one or multiple unexecuted (or remaining) steps of an "activation operation" have not been executed while (or as long as) a display unit is or remains turned off. Therefore, while a display unit is in its off state (i.e., remains turned off), an "activation operation" and a "turning on" is deemed to be on hold.

A terminal may synchronize "timings" between such turning on and other operations to be run by the terminal. Such timings related to turning on a display unit are referred to as "turning-on timings" hereinafter. Examples of such turning-on timings may include running an activation operation [1] "concurrently with" receiving a user input including $UI_{ACT}$ therein; [2] "concurrently with" receiving another user input which does not include $UI_{ACT}$ therein; [3] "immediately after" receiving the user input of [1] or [2], where the "immediately" is defined above, [4] after receiving the user input of [1] or [2] but "before" a user provides another user input, [5] concurrently with running an authentication operation (e.g., upon determining whether a user passes such authenticating), [6] immediately after running an authentication operation, or the like.

1-21. Types of Switching Modes

When a user desires to switch from a current mode (or an off-state) to a new mode, a terminal may enable a user to do so in different ways. That is, a terminal may mandate a user to switch to a certain new mode one after another only along various modes defined in a hierarchy in which a terminal operates. To the contrary, a terminal may allow a user to switch to any mode defined a hierarchy by jumping around such modes depending upon $UI_{SWT}$.

As used herein, a "series switching" means an arrangement in which a terminal switches from a current mode to a new mode which corresponds to a mode neighboring the current mode in a hierarchy. In this arrangement, a terminal switches modes whenever it receives a user input or whenever it acquires $UI_{SWT}$. The hierarchy in the panel (B) of FIG. 2 is an example hierarchy of the series switching, where a terminal switches modes from $MD_{LK}$ to $MD_{IN1}$, to $MD_{IN2}$, to $MD_{IN3}$, then to $MD_{UL}$ as a user supplies multiple $UI_{SWT}$'s one at a time successively, and where the terminal stays in $MD_{UL}$ because the hierarchy is non-circulating. In addition, the hierarchy in the panel (F) of FIG. 2 is another example hierarchy of the series switching, where a terminal may switch modes from $MD_{LK}$ to $MD_{IN}$, and then to $MD_{UL}$ as a user supplies multiple $UI_{SWT}$'s one at a time successively, and where the terminal switches from $MD_{UL}$ to $MD_{LK}$ because the hierarchy is circulating.

Accordingly, as far as the mode switching is concerned, all the user has to do is to provide $UI_{SWT}$ one at a time, and then a terminal switches modes in a forward direction (or in a backward direction when a hierarchy may be circulating). As a result, when a user wants to switch three clicks in a forward direction, the user provides three $UI_{SWT}$'s, one at a time. In this respect, a user operating a terminal according to this arrangement may only need to be concerned about in which direction a user wants to switch modes and how many $UI_{SWT}$'s he or she has to provide to a terminal. It then follows that a terminal which operates in the series switching may not have to consult the matching list to select which mode to switch to, for the terminal has only to switch to a neighboring mode. It also follows that a user operating such a terminal may be able to provide multiple identical $UI_{SWT}$, for the terminal is to switch to a neighboring mode of a hierarchy whichever $UI_{SWT}$'s he may provide to a terminal.

It is appreciated that, when a terminal may switch modes in this series switching and when a hierarchy is non-circulating, a terminal may allow a user to switch modes only in the forward direction. In this case, a user who arrives at an unlock mode may not be able to switch modes anymore. When such a user wants to switch back to a lock mode, he or she may turn off a display unit (thereby switching to an off-state), and may then turn on a display unit (thereby switching to a lock mode). However, when a hierarchy is circulating, a terminal may allow a user to follow the hierarchy along a direction of the mode switching. In such series switching, a terminal may allow a user to select whether a user wants to switch modes [1] only in a forward direction, [2] only in a backward direction, or [3] in both directions.

Conversely and as used herein, a "selective switching" refers to an arrangement where a terminal may switch to a new mode which may not necessarily be a neighboring mode of a current mode in a hierarchy, either in a forward direction or in a backward direction. In this selective switching, a terminal switches modes not only upon acquiring $UI_{SWT}$ but also depending on which $UI_{SWT}$ a user provides. In the panel (B) of FIG. 2, for example, a terminal may match each of six different modes with each of six different $UI_{SWT}$'s, and may keep each of six matching in a matching list. When a user supplies one of six $UI_{SWT}$'s such as, e.g., $UI_{SWT}3$, a terminal consults the matching list and selects one of six modes such as, e.g., $MD_{IN2}$ which matches $UI_{SWT}3$. Then a terminal may switch to $MD_{IN2}$, regardless of how many clicks a new mode is spaced from a current mode. More particularly, when a hierarchy is circulating, a terminal may switch from almost any current mode to almost any new mode, regardless of [1] how many clicks a new mode is spaced from a current mode, [2] whether a new mode may be positioned in an upstream or downstream of a current mode, or the like. Accordingly, as far as the mode switching is concerned, all the user has to do is to provide a single $UI_{SWT}$ which matches a certain mode of the matching list to which a user wants to switch.

Alternatively and as used herein, an "adaptive switching" refers to an arrangement where a terminal may switch to a new mode adaptively, thereby switching modes based on certain pre-selected criteria examples of which may include, but not limited to, an operation run by a user in a current (or past) mode, outcomes from running the operation, a certain event occurred in a current mode, use statistics of a terminal, user statistics in a lock (or intermediate) or unlock mode, or the like.

To this end, a terminal may monitor certain pre-selected criteria such as, e.g., by monitoring [1] which hardware or software elements a user may drive in a current mode, [2] which web-sites or external links a user may access in a current mode, [3] what kind of data a user downloads from the websites or links in a current mode, [4] which kind of data a user processes in a current mode, [5] which contents are included in such data or which contents are linked in such data, [6] how long a user remains in a current mode, [7] whether a user has an upcoming schedule which requires to run a certain operation in this mode, or the like. Based upon such criteria, a terminal may decide whether or not to switch from a current mode to a new mode or which new mode it should switch to. To this end, a terminal may utilize prior art algorithms which are commonly used in the fields of big data, AI (artificial intelligence), or the like.

Alternatively, a terminal may adopt the similar adaptive switching based on other criteria which relates rather to the past activities or past user statistics than the current ones. Examples of such past criteria may include [1] which hardware or software elements a user has driven (most or least) in the past modes, [2] which web-sites or external links a user has accessed (most or least) in the past modes, [3] which external web-sites or links a user had spent the longest period in the past modes, [4] what kind of data a user has downloaded during the past sessions, past weeks, or past months, [5] what kind or what type of data a user has obtained most (or least) often) in the past modes, [6] which contents were included in such results, or the like. To this end, a terminal may similarly use those prior art algorithms of bog data or AI fields.

It is appreciated that such adaptive switching is subject to whether a hierarchy is circulating or non-circulating. In other words, when a hierarchy is non-circulating, a terminal may not switch to another mode once it switches into an unlock mode, regardless of whichever new mode an AI algorithm may recommend. Alternatively, such a terminal may switch to almost any mode defined in a hierarchy when a hierarchy is circulating.

In another example, a terminal may switch from a current mode to a new mode upon sensing other criteria examples of which may include [1] an occurrence or a termination of a certain event, [2] running or finishing (or starting to run or finishing to run) a certain operation, [3] executing or ending (or starting or finishing to execute) a certain (software) application, [4] acquiring data from such operations or applications, or the like. Accordingly, a terminal may switch modes based upon the above criteria, without having to wait to receive a user input or to acquire $UI_{SWT}$, where such criteria may be pre-selected by a manufacturer, a terminal, a user, or the like.

As used herein, a terminal is to switch from a current mode to a new mode in various "mode-switching timings" in response to events associated with the turning-on timings, erasure timings, launch timings, or storing timings. More particularly, the mode-switching timings refer to various "timings" between the mode switching and other operations run by a terminal, and examples may include "switching modes" [1] "concurrently with" receiving a user input which includes $UI_{SWT}$ therein, [2] "concurrently with" receiving a user input which does not include $UI_{SWT}$ therein, [3] "immediately after" receiving the user input of [1] or [2], where the "immediately" is defined above, [4] after receiving the user input of [1] or [2], but "before" a user provides an additional user input, [5] "concurrently with" finishing to run user authenticating, [6] "immediately after" running an user authenticating, [7] "concurrently with" running an erase (or semi-erase) operation, [8] "concurrently with" or "immediately after" receiving a user input related to running such erasure (or semi-erasure), [9] immediately before, concurrently with, or immediately after turning on (or turning off) a display unit, [10] immediately before, concurrently with, or immediately after powering off (or on) a terminal, [11] concurrently with or immediately after launching a main, intermediate, or lock system, [12] concurrently with storing results obtained by running operations in a lock (or intermediate) mode, [13] immediately after storing such results, or the like.

2. Objectives

Objectives to be achieved by various data processing terminals of this disclosure are summarized below. It is appreciated that following objectives are exemplary only and, therefore, not intended to confine any application or scope of such terminals. It is also appreciated that various features of the data processing terminals, their units, and their hardware or software elements in this Section 2 are focused upon protecting a main system of a terminal from those results obtained by running lock operations by a lock system in a lock mode. It is to be understood [1] that a main system of a terminal may also be protected from various results obtained by running intermediate operations by an intermediate system in an intermediate mode, [2] that an intermediate system of a terminal may also be protected from various results obtained by running lock operations by a lock system in a lock mode, or the like.

2-1. Running a Lock Operation with a Lock System in a Lock Mode

A first objective and one exemplary aspect of a data processing terminal and related methods of this disclosure are to restrict a user from driving all (or some) accessible hardware or software elements of a main system of a terminal when a user operates a terminal in a lock mode of operation. Accordingly, a user who is operating a terminal in a lock mode may then be prevented [1] from driving at least one hardware or software element of a main system, [2] from driving that hardware or software element with full options even after successful accessing and driving, or the like.

To this end, at least a portion of a main system of a terminal may be physically or operationally isolated from a lock system of a terminal. In addition, a terminal may prevent a user who operates a terminal in a lock mode from driving all (or at least some) hardware or software element of a main system of the terminal. Due to such isolation or such prevention, those "results" obtained from running an operation with a lock system in a lock mode may not be able to adversely affect a main system of the same terminal.

For simplicity of illustration, to "run at least one operation with a lock system (and, therefore, in a lock mode)" is referred to as to [1] "run at least one lock operation," [2] to "run a lock operation," [3] to "run lock operations," or the like. To "run at least one operation with an intermediate system (and, therefore, in an intermediate mode)" is abbreviated as to [1] "run at least one intermediate operation," [2] to "run an intermediate operation," or [3] to "run intermediate operations" hereinafter.

In one exemplary embodiment of this first objective, a terminal may allow a user to switch from a current mode to a new mode [1] directly based on $UI_{SWT}$, [2] indirectly according to a user input such as, e.g., based upon an outcome obtained from running an authentication operation which in turn uses $UI_{THEN}$, [3] based upon a setting of a terminal selected by a user or a terminal, or the like.

In another exemplary embodiment of this first objective, a user may run an operation with a lock system in a lock mode (i.e., run a lock operation), while not driving all (or some) hardware or software elements of a main system of the terminal. More particularly, a terminal may prevent a user from storing unauthorized or unreliable results into a main memory unit of a main system [1] while a user runs a lock operation in a lock mode, [2] as far as a user operates a terminal in a lock mode, [3] before a terminal switches to a new mode granted with greater access authority, or the like. A terminal may also prevent a user from accessing or retrieving data from a main memory unit of a main system, or may also prevent a user from altering any unit of a main system [1] while a user runs a lock operation in a lock mode, [2] as far as a user operates a terminal in a lock mode, [3] before a terminal switches to a new mode granted with greater access authority, or the like.

As described above, a lock system may be physically or operationally isolated from a main system of a terminal. Therefore, a terminal may enhance the security of its main system, e.g., [1] by preventing any unauthorized alteration of a main system while a user runs lock operations by a lock system in a lock mode, [2] by preventing such alteration of the above [1] even after a terminal switches to an unlock mode, unless a terminal runs such erasure (or semi-erasure), or [3] by preventing hacking of a main system.

As a result, a terminal may improve the integrity of a main system [1] by preventing modification or alteration of a main system while or after a user runs lock operations, [2] by preventing the modification or alteration of even after a terminal switches to an unlock mode, unless a terminal runs such erasure (or semi-erasure), or the like. A terminal may also preserve the privacy, e.g., [1] by protecting personal data stored in a main memory unit of a main system from unauthorized accesses by unauthorized users in a lock mode, [2] by preventing unauthorized data retrieval from a main system while (or after) a user runs a lock mode, or the like. In addition, because any results obtained by running such lock operations may neither drive nor modify a main system in a lock mode, a user may run any lock operation, [1] without being concerned about degrading the security, integrity, security or integrity of a main system, or [2] without worrying about any contamination of a main system. Due to the foregoing reasons, a user may also comfortably access any unknown or unreliable website, may download any contents therefrom, or may permanently or temporarily store such results in a lock memory unit of a lock system, or the like.

A terminal may include a single or multiple lock system to run lock operations in a lock mode. When a terminal includes multiple lock systems, the terminal may grant the same or different access authorities to at least two (or all) of such systems. All or at least two of the lock systems may be physically or operationally isolated from at least a portion of a main system such that [1] a lock system may not adversely affect (i.e., modify or alter) a main system, or [2] any results obtained by running lock operations may not adversely affect a main system. As far as the security, integrity, or privacy of a main system is not adversely affected, the terminal may allow a user to access data stored in a main system, but may prevent a user from altering, modifying or otherwise changing any unit or element of a main system.

Due to such advantages, multiple users may share a single terminal in various ways. For example, those users may operate a terminal in a common lock, intermediate, or unlock mode. A terminal may instead provide each user with at least one of his or her own lock, intermediate, or unlock system. More particularly, a terminal may [1] prevent each user from driving a system of another user, [2] prevent each user from switching to a certain mode of another user, or [3] prevent any result obtained by running lock operations by a $1^{st}$ user from adversely affecting any system of another user. Accordingly, the terminal may maintain the security, integrity, or privacy of [1] a main system of each user or [2] a common main system of a terminal.

2-2. Erasing Results Obtained by Running Lock Operations in a Lock Mode

A second objective and another exemplary aspect of a data processing terminal and related methods of this disclosure are to enable a user to erase all or some results which are obtained by running lock operations with a lock system in a lock mode.

In one exemplary embodiment of this second objective, a terminal may "run an erase operation" to erase all (or some) results obtained by running a lock operation with a lock system in a lock mode. A terminal may rather "run a semi-erase operation" to erase not all but only selected results obtained by running a lock operation. Further details of running such erasure (or semi-erasure) have been provided in Section 1-6 and, therefore, are omitted herein.

In another exemplary embodiment of this second objective, a terminal may "synchronize" the erasure (or semi-erasure) with various "timings," particularly when (or after) a user switches from a current mode of operation to a new mode. For example, a terminal may run such erasure (or semi-erasure) when it switches from a mode granted with less access authority to a mode granted with greater access authority (or vice versa). Alternatively, a terminal may run such erasure (or semi-erasure) whenever a terminal may switch modes. A terminal may run the erasure (or semi-erasure) when a terminal switches from an "off-state" of a terminal to an "on-state" (or vice versa). These arrangements may ensure that the results obtained by running operations in a $1^{st}$ mode may not be automatically transferred to a $2^{nd}$ mode and that such results may not adversely affect a hardware or software element of a main system of a terminal.

More particularly, a terminal may synchronize the "timings" between the erasure (or semi-erasure) and various operations run by a terminal. Such timings related to running the erasure (or semi-erasure) and mode switching are referred to as "erasure timings.". Examples of such erasure timings may include running such an erase (or semi-erase) operation [1] "concurrently with" the mode switching (e.g., at least one step of an erase or semi-erase operation overlaps with at least one step of a mode-switching operation in a common clock cycle), [2] "immediately after" the mode switching, where the definition of "immediately" is provided above, [3] after such mode switching but "before" a user provides another user input.

The "erasure timings" may also include other timings related to various operations which are run by a main or lock system of a terminal. For example, the erasure timings may also include running an erase (or semi-erase) operation [1] concurrently with running an authentication operation (e.g., upon determining whether a current user passes or fails the user authenticating), [2] immediately after running an authentication operation, [3] immediately before, concurrently with, or immediately after turning on (or turning off) a display unit of a terminal, [4] immediately before, concurrently with, or immediately after powering off (or on) a terminal, [5] concurrently with or immediately after receiving a user input related to running such erasure (or semi-erasure), or the like.

Accordingly, a terminal may provide a user with seamless features as well as consequent user convenience. As a result, a user may ensure that any results permanently or temporarily stored or residing in a lock system (e.g., a lock memory unit or sector) may not adversely affect any unit or element of a main system of a terminal. In addition, a user may conveniently erase a trace of operations which he or she has run using a lock system in a lock mode.

A terminal may run such erasure (or semi-erasure) in various ways when viewed in the level of clock cycles. For example, a terminal may [1] run a "real-time erasure (or semi-erasure)," where a terminal runs such erasure (or semi-erasure) as a user runs one lock operation after another operation, thereby erasing (or semi-erasing) data after data, file after file, folder after folder as soon as such data, file, or folder may be created, [2] run an "interim erasure (or semi-erasure)," where a terminal ruins such erasure (or semi-erasure) [2-1] at every preset intervals, [2-2] at every intervals selected by a user, or [2-3] at every instances when such results obtained by running such lock operations exceed a certain size, or [3] run an "ex post erasure (or semi-erasure)" in which a terminal runs such erasure (or semi-erasure) once a user finishes running lock operations in a lock mode.

In another exemplary embodiment of this second objective, a terminal may run an erasure (or semi-erasure) to erase all (or some) results obtained by running operations in various modes. In a $1^{st}$ example, a lock system may run such erasure (or semi-erasure) in a lock mode. That is, a lock system may start to run such erasure (or semi-erasure) in a lock mode, where the erasure (or semi-erasure) may be completed either before or after switching to a new mode such as an intermediate mode or an unlock mode. In a $2^{nd}$ example, an intermediate system may run such erasure (or semi-erasure) in an intermediate mode. That is, an intermediate system may start to run such erasure (or semi-erasure) in an intermediate mode, where such erasure (or semi-erasure) may also be completed either before or after a terminal may switch to a new mode such as an unlock mode. In a $3^{rd}$ example, an unlock system may run such erasure (or semi-erasure) in an unlock mode. In other words, an unlock system may start to run such erasure (or semi-erasure) in the unlock mode, where such erasure (or semi-erasure) after switching to a new mode such as an intermediate mode or a lock mode.

In the $1^{st}$ and $2^{nd}$ examples of this embodiment of the preceding paragraph, a terminal may run such erasure (or semi-erasure) when the terminal switches modes from one mode granted with less access authority to another mode with greater access authority. Therefore, these arrangements may ensure the enhanced security and improved integrity of a main system of a terminal, while also strengthening the protection of valuable data stored in a main system.

To the contrary, in the $3^{rd}$ example of this embodiment, a terminal runs such erasure (or semi-erasure) even when a terminal switches from a current mode granted with greater access authority to a new mode with less access authority. It is, however, appreciated that a terminal running such a mode-switching operation may be in a low risk even without running any erasure (or semi-erasure), for potential threats to a main system which operate in an unlock more may be deemed minimal at best.

However, when a user runs such erasure (or semi-erasure) in such mode switching of the $3^{rd}$ example, a user can effectively remove all results which have been obtained by running various unlock operations in the unlock mode. As a result, a user may effectively prevent a $3^{rd}$ person from finding out any trace at all, regarding [1] which unlock operations a user has run in the past, [2] which websites a user has visited in the past, [3] which contents a user has downloaded from external sources, [4] what kind of communication a user has exchanged in the past, or the like. In this context, whenever a user is concerned about privacy of his or her data stored or residing either in a lock system or an unlock system, a terminal may then be configured to run such erasure (or semi-erasure) whenever a terminal switches modes.

2-3. Saving Results Obtained by Running Lock Operations in a Lock Mode

A third objective and another exemplary aspect of a data processing terminal and related methods thereof are to provide a terminal with which a user may store some but not all results which are obtained from running lock operation with a lock system in a lock mode, while ensuring such results which are stored [1] may not adversely affect a main system or [2] may not interfere with running unlock operations in an unlock mode by a main system.

In one exemplary embodiment of this third objective, a lock system may include a lock memory unit. In addition, a lock system may temporarily or permanently store at least a portion of such results obtained by running lock operations with the lock system in a lock mode in the lock memory unit. More particularly, a lock memory unit may be physically or operationally isolated from a main memory (or another) unit of a main system. As a result, a terminal can protect a main memory (or another) unit of a main system from any potential contamination or spoiling caused by such results stored in the lock memory unit. In other words, by physically or operationally isolating a lock memory unit from a main system, a terminal may enable a user to fully utilize the lock system as well as the main system, while minimizing contamination or destruction of a main system by such results.

In another exemplary embodiment of this third objective, a lock system may not include any lock memory unit, but a terminal may allow a lock system to recruit at least a portion of a main memory unit of a main system and to temporarily (or permanently) store at least a portion of results obtained by running lock operations with a lock system in a lock mode. In this case, a terminal may also physically or operationally isolate the portion of a main memory unit recruited by the lock system from other portions of the main memory unit in such a way that a terminal may prevent such other portions of the main memory unit from being contaminated by results stored or residing in the recruited portion of the main memory unit. In this context, that portion of a main memory unit recruited by a lock system may be viewed as a unit of the lock system, not a unit of the main system.

In each of the above embodiments of this Section, a terminal may run an erase (or semi-erase) operation in the recruited portion of the main memory unit in one of such erasure timings, thereby erasing all (or some) of such results stored or residing in the recruited portion of the main memory unit. Accordingly, the terminal may ensure that any viruses or malicious programs included in such results may be eventually erased and may not contaminate the main system of the terminal.

In either embodiment, a terminal may also allow a user to store at least some of such results stored or residing in a lock system, and to access such results while a user operates an unlock system in an unlock mode. In this case, a terminal may ensure that those results may not alter any units of the main system, or that those results may not be stored in the main system. The terminal may further allow the user to retrieve such results and then to store such results in a main memory unit of a main system as well. In this case, it is desired to confirm whether the to-be-stored results may not contain any malicious virus therein.

2-4. Implementing Lock and Main Systems into a Terminal

A fourth objective and another exemplary aspect of a data processing terminal and its related methods are to provide a data processing terminal capable of running various operations in various hardware or software configurations, thereby fulfilling various objectives described throughout this disclosure. To this end, a terminal may include at least one main system and at least one lock system, where the lock system may be physically or operationally isolated from at least a portion of the main system. When a terminal may include at least one intermediate system, a lock system may also be physically or operationally isolated from at least a portion of an intermediate (or main) system. It is appreciated that features related to a lock system which operates in a lock mode in the following embodiments of this Section may similarly apply to an intermediate system operating in an intermediate mode.

In a $1^{st}$ exemplary embodiment of this fourth objective, an exemplary data processing terminal may include at least one main system and at least one lock system, where a main system may include at least one main CPU unit, at least one main memory unit, at least one main input unit, and at least one main output unit, along with other optional main units as commonly found in other prior art data processing devices. A lock system may similarly include at least one lock (application) viewer (e.g., any prior art file viewer), at least one optional lock memory unit, at least one optional lock CPU unit, and an optional lock hardware or software element such as, e.g., a lock display unit or a lock software applications. It is appreciated in this embodiment that each element of a lock system is "operationally isolated" from all elements of a main system in such a wat that a terminal does not allow a lock system to drive any element of a main system. It is also appreciated in this embodiment that each element of a lock system is "physically isolated" from all elements of a main system in such a way that a terminal disposes each element of a lock system not physically adjacent to all elements of a main system.

For example, a data processing terminal may include at least one main system and at least one lock system in various configurations. In one case, a lock system may be implemented independently of a main system, i.e., "completely isolated" from all units or all elements of a main system, either physically or operationally. As a result, when a lock system includes a lock hardware or software element, that lock element may be physically or operationally isolated from all units or all elements of a main system completely, whereby the terminal may [1] completely prevent any results which may be stored or residing in a lock system from adversely affecting any unit or any element of a main system, or [2] completely prevent any lock unit or lock element from adversely affecting any unit or any element of a main system.

In another case, a lock system may only be "partly isolated" from all units or elements of a main system, either physically or operationally. Accordingly, when a lock system includes a lock hardware or software element, [1] that lock element may be physically or operationally isolated from at least one unit (or element) of a main system but not all units (or elements) of a main system, or [2] that element may not be isolated from all units (or elements) of a main system but may be only partly isolated from at least one unit (or element) of a main system. Accordingly, a terminal may prevent any results stored or residing in the isolated unit of a lock system from adversely affecting any unit of a main system.

In a $2^{nd}$ exemplary embodiment of this fourth objective, an exemplary data processing terminal may include at least one main system and at least one lock system, each of which is similar to that of the $1^{st}$ embodiment of this fourth objective. In addition, each lock element of a lock system is "physically isolated" (i.e., positioned in different locations) from all elements of a main system. However, a lock system is not completely operationally isolated from a main system such that [1] a terminal may allow a lock system to drive at least one element of a main system and that [2] a lock system may recruit at least one but not all elements of a main system in a lock mode. In this context, this lock system is referred to as "operationally partly interacting" with at least one (but not all) element of a main system. To the contrary, when a lock system may recruit all elements of a main system in a lock mode, this lock system is to be referred to as "operationally completely interacting" with a main system.

In this embodiment, a lock system is physically isolated from a main system in such a way that a lock system is disposed in a location which is not adjacent to all elements of a main system. In one case, however, a lock system may recruit at least one but not all portions of a main memory unit, and may temporarily (or permanently) store therein all (or some) results obtained by running lock operations in a lock mode. Thereafter, a lock system may retrieve the stored results from the recruited portion of a main memory unit. In another case, a lock system may recruit at least one but not all portions of a main CPU unit, and run lock operations with the recruited portion of a main CPU unit in a lock mode. In yet another case, a lock system may recruit at least a portion but not all portions of a main display unit and display therein various results obtained by running lock operations in a lock mode.

It is appreciated in such cases that, even though a lock system may recruit some elements of a main system, a terminal may still prevent a lock system [1] from deleting any data which have been already stored in a main memory unit, [2] from changing configurations of any main unit of a main system, or the like. Accordingly, a terminal may enhance the security, improve integrity, and heighten privacy of the main system of a terminal.

In a $3^{rd}$ exemplary embodiment of this fourth objective, an exemplary data processing terminal may include at least one main system and at least one lock system, each of which is similar to that of the $1^{st}$ embodiment of this fourth objective. However, each element or unit of a lock system is "completely operationally isolated" from (i.e., not interacting with) each element or unit of a main system. Therefore, such a lock system may not be able to recruit any element of a main system, as far as a user operates a terminal in a lock mode.

However, at least one element of a lock system [1] may be disposed adjacent to at least one element of a main system either laterally or vertically, or [2] may form a unitary article with at least one element of a main system. Accordingly, although a lock system is (completely or partly) operationally isolated from a main system, such a lock system is referred to as "physically interacting" with at least one (but not all) element of a main system.

In this embodiment, a lock system is operationally isolated from a main system in such a way that a lock system does not recruit any element of a main system at all. In one case, however, a lock memory unit of a lock system may be disposed next to a main memory unit of a main system. A lock memory unit and a main memory unit may also form a unitary article. However, a lock system may not drive any portion of a main memory unit, and a main system may not drive any element of a lock memory unit. In another case, a lock CPU unit of a lock system may be disposed next to a main CPU unit of a main system. A lock CPU unit may even form a unitary article with a main CPU unit. However, a lock system may not drive any portion of a main CPU unit, while a main system may not drive any element of a lock CPU unit.

In a $4^{th}$ exemplary embodiment of this fourth objective, an exemplary data processing terminal may include at least one main system and at least one lock system, each of which is similar to that of the $1^{st}$ embodiment. However, a main system is "operationally interacting" with at least one element of a lock system in such a way that a main system may drive the interacting portion of a lock system while a user operates a terminal in an unlock mode, [1] whether or not a lock system is "operationally interacting" with at least one element of a main system and, therefore, whether or not a lock system may drive the interacting portion of a main system in a lock mode, or [2] whether or not a lock system is "operationally isolated" with all portions of a main system and, therefore, whether or not a lock system may drive any portion of a main system in a lock mode. In this case, a main system may be "physically isolated" from a main system or "physically interacting" with at least one portion of the main system.

As described above, a terminal may grant different access authorities to the lock and main systems in the lock and unlock modes. Therefore and in a $5^{th}$ exemplary embodiment of this fourth objective, a terminal may entirely restrict a lock system from driving any hardware or software element of a main system in a lock mode. Alternatively, a terminal may grant a lock system to drive only a certain hardware or software element of a main system in a lock (or intermediate) mode.

Accordingly, by manipulating a degree of physical and/or operational isolation between a main system and a lock system, a user may easily run a lock operation [1] with a lock system only in a lock mode, [2] with a lock system in both lock and unlock modes, [3] with a main system in an unlock mode along with [1] or [2], or the like. It is appreciated, however, that a terminal may prevent or at least minimize an accident that a lock system may adversely affect a main system or that the lock and main systems may get mixed up in running operations in the lock and unlock modes such that some results obtained by running lock (or unlock) operations in a lock (or unlock) mode may adversely degrade the security, integrity, or privacy of a main (or lock) system.

The existence of a lock system may generally require a terminal to incorporate at least one extra hardware or software element of the lock system, and to define an extra space to fit the extra element inside the terminal. However, costs and efforts associated with the extra element and extra space may well be surpassed by, e.g., improved versatility in seamless operations, enhanced security or integrity, a minimized risk of hacking by an unauthorized person, or improved privacy of personal data stored in a terminal. Alternatively, by configuring a main CPU unit or a main O/S to serve as a lock system as well as a main system while providing physical or operational isolation between such systems, a terminal may provide a user with the above advantages, while obviating the need for an extra hardware or software element.

2-5. Implementing a Single System Operating in both Lock and Unlock Modes

A fifth objective and another exemplary aspect of a data processing terminal and related methods thereof are to provide a terminal incorporating a single system which can serve as both a main system and a lock system and, therefore, which can operate in both a lock mode and an unlock mode. In other words, a terminal includes a single system which can operate as a main system in an unlock mode, and as a lock system in a lock mode. Accordingly, this system may be viewed [1] as a single main system operating in an unlock mode, while also serving as a lock system when operating in a lock mode or, conversely, [2] as a single lock system operating in a lock mode, while also serving as a main system when operating in an unlock mode. For simplicity of illustration, following explanations are based upon the above view [1]. It is appreciated, however, that various features of the following embodiments of this Section may also be applicable to a terminal based upon the above view [2] as well. In general, various embodiments of this fifth object may be embodied into the terminals of the $3^{rd}$ Configuration as will be described in greater detail below.

In one exemplary embodiment of this fifth objective, a terminal includes only a single system. In a lock mode, a terminal operates the system as a lock system which may drive certain hardware and software elements of a terminal, but which may be prevented [1] from driving other hardware or software elements of a terminal, [2] from altering such other elements, [3] from erasing data stored in such other elements, [4] from modifying or altering configuration or operational sequence of such other elements, [5] from storing results obtained from running lock operations in a lock mode into such other elements, [6] from updating or rearranging such other elements, or [7] from transmitting data stored in such other elements to a lock system, to another terminal, or to a $3^{rd}$ party. In addition, a terminal may also operate the single system as a main system in an unlock mode, while driving such other elements of a terminal. This single system may also operate in multiple lock or unlock modes, may run such "erasure" or "semi-erasure" when a terminal may switch from a lock mode to another lock or unlock mode (or vice versa when desirable), or when a terminal receives a certain user input.

That is, the above system may be regarded as a pool of multiple hardware and software elements, where a terminal assigns some elements to a lock system, while the terminal assigns the rest of such elements to a main system. To obtain the enhanced security, improved integrity, and better protection of data stored therein, such elements recruited by the system in a lock mode may be completely isolated from such other elements recruited by the system main in an unlock mode, either physically or operationally. Alternatively, such elements recruited by a lock system may be partly isolated from such other elements recruited by a main system.

In another exemplary embodiment of this fifth objective, a terminal similarly includes only a single system. In a lock mode, a terminal operates the system as a lock system which may drive certain hardware and software elements of a terminal, but which may be prevented from driving other remaining elements or from running some operations as exemplified in [1] to [7] of the above embodiment. In addition, a terminal may also operate the single system as a main system in an unlock mode, while driving such other elements of a terminal. The only difference between the terminal of the previous embodiment and that of this embodiment is that the latter terminal may allow at least one hardware or software element to be driven by both of a lock system and a main system.

In this context, the above system may be regarded as a pool of multiple hardware and software elements, where a terminal may [1] assign a $1^{st}$ group of elements to a lock system, [2] assign $2^{nd}$ group of elements to a main system, and then [3] assign a $3^{rd}$ group of elements to both of a lock system and an unlock system. To achieve the enhanced security, improved integrity, and better protection of data stored therein, the $1^{st}$ group of elements may be completely isolated from the $2^{nd}$ group of elements, either physically or operationally. At the same time, a terminal may also allow the $3^{rd}$ group of elements [1] to run the same operations in both of a lock mode and an unlock mode, [2] to run more operations in an unlock mode than in a lock mode, [3] to access and use the same data in both modes, [4] to access more data in an unlock mode than a lock mode, or the like.

Because such terminals of this embodiment may operate as a main system as well as a lock system, it may be typically easier to construct a terminal, e.g., by granting different access authorities to a lock system and an unlock system, by displaying different graphical user interfaces (GUIs) on a lock screen and an unlock screen, or the like. Because the same hardware or software elements can be used by both of a lock system and a main system, a terminal may not need to include multiple identical units in each of the lock and unlock system. As a result, the terminal may be constructed as a more compact article. In addition, by isolating the lock mode from the unlock mode, this terminal may also enhance security, prevent hacking, improve integrity, or preserve privacy thereof. Moreover, this terminal may provide operational flexibility to a user who may set different access authorities to different modes, while incorporating only a single system therein.

2-6. Multiple Modes and Their Access Authorities

A sixth objective and another exemplary aspect of a data processing terminal and related methods thereof are to provide a terminal which operates in at least one lock mode and in at least one unlock mode, along with at least one optional intermediate mode such as, e.g., a semi-lock mode, a less-lock mode, a semi-unlock mode, or a less-unlock mode, and which assigns various access authorities to each of such modes. As defined above, an "access authority" refers to an authority [1] to "access" a certain number (including zero) of accessible hardware or software elements of a main system of a terminal, unless otherwise specified that such elements belong to a lock (or intermediate) system, [2] to "drive" such an element, [3] to "run" a certain operation by driving such an element, and [4] to "perform" a certain function [4-1] by driving such an element or [4-2] by running such an operation. It is appreciated that features related to a lock system operating in a lock mode in the following embodiments of this Section may also apply to other features related to an intermediate system operating in an intermediate mode.

In one exemplary embodiment of this sixth objective, a terminal [1] may grant an unlock mode with the greatest access authority, [2] may grant a lock mode with the least access authority, and [3] may grant an intermediate mode (such as, e.g., a semi-lock mode or a semi-unlock mode) with access authority which exceeds that of a lock mode but falls short of that of an unlock mode. When a hierarchy may define multiple overlapping unlock modes, a terminal may grant [1] each unlock mode with the identical access authority, [2] one unlock mode with the access authority which may be greater than that of another unlock mode, [3] one unlock mode with the access authority which is less than that of another unlock mode, or the like.

Alternatively, when a hierarchy defines multiple non-overlapping unlock modes, a terminal may grant different and non-overlapping access authorities to such unlock modes. Because such access authorities do not overlap each other, it is generally difficult to tell in which unlock mode a terminal may be granted with the greater (or less) access authority. However, in quantitative context, one unlock mode may be regarded to be granted with the access authority to drive more hardware or software elements, to run more operations, or the like. It is appreciated that those features related to multiple unlock modes also apply to a hierarchy which may define multiple lock or intermediate modes.

In another exemplary embodiment of this sixth objective, a terminal may define, in a certain hierarchy, multiple completely non-overlapping modes in such a way that [1] each mode does not overlap with others completely and [2] that a terminal may grant each mode with different access authorities. As exemplified in the panels (D) of FIGS. 1C and 1D, different systems operating in such non-overlapping modes may be more readily isolated from each other.

Such non-overlapping feature may apply to different hardware and software elements such that, e.g., an unlock system can drive a main memory unit in an unlock mode but a lock system may not drive the same unit in a lock mode. Such non-overlapping feature may also apply to different portions of a certain hardware or software element. For example, a terminal may allow both of a lock system and an unlock system to drive, e.g., a main memory unit. However, a terminal may allow the lock system [1] to access and use lock data which have been obtained by running lock operations in a lock mode and which have been stored in the main memory unit but [2] to not access unlock data which have been obtained by running unlock operations in an unlock mode. At the same time, a terminal may allow the main system [1] to access all of such unlock data but [2] to not access any of such lock data at all.

The same arrangement may also apply to a software element of a main system. For example, a terminal may allow both of a lock system and an unlock system to drive a software application which may be designated to perform financial transactions. In this case, a terminal may allow a lock system [1] to run operations for sending limited information to a $3^{rd}$ party, but [2] to not run operations for processing financial transactions. At the same time, a terminal may allow a main system [1] to run operations for retrieving personal data and for authorizing financial transactions but [2] to not sending or receiving data from a $3^{rd}$ party at all.

In another exemplary embodiment of this sixth objective, a terminal may define multiple partly non-overlapping modes in a certain hierarchy in such a way that [1] each mode overlaps with at least a (but not all) portion of another mode and, therefore, [2] that such multiple modes include at least one common access authority with respect to at least one hardware or software element (or its certain portions or options). For example, a $1^{st}$ system in a $1^{st}$ mode may drive at least one $1^{st}$ hardware or software element (or its certain portion or option), whereas a $2^{nd}$ system in a $2^{nd}$ mode may drive at least one of such $1^{st}$ hardware or software element (or its certain portion or option). Of course, the $2^{nd}$ system cannot drive at least one of such $1^{st}$ hardware or software elements (or its certain portions or options).

In another exemplary embodiment of this sixth objective, a terminal may grant different access authorities to a certain hardware or software element of a main system, by directly manipulating various user interfaces each of which is assigned to each hard or software element. A terminal may manipulate such interfaces based upon many factors such as, e.g., [1] in which mode a user is operating a terminal, [2] how much access authority is granted to a current user, [3] whether or not a user passes the user authentication, or the like. To this end, a terminal may readily restrict an access to a hardware or software element of a main system by manipulating the interfaces.

In one example of this exemplary embodiment, a terminal may manipulate a "DUI" (i.e., a "direct manipulation user interface") assigned to a certain hardware or software element, e.g., [1] by completely or partly restricting a normal function of a DMI in a lock mode, but unrestricting its function in an unlock mode, or [2] completely or partly locking a DMI in a lock mode but unlocking the DMI in an unlock mode. Accordingly, a user in a lock mode may not be able to access the element represented by the restricted DUI, thereby not being able to drive a hardware or software element of a main system in a lock mode.

In another example of this exemplary embodiment, a terminal may manipulate a "GUI" (i.e., a "graphical user interface") assigned to a certain hardware or software element in some of the modes. For example, a terminal may not display an "object-oriented GUI" or "application-oriented GUI" on a display unit when a user operates a terminal in a lock mode. As a result, a terminal may effectively prevent a user in a lock mode from driving the hardware or software element of which GUI is not displayed on a lock screen. Once switching to an unlock mode, a terminal may display that GUI on a screen, thereby providing a user with an access tool to drive the element represented by that GUI.

A terminal may employ various GUIs for this arrangement, where examples of such GUIs may include [1] a GUI matching a certain hardware or software element, [2] a GUI matching a certain portion of a hardware or software element, [3] a GUI representing the access authority, or the like. As a result, a user may be able to find out which hardware or software elements he or she can drive in a certain mode by simply looking at those GUIs displayed on a screen in a certain mode. At the same time, a terminal may also readily manipulate the access authorities for each mode.

In another example of this exemplary embodiment, a terminal may display such GUIs on a lock screen in a lock mode or unlock mode any, but may disable some of such GUIs (i.e., restricted GUIs) in a certain mode in such a way that a user may see such GUIs on a lock screen, but may not be able to drive certain hardware or software elements which are assigned to those GUIs as far as a user stays in a lock mode. In one example, a terminal may display a GUI for a main memory unit in both a lock mode and an unlock mode. In an unlock mode, a terminal may display the GUI in a darker color (e.g., unrestricted GUI), and may allow a user to drive a hardware or software element which is matched to the GUI when a user provides a user input onto the GUI. In a lock mode, however, a terminal may display the same GUI in a lighter color (e.g., a restricted GUI), and may prevent a user from driving the element, even if the user provides a user input onto the GUI. Accordingly, a user may readily find out whether he or she may drive a certain element in a certain mode, simply by looking at the color of the GUI in the certain mode.

Such a terminal may display the GUI [1] in different colors in different modes, [2] in different shapes in different modes, [3] in different locations of a screen in different modes, [4] in different orientations in different modes, or [5] with or without blurring the GUI in different modes. As far as a user may readily discern whether a certain GUI is manipulatable by a user and whether he or she can drive a certain hardware or software element in a certain mode, such GUIs may be represented to a user in different ways as well.

In another example of this exemplary embodiment, a terminal may also manipulate a "TUI" (i.e., a "touch user interface"), where a TUI is a specific type of GUI which is commonly displayed on a touchscreen-type display unit. Accordingly, a terminal may not display a TUI assigned to a restricted hardware or software element (or its restricted portion or option) on a touchscreen. In the alternative, a terminal may display a TUI of a restricted hardware or software element on a touchscreen but may prevent a user from selecting or driving the restricted element as described above, while optionally, e.g., [1] displaying a TUI of the restricted element in a shape, a size or a color different from that of an unrestricted hardware or software element, [2] displaying a TUI of a restricted element in a position different from that of an unrestricted element, [3] blurring a TUI of the restricted element (applicable to both object-oriented GUIs and application-oriented GUIs), or the like.

In another exemplary embodiment of this sixth objective, various embodiments of this Section may be applied to different types of prior art user interfaces examples of which may include [1] a web-based user interface, [2] a command line user interface, [3] a hardware (or firmware) user interface, [4] an attentive user interface, [5] a batch user interface, [6] a conversational user interface, [7] a crossing-based user interface, [8] a gesture user interface, a holographic user interface, a motion-tracking user interface, a multi-screen user interface, a reflective user interface, or the like. The above embodiments of this Section may also be applied [1] to a lock mode, [2] to an unlock mode, or [3] to any intermediate mode in which a terminal does not grant a full access authority to all accessible hardware or all software elements but in which a terminal grants greater access authority than in a lock mode.

In another exemplary embodiment of this sixth objective, an O/S (or another application) of a terminal may be configured to grant or deny access to a certain hardware or software element depending on a mode in which a terminal operates. For example, once finding a current mode in which a terminal operates, the terminal may consult a database regarding which hardware or software elements a user can drive in that mode. Whenever a terminal receives a user input, a terminal may determine whether the user has the access authority to drive a certain hardware or software element. When the user does, a terminal may drive that element in response to a user input. Otherwise, a terminal may not take any action or may inform a user that he is not authorized to drive such an element.

In another example, upon finding out a current mode, a terminal may consult a database, and confirm a list of hardware and software elements which a user may drive in the mode. The terminal may then provide the GUIs to the user, graphically, mechanically, or electrically. In another example, a terminal may adopt other prior art techniques for granting different access authorities to different hardware or software elements depending upon a variable such as, e.g., a type of a current mode of operation, a type of a new mode to which a user is to switch, or the like. Some examples of such prior art techniques are provided in Section 4-11-6.

In another exemplary embodiment of this sixth objective, a terminal may grant each mode of operation defined in a certain hierarchy with preset access authorities, and then may provide a user with information about such access authorities using various visible, audible or tactile notice signals generated by various notice units or by a main display unit or a main speaker. Based upon such notice signals, a user may readily confirm [1] what kind of access authorities a user is granted in a current mode, [2] what kind of access authority a user may be granted when a terminal may switch to a new mode, [3] which hardware or software elements a user may drive in a current or new mode, [4] which hardware or software elements a user may drive once switching to a new mode, [5] which hardware or software elements a user may not be able to drive anymore once switching to a new mode, or the like.

In one example, a terminal may assign different modes with different visual features such that a terminal may display different screens for different modes. More particularly, a terminal may assign a unique color, shape, size, orientation, image, pattern, or orientation to each mode. Accordingly, a user may readily confirm in which mode the user operates a terminal, simply looking at such visual features. In another example, a terminal may utilize a notice unit and provide such visual features on the notice unit, where details of such notice units are to be provided in detail below and, therefore, are omitted herein.

In another example, a terminal may display identical or similar (background) screens in at least two different modes, but may display different sets of GUIs in each screen, while optionally blurring or not displaying GUIs which are restricted and, therefore, not accessible in such a mode. In another example, a terminal may display identical GUIs in each mode such that the GUIs restricted in a certain mode may be displayed in different shapes, sizes, colors, patterns, orientations, or positions on a display unit or a notice unit. In other words, the terminal may employ any visual means as described above, audible means by generating sounds or beeps, or tactile means by generating vibrations, as far as such means may alert a user that a terminal is to operate in a certain mode. A user may then easily confirm the mode in which the terminal operates or to which mode the terminal is to switch. When a user finds out that he or she is in a wrong mode, the user may readily take a remedial action to provide a correct mode-switching (user) sub-input to a terminal.

In another example, a terminal may assign each mode of operation defined in a certain hierarchy with different access authorities to the available hardware or software elements. Other configurational or operational details of this example are similar or identical to those of the above paragraph and, therefore, omitted here.

2-7. Easy Shifting between Different Modes or States

A seventh objective and another exemplary aspect of a data processing terminal and related methods thereof are to provide a terminal with a hardware or software element with which a user can easily switch modes such as, e.g., switching [1] from a powered-off state to a certain mode of operation defined in a certain hierarchy, [2] from a powered-on state but an off-state to the certain mode of operation, [3] from a current mode to a new mode both of which are defined in the hierarchy, [4] from the certain mode to an off-state, or [5] from the current mode to a powered-off state. As a result, a user does not have to turn off a display unit and then turn it on to switch from a current mode to a new mode, or to authenticate himself or herself to switch modes, or the like.

In one exemplary embodiment of this seventh objective, a terminal may include at least one mode-switching input unit which is designated to receive a user input including $UI_{SWT}$ therein. The input unit may be implemented [1] as a "soft button" such as a GUI displayed on a display unit, or [2] as a "hard button" provided on a suitable location of a terminal, where the terminal may employ any of the prior art input units as the hard button.

In one example, a terminal may allow a user to conveniently switch from a $1^{st}$ mode granted with $1^{st}$ access authority to a $2^{nd}$ mode granted with less (or more) access authority, whenever a user provides identical or different $UI_{SWT}$'s to the mode-switching input unit, while optionally requiring a user authentication. In another example, a terminal may allow a user to switch modes when a user provides $UI_{SWT}$ to the input unit, along with $UI_{THEN}$. Whichever examples a terminal may adopt, a user may readily switch modes, simply by providing a user input with $UI_{SWT}$ to such an input unit, without having to turn off a display unit and then to turn on a display unit.

As described above, a terminal may require a user to provide $UI_{THEN}$ when the terminal switches from a $1^{st}$ mode which is granted with less access authority to a $2^{nd}$ mode which is granted with greater access authority. This authentication may be helpful in protecting a main system of a terminal from various results which are obtained by running operations in the $1^{st}$ mode. When desirable, a terminal may still require a user to provide $UI_{THEN}$ even when the terminal switches from the $2^{nd}$ mode granted with more access authority to the $1^{st}$ mode granted with less access authority. Alternatively, a terminal may allow a user to switch from the $1^{st}$ mode to the $2^{nd}$ mode without any user authentication, when a user has already passed the user authenticating and has been operating a terminal in any mode. In another alternative, a terminal may require a user to provide a $2^{nd}$ $UI_{THEN}$ which is different from a $1^{st}$ $UI_{THEN}$ which a user has supplied to "wake up" a terminal from an off-state to an on-state.

In another exemplary embodiment of this seventh objective, a terminal may include a mode-switching input unit which is specifically designated to receive a user input with $UI_{SWT}$. A terminal may set a certain hierarchy of multiple modes, and allow a user to switch modes when such an input unit receives a proper user input. In addition, a terminal may switch modes depending upon, e.g., [1] a sequence of multiple modes defined in the hierarchy (e.g., in the case of a series switching), [2] a path of switching between different modes (e.g., in the case of a selective switching in which a user may jump from one mode to another based on $UI_{SWT}$, or the like. To this end, a terminal may adopt a parallel hierarchy, a series hierarchy, or a hybrid hierarchy as explained above.

For example, a terminal may allow a user to switch from a current mode to a new mode successively along a hierarchy whenever a user provides $UI_{SWT}$. A terminal may also allow a user to switch modes continuously along each mode of a circulating hierarchy. Alternatively, a terminal may adopt a non-circulating hierarchy in which a user may not advance either in a forward direction or in a backward direction when the user reaches the last mode defined in the hierarchy.

In another exemplary embodiment of this seventh objective, a terminal may include a mode-switching input unit which is designated to receive a user input with $UI_{SWT}$, while displaying various details of a hierarchy on its display (or notice) unit, where such details may include, e.g., a configuration or arrangement of the hierarchy, various paths for the selective switching defined in the hierarchy, or the like. A terminal may display various information such as at least one name, icon, symbol, or text, each of which may denote [1] which mode a user is currently in, [2] to which mode a terminal is to switch, [3] which hardware or software element is available in a current (or new) mode, or [4] which operations a user may run in a current (or new) mode. Therefore, a user may confirm the mode switching or may take a remedial action when he or she has provided wrong $UI_{SWT}$ to the input unit.

A terminal may display such information of each mode on a display unit or on only a portion or a section thereof. Alternatively, a terminal may include at least one "notice unit" which is a unit separate from the display unit and which displays such information thereon, thereby assisting a user in confirming a current (or new) mode. As explained above, a notice unit may provide a user with a "visual notice signal," an "audible notice signal," or a "tactile notice signal."

A notice unit may be disposed in various locations on or around a terminal. For example, a notice unit may be disposed adjacent to or around a main input unit (or a mode-switching input unit) such that a user may readily confirm which mode a user is currently in, to which mode a user is to switch, or the like. In another example, a notice unit may be disposed away from a main input unit (or a mode-switching input unit), but in a location which is convenient for a user to confirm such notice signals. When a notice unit generates an audible or tactile notice signals, an exact location of a notice unit with respect to such input units may not be material, as far as a user may readily hear the audible notice signals or a user may feel the tactile notice signals.

In another exemplary embodiment of this seventh objective, a terminal may allow a user to switch modes once a terminal starts to operate in certain modes. In one example when a user operates a terminal in a lock mode, a user may switch [1] to another lock mode, [2] to an intermediate mode, or [3] to an unlock mode, based upon which modes are defined in a hierarchy and how such modes arranged in the hierarchy. When a user operates a terminal in an unlock mode, a user [1] may switch to another unlock mode with greater access authority, [2] to an intermediate mode or a lock mode when a hierarchy is circulating, [3] may not switch to any other mode when a hierarchy is non-circulating, or the like.

2-8. Use Applications

An eighth objective and another exemplary aspect of this disclosure is to fabricate a data processing terminal which may include at least one of various features related to such mode switching and which may operate in one of various sequences or arrangements. In general, various data processing terminals of this disclosure are preferably fabricated as portable terminals in such a way that a user may carry such terminals with himself or herself, like prior art smartphones, handphones or tablets.

In one example of this eighth objective, a data processing terminal of this disclosure may be readily fabricated according to this disclosure and based upon various teaching provided herein.

In another example of this eighth objective, a data processing terminal of this disclosure may also be fabricated by modifying at least one hardware or software element of a prior art data processing device according to this disclosure or various teachings thereof and, thereby converting the prior art data processing device into the data processing terminal of this disclosure. Therefore, the data processing terminals of this disclosure may be fabricated by modifying various prior art data processing devices or data managing devices such as, e.g., [1] a prior art desk top data processor, [2] a prior art device including that processor, [3] a prior art mobile data processor, [4] a prior art device including that processor, or [5] other prior art devices which can run various data processing operations such as, e.g., [5-1] data storing, [5-2] data editing or rearranging, [5-3] data storing, or [5-4] data cleaning or erasing. It then follows that various data processing terminals of this disclosure may also be fabricated in shapes, sizes, or designs which may be similar or identical to those of the above prior art devices described in this paragraph.

In another example of this eighth objective, such features related to mode switching described throughout this disclosure may be implemented into various prior art computers such as, e.g., [1] desk top computers, [2] lap-top computers, [3] mobile pads, [4] computers of various sizes or capacities which are incorporated into various electrical devices such as, e.g., [4-1] vehicles, [4-2] robots, or the like, each of which can run various data processing operations examples of which have been described in the preceding paragraph. Therefore, a data processing terminal of this disclosure may be fabricated in a shape, a size, or a design which may be similar or identical to those of various prior art devices which are described in this paragraph.

In another example of this eighth objective, such features related to mode switching described throughout this disclosure may be implemented into various prior art wireless communication devices. Therefore, various data processing terminal of this disclosure may be fabricated in a shape, a size, or a design which is similar or identical to [1] prior art smart-phones, [2] prior art mobile-phones, [3] prior art mobile pads, [4] prior art personal digital assistants, [5] prior art web pads, [6] other prior art wireless communication devices, or [7] other prior art data processing devices.

In another example of this eighth objective, various data processing terminals of this disclosure may include various prior art features related to, e.g., an internet of things (IoT), big data, artificial intelligence (AI), or the like. In one case, a data processing terminal of this disclosure may include at least one hardware or software elements which can connect to an IoT network, or to an electrical device which is a part of the IoT network, thereby monitoring or manipulating an operation of the IoT network or an operation of the electric device. When desirable, a terminal may couple with an electrical device in the IoT network and then manipulate the electric device based on the mode switching of a terminal. Conversely, an electrical device which is in the IoT network may couple with a terminal and then render the terminal switch modes [1] when the device may start or end a certain operation, [2] when the device detects a certain event (e.g., fire, emergency, or other preset events), or the like. The terminal may also utilize those IoT-related features for various applications in which prior art IoT's are currently employed.

In another case, a data processing terminal of this disclosure may include at least one hardware or software elements which can connect to a big data repository, thereby storing data therein or retrieving data therefrom. In addition, such a terminal may incorporate a prior art algorithm or computer codes with which the terminal may analyze the big data and utilize such in conjunction with various operations of the terminal. For example, a terminal may condition the mode switching upon an outcome obtained by analyzing the big data, or such a terminal may manipulate the data stored in the big data repository based on the mode switching.

In another case, a data processing terminal of this disclosure may include at least one hardware or software elements which can incorporate or collaborate with various conventional intelligent agents, thereby analyzing usages of a terminal, user preferences, user habits, and environment with such agents and assist a terminal or a user. Accordingly, the intelligent agents may provide a terminal (or a user) with reasoning, knowledge, planning, or natural language processing, as have been performed by prior art intelligent agents such as, e.g., artificial intelligence (AI).

For example, a terminal may employ the prior art intelligent agent for various purposes such as, e.g., controlling a hardware or software element of the terminal, performing self-diagnosis of a main system or a lock system of the terminal, repairing any defects of such systems, diagnosing physical or operational isolation between a lock system and a main system, or the like. A terminal may also employ the prior art intelligent agent to assist a user in various ways such as, e.g., keeping track of [1] various operations which a user has run, [2] various functions which a user has performed, [3] sequence of various modes which a user has operated a terminal, or the like. Based thereupon, the prior art intelligent agent may suggest a user which operation to run, which function to perform, whether the user should stay in a current mode, to which mode the user may switch, or the like.

More particularly, a terminal may switch modes with a guidance from the intelligent agent. In one example, the agent may require a terminal to switch from a current mode to a new mode based upon user actions, e.g., [1] when an outcome obtained from running lock (or unlock) operations by a user in a lock (or unlock) mode may favor such mode switching, [2] when user statistics may reveal that a user tends to switch modes at a certain instance or under a preset circumstance, or [3] when a user preference may mandate such mode switching. In another example, the intelligent agent may require a terminal to switch from a current mode to a new mode based upon external circumstances or events, e.g., [1] when an emergency occurs or a preset event happens, [2] when a chance of an emergency or a preset event increases over a preset threshold, [3] when a preset appointment is upcoming, [4] when a certain call, message, or email is received, or the like. The terminal may also utilize those intelligent agent-related features for various applications in which prior art intelligent agents are currently employed.

In addition and in another example of this eighth objective, a user may apply various features of this disclosure not only to a mobile data processing terminal as described heretofore and hereinafter, but also to [1] a non-mobile data processing terminal (or equipment) or [2] a non-portable data processing terminal (or equipment). For example, a non-mobile terminal (e.g., prior art desktop computers or other data processing devices) may incorporate various features of this disclosure such that security of the computer or devices, integrity thereof, or protection of data stored therein may be enhanced. In another example, various transportation vehicle (such as, e.g., an automobile, a train, a motor bicycle, a bicycle, an airplane, or a helicopter) or various drones may incorporate various features of this disclosure in such a way that operation of such vehicles or drones may be better protected and, at the same time, prevent unauthorized users from using such vehicles or drones for undesirable purposes.

2-9. User Applications

A ninth objective and another exemplary aspect of a data processing terminal and related methods thereof are to grant certain access authorities to multiple modes of operation defined in a certain hierarchy, to incorporate such into a terminal, and to enable a single user or multiple users to utilize multiple modes with a single terminal. To this end, a terminal may include multiple systems each of which may operate in each of multiple modes defined in a certain hierarchy. As a result, a single user or multiple users may enjoy versatility or flexibility in using such a terminal by operating at least two different systems in one or at least two of different modes.

In one exemplary embodiment of this ninth objective, multiple authorized users may operate a single terminal, where a terminal may set up [1] a single hierarchy for all users or [2] different hierarchies, or where a terminal may define [1] the same modes for all users, [2] different modes for different users, or [3] a combination thereof. Therefore, a terminal may grant each user with the same (or different) number of lock or unlock modes, or may allow each user to operate in each (or at least one) of such modes with the same, similar, comparable or different access authorities.

For example, a terminal may operate in a hierarchy defining therein one lock mode ($MD_{LK}$) and three unlock modes ($MD_{UL1}$, $MD_{UL2}$, and $MD_{UL3}$). A $1^{st}$ user may then operate a terminal in a lock mode ($MD_{LK}$) and a single unlock mode ($MD_{UL1}$), whereas a $2^{nd}$ user may operate the same terminal in the same lock mode ($MD_{LK}$) and two different unlock modes ($MD_{UL2}$ and $MD_{UL3}$). In another example, a terminal may include at least one lock system and at least one main system, where each user may use the same main (or lock) system or different main (or lock) systems in each of multiple unlock (or lock) modes. In another example, a terminal may grant various access authorities to each of such multiple authorized users so that a terminal grants a $1^{st}$ user with access authorities to switch to another mode without any user authentication, while granting a $103^{rd}$ user with access authority which may be enough to access his own $1^{st}$ mode and $2^{nd}$ mode, but not enough to access other modes of other users.

Therefore, each user may use a single terminal with different access authorities such that [1] each user may access the same modes of a certain hierarchy but with different access authorities to switch to certain modes of the hierarchy, [2] each user may use those modes defined in different hierarchies and, therefore, a $1^{st}$ user may switch to any mode defined in a $1^{st}$ hierarchy but may not switch to any mode defined in a $2^{nd}$ hierarchy for a $2^{nd}$ user, or the like. As a result, each user may also have different access authorities to drive a certain hardware or software element of a main system of a terminal. That is, multiple users may [1] operate the same or different lock systems in one or multiple lock modes, [2] operate the same or different main systems in one or multiple unlock modes, [3] drive the same or different hardware or software elements in at least one of such modes, or the like. It then follows that an exact number of such modes defined in a certain hierarchy does not have to exactly match a number of users who are authorized to use such a terminal.

In another exemplary embodiment of this ninth objective, a terminal has a single authorized user, while the user can operate a terminal in multiple modes of operation as defined in a single hierarchy. Accordingly, a user may operate a terminal while switching between such modes examples of which may include a lock mode, an unlock mode or any number of optional intermediate modes. In one example, when a hierarchy defines a single lock mode ($MD_{LK}$) and three same, similar, comparable, or different unlock modes ($MD_{UL1}$, $MD_{UL2}$, and $MD_{UL3}$), a user may use $MD_{UL1}$ for general purposes, $MD_{UL2}$ for family matters, and $MD_{UL3}$ for personal affairs.

When a terminal operates in a hierarchy which defines multiple unlock (or lock) modes, a terminal may grant identical, similar, comparable, or different access authorities to each of such modes, depending upon user's needs or upon external circumstances, e.g., by restricting a user [1] from driving a certain hardware or software element in one mode but not in another mode, [2] from using an entire portion or option of at least one of such elements in one mode but not in another mode, or [3] from accessing data stored in a memory unit in one mode but not in another mode. In this example, a terminal may grant greater access authorities to $MD_{UL3}$ than $MD_{UL1}$ and $MD_{UL2}$, or the like. Alternatively, when a user preferentially uses a terminal in $MD_{UL1}$ for business, while requiring only a minimum functionality (e.g., a word processor, photo-shop or photo gallery) in $MD_{UL3}$, a terminal may grant greater access authority to $MD_{UL1}$ than $MD_{UL3}$.

In either of such examples, a terminal may include a lock system and a main system, where a terminal operates a lock system in a lock mode, but operates a main system in an unlock mode. Alternatively, a terminal may include a single system which may operate as a lock system in a lock mode but as a main system in an unlock modes. Alternatively, a terminal may include multiple systems [1] such that a user may use a lock system in a lock mode, and a main system in an unlock mode, or [2] that a user may use a $1^{st}$ lock system in $MD_{LK1}$, a $2^{nd}$ lock system in $MD_{LK2}$, and a main system in $MD_{UL1}$ and $MD_{UL2}$. In other words, an exact number of such modes of operation defined in a certain hierarchy by a terminal does not have to exactly match a number of lock or main systems included in the terminal.

A terminal may grant a user to drive identical hardware or software elements in at least two modes but may impose certain restrictions in each mode, e.g., preventing a user [1] from accessing a certain data sector of a memory unit in one mode but not in another mode, [2] from using a certain option of a software element in one mode but not in another mode, or the like. A terminal may include a single lock system and a single main system (or multiple lock systems and multiple main systems) in such a way that a user may operate different main (or lock) systems in different unlock (or lock) modes. Therefore, a single user may utilize a single terminal in multiple modes in each of which a user may use a lock system in a lock mode, a main system in one or multiple unlock modes, or the like, where a user operating in different modes is granted with different access authorities [1] to drive certain hardware or software elements of a terminal, [2] to drive certain portions of such elements, [3] use certain options of such elements, or the like.

In another exemplary embodiment of this ninth objective, various data processing terminals of this disclosure may operationally couple with various prior art devices during use, and then uncoupled from such devices after use. More particularly, a user may manipulate such prior art devices by coupling his or her terminal thereto and by manipulating the terminals. In other words, a user may utilize his or her data processing terminal [1] as a portable control console which allows a user to manipulate various operations of the prior art devices when a terminal is physically coupled to the devices, or [2] as a portable and remote controller which allows a user to manipulate various operations of the prior art devices when a terminal does not have to be physically coupled to such devices. In general, a terminal of [1] may communicate with the devices through wire, while a terminal of [2] may communicate with the devices through wireless communication.

Accordingly and in one example, various features of various terminals of this disclosure may be applied [1] to various prior art mobile data processing devices, [2] to various prior art non-mobile data processing devices, or [3] to various prior art non-portable data processing devices, as described above. More particularly, such prior art devices may be those included in prior art transportation vehicles (e.g., an automobile, a motor bicycle, a bicycle, a train, an airplane, a helicopter, or the like), or prior art drones may incorporate various features of this disclosure such that operation of such vehicles or drones may be better protected and, at the same time, may prevent unauthorized users from using such vehicles or drones for undesirable purposes.

2-10. User Advantages

A tenth objective and another exemplary aspect of a data processing terminals and its related methods are to offer a user with enhanced security, improved privacy, and better protection of data stored therein.

In one exemplary embodiment of this tenth objective, a terminal may provide a user with various hierarchies each of which defines multiple modes of operation thereon. A terminal may grant each mode with identical, similar, comparable, or different access authorities. A terminal may erase an entire (or only selected) portions of results obtained by running various operations in a lock (or unlock) mode in response to mode switching in various erasure timings. In addition, the terminal may run such erasure (or semi-erasure) when a terminal may switch from a mode with less access authority [1] to another mode with greater access authority, [2] to another mode with comparable or non-overlapping access authority, or the like.

Therefore, a terminal operating in a new mode may be secured from potential attacks from malicious programs which may have been downloaded and impregnated into such results obtained in a previous mode, whether the previous mode is granted with less access authority than a new mode (or vice versa). As a result, a user may enjoy operating a terminal in each of multiple modes defined in a hierarchy by completely (or partly) isolating each mode from the rest of multiple modes in the hierarchy, without having to worry about potential contamination or spoiling of a terminal therefrom. As a result, a user can enjoy enhanced security, improved privacy, and heightened privacy.

In another exemplary embodiment of this tenth objective, a terminal may conveniently allow multiple users to set up a hierarchy which defines one or multiple lock (or intermediate) modes, one or multiple unlock modes, or the like. As a result, a terminal may grant each user with certain access authority in each of his or her own mode, thereby granting some users to drive some but not all accessible hardware or software elements of a main system of a terminal, but granting other users to drive all (or almost all) hardware or software elements of the main system.

Alternatively, multiple users may share a single terminal or multiple terminals connected in a single network in an individually isolated environment, while sharing at least one portion of the network of hardware and software elements. In addition, a terminal may erase all (or some) of such results as described in the previous paragraph. As a result, each user may maximize the use of his or her terminal, without having to worry about a potential leak or accidental disclosure of his or her activities stored in his or her own modes to another user, without having to worry about potential contamination or breakdown of the network due to his or her activities performed in some of his or her own modes, or the like.

In another exemplary embodiment of this tenth objective, a terminal may allow a user to conveniently switch between different modes of operation defined in a certain hierarchy or to switch from one mode to another, while running such erasure or semi-erasure. More particularly, a user (or a terminal) may set up a hierarchy of multiple operations such that a user who starts operation of a terminal in a certain lock (or intermediate) mode or who switches from a certain lock (or intermediate) mode may not be able to reach an unlock mode, may not be able to drive a certain hardware or a software element of a main system, or the like. To this end, a terminal may set up a sequence-specific hierarchy which includes at least one trap mode, as exemplified in the panels (C) and (D) of FIG. 2. This arrangement may serve as an additional safeguard against potential contamination, spoilage or breakdown of a precious main system of a terminal by an intruder, for a terminal may prevent any unauthorized user who does not start to operate a terminal in a correct mode from driving a certain hardware or software element of a main system.

According to the foregoing, various terminals of this disclosure can prevent accidental or intentional breakdown, spoilage or contamination of a main system of a terminal which may be caused [1] by an unauthorized user, or [2] by malicious viruses which enter a terminal while a user runs lock operations and which may migrate into a main system when a user may switch from a lock mode to an unlock mode. To this end, a terminal may provide a safeguard of erasing or semi-erasing results obtained by running lock (or intermediate) operations in a (lock or intermediate) mode before a terminal may switch to an unlock mode or any mode which is granted with greater access authority than the lock mode. As a result, various terminals of this disclosure effectively prevent accidental or intentional hacking caused by an accidental access to a suspicious website or unwary downloading of contaminated files in a lock (or intermediate) mode.

According to the foregoing, various terminals of this disclosure can also effectively preserve private data of a user stored in a main memory unit of a terminal, and personal use history of a terminal in a lock, intermediate, or unlock mode. By setting up a carefully structured hierarchy, such terminals may prevent an unauthorized user from retrieving data from a main memory unit, from writing contaminated data into a main memory unit, or the like. In addition, a user of such terminals may block an unauthorized user from obtaining a record of his or her activities performed by a user in less protected modes such as, e.g., lock or intermediate modes.

In another exemplary embodiment of this tenth objective, a terminal may allow a user to use various vehicles or drones with enhanced security, improved integrity, or heightened privacy. For example, when a user drives a shared vehicle, a user may couple his or her terminal with the vehicle and drive the vehicle based on his or her needs, by inserting his terminal into a matching port of the shared vehicle or by synchronizing his terminal with the vehicle wirelessly. In doing so, a terminal may prevent its main system from any malicious viruses or codes which may have been implanted into the vehicle by previous users, may prevent others from acquiring the user's driving record or data by running erase (or semi-erase) operations, or the like.

The same advantages apply to any shared electric devices to which a user may have to operationally couple a terminal through wire or wirelessly. The same advantages also apply to any shared environment in which a user may have to operationally couple his or her terminal through wire or wirelessly, where examples of which may include [1] connecting to an open internet environment, [2] connecting to a $3^{rd}$ party's internet environment, or the like. In other words, as far as a user operates his or her terminal in a lock (or intermediate) mode while completely (or partly) isolating a main system of his or her terminal and while preventing an unauthorized user from accessing or driving a main system of the user's terminal, the security, integrity, and privacy of the terminal may be maintained and enhanced.

2-11. Modifying or Improving Prior Art Data Processing Devices

Various data processing terminals, their units, and their hardware or software elements of this disclosure may operate in different modes of operation which have been disclosed in various prior art documents. Examples of such prior art includes U.S. Pat. No. 8,782,775 entitled "Embedded authentication systems in an electronic device" and assigned to Apple (specifically referring to, but not limited to, FIG. 3 and FIG. 5C, Col. 7; Lines 27~39, Col. 8; Line 15~Col. 9; Line 17), U.S. Pat. Application Publication No. 2012/0009896 entitled "Above-lock camera access" and assigned to Microsoft Corp. (specifically referring to, but not limited to, FIGS. 3A~3B, FIGS. 4A~4B, Para. [70]~[72], Para. [75]~[76]), U.S. Pat. No. 8,943,580 entitled "Embedded authentication systems in an electronic device" and assigned to Apple, Inc. (specifically referring to, but not limited to, FIGS. 3 and 5C, Col. 7; Line 27~39, Col. 8; Line 15~Col. 9; Line 17), or the like.

It is appreciated, however, that various terminals of this disclosure may grant the prior art modes of operation of the above paragraph with access authorities which are different from those as disclosed in such prior art. In addition, various terminals of this disclosure may include such prior art modes of the preceding paragraph in a new hierarchy which may also be different from those disclosed in such prior art. Various terminals of this disclosure may further combine such prior art modes with other modes which are disclosed heretofore and hereinafter.

3. Additional Objectives

This disclosure relates to various data processing terminals each of which may operate in multiple modes of operations one at a time. More particularly, each terminal of this disclosure may erase an entire (or a selected) portion of results which are obtained by running various lock (or intermediate) operations by operating a lock (or intermediate) system in a lock (or intermediate) mode, where such results may be stored or reside in a lock (or intermediate) system in a lock (or intermediate) mode. Accordingly, even when a user runs various lock (or intermediate) operations with a lock (or intermediate) system in a corresponding mode while accessing unreliable websites, connecting to suspicious links, or downloading files or contents impregnated with malicious viruses therefrom, a terminal can erase an entire (or selected) portion of such results in various erasure timings. As a result, when a terminal may switch to an unlock mode, such malicious viruses have already been erased and, therefore, cannot adversely affect a main system of a terminal.

In addition to such erasure or semi-erasure, various terminals of this disclosure may physically or operationally isolate a main (or lock) system from a lock (or main) system either completely or partly. As a result, even when malicious viruses successfully land onto a lock system, such viruses may not migrate into a main system due to such physical or operational isolation.

Accordingly, various terminals of this disclosure can protect themselves against a risk posed by questionable websites, potentially detrimental downloaded contents, and viruses embedded in such contents or links. At the same time, a terminal enables a user to enjoy seamless operations, while switching from one mode to another without making a user worry about contaminating or damaging his or her terminal from his or her activities in a restricted mode.

In another exemplary objective, a data processing terminal may operate between an unlock mode and a lock mode, include a display unit and a main system which may operate in an unlock mode and drive the display unit in the unlock mode. The terminal may also include a lock viewer which can display data on the display unit in the lock mode. In one exemplary embodiment of this objective, a terminal which operates in a lock mode may erase at least a portion of results (immediately) before, concurrently with, (immediately) after, or within a certain period of time after a terminal switches to an unlock mode so that the terminal may entirely or partially prevent the portion of the results from affecting the main system. In another exemplary embodiment of this objective, a terminal may include the lock viewer, may entirely or partially isolate the lock viewer from the main system in the lock mode operationally or physically and, accordingly, prevent the lock viewer and such results from adversely affecting the main system.

In another exemplary objective, a data processing terminal may operate between an unlock mode and a lock mode and include multiple hardware and software elements. The terminal may include a display unit, a main system which may drive the display unit and run multiple operations by driving such hardware or software elements in the unlock mode. The terminal may also include a lock system which includes a lock viewer and drives the display unit and lock viewer for displaying data on the display unit in the lock mode. In addition, the terminal operating in the lock mode may erase at least a portion of results which may reside in a lock system (immediately) before, concurrently with, (immediately) after, or within a certain period of time after switching to the unlock mode. In another exemplary embodiment of this objective, the terminal may entirely or partially prevent the portion of results from contaminating or adversely affecting the main system. In another exemplary embodiment of this objective, the terminal may include the lock system, operationally or physically isolate the lock system entirely or partially from the main system, and may entirely or partially prevent a lock system from accessing the main system in the lock mode, thereby preventing the lock system and results from affecting the main system.

In another exemplary objective, another data processing terminal may incorporate therein a display unit and a main memory unit, may operate between an unlock mode and a lock mode, and may allow a user to store first data into the main memory unit or to retrieve the first data from the main memory unit in the unlock mode. In one exemplary embodiment of this objective, a terminal may include at least one lock viewer which may receive and display second data on the display unit while the terminal may operate in the lock mode. In another exemplary embodiment of this objective, a terminal operating in the lock mode may entirely or partially prevent the lock viewer from retrieving the first data from the main memory unit or store the second data into the main memory unit. The terminal operating in the lock mode may erase at least a portion of the second data (immediately) before, concurrently with, (immediately) after, or within a certain period of time after switching to the unlock mode, whereby the terminal may entirely or partially protect the main memory unit from such erased data. In another exemplary embodiment of this objective, the terminal may include a lock viewer but operationally or physically isolate a lock viewer entirely or partially from the main memory unit, thereby protecting the main memory unit of the main system from the lock viewer and such data.

In another exemplary objective, a data processing terminal may include therein multiple hardware elements or software elements, may operate between a first mode and a second mode, and may allow a user to drive a first number and a second number of such elements in the first and second modes, respectively. The terminal includes a file viewer application which displays data in the second mode. In one exemplary embodiment of this objective, the terminal operating in the second mode may erase at least a portion of such data (immediately) before, concurrently with, (immediately) after, or within a certain period of time after switching to the first mode. Accordingly, the terminal may allow the user to display such data on the display unit in the second mode but protect at least one of such elements from being contaminated or degraded by the erased portion of such data in the first mode or second mode. In another exemplary embodiment of this objective, the terminal may include the file viewer application, may entirely or partially isolate the file viewer application physically or operationally from such elements and, therefore, may protect at least one of such elements from the file viewer application and such data in the first mode or second mode.

In another exemplary objective, a data processing terminal may incorporate multiple hardware elements or software elements and operate between an unlock mode and a lock mode. The terminal may also include a display unit, a main system which may drive the elements and may run multiple operations in the unlock mode and displays results from the operations on the display unit in the unlock mode. The terminal may include a lock system which may include a lock viewer and a lock memory unit, may drive the lock viewer and the lock memory unit in the lock mode, may display results on the display unit in the lock mode, and may allow the lock viewer to store at least a portion of such results into the lock memory unit in the lock modes.

In another exemplary objective, a data processing terminal may operate in a lock mode and erase a portion of such results which reside in a lock system (immediately) before, concurrently with, (immediately) after, or within a certain period of time after switching to an unlock mode, whereby the terminal may entirely or partially prevent the lock system and erased portion of such results from adversely affecting a main system in the lock or unlock mode. In one exemplary embodiment of this objective, the terminal may include the lock system therein but entirely or partially isolate the lock system from the main system operationally and physically, whereby the terminal may entirely or partially prevent the lock system from accessing at least one of such elements in the lock mode and, therefore, may protects such elements from adverse effects from the lock system and such results.

In another exemplary objective, a data processing terminal may incorporate multiple hardware and software elements, may operate between a first mode and a second mode, and may allow a user to access more of such elements in the first mode than in the second mode. The terminal may include a file viewer application which displays results in the second mode, and a second memory unit which stores such results in the second mode. In one exemplary embodiment of this objective, the terminal operating in the second mode may erase at least a portion of such results stored in the second memory unit (immediately) before, concurrently with, (immediately) after, or within a certain period of time after switching to the first mode, whereby the terminal may allow the user to retrieve or view such results displayed on the display unit in the second mode, but may entirely or partially protect at least one of such hardware or software elements from the erased portion of the results in the first or second mode. In another exemplary embodiment of this objective, a terminal may include the lock system therein but may entirely or partially isolate the file viewer application as well as the second memory unit of the lock system from such elements either operationally or physically, whereby the terminal may entirely or partially prevent the file viewer application and second memory unit from accessing at least one of such elements in the second mode and, therefore, may protect such one of the hardware or software elements from adverse effects from the file viewer application, the second memory unit, and such results.

In another exemplary objective, a data processing terminal may include a display unit and operate between an unlock mode and a lock mode, may allow a user to be capable of running as many operations as the user sees fit in the lock mode, downloading as many results from external sources as the user sees fit in the lock mode, and storing as many results obtained from such running and downloading as the user sees fit in the lock mode, without having to worry about potentially contaminating, degrading or spoiling the terminal, where the terminal operates in the unlock or lock mode one at a time. Such a terminal may include a main system and a lock system, where the main system may operate in the unlock mode and allow the user to access at least a majority of hardware and software elements of the terminal in the unlock mode, while the lock system may operate in the lock mode and may not allow a user to access at least another majority of the elements of the terminal in the lock mode. The terminal may also erase an entire or pre-selected portion of such results (immediately) before, concurrently with, (immediately) after, or within a certain period of time after switching from the lock mode to the unlock mode. Accordingly, the terminal may entirely or partially prevent the erased results from adversely affecting the main system in the unlock or lock mode.

In another exemplary objective, a data processing terminal may include a main system, a lock system, and a display unit, where the main system operates in an unlock mode, where the lock system operates in a lock mode, and where the main and lock systems respectively drive the display unit in the unlock mode and lock mode. The terminal may incorporate a mode-switching input unit capable of acquiring a mode-switching (user) sub-input from the user, where the terminal operating in the unlock mode may run a mode-switching operation in response to the sub-input and switches to the lock mode, [1] without having to turn off and then turn on the display unit for switching to the lock mode, [2] without requiring the user to provide any additional user sub-input for switching to the lock mode, or [3] without having to run any other operation after running a mode-switching operation and before switching to the lock mode, where the mode-switching operation includes the step of finding which mode is matched to the sub-input.

In another exemplary objective, a data processing terminal may include a display unit and multiple hardware and software elements, may operate between a first mode and a second mode, and may also allow a user to access a greater number of such elements in the first mode than in the second mode. The terminal may also include a mode-switching input unit capable of acquiring at least one mode-switching (user) sub-input from the user, where the terminal operating in the first mode may run a mode-switching operation in response to the mode-switching (user) sub-input and then switches to the second mode, [1] without having to turn off and then turn on the display unit for switching to the second mode, [2] without requiring the user to provide any additional (user) sub-input to switch to the second mode, or [3] without having to run any additional operation after running the mode-switching operation and before switching to the second mode.

In another exemplary objective, a data processing terminal may include multiple hardware elements as well as multiple software elements, may operate between a first mode and a second mode, and may allow a user to access a first number of such elements in the first mode but to access a second number of such elements in the second mode. The terminal may include a mode-switching input unit which acquires a mode-switching user sub-input from the user. The terminal may run a mode-switching operation in response to the sub-input to switch from a current mode which is one of such first and second modes to a new mode which is the other of such modes. Accordingly, the terminal may change its mode in an alternating fashion as the user provides multiple or successive mode-switching sub-inputs one at a time.

In another exemplary objective, a data processing terminal may also include multiple hardware and software elements, may operate among a mode A, a mode B, and a mode C, and may allow a user to access a first number, a second number, and a third number of such elements, respectively, in each of such modes A, B, and C. The terminal may include a mode-switching input unit which acquires a mode-switching (user) sub-input from the user. The terminal may then run a mode-switching operation in response to the sub-input for switching from a current mode which is one of the modes A, B, and C to another of such modes A, B, and C. Therefore, when the mode-switching input unit acquires multiple mode-switching sub-inputs sequentially or one at a time, the terminal may switch a mode from a first of such modes A, B, and C to a second of such modes in response to a first of the sub-inputs, from the second of such modes to A, B, and C to a third of such modes in response to a second of the sub-inputs, and then from the third of such modes A, B, and C back to the first of such modes in response to a third of the sub-inputs, according to a sequence of such mode A, B, and C.

In another exemplary objective, an external device is provided for a data processing terminal which operates between an unlock mode and a lock mode and which includes a display unit and a main system which in turn operates and drives the display unit in the unlock mode. The external device may include an add-on device which releasably couples with (at least a portion of) the terminal and which includes a lock viewer capable of displaying results [1] which reside in the add-on device, [2] which are provided by an external source accessed by a user in the lock mode, or [3] which are otherwise obtained in the lock mode. The add-on device (or the main system) may drive the lock viewer for displaying the results on the display unit in the lock mode and may erase an entire (or only a selected) portion of such results (immediately) before, concurrently with, (immediately) after, or within a certain period after switching from the lock mode to the unlock mode, thereby preventing the add-on device from affecting the terminal.

In another exemplary objective, an external device is provided for a data processing terminal which includes multiple hardware elements and software elements and which operates between a first mode and a second mode, where the terminal may allow a user to access a first number of the elements in the first mode but to access a second number of the elements in the second mode, where the second number is less than the first number. The external device includes an add-on device which may releasably couple with the terminal and which may include a file viewer application for displaying results [1] which reside in the add-on device, [2] which are provided by a terminal (e.g., such hardware or software elements) in the first or second mode [3] which are obtained from an external source accessed by the user in the second mode, or [4] which are otherwise obtained by the add-on device in the second mode (or the terminal in the first or second) mode. The add-on device (or the terminal) may erase at least a (or an entire) portion of the results (immediately) before, concurrently with, (immediately) after, or within a certain period of time after the terminal switches from the second mode to the first mode, whereby the terminal may allow the user to access or retrieve such results stored in the add-on device in the second mode, but entirely or partially protects at least one of such elements from the erased portion of the results. The add-on device (or terminal) may (optionally) erase at least a (or an entire) portion of other results [1] which reside in the hardware elements, [2] which are obtained from another external source accessed by the user in the first mode, or [3] which are obtained by such hardware or software elements in the first or second mode (immediately) before, concurrently with, (immediately) after, or within a certain period of time after the terminal switches from the first mode to the second mode, whereby the terminal allows the user to erase an entire (or only a selected) portion of a history of his or her activities in the first mode.

In another exemplary objective, a method is provided to protect a data processing terminal from degrading or unreliable results obtained by a user from an external source, where the terminal operates between an lock mode and an unlock mode, allows a user to access and drives various hardware elements or software elements of the terminal in the unlock mode, but prevents the user from accessing an entire (or at least a substantial) portion of such elements in the lock mode. The method includes the first step of allowing the user to obtain the results from the external source in the lock mode. In one exemplary embodiment of this objective, the method may include the step of switching to the unlock mode after erasing an entire (or at least a) portion of such results, thereby preventing the erased portion of the results from contaminating or adversely affecting the terminal. In another exemplary embodiment of this objective, the method may include the step of erasing an entire (or only a selected) portion of such results (immediately) before, concurrently with, (immediately) after, or within a certain period of time after the terminal switches from the lock mode to the unlock mode, whereby this arrangement entirely or partially prevents the erased portion of the results from adversely affecting the terminal.

In another exemplary objective, a method is provided to improve security of a data processing terminal from unreliable or infected results obtained by a user from an external source, where the terminal operates between an unlock mode and a lock mode, allows a user to access all (or at least a substantial) portion of hardware and software elements of the terminal in the unlock mode, but entirely or partially prevents the user from accessing at least one of such elements in the lock mode. The method includes the first steps of providing the terminal with a main system and a lock system, where the main system operates in the unlock mode while the lock system operates in the lock mode, and allowing the user to obtain the results with the lock system in the lock mode. In one exemplary embodiment of this objective, the method includes the step of erasing an entire (or at least a) portion of such results (immediately) before, concurrently with, (immediately) after, or within a certain period of time after such terminal may switch from the lock mode to the unlock mode. As a result, the terminal may entirely or partially prevent the lock system and erased portion of the results from contaminating or adversely affecting the main system. In another exemplary embodiment of this objective, the method also includes the step of physically or operationally isolating the lock system from the main system, thereby entirely or partially preventing such results and the lock system from adversely affecting the main system.

In another exemplary objective, a method is provided to maintain privacy of data stored in a data processing terminal which operates between a first mode and a second mode and which grants authorities to access a first number and a second number of its hardware and software elements in the first mode and second mode, respectively, where the first and second numbers may be different from, comparable with, similar or identical to each other. The method includes the first step of allowing a user to process the data in the second (or first) mode. In one exemplary embodiment of this objective, the method may also include the step of switching to the first (or second) mode after erasing an entire (or only a selected) portion of the data, thereby entirely or partially preventing other users from accessing the erased portion. In another exemplary embodiment of this objective, the method may also include the step of erasing an entire (or only a selected) portion of such data (immediately) before, concurrently with, (immediately) after, or within a certain period of time after the terminal switches from the second (or first) mode to the first (or second) mode, thereby entirely or partially preventing other users from accessing the erased portion of the data.

In another exemplary objective, a method aims to provide independency of data stored in different parts of a data processing terminal which operates between (or among) multiple modes of operations and which grants different, comparable, similar or identical authorities to access to all (or only selected) hardware or software elements in each of such modes. The method includes the first step of allowing a user to manipulate the data with the terminal in one of such modes. In one exemplary embodiment of this objective, the method may also include the step of switching to another of such modes after erasing an entire (or only a selected) portion of the data, thereby entirely or partially preventing access to the erased portion of the data in the another of the modes. In another exemplary embodiment of this objective, the method may also include the step of erasing an entire (or only a selected) portion of the data (immediately) before, concurrently with, (immediately) after, or within a certain period of time after the terminal may switch from such one of the modes to such another of the modes, thereby preventing access to the erased portion of the data in the another of the modes.

In another exemplary objective, a method is provided for switching modes of operation in a data processing terminal operating in an unlock mode and a lock mode and granting more access authorities to a user operating in the unrestricted mode than the user in the lock mode. In one exemplary embodiment of this objective, a method includes the steps of allowing a user to run lock operations in a lock mode, receiving a mode-switching user sub-input, and running a mode-switching operation in response to the sub-input for switching from the lock mode to the unrestricted mode, while erasing results which are related to the lock operations (immediately) before, concurrently with, (immediately) after, or within a certain period of time after such switching. In another exemplary embodiment of this objective, a method further includes the steps of allowing a user to run unlock operations in an unlock mode, receiving a mode-switching (user) sub-input, and running a mode-switching operation in response to the sub-input to switch from the unlock mode to the lock mode. In either of such embodiments, the method may perform the above step(s) [1] without turning off a display unit and then turning the display unit on before, during, or after the switching, [2] while (optionally) turning off a display unit and then turning on the unit before or during such switching, [3] without (optionally) running any additional operation between such running and such switching, or the like.

In another exemplary objective, a method is provided for switching modes of operation in a data processing terminal operating between a first mode and a second mode, while granting different, comparable, similar or identical access authorities to each of such modes. The method may include the step of allowing a user to operate a terminal in a second mode, acquiring a first mode-switching (user) sub-input from the user, switching from the second mode to a first mode in response to the first (user) sub-input, acquiring a second mode-switching (user) sub-input from the user, and switching from the first mode back to the second mode in response to the second sub-input, whereby the terminal may allow the user to switch the modes alternatingly as the user provides multiple sub-inputs one at a time. The method performs the above [1] while (optionally) running an erase operation, [2] without turning a display unit off and then turning the unit on before, during or after such switching, [3] while (optionally) turning a display unit off and then turning on the display unit before or during switching, [4] without (optionally) running any additional operation between such acquiring and switching, [5] (optionally) acquiring the first and second sub-inputs with different mode-switching input units, or the like.

In another exemplary objective, a method is provided for switching modes of operation in a data processing terminal operating among at least three modes and granting different, comparable, similar, or same access authorities to each of such modes. In one exemplary embodiment of this objective, a method may include the steps of setting or defining a sequential, parallel, or hybrid hierarchy of such modes, allowing a user to run at least one operation in a $1^{st}$ of such modes, acquiring a mode-switching (user) sub-input from the user, and switching from the $1^{st}$ mode to a next of the modes successively along the hierarchy in response to the sub-input, thereby allowing the user to switch the modes along the hierarchy one mode at a time, as a user may provide multiple sub-inputs one at a time. In another exemplary embodiment of this objective, a method may include the steps of matching each of such multiple modes with each of multiple mode-switching (user) sub-inputs, allowing a user to run at least one operation in a $1^{st}$ of the modes, acquiring a certain mode-switching (user) sub-input from a user, finding a certain mode which is matched to the certain sub-input, and switching from the $1^{st}$ of such modes directly to the certain mode in response to the sub-input, thereby allowing the user to switch directly to a mode which matches a sub-input supplied by the user. Accordingly, the method may perform the above step(s) [1] while (optionally) running an erase operation, [2] without turning a display unit off and thereafter turning on the display unit before, during, or after such switching, [3] while (optionally) turning off a display unit and then turning the unit on before or during such switching, [4] without running any additional operation between such acquiring and such switching, [5] (optionally) acquiring the sub-inputs with different mode-switching input units, or the like.

In another exemplary objective, a method is provided for switching modes of operation in a data processing terminal which may include a mode-switching input unit, operate between at least one unlock mode and at least one lock mode, and grants more access authorities to a user operating in the unlock mode than to another user operating in the lock mode. In one exemplary embodiment of this objective, the method includes the steps of allowing a user to run at least one operation in a lock mode, receiving a mode-switching (user) sub-input with a mode-switching input unit, and running a mode-switching operation in response to the sub-input for switching from the lock mode to the unlock mode, while erasing results which are related to such an operation (immediately) before, concurrently with, (immediately) after, or within a certain period after such switching. In another exemplary embodiment of this objective, the method may include the steps of allowing a user to run at least one operation in an unlock mode, receiving a mode-switching (user) sub-input with a mode-switching input unit, running a mode-switching operation in response to the sub-input for switching from the unlock mode to the lock mode, or the like. In either of the above embodiments, the method may perform the above step(s) [1] without turning a display unit off and then turning the unit on before, during, or after such switching, [2] while (optionally) turning a display unit off and then turning it on again before or during such switching, or [3] without running any additional operation between such running and such switching.

In another exemplary objective, a method is provided for switching modes of operation in a data processing terminal which includes a mode-switching input unit, operates between a first mode and a second mode, and grants different, comparable, similar, or identical access authorities to each of such modes. The method may include the steps of allowing a user to operate a terminal in a $2^{nd}$ mode, acquiring a $1^{st}$ mode-switching user sub-input from the user with an input unit, switching from the $2^{nd}$ mode to the $1^{st}$ mode in response to the $1^{st}$ sub-input, acquiring a $2^{nd}$ mode-switching user sub-input from the user with the input unit, and switching from the $1^{st}$ mode back to the $2^{nd}$ mode in response to the $2^{nd}$ sub-input, whereby the terminal may allow the user to switch the modes in an alternating manner as the user provides multiple sub-inputs one at a time. In either of such embodiments, the method may perform the above step(s) [1] while (optionally) running an erase operation, [2] without turning a display unit off and then turning the display unit on before, during, or after the switching, [3] while (optionally) turning a display unit off and then turning the unit on again before, during or after such switching, [4] without running any additional operation between such acquiring and such switching, or [5] acquiring the $1^{st}$ and $2^{nd}$ sub-inputs with different mode-switching input units.

In another exemplary objective, a method is provided for switching modes of operation in a data processing terminal which may include at least one mode-switching input unit, operate between at least three modes, grant different, comparable, similar, or identical access authorities to each of such modes. In one exemplary embodiment of this objective, a method may include the steps of setting or defining a sequential, parallel, or hybrid hierarchy of the modes, allowing a user to run at least one operation in a $1^{st}$ of such modes, acquiring a mode-switching (user) sub-input from the user, and switching from the $1^{st}$ of such modes to a next of such modes along the hierarchy in response to the (user) sub-input, thereby allowing the user to switch the modes along the hierarchy one mode at a time as the user provides multiple mode-switching (user) sub-inputs one at a time. In another exemplary embodiment of this objective, a method may include the steps of matching each of multiple modes with each of multiple mode-switching (user) sub-inputs, allowing a user to run at least one operation in a $1^{st}$ of such modes, acquiring a certain mode-switching (user) sub-input from the user with an input unit, finding a certain mode which is matched to the certain sub-input, and switching from the $1^{st}$ of the modes directly to the certain mode in response to the (user) sub-input, thereby allowing a user to switch directly to a specific mode which matches a (user) sub-input supplied by the user. In either embodiment, the method may perform the above step(s) [1] while running such erasure, [2] without turning a display unit off and then turning it on before, during, or after such switching, [3] while turning a display unit off and then turning the display unit on again before or during such switching, [4] without running any additional operation between such acquiring and such switching, [5] acquiring the sub-inputs with different mode-switching input units, or the like.

Unless otherwise defined in this specification, all technical and scientific terms used herein have the same meaning as commonly understood by one of ordinary skill in the art to which such data processing terminals, methods of manufacturing and using such terminals, and sequences used in such terminals and methods belong. Although various other structures, methods, and sequences equivalent or similar to those described throughout this disclosure may be used in practicing and/or testing such terminals, methods, and sequences, suitable structures, methods, and sequences are to be described below. All publications, patent applications, patents or other references mentioned herein are incorporated by reference in their entirety. In case of any conflict, this disclosure, including definitions as provided above, will control. In addition, the structures, methods, and sequences are only illustrative and not intended to be limiting.

In another exemplary aspect of this disclosure, a method is provided to protect a data processing terminal which operates in each of an unlock mode and a lock mode and which includes a plurality of hardware and software elements. The method comprises the steps of: granting a user who operates the terminal in the lock mode with a first authority which allows the user to drive a first set of the elements; granting the user who operates the terminal in the unlock mode with a second authority which allows the user to drive a second set of the elements, wherein the second set includes more of such elements than the first set; driving the element of the first set in the lock mode, thereby obtaining first results; and switching from the lock mode to the unlock mode while erasing at least a portion of the first results after such obtaining, thereby preventing the first results from affecting the elements of the second set when the user operates the terminal in the unlock mode.

In one exemplary embodiment, the "driving the element" may comprise the steps of: displaying a graphical user interface of the element of the first set; receiving a user input applied to the interface by sad user; and performing the driving in response to the receiving.

In another exemplary embodiment, the "receiving" may include sensing user's manipulating of the interface, and where the manipulating may comprise one of the steps of: pressing at least a portion of the interface; pressing at least a portion of the interface with a user's body part and moving the body part over the portion while maintaining the pressing; touching at least a portion of the interface; and touching at least a portion of the interface with a user's body part and moving the body part over the portion while maintaining the touching.

In another exemplary embodiment, the "driving the element" may comprise one of the steps of: driving a file viewer application; driving an image viewer application; and driving a web browser application.

In another exemplary embodiment, the "driving the element" may lead to running an operation, and where the "running" may comprise one of the steps of: displaying a file; displaying an image; playing sound; connecting to a website, or the like.

In another exemplary embodiment, the "obtaining" may comprise one of the steps of:

obtaining the first results after connecting to a uniform resource locator; obtaining the first results by downloading a first file from the website; obtaining the first results by downloading a second file attached to a message; obtaining the first results by downloading a third file attached to an email; and obtaining the first results by opening one of the first, second, and third files.

In another exemplary embodiment, the "obtaining" is followed by one of the steps of: providing a lock memory unit and storing the first result in the lock memory unit; and temporarily keeping the first result in a temporary memory sector of the terminal.

In another exemplary embodiment, the "erasing" may comprise one of the steps of: erasing the portion but not an entire portion of the first result; and erasing an entire portion of the first result.

In another exemplary embodiment, the "erasing" may comprise one of the steps of: erasing the portion of the first result in the lock mode; and erasing the portion of the first result in the unlock mode.

In another exemplary embodiment, the "erasing" may comprise one of the steps of: erasing the portion of the first result before the switching; erasing the portion of the first result concurrently with the switching; erasing the portion of the first result immediately the switching; erasing the portion of the first result before the user provides another user input; and erasing the portion of the first result concurrently with receiving another user input from the user.

In another exemplary embodiment, the method may further comprise the steps of: driving the element of the second set in the unlock mode, thereby obtaining second results; and switching from the unlock mode to the lock mode without erasing the second results.

In another exemplary embodiment, the method may further comprise the steps of: providing an intermediate mode in which the terminal operates; and granting the user who operates the terminal in the intermediate mode with a third authority which allows the user to drive a third set of the elements, where the third set includes more of the elements than the first set but includes less of the elements than the second set.

In another exemplary embodiment, the method may further comprise the steps of: driving the element of the third set in the intermediate mode, thereby obtaining third results; and switching from the intermediate mode to the unlock mode while erasing at least a portion of the third results after the obtaining, thereby preventing the third results from affecting the elements of the second set when the user operates the terminal in the unlock mode.

In another exemplary aspect of this disclosure, a method is provided to protect a data processing terminal which operates in each of an unlock mode and a lock mode and which includes a display unit and a plurality of hardware and software elements, The method may comprise the steps of: granting a user who operates the terminal in the lock mode with a first authority which allows the user to drive a first set of the elements; granting the user who operates the terminal in the unlock mode with a second authority which allows the user to drive a second set of the elements, where the second set includes more of the elements than the first set; driving the element of the second set in the unlock mode, thereby obtaining second results; and switching from the unlock mode to the lock mode simply by receiving a single user input from a user, without requiring the user to turn off and then to turn on the display unit.

In one exemplary embodiment, the "granting" may comprise the steps of: displaying on the display unit a first set of graphical user interfaces which represent the elements of the first set in the lock mode, thereby allowing the user to drive the elements of the first set as the user provides a first user input to each of the elements of the first set; and displaying on the display unit a second set of graphical user interfaces which represent the elements of the second set in the unlock mode, thereby allowing the user to drive the elements of the second set as the user provides a second user input to each of the elements of the second set, where the display unit displays more of the interfaces in the unlock mode than in the lock mode, thereby granting the second authority in the unlock mode which is greater than the first authority in the lock mode.

In another exemplary embodiment, the "receiving" may include sensing user's manipulating of the interface, and where the "manipulating" may comprise one of the steps of: pressing at least a portion of the interface; pressing at least a portion of the interface with a user's body part and moving the body part over the portion while maintaining the pressing; touching at least a portion of the interface; and touching at least a portion of the interface with a user's body part and moving the body part over the portion while maintaining the touching.

In another exemplary aspect of this disclosure, a method is provided to protect a data processing terminal, where the terminal operates in each of a lock mode and an unlock mode, where the terminal includes a display unit, at least one lock element, and at least one main element, where the terminal is capable of displaying on the display unit at least one lock interface in the lock mode and at least one main interface in the unlock mode, where a terminal drives the lock element in the lock mode in response to a first user input provided to the lock interface, where a terminal drives the main element in the unlock mode in response to a second user input provided to the main interface, and where the terminal displays on the display unit a greater number of the main interfaces in the unlock mode than displaying the lock interfaces in the lock mode. The method may comprise the steps of: displaying the lock interface on the display unit in the lock mode; driving the lock element in the lock mode in response to the first user input provided by a user; running a lock operation with the lock element in the lock mode in response to the driving, thereby obtaining results after the running; and switching from the lock mode to the unlock mode while erasing at least a portion of the results after the obtaining, thereby preventing the results from affecting one of the main element and the terminal.

In one exemplary embodiment, the "displaying" and "driving" may comprise the steps of: displaying a graphical user interface as the lock interface; receiving the first user input from manipulating of the graphical user interface by the user; locating at least one of a lock hardware element and a lock software element which is designated by the graphical user interface; and driving the at least one of the lock hardware and software elements.

In another exemplary embodiment, the "manipulating" may comprise one of the steps of: pressing at least a portion of the graphical user interface; pressing at least a portion of the graphical user interface with a user's body part and moving the body part over the portion while maintaining the pressing; touching at least a portion of the graphical user interface; and touching at least a portion of the graphical user interface with a user's body part and moving the body part over the portion while maintaining the touching.

In another exemplary embodiment, the "driving" may comprise one of the steps of: driving a file viewer; driving an image viewer; and driving a web browser.

In another exemplary embodiment, the "running" may comprise one of the steps of: displaying a file; displaying an image; playing sound; and connecting to a website.

In another exemplary embodiment, the "obtaining" may comprise one of the steps of: obtaining the results after connecting to a uniform resource locator; obtaining the results by downloading a first file from the website; obtaining the results by downloading a second file attached to a message; obtaining the results by downloading a third file attached to an email; and obtaining the results by opening one of the first, second, and third files.

In another exemplary embodiment, the "obtaining" may be followed by one of the steps of: providing a lock memory unit and storing the result in the lock memory unit; and temporarily keeping the result in a temporary memory sector of the terminal.

In another exemplary embodiment, the "erasing" may comprise one of the steps of: erasing the portion but not an entire portion of the result; and erasing an entire portion of the result.

In another exemplary embodiment, the "erasing" may comprise one of the steps of: erasing the portion of the result in the lock mode; and erasing the portion of the result in the unlock mode.

In another exemplary embodiment, the "erasing" may comprise one of the steps of: erasing the portion before the switching; erasing the portion concurrently with the switching; erasing the portion immediately after the switching; erasing the portion before the user provides an additional user input; and erasing the portion concurrently with receiving an additional user input from the user.

In another exemplary embodiment, the method may further comprise the steps of: displaying the main interface on the display unit in the unlock mode; driving the main element in the unlock mode in response to the second user input provided by a user; running an unlock operation with the unlock element in the unlock mode in response to the driving, thereby obtaining additional results after the running; and switching from the unlock mode to the lock mode without erasing the additional results.

In another exemplary embodiment, the terminal may additionally operate in an intermediate mode, where the terminal includes at least one intermediate element, where the terminal is capable of displaying on the display unit at least one intermediate interface, where the terminal displays on the display unit a preset number of the intermediate interfaces in the intermediate mode, and where the preset number is less than a first number of the main interfaces displayed in the unlock mode but greater than a second number of the lock interfaces displayed in the lock mode.

In another exemplary embodiment, the method may further comprise the steps of: displaying the intermediate interface on the display unit in the intermediate mode; driving the intermediate element in the intermediate mode in response to fourth user input provided to the intermediate interface by the user; running an intermediate operation with the intermediate element in the intermediate mode in response to the driving, thereby obtaining additional results after the running; and switching from the intermediate mode to the unlock mode while erasing at least a portion of the additional results after the obtaining, thereby preventing the additional results from affecting one of the main element and the terminal.

In another exemplary aspect of this disclosure, a method may be provided to protect a data processing terminal, where the terminal operates in each of a lock mode and an unlock mode, where the terminal includes a display unit, at least one lock element, and at least one main element, where the terminal is capable of displaying on the display unit at least one lock interface in the lock mode and at least one main interface in the unlock mode, where a terminal drives the lock element in the lock mode in response to a first user input provided to the lock interface, where a terminal drives the main element in the unlock mode in response to a second user input provided to the main interface, and where the terminal displays on the display unit a greater number of the main interfaces in the unlock mode than displaying the lock interfaces in the lock mode. The method may comprise the steps of: displaying the lock interface on the display unit in the lock mode; receiving a first user input from a user; allowing the user to drive the lock element in the lock mode in response to the first user input; allowing the user to run a lock operation with the lock element in the lock mode in response to driving the lock element, thereby obtaining results after running the lock operation; and allowing the user to switch from the lock mode to the unlock mode while erasing at least a portion of the results after the obtaining, thereby preventing the results from affecting one of the main element and the terminal.

In another exemplary aspect of this disclosure, a method may be provided to protect a data processing terminal, where the terminal operates in each of a lock mode and an unlock mode, where the terminal includes a display unit, at least one lock element, at least one main element, and at least one mode-switching input unit, where the terminal is capable of displaying on the display unit at least one lock interface in the lock mode and at least one main interface in the unlock mode, where a terminal drives the lock element in the lock mode in response to a first user input provided to the lock interface, where a terminal drives the main element in the unlock mode in response to a second user input provided to the main interface, and where the terminal displays on the display unit a greater number of the main interfaces in the unlock mode than displaying the lock interfaces in the lock mode. The method may comprise the steps of: displaying the main interface on the display unit in the unlock mode; driving the main element in the unlock mode in response to the second user input provided by a user; running a main operation with the main element in the unlock mode in response to the driving; receiving a third user input provided to the mode-switching input unit by the user; and switching from the unlock mode to the lock mode in response to the third user input, without requiring the user to provide an additional user input.

In one exemplary embodiment, the "displaying" and "driving" may comprise the steps of: displaying a graphical user interface as the main interface; receiving the second user input from manipulating of the graphical user interface by the user; locating at least one of a main hardware element and a main software element which is designated by the graphical user interface; and driving the at least one of the main hardware and software elements.

In another exemplary embodiment, the "manipulating" may comprise one of the steps of: pressing at least a portion of the graphical user interface; pressing at least a portion of the graphical user interface with a user's body part and moving the body part over the portion while maintaining the pressing; touching at least a portion of the graphical user interface; and touching at least a portion of the graphical user interface with a user's body part and moving the body part over the portion while maintaining the touching.

In another exemplary embodiment, the "receiving" may comprise one of the steps of: pressing at least a portion of the mode-switching input unit; pressing at least a portion of the mode-switching input unit with a user's body part and moving the body part over the portion while maintaining the pressing; touching at least a portion of the mode-switching input unit; touching at least a portion of the mode-switching input unit with a user's body part and moving the body part over the portion while maintaining the touching; and moving the mode-switching input unit in a preset direction.

In another exemplary aspect of this disclosure, a data processing terminal may operate between a lock mode and an unlock mode, and may comprise a display unit: at least one lock element; and multiple main elements. The terminal may display a lock user interface for the lock element on the display unit in the lock mode, while displaying another plurality of main user interfaces for the plurality of the main elements on the display unit in the unlock mode. In response to receiving a first user input provided to the lock user interface by a user, the terminal is capable of driving the lock element and obtains results from the driving in the lock mode. In response to receiving a second user input provided to the main user interfaces by the user, the terminal is capable of driving the main elements in the unlock mode. The terminal may display a greater number of the main user interfaces in the unlock mode on the display unit than displaying the lock user interface in the lock mode. The terminal may erase at least a portion of the results in response to switching from the lock mode to the unlock mode.

In one exemplary embodiment, the lock element may include at least one of: a file viewer; an image viewer; and a web browser.

In another exemplary embodiment, the lock element may include at least one of: a viewer application; a first set of a viewer application and a driver for the application; a second set of a viewer application and a lock memory unit; a third set a lock memory unit and a lock CPU unit; a fourth set of a lock memory unit and a lock O/S; and a fifth set of a lock memory unit, a lock CPU unit, and a lock O/S.

In another exemplary embodiment, the user interface may include one of: a touch user interface; a graphical user interface; a text-based user interface; an object-oriented user interface; an application-oriented user interface; and a direction manipulation user interface.

In another exemplary embodiment, the lock element may include at least one of: a hardware element which also corresponds to the main element; a hardware element which is different from the main element; a software element which also corresponds to the main element; and a software element which is different from the main element.

In another exemplary embodiment, the terminal may prevent the user from driving the lock element when the terminal operates in the unlock mode. In another exemplary embodiment, the terminal may prevent the user from driving the main element when the terminal operates in the lock mode.

In another exemplary embodiment, the results may include one of: data stored and retrieved from the lock element; data stored and retrieved from the main element; data downloaded from a website; data downloaded from a message; data downloaded from an email; and obtaining the results by opening one of the first, second, and third files.

In another exemplary embodiment, the results may include one of: a list of web-sites visited by the user in the lock mode; a list of data processed by the user in the lock mode; a list of data downloaded by the user in the lock mode; a list of uniform resource locators selected by the user in the lock mode; a list of operations run by the terminal in the lock mode; a list of data stored into the lock element in the lock mode; a list of data retrieved from the main element in the lock mode; and a list of data erased in the lock mode.

In another exemplary embodiment, the terminal may erase the portion of the results in one of multiple timings which may include: before the switching; concurrently with the switching; immediately after the switching; before the user provides an additional user input; and concurrently with receiving an additional user input from the user.

In another exemplary embodiment, the terminal may erase the portion of the results while operating in one of the lock mode and the unlock mode.

In another exemplary embodiment, the terminal may erase the portion of the results which reside in at least one of: a temporary memory sector of the terminal; a memory space in the lock element; and a memory space in the main element.

In another exemplary aspect of this disclosure, a data processing terminal may operate between a lock mode and an unlock mode, and may comprise a display unit: at least one lock element; a plurality of main elements; and at least one mode-switching input unit, where the terminal may display a lock user interface for the lock element on the display unit in the lock mode, while displaying another plurality of main user interfaces for the plurality of the main elements on the display unit in the unlock mode, where, in response to receiving a first user input provided to the lock user interface by a user, the terminal is capable of driving the lock element and obtains results from the driving in the lock mode, where, in response to receiving a second user input provided to the main user interfaces by the user, the terminal is capable of driving the main elements in the unlock mode, where the terminal displays a greater number of the main user interfaces in the unlock mode on the display unit than displaying the lock user interface in the lock mode, and where the terminal is capable of switching from the unlock mode to the lock mode in response to a single third user input provided to the mode-switching input unit by the user.

DETAILED DESCRIPTION

This disclosure relates to various data processing terminals which enable a user to access any website of his or her choice, to download any contents therefrom, and to open any downloaded contents, while not having to worry about any malicious virus which may have been impregnated into such contents and which may migrate into the user's terminals.

Most importantly, various data processing terminals of this disclosure provide their users with the enhanced security, the improved integrity, and the better data protection, while maintaining or improving a convenience of seamless operations by employing at least "four features" which may be "independent" of each other or may be "interdependent" on each other, based upon configurational or operational characteristics of a terminal or upon such characteristics of various hardware or software elements of a main system of a terminal.

The first of such features is to provide a user with "at least two different modes" of operation each of which is granted with different access authority to drive a hardware or software element of a main system. As a result, a user may operate a terminal in one mode such as an unlock mode when a user processes reliable data, but may operate a terminal in another mode such as a lock mode when a user processes unreliable data. The second of such features is the "physical isolation" or "operational isolation" of a main (or lock) system from a lock (or main) system of a terminal.

The third of such features is the "erase (or semi-erase) operation" with which a terminal can erase all (or some) results obtained by running various lock operations with a lock system in a lock mode before such results may affect any hardware or software element of a main system of a terminal. To this end, a terminal may run an erase (or semi-erase) operation in one of various timings as defined above. Finally, the fourth of such features is the inclusion of a "mode-switching input unit" with which a user may conveniently switch from one mode to another mode, simply by providing a terminal with a user input which includes at least one mode-switching (user) sub-input, and without having to turn off a display unit of a terminal and then to turn it on again.

Beginning with the "first" of such features, a data processing terminal of this disclosure operates in a hierarchy which may define "multiple modes of operation" therein. In addition, a terminal may operate in each of such multiple modes examples of which may include [1] at least one lock mode in which a terminal operates a lock system, [2] at least one unlock mode in which a terminal operates an unlock system, and [3] at least one optional intermediate mode in which such a terminal operates an optional intermediate system.

A lock mode is a mode [1] in which a lock system runs various lock operations, and [2] to which a terminal grants such access authority enough to drive the least number of various hardware or software elements of a main system of a terminal. Accordingly, a lock mode corresponds to a mode which is granted with the least access authority. In contrary, an unlock mode is a mode [1] in which an unlock system runs various unlock operations and [2] to which a terminal grants such access authority enough to drive the greatest number of such hardware or software elements of a main system of a terminal. Therefore, an unlock mode corresponds to a mode which is with the greatest access authority.

A terminal may set up another hierarchy in which various modes are arranged in a parallel or series manner, but in which at least two modes are granted with completely non-overlapping access authorities. Therefore, a terminal may drive entirely different hardware or software elements in each of such modes. Similarly, at least two modes may be granted with access authorities which partly overlapping access authorities. Accordingly, a terminal [1] may drive a $1^{st}$ of such elements in both modes, but [2] may drive a $2^{nd}$ of such elements in one of such modes but not in the other of such modes.

A terminal may rather operate in a hierarchy which may define multiple lock (or unlock) modes. In this case, a terminal may include multiple lock (or unlock) systems, and may grant multiple lock (or unlock) modes with the same, similar, or different access authorities in such a way [1] that a single user may use each of such modes for different purposes, or [2] that multiple users can operate a single terminal one at a time, e.g., by ensuring each user to run operations only in his or her own modes but not in other users' modes. Accordingly, a terminal may enhance its security, improve its integrity, and ensure privacy of each user's data stored therein.

A data processing terminal of this disclosure may operate in a hierarchy which additionally defines at least one intermediate mode therein. In this case, a terminal may also include at least one intermediate system which operates in the intermediate mode. A terminal may grant an intermediate mode with access authority which is less than that of an unlock mode but greater than that of a lock mode. A terminal may also set up at least one hierarchy in which at least one lock mode, at least one intermediate mode, and at least one unlock mode are arranged in a parallel or series manner such that a user may switch from one mode to another in an order as provided in the hierarchy. Therefore, when a user provides a user input which includes a mode-switching (user) sub-input, a user may switch modes along the hierarchy in a forward direction (i.e., from one mode with less access authority to another mode with greater access authority) or in a backward direction (i.e., from one mode with greater access authority to another mode with less access authority).

It is appreciated that this disclosure provides various exemplary aspects and their exemplary embodiments in which a data processing terminal operates in a hierarchy which defines at least one unlock mode and at least one lock mode. However, such aspects and embodiments are readily applicable to other terminals which may operate in another hierarchy which defines at least one intermediate mode along with such lock and unlock modes.

As to the "second feature," a data processing terminal of this disclosure can achieve the enhanced security, the improved integrity, and the better data protection, while maintaining a convenience of seamless operations by including at least one main system and at least one lock system therein and by "isolating" at least a portion of a main (or lock) system from at least a portion of a lock (or main) system either "completely" or "partly." Therefore, whatever websites a user may access with a lock system in a lock mode or whichever contents a user may download or open with a lock system in a lock mode, a terminal may prevent any virus impregnated in such contents from adversely affecting the main system due to such isolation.

In other words, even when malicious viruses successfully land into a lock system while a user runs various lock operations with a lock system in a lock mode, such viruses cannot migrate into a main system anyway and cannot adversely affect any hardware or software element of the main system due to such isolation. As a result, a terminal can enhance the security of its main system, improve the integrity of its main system, and heighten the protection of precious data stored in the main system.

As to the "third feature," to achieve the enhanced security, improved integrity, and tightened data protection while maintaining a convenience of seamless operations, a data processing terminal of this disclosure may "run an erase (or semi-erase) operation" and erase such malicious viruses or codes which may have migrated into a lock system in a lock mode, preferably before a main system of a terminal may contact such viruses or codes. Accordingly, such viruses or codes cannot adversely affect any hardware or software element of the main system.

To this end, a lock system may run an erase (or semi-erase) operation in a lock mode and erase such malicious viruses or codes which may be included in such results which are in turn obtained by running lock operations with a lock system in a lock mode. Alternatively, a main system may run an erase (or semi-erase) operation in an unlock mode and erase such viruses or codes included in such results. Accordingly, whatever websites a user may access or whichever contents a user may download or open with a lock system in a lock mode, a terminal may prevent any virus impregnated in such contents from adversely affecting the main system due to such erase (or semi-erase) operation.

Because a data processing terminal of this disclosure operates in each of multiple modes, a user may have to frequently switch from one mode to another. Accordingly, in the "fourth feature," a data processing terminal of this disclosure may incorporate at least one "mode-switching input unit" to maintain a convenience of seamless operations, while also achieving the enhanced security, the improved integrity, and the better data protection.

A mode-switching input unit is an input unit which is specifically designated to receive a user input which in turn includes a mode-switching (user) sub-input therein. Upon receiving the user input, such an input unit may acquire the sub-input using its sensor, may generate a control signal, and then may send the control signal to a main CPU or a main O/S. Based thereon, a terminal may switch from a current mode to a new mode which matches the sub-input.

A mode-switching input unit may be provided as a prior art hard button (e.g., a button or a switch), a prior art soft-key, or a prior art soft button (e.g., a GUI displayed on a display unit). Alternatively, a mode-switching input unit may be incorporated into a main input unit, thereby forming a unitary article.

Disclosed hereinafter include various exemplary aspects, exemplary embodiments, and detailed examples of data processing terminals of this disclosure, where such terminals may operate in multiple modes of operation to provide their users with the enhanced security, improved integrity, and heightened privacy of personal data stored therein. More particularly, this disclosure relates to various configurational and operational features of such terminals and to various methods of constructing or using such terminals in various hierarchies of multiple modes of operation. This disclosure also relates to methods of driving various hardware or software elements of a main system of such a terminal.

It is appreciated that this disclosure is provided with reference to accompanying drawings and text, in which such exemplary aspects, embodiments or examples only represent different forms. However, such terminals and various methods related thereto may also be embodied in many other different configurations, structures, methods, processes, or sequences in such a way that they should not be limited to various exemplary aspects and embodiments as set forth hereinabove and hereinafter. Rather, such exemplary aspects and embodiments described herein are provided so that this disclosure will be thorough and complete, and fully convey the scope of such terminals, methods, processes or sequences to one of ordinary skill in the relevant art.

It is appreciated that, unless otherwise specified, various systems, units, elements, portions, or parts of various data processing terminals are not typically drawn to proportions or scales in the accompanying figures for ease of illustration. It is also appreciated that such systems, units, elements, portions, or parts of such terminals as well as their operations, steps, and sequences designated by the same numerals in the accompanying figures represent the same, similar or functional equivalent systems, units, elements, portions, parts, operations, steps, and sequences, respectively.

Reference is made to accompanying drawings which show, by way of illustration, various exemplary aspects or embodiments in which various data processing terminals may be constructed and various methods related to such terminals may be practiced. It is appreciated that numerals appearing between parentheses "(" and ")" such as, e.g., (10) or (60), in this disclosure represent those systems, units, elements, portions, or parts which appear in the drawings.

It is appreciated that various exemplary aspects and embodiments of such data processing terminals of this disclosure, although different, are not necessarily mutually exclusive. That is, a particular feature, structure, operation, function, method, sequence or characteristic of such terminals described herein in connection with one exemplary aspect or embodiment may also be implemented into another aspect or embodiment of this disclosure, within the extent of not contradicting each other, and without departing from a spirit and a scope of such terminals throughout this disclosure, subject to a certain modification, addition or omission each of which becomes apparent based on detailed contexts.

It is also appreciated that an arrangement or a position of each system, unit, element, portion, or part of various exemplary aspects or embodiments of this disclosure may also be modified to certain extents without departing from the spirits and scopes of other exemplary terminals of this disclosure. Accordingly, the following detailed description is not to be taken to limit the scope of various terminals for providing multiple different modes of operation while ensuring the enhanced security, improved integrity, and better data protection, not to mention seamless capabilities provided by such terminals. The scope of such terminals and methods are defined only by appended claims that should be appropriately interpreted in a full range of equivalents to which such claims are entitled. In the drawings, like reference numerals identify like or similar elements or functions through the several views.

Hereinafter, exemplary aspects and embodiments of various data processing terminals of this disclosure will be explained in detail in both hardware and software perspectives and with reference to the accompanying drawings so that those skilled in the art can easily understand and use such terminals, can manufacture such terminals, and can perform such sequences of various operations and steps for such terminals, or the like.

4. 1st Configuration—Lock System with a Lock Viewer

In the first exemplary aspect of this disclosure which corresponds to the $1^{st}$ Configuration of this disclosure, a data processing terminal includes at least one main system and at least one lock system. A main system typically includes at least one [1] main CPU unit, [2] main input unit, [3] main output unit, [4] main memory unit, and other optional main units, where a main output unit may include at least one display unit for displaying static or dynamic images thereon, or at least one speaker for generating sounds. To the contrary, a lock system includes at least one lock viewer and an optional lock memory unit, where this lock system may be viewed to have one of the simplest configurations. It is appreciated that each of the above units of a main (or lock) system may include or may be associated with at least one hardware or software element of a main (or lock) element to run certain operations, thereby performing specific functions assigned to each of such units.

4-1. 1st Configuration—Main System

In one exemplary embodiment of the first exemplary aspect of this disclosure, a terminal includes at least one main system which in turn includes various main units each of which may include therein at least one hardware or software element. A software element may be embedded into the hardware element or may be provided as separate codes of computer programs.

Figure 5A:
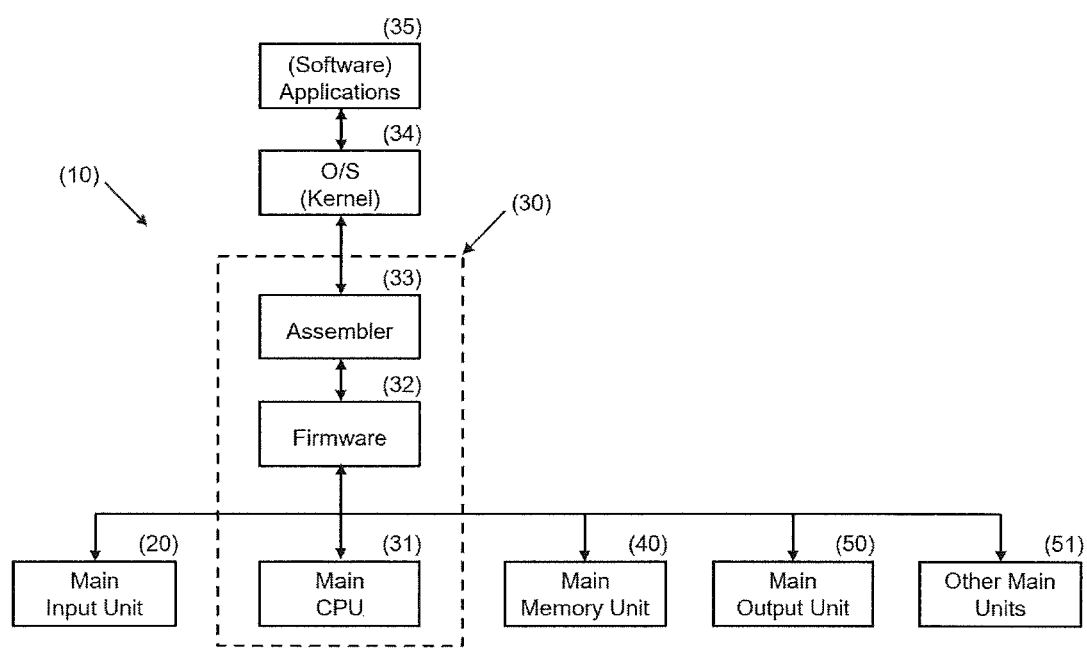
FIG. 5A is a block diagram of a main system of an exemplary data processing terminal including a lock viewer according to the first exemplary aspect of this disclosure.

FIG. 5A is a block diagram of a main system of an exemplary data processing terminal of this first exemplary aspect of this disclosure. In particular, FIG. 5A describes a main system in a context of multiple abstract layers, where an exemplary main system (10) includes therein at least one main CPU (31), at least one main firmware (32) (optional), at least one main assembler (33) (optional), at least one main input unit (20), at least one main memory unit (40), at least one main output unit (50), at least one main (software) application (35), at least one main operating system (i.e., or an O/S) (34) which may include at least one main kernel (optional), and other optional units (51).

Various lines which connect such units of FIG. 5A describe "paths" of physical or operational coupling between various units such as, e.g., a command signal, data transfer, manipulation, or the like. It is appreciated that such paths of FIG. 5A are only exemplary and that many other units may be connected by additional paths. For example, the main CPU (31) and the main O/S (34) may drive other units of FIG. 5A. Not all paths are included in this figure, however, for simplicity of illustration, and further paths among various units of the figure will to be explained in greater detail below.

A main CPU (i.e., a main central processing unit) (31) generally refers to an electronic circuitry which carries out instructions of a computer program by performing basic arithmetic, logical, control, and/or I/O operations as specified by such instructions. The main CPU (31) may be fabricated as a microprocessor, may instead be incorporated into a microcontroller, or may be formed as a system-on-a-chip (SoC) which may also include therein a memory part, a peripheral interface, or the like.

A main firmware (32) is a kind of prior art software or (software) application which may provide control, data monitoring, or data manipulation to many engineered parts (or portions) of various hardware elements of a main system (10) of the terminal. The main firmware (32) may be incorporated into various prior art parts of a terminal such as, e.g., an input unit, a touchscreen, a camera, or a display panel. A main assembler (33) is another type of software or (software) application creating an object code, e.g., by translating combinations of various mnemonics and syntax for operations and addressing modes into their numerical equivalents. The main assembler (33) may calculate a constant expression and resolve a symbolic name for memory locations, and may store tedious calculations and manual address updates after program modifications.

A main O/S (34) refers to a "system software" which can manage various hardware or software elements and other elements of a main system (10). The main O/S (34) provides common services to computer programs. That is, every computer program, except the main firmware (32), may require the O/S (34) to run operations and to perform their intended functions. In addition, a main O/S (434) with time-sharing features may schedule tasks for efficient use of the main system (10), and may include an accounting software for cost allocation of processor time, mass storage, printing, or other resources. A main O/S (34) may also serve as an intermediary between various software and hardware elements for performing various functions such as, e.g., memory allocation, I/O (input-output) hardware functions, or the like.

In relation to the main O/S (34), a main kernel is a computer program which may have a complete control over (almost) everything which is processed or executed in the main system (10). In this context, the main kernel may be deemed as a central core of the main O/S (34). Therefore, the main kernel is the first program loaded on a startup of a terminal, and then manages the remainder of the startup such as, e.g., I/O requests by various software elements, translating them into data processing instructions for the main CPU (31), or the like. The main kernel is responsible for managing a main memory unit (40) and for managing and communicating with various prior art computing peripheries such as, e.g., a printer, an external speaker, and an external monitor. The main kernel may also manage and communicate with other external electrical devices to which a terminal may be operatively coupled either by wire or wirelessly, where examples of such devices may include, but not limited to, an electrical device included in an IoT network, another terminal, another computer, a vehicle or an automobile, a motor cycle, a robot, a drone, a weapon with at least minimum electrical circuits, or the like.

A main kernel may connect various software elements of a main system (10) (including software applications). Critical codes of such a kernel are usually loaded into a protected sector of memory, thereby preventing such codes from being overwritten by other, less frequently used parts of the main O/S (34) or various applications residing therein. The main kernel typically performs its tasks (e.g., executing programs and handling interrupts) in a "kernel space," whereas everything a user normally performs (e.g., writing text in a text editor or executing programs in a GUI) is done in a "user space," thereby preventing interference between user data and kernel data and resulting diminished performance and instability. When a process makes request of the main kernel, the request is called a "system call." Various kernel designs differ in how they may manage the system calls and resources.

Figure 5B:
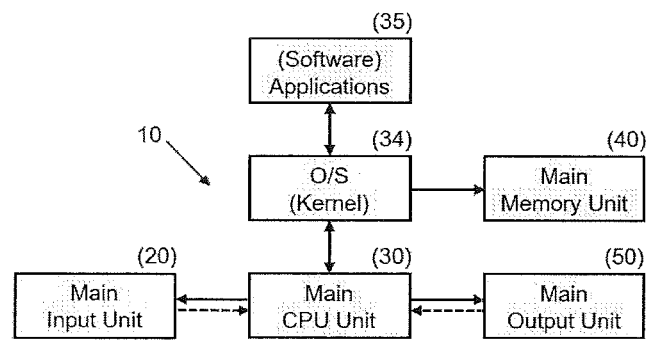
FIG. 5B is a simplified block diagram of the main system of FIG. 5A.

FIG. 5B is a simplified block diagram of the main system of FIG. 5A. As shown in the figure and for illustration purposes, a main "CPU unit" (30) may collectively refer to the main CPU (31), the main firmware (32), and the main assembler (33), as encircled by a dotted line in FIG. 5A. It is appreciated that such hardware and software elements of the main CPU unit (30) are identical or similar to those commonly found in prior art data processing devices such as, e.g., mobile phones or smart-phones and, therefore, other features of such elements are omitted herein.

As a result and as exemplified in FIG. 5B, the main system (10) includes at least one main CPU unit (30), at least one main O/S (34), at least one main (software) application (35), at least one main input unit (20), at least one main output unit (50), and at least one main memory unit (40). Although not included in the figure, the main system (10) may further include other optional units which are omitted for simplicity of illustration.

Still referring to FIG. 5B, the main memory unit (40) may include at least one conventional non-volatile memory element or at least one volatile memory element. When desirable, a terminal may be configured to releasably couple with an external memory unit or card (e.g., an add-on device) in such a way that the main CPU unit (31) or the main O/S (34) may drive the main memory unit (40) as well as the add-on, external memory unit, and may store various data into one or both of such units.

In addition, other units may be similarly configured such that they can releasably couple with an external unit. For example, when a terminal runs a DNA authentication operation, an additional input unit may be added to a terminal to perform a DNA analysis. Other units of the main system (10) such as, e.g., the main input unit (20) and the main output unit (50) may be similar or identical to those commonly found in conventional mobile phones or smart-phones and, accordingly, detailed configurations or operational characteristics of such units (20), (50) are omitted herein for simplicity of illustration.

Unless otherwise specified, a terminal is deemed to be able [1] to operate a lock system (60) in a lock mode, [2] to operate an unlock system (10) in an unlock mode, and [3] to optionally operate an intermediate system in an intermediate mode. By default, a lock system (60) is deemed to be able to drive all lock units and to be also able to drive all hardware and software (lock) elements of a lock system. In addition, a main system (10) is similarly deemed to be able to drive all main units and to be also able to drive all hardware and software (main) elements of a main system.

In addition, it is appreciated that a default isolation between a main system (10) and a lock system (60) is a complete isolation. Accordingly, a main system (10) may not drive any lock unit or any (lock) elements in an unlock mode. Similarly, a lock system (60) may not drive any main unit or any (main) elements in a lock mode. When a main system (10) and a lock system (60) is only partly isolated, however, a main system (10) may be able to drive at least one unit or all units of a lock system (60). However, unless otherwise specified, a lock system (60) is deemed to not be able to drive any unit or element of a main system (10).

4-2. 1st Configuration—Lock System

As described above, the exemplary data processing terminal of FIGS. 5A and 5B includes at least one main system (10) which also includes various units therein. In another exemplary embodiment of the first exemplary aspect, such a data processing terminal also includes at least one lock system (60).

Figure 5C:
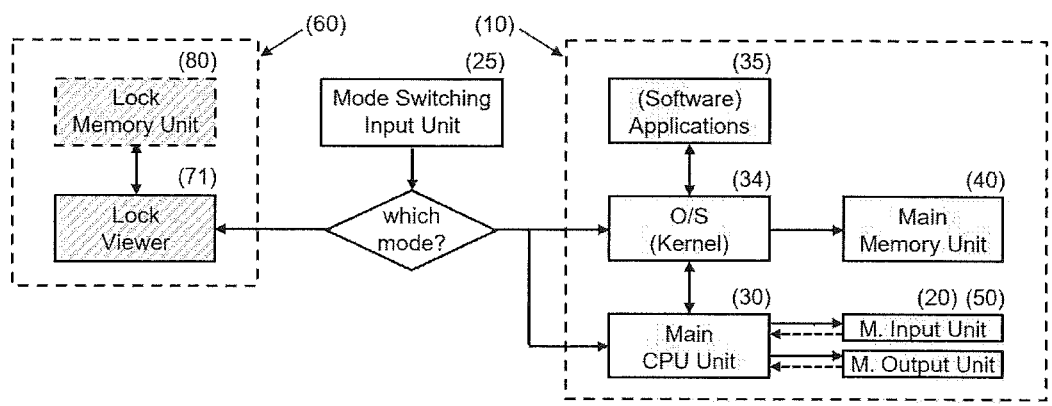
FIG. 5C is a block diagram of a lock system of the exemplary data processing terminal of FIGS. 5A and 5B.

FIG. 5C is a block diagram of an exemplary lock system of the exemplary data processing terminal of FIGS. 5A and 5B, where those units enclosed by a box on the right side of FIG. 5C correspond to the main system (10) of the terminal, and where a lock viewer (71) and an optional lock memory unit (80) enclosed by another box on the left side of FIG. 5C constitutes the lock system (60). In addition, the terminal also includes at least one mode-switching input unit (25) which may be viewed as a hardware element of the main system (10) or lock system (60).

It is appreciated that a lock system (60) of FIG. 5C with at least one lock viewer (71) and at least one optional lock memory unit (80) may be viewed as the one with the simplest configurations. Although not shown in FIG. 5C, a lock system (60) may include other optional lock units such as, e.g., at least one lock input unit, at least one lock output unit, or the like. It is also appreciated that, although many units of FIG. 5C are not connected to each other by any path with a single arrow or double arrows, such paths are omitted herein for simplicity of illustration. For example, a main CPU unit (30) may directly drive a main memory unit (40) or a lock viewer (71), a main O/S (34) may directly drive a lock viewer (71), a lock memory unit (80), or a main input or output unit (20), (50). Similarly, a main memory unit (40) and a lock memory unit (80) may operationally couple directly or indirectly with each other, and such units (40), (80) may exchange data. For the simplicity of illustration, however, additional paths representing such operational couplings are omitted herein.

A "lock viewer" (71) generally serves to run lock (or intermediate) operations in a lock (or intermediate) mode. More particularly, the lock viewer (71) may correspond to a software application capable of presenting data or files in a format friendly to a user. A lock viewer (71) may be a limited-functionality (software) application with which a user may not edit, create or modify any data or files. Therefore, a lock viewer (71) may include at least one format translator which may provide various views of data or files by handling, e.g., a different byte order, a code page, a newline style, or the like. A lock viewer (71) may also render HTML markup into a form which is human friendly, or may provide graphic files such as a thumbnail preview, a thumbnail creation, or an image zooming. Therefore, a lock viewer (71) may correspond to various prior art viewers or browsers, examples of which may include, but not limited to, [1] file viewers, [2] image viewers, [3] web browsers, or [4] other prior art viewers. The terminal may drive the lock viewer (71) in various ways such as, e.g., [1] by including a driver capable of driving the lock viewer (71), by using a main CPU unit (30) when a lock system (60) includes such, or [3] by using a main O/S (34). A lock system (60) may optionally include a lock CPU unit which may drive the lock viewer (71) as described in the following Sections 5 and 6.

When a main system (10) does not include any main (software) application which functions identical or similar to a lock viewer (71), there is no (or at most negligible) concern for any potential conflict or interference between the main and lock systems (10), (60), as far as a lock viewer (71) is concerned. However, when a main system (10) includes at least one (software) application which is identical or similar to the lock viewer (71), the software application in a main system (10) may be referred to as a "main viewer" in contrast to the lock viewer (71) of a lock system (60). In this case, the lock viewer (71) may be regarded as a limited-functionality viewer which is only driven by a lock (or intermediate) system (60) in the lock (or intermediate) mode, whereas the main viewer may serve as a full-functionality viewer which is driven by the main system (10) in an unlock mode.

In one example, the lock viewer (71) may display data which reside in a lock system (60), but may not display any data residing outside a lock system (60). That is, the lock viewer (71) may neither access the main memory unit (40), nor retrieve any data therefrom. In addition, a terminal may prevent the lock viewer (71) from storing results obtained by running lock (or intermediate) operations in the lock (or intermediate) mode into the main memory unit (40). In another example, the lock viewer (71) may access the main memory unit (40), retrieve an entire (or only a certain) portion of data therefrom, and display such data in the lock (or intermediate) mode. It is appreciated that a terminal may determine the capacity of the lock viewer (71) based on a hierarchy in which it operates, based on the user needs, or the like.

With such configurations, a terminal may entirely (or at least partly) prevent a lock system (60) from altering or otherwise adversely affecting not only a main memory unit (40) but also a main system (10) as a whole. As a result, a terminal may improve and maintain integrity or security of a main system (10), or may preserve privacy of user data stored in a main system (10). When desirable, a terminal may also run an erase (or semi-erase) operation, thereby removing an entire (or a selected) portion of results which are obtained by running lock (or intermediate) operations and which reside in the lock (or intermediate) system (60).

Even when a lock viewer (71) is a (software) application which does not reside in a main system (10), a terminal may still entirely (or at least partly) isolate the lock viewer (71) from the main system (10) [1] to improve integrity or security of the main system (10), [2] to preserve privacy of user data stored or residing in the main system (10), or [3] to run an erase or semi-erase operation in various erasure timings. When desirable, a terminal may also conditionally or adaptively allow a lock viewer (71) to access a main system (10), to retrieve all (or only certain) data from a main memory unit (40), to store all (or only selected) results obtained by running lock (or intermediate) operations by a lock (or intermediate) system (60) into a main memory unit (40), or the like. It is appreciated again that a terminal may determine the capacity of the lock viewer (71) based on a hierarchy in which it operates, based on the user needs, or the like.

When a main system (10) includes a main viewer, a terminal generally grants greater access authority to the main viewer than to the lock viewer (71) such that the lock viewer (71) can only display those data [1] stored or residing in the lock system (60) or [2] obtained from an external source, but cannot display any data stored in the main system (10). Alternatively, a terminal may grant greater access authority to a lock viewer (71) (than a main viewer), where such access authority may relate to [1] accessing a main memory unit (40) of a main system (10), [2] accessing another unit of a main system (10), [3] accessing an external source of other data via an internet or other networks, [4] connecting to an external link via an internet or other networks, [5] driving a certain hardware or software element of a main system (10), or the like. As a result, the lock viewer (71) of this arrangement may even be able to access all data stored in the main memory unit (40) or other units of the main system (10), while running operations in the lock (or intermediate) mode, although such an arrangement may generally ne a rare case.

When a terminal runs such erasure (or semi-erasure) upon or after switching from a lock mode to an unlock mode, whatever operations a user may run in a lock mode or whatever results a user obtained by running lock operations in the lock modes can be erased after the mode switching and, therefore, such results cannot affect a main system (10). It is appreciated that granting proper access authorities to different modes of operation is typically a matter of selection of a terminal manufacturer or a user. In other words, the terminal or user may pick and choose to assign appropriate access authorities to each of such modes depending upon his or her purpose, environment, or the like.

It is appreciated, however, that granting greater access authority to a lock system (60) than a main system (10) may pose a threat to the security or integrity of a terminal, for a user may accidently store results infected with malicious virus into a main memory unit (40), or may unknowingly transfer data infected with such virus into a main system (10). To prevent such accidents, it is typically desirable to limit such authorities to access a main system (10) with a lock system (60) when a user operates a terminal in a lock mode. Therefore, even when a terminal may grant a user to access all (or some) units of a main system (10) while a user operates the terminal in a lock mode, it is generally advisable to configure a terminal to entirely (or at least partly) prevent a user from storing such results obtained by the lock system (60) into the main memory unit (40) or to other units of the main system (10) without properly checking presence of malicious viruses.

When a lock system (60) includes at least one lock memory unit (80), a terminal may allow a user to store all (or only some) results obtained by running lock operations in a lock mode into a lock memory unit (80). To this end, a terminal may allow a user to manually mark to-be-stored results, thereby saving the to-be-saved results from such erasure or semi-erasure. As a result, such to-be-saved results may remain in the lock system, even after a terminal may switch to a new mode which is granted with greater access authority than the previous mode. Alternatively, a terminal may adaptively select to-be-stored results based upon certain criteria such as, e.g., a type or content of such results, a period of time in which a user processes such results, a period of time in which a user remains in a certain website, a user preference, use statistics, or the like.

The lock memory unit (80) primarily serves to temporarily (or permanently) store various results obtained by running lock operations in a lock mode. A terminal may also ensure that such lock operations run by a lock system (60), results obtained or downloaded in a lock mode, or results stored or residing in a lock system (60) may not adversely affect or contaminate a main memory unit (40) or other units of a main system (10). As a result, even when a terminal allows a user to operate a lock system (71) and to store such to-be-saved results into a lock memory unit (80) and to retrieve data therefrom, a terminal may still prevent a user from storing any results stored or residing in a lock system (60) into a main memory unit (40).

When a terminal includes a lock memory unit (80), the terminal may complement a main memory unit (40) with a lock memory unit (80). For example, a terminal [1] may retrieve data from one memory unit and store such data into another memory unit, [2] may store the same data in both memory units, [3] may divide data into two portions and then store each portion in each memory unit, or the like. However, because there always exist potential risks that bad codes from the results stored or residing in a lock system (60) may contaminate a main memory unit (40) by overwriting good data with infected data, a terminal may completely (or at least partly) isolate a main memory unit (40) from a lock memory unit (80).

A terminal may even physically or operationally divide a main memory unit (40) into multiple isolated memory sectors (e.g., a main sector and a lock sector). Thereafter, a terminal may drive a main system (10) and run unlock operations only in the main sector, while driving a lock system (60) and running lock operations in the lock sector. A terminal may also physically or operationally isolate the main sector from the lock sector of the main memory unit (40), thereby preventing a potential mix-up between such sectors.

Various conventional memory devices may be recruited as the lock memory unit (80). For example, the lock memory unit (80) may be a prior art non-volatile memory device or a volatile memory device. In the latter case, a terminal may be configured to cut power supply to a lock system (60) when the terminal switches from a lock mode to another mode. In such a case, the latter arrangement offers the benefit of obviating a need to run a separate erase (or semi-erase) operation, for any results stored in a lock memory unit (80) of a volatile memory type are to be erased anyway. Of course, a terminal may run the erasure (or semi-erasure) on a lock memory unit (80) of the volatile memory type.

A lock viewer (71) may include a temporary memory sector, and a lock system (60) may utilize the temporary memory sector as a lock memory unit (80). Conversely, a main memory unit (40) may include a temporary memory sector, and a lock system (60) may utilize such a sector as a lock memory unit (80). In addition, a lock system (60) may use any other conventional memory devices as a lock memory unit (80), where such memory devices may be included inside the terminal, or may be provided as a portable, add-on device.

A lock memory unit (80) may be incorporated into a terminal in various arrangements. In one example, a lock memory unit (80) may be incorporated inside a terminal, or at least a portion of a lock memory unit (80) may be exposed to an exterior. A lock memory unit (80) may be provided as a separate unit which may be releasably coupled to and uncoupled from a terminal (e.g., an add-on device). Whatever its type may be, a lock memory unit (80) need to provide a minimum memory space for storing results obtained by running lock operations in a lock mode by a lock system, while temporarily or permanently storing such results. When a lock viewer (71) serves to only display various data (e.g., displaying images or playing sounds), a terminal may not need any lock memory unit, because such data do not have to be stored anywhere anyway.

A terminal may include at least one mode-switching input unit (25) which is designed to receive a user input, and to acquire a mode-switching (user) sub-input ($UI_{SWT}$) therefrom. As shown in the figure, the mode-switching input unit (25) may be provided to a terminal as a separate unit in addition to a main input unit (20), where the former (25) may be implemented next to the latter (20), or may be incorporated in a position different form that of the latter (20). Alternatively, a mode-switching input unit (25) and a main input unit (20) may be formed as a unitary article which includes a sensor for acquiring $UI_{SWT}$ and another sensor for acquiring another (user) sub-input from at least one user input. As far as a mode-switching input unit (25) receives a user input, acquires $UI_{SWT}$ therefrom, generates a control signal, and to deliver such signal to a main CPU unit (30) or to a main O/S (34), detailed configuration of a mod-switching input unit (25) and an exact location of the input unit (25) are typically within the knowledge of one of ordinary skill in the relevant art. In this context, any prior art input unit (e.g., a prior art button, switch, or lever) may be readily employed as a mode-switching input unit (25), as far as a terminal may recognize a control signal generated by a mode-switching input unit (25) as $UI_{SWT}$.

A mode-switching input unit (25) may also be provided as a software element or as a user interface such as, e.g., a graphical user interface (GUI). When a terminal employs a GUI, a user may easily manipulate the GUI and provide $UI_{SWT}$ thereto when a terminal is in its on-state before mode switching. When a terminal is in its off-state, however, it may not be easy for a user to locate the GUI on a display unit (which is turned off anyway). In this case, a terminal may allow a user to provide $UI_{SWT}$ through a separate hardware element. In other words, a terminal may include a GUI and a hardware input unit, where [1] a user may be able to provide $UI_{SWT}$ to either the GUI or the input unit either in the off-state or on-state, or [2] a user may provide $UI_{SWT}$ to the GUI only in the on-state, but may provide $UI_{SWT}$ to the hardware input unit only in the off-state. Similarly, a terminal may configure its main input unit to receive a user input with $UI_{SWT}$, along with other user inputs which include other (user) sub-inputs.

A user may operate a terminal while switching modes as he or she sees fit, using the above lock system (60) and main system (10). Followings are several exemplary operations of a terminal including at least one display unit which is in turn a hardware element of a main output unit (50) of a main system (10).

In general, a terminal may launch and operate a main system (10) in an unlock mode. Thereafter, a terminal may allow a main system (10) to drive various units and elements of a main system (10) in an unlock mode. Similarly, a terminal may launch and operate a lock (or intermediate) system (60) in a lock (or intermediate) mode, and then may allow the lock (or intermediate) system (60) to drive various units and elements of a lock (or intermediate) system in a lock (or intermediate) mode. Because a terminal may operate in a single mode, a main system (10) may not typically operate in a lock (or intermediate) mode, while a lock (or intermediate) system (60) may not typically operate in an unlock mode. In this context, following embodiments and examples of this $1^{st}$ Configuration are illustrated in various arrangements in which a main system (10) preferentially drives various main units and various main (hardware or software) elements in an unlock mode, and in which a lock system (60) preferentially drives various lock units and various lock (hardware or software) elements in a lock mode. Although not included in the following arrangements, a terminal may include an intermediate system and operate such a system in an intermediate mode, where an intermediate system may preferentially drive various intermediate units and various intermediate (hardware or software) elements in an intermediate mode.

However, a terminal which operates in a lock mode may launch a main system (10) in addition to a lock system (60), and may allow either or both of the main and lock systems (10), (60) to drive various units and elements of either of the main or lock system (10), (60), or both of the main and lock systems (10), (60). In addition, a terminal may operate a main system (10) in a lock mode, while allowing a main system (10) to drive all (or only selected) units and elements of a lock (60), without any intervention from a lock system (60). It is therefore appreciated that various embodiments and examples of this $1^{st}$ Configuration may be readily modified in such a way that a main system (10) alone or in conjunction with a lock (or intermediate) system (60) may drive a lock viewer (71) and an optional lock memory unit (80). It is further appreciated that such modifications apply to other exemplary aspects provided throughout this disclosure.

4-3. 1st Configuration—Operation 1

In a first operation which is another exemplary embodiment of the first exemplary aspect, a terminal (i.e., its proper input unit) receives a $1^{st}$ user input while its display unit is in its off-state (a display unit is or has been turned off, but a terminal is communicable, i.e., not completely powered off). A terminal may then determine to which mode it is to switch in various ways. It is appreciated that this mode switching of a terminal from an off-state to one mode defined in a hierarchy corresponds to the $1^{st}$ type mode switching as defined above.

In one example, a terminal may switch to a lock mode upon (or in response to) receiving a $1^{st}$ user input and may launch a lock system, regardless of whether or not the $1^{st}$ user input includes $UI_{SWT}$ therein. While operating a lock system in a lock mode thereafter, a terminal may switch to an unlock mode when a user provides a $2^{nd}$ user input, as may be the case of the series switching. When a user provides another $3^{rd}$ user input thereafter, a terminal may remain in an unlock mode when a terminal may switch modes in a non-circulating hierarchy, for such a hierarchy does not allow a user to switch to a lock mode granted with less access authority from an unlock mode. Alternatively, upon receiving the $3^{rd}$ user input, a terminal may switch to the lock mode when the hierarchy is circulating.

In another example, a terminal may receive a $1^{st}$ user input, acquire $UI_{SWT-1}$ therefrom, and then switch to a lock mode or to an unlock mode based on $UI_{SWT-1}$, as may be the case of the selective switching. When a user provides a $2^{nd}$ user input, a terminal [1] may stay in the lock (or unlock) mode or switch to the unlock (or lock) mode based on $UI_{SWT-2}$ included in the $2^{nd}$ user input when the terminal adopts the selective switching, or [2] may always switch to the unlock (or lock) mode when the terminal adopts the series switching and where the hierarchy is circulating.

4-3-1. Lock Viewer Revisited

Once a terminal starts to operate a lock system (60) in a lock mode, a lock system (60) may also start to drive a lock viewer (71). For example, a lock system (60) may drive a lock viewer (71) such as a prior art viewer or browser, and run various operations for viewing files (i.e., a file viewer), viewing images (i.e., an image viewer), or accessing websites (i.e., a web browser). Similarly, a lock viewer (71) may obtain such files or images from a lock memory unit (80), from a main memory unit (40), from add-on devices which may releasably couple with a terminal, or from external websites. Because a lock viewer (71) is a limited-functionality (software) application, its user may not be able to edit, create or modify any of such files or images. In addition, a terminal may not allow lock viewer (71) to store any of such files, images, or other results into a main memory unit (40), even when a lock viewer (71) may be equipped with a functionality to store such results into a lock memory unit (80) temporarily or permanently.

As a software element of a lock system (60), a lock viewer (71) may be implemented into various locations of a terminal. For example, a lock viewer (71) may be stored in a user space of a lock system (60) (i.e., physically isolated from a main system), and a lock system (60) drives a lock viewer (71) in a lock mode (i.e., operationally isolated from an unlock mode). Alternatively, a terminal may allow a main CPU unit (30) or a main O/S (34) of a main system (10) to drive a lock viewer (71), either in a lock mode or an unlock mode, and may even allow a main system (10) to store data into a lock memory unit (80) in a lock or unlock mode, or to retrieve the stored data or results from a lock memory unit (80) in a lock or unlock mode.

To the contrary, a lock viewer (71) may be implemented into a main system (10) (i.e., not physical isolated), and a lock or main system (60), (10) may drive a lock viewer (71) in a lock or unlock mode. More particularly, when a main system (10) includes a main viewer, a terminal may physically or operationally isolate such a lock viewer (71) from a main viewer. However, when a terminal includes only a single viewer, the viewer may be driven as a lock viewer by a lock system (60), and also as a main viewer by a main system (10) (i.e., neither physically nor operationally isolated from a main system). A terminal may allow a main viewer to retrieve data only from a main memory unit (40) or from both of the lock and main memory units (80), (40).

It is appreciated that such arrangements of the preceding paragraphs may apply to other (software) elements as well as other configurations. For example, when a lock system (60) includes a lock messenger application (to be abbreviated as a "lock application") and a main system includes a main messenger application (to be abbreviated as a "main application"), the lock application and the main application [1] may be physically or operationally isolated from each other, or [2] may drive an entire (or only selected) portion of a database which may be a main or lock memory unit (40), (80). In addition, both applications may access and process the same data, but the lock application may not allow a user to edit or otherwise modify such data.

A terminal may limit a temporal duration of [1] driving a lock viewer with a lock system, [2] driving a lock viewer by a certain user, [3] operating a lock system in a lock mode, such as, e.g., [1] indefinitely, or [2] as far as a user desires (e.g., until a user switches to another mode, turns off a display unit, or the like). A terminal may also limit a temporal duration of driving a lock viewer based on [1] an absolute length of such driving, [2] a size of data which a user processes in a single session in a lock mode, [3] a size of results obtained from running lock operations in a lock mode, [4] a length of viewing certain contents, [5] a number of websites connected by a user, or the like. Based upon a system setting or a user preference, a terminal may also [1] continue to allow a user to drive a lock viewer or to drive an entire lock system (60), [2] terminate a lock viewer, [3] terminate an entire lock system (60), or the like.

In addition, a terminal may set up a protocol for terminating a lock viewer (71) (or a lock system) based upon various factors. For example, a terminal may terminate a lock viewer or an entire lock system (60) [1] when a user switches from a lock mode to another mode, [2] when a user turns off a display unit, [3] when a user fails to provide any user input (i.e., a non-action by a user) for more than a preset period, [4] when a user fails user authenticating for a preset number of times, or [5] when a user passes such authenticating. More particularly, after terminating a lock viewer (71), a terminal may switch to an unlock mode in the case of [1] or [5], may stay in a lock mode while driving a lock system (60) in the case of [2], [3], or [4], or the like.

A terminal may also terminate a lock viewer (71) or a lock system (60) [1] when a user attempts to access and drive a hardware or software element of a main system (10) which is not accessible in a lock mode, [2] when a user tries to connect to a forbidden website, [3] when a user attempts to download data from an unreliable website, [4] when a terminal finds potential risks or viruses from such websites or downloaded data, or the like. After a terminal terminates a lock viewer (71), it may [1] remain in a lock mode while driving a lock system (60), [2] turn off its display unit, [3] give off visual or audible alarms, or [4] power off itself.

4-3-2. Synchronizing Mode Switching with User Authenticating

A terminal may be configured to switch from its off-state to a lock mode whenever a user provides a user input, [1] whether or not a user input includes therein $UI_{SWT}$, or [2] whether or not a terminal runs any authentication operation. In other words, a terminal may be configured to switch modes (i.e., from an off-state to a lock mode) by turning on its display unit whenever it receives a user input in this arrangement.

Conversely, a terminal may condition the mode switching upon an outcome from user authenticating. In other words, a terminal may switch modes differently whether or not a user may pass the authenticating. As a result, a terminal [1] may or may not turn on its display unit in one of various turning-on timings in response to $UI_{SWT}$, [2] may or may not launch a lock system (60) or a main system (10) in various "launch timings" which is defined as the timings to launch a lock (or main) system with respect to the mode switching, where examples of such timings include launching such a system [1] concurrently with such mode switching (e.g., at least one step of a launch operation overlaps with at least one step of a mode-switching operation), [2] immediately after the mode switching, [3] after such mode switching but before a user provides another user input, [4] upon receiving a user input which includes a sub-input for the mode switching, [5] concurrently with running an authentication operation, [6] immediately after running an authentication operation, [7] immediately before, concurrently with, or immediately after turning on (or off) a display unit of a terminal, or the like.

Because a terminal includes a lock system (60) to provide a separate system to run lock operations and isolate potentially harmful results and malicious viruses included therein from a main system (60), a lock system (60) may be physically or operationally isolated from a main system (10). In addition, because it is desired to remove any of such potentially harmful results from a terminal, a terminal may run an erase (or semi-erase) operation to all (or some) results before, during, or after switching to a new mode, thereby preventing such results from adversely affecting a new system operating in a new mode. Accordingly, a terminal may not require a user to authenticate himself or herself to launch a lock system (60).

In general, a terminal may run such erase (or semi-erase) operation onto a lock memory unit (80) or onto a lock memory sector and may erase (or semi-ease) only those results. However, a terminal may run the erasure or (semi-erasure) by reformatting a lock memory unit (71) or a lock memory sector in which a lock viewer (71) may be stored. This arrangement may be useful when the previous lock viewer has been contaminated by malicious virus or when the previous lock memory unit does not function normally due to such contamination. In this case, a terminal may reformat a lock memory unit (71) or an entire lock system (60), and then may have to reload a new lock viewer (71) as well as its driver into a lock system.

A terminal may also run an authentication operation and allow a user to switch to an on-state and to advance one of various modes defined in a hierarchy. In one example, when a terminal runs at least one authentication operation in its off-state and when a user fails the user authenticating, a terminal may [1] keep its display unit turned off (i.e., staying in its off-state), or [2] launch a lock system (60) in a lock mode. Even while launching a lock system (60), a terminal may maintain its display unit turned off. This arrangement may prove useful, for a terminal with a launched lock system (60) may respond to additional user authenticating more quickly than otherwise. In the alternative, a terminal may turn on its display unit in one of such turning-on timings as defined above, while or after launching a lock system (60). This arrangement may be also helpful, for a user may easily confirm that a terminal is now waking up.

However, it frequently happens that the user authenticating may take longer than turning on a display unit. In this case, a terminal may first turn on a display unit and display a lock (or default) screen thereon in response to (or upon) receiving a user input, until a terminal completes the user authenticating. Thereafter, when a user fails the authenticating, a terminal may [1] turn off its display unit, [2] keep displaying a lock screen on an already turned-on display unit, or the like.

When a user passes such authenticating, a terminal may switch from a lock mode to an unlock mode, while launching a main system (10). During or after such mode switching, a terminal may display an unlock (or home) screen on its display unit. To this end, a terminal may [1] stop displaying the previously displayed lock screen and start to display an unlock screen, with or without any temporal gap between displaying such different screens, [2] overlay an unlock screen over a lock screen, [3] gradually removing a lock screen, while filling the remove portion of a screen with an unlock screen, or the like.

Once a terminal launches a lock system (60) or a main system (10) in a lock or unlock mode, respectively, a user may run various lock or unlock operations therewith. When a user wants to switch from a current mode to a new mode, a user may provide a user input with $UI_{SWT}$, e.g., simply by manipulating a mode-switching input unit. Based thereon, a terminal may switch modes or may stay in a current mode.

When a new mode (e.g., an unlock mode) which a user wants to switch to may be granted with greater access authority than a current mode (e.g., a lock mode), a terminal may optionally request a user to run at least one user authentication operation. In addition, a terminal may run optional erasure (or semi-erasure) in one of the erasure timings as defined above, while also running the real-time, intermediate, or ex-post erasure (or semi-erasure), depending on the needs of a user.

Once being launched, a lock system (60) may start to drive a lock viewer (71). As discussed above, a terminal may launch a lock system (60) [1] whenever a user provides a user input and a terminal turns on its display unit in response to the user input (i.e., without having to run an authentication operation), [2] when a user fails the user authenticating in response to a user input received by a terminal in its off-state, [3] when a user passes the user authenticating in response to a user input received by a terminal in its off-state, or [4] when a terminal switches from an unlock mode to a lock mode. A lock viewer (71) may then start to run lock operations, e.g., for presenting data or files in a format friendly to a user. To this end, a lock viewer (71) may retrieve such data or files from a lock memory unit (80), from a main memory unit (40), from an external device releasably coupled to a terminal, or the like. A lock viewer (71) may also retrieve the data or files from an external source through an internet or other communication means. In the last case, a lock system (60) may utilize a hardware element of a main system (10) for communication purposes.

In general, a terminal may include a lock system (60) therein, by incorporating an entire portion of the system (60) inside an external cover of a terminal, or by exposing at least a portion of the system (60) to an exterior in such a way that a user may see such a portion. In contrary, an entire (or a selected) portion a lock system (60) may be fabricated as an "external device" such as, e.g., [1] an "add-on device," [2] a "portable device," or [3] a "wearable device." It is appreciated that an external device may include therein a lock viewer, a lock CPU unit, a lock memory unit, a lock input unit, or a lock output unit, and that an external device may include therein at least one lock hardware element or at least lock one software element, while including (or not including) an optional driver capable of driving the lock software element.

More particularly, an external device may be fabricated as an "add-on device" which may be releasably coupled to a terminal and uncoupled therefrom. Therefore, an add-on device may be fabricated as [1] a protector of a terminal, [2] its holder, [3] its case, or [4] its cover which may enclose at least a portion of a terminal. In addition, an add-on device may be fabricated as [5] a "USB-type memory" (with or without including a driver therein), [6] an "external memory chip (or card)" which may couple with a terminal and which may (or may) not include a driver, [7] a "portable memory chip (or card)" such as, e.g., a USIM card or a SIM card, which may releasably couple or uncouple with a terminal, and which may (or may not) include a driver, [8] any other prior art memory chip (or device) which may include a space for storing data therein and which may (or may not) include a driver, or the like.

An external device may also be fabricated as a "wearable device" which a user may wear on a user's body part. Therefore, a wearable device may be fabricated as [1] a watch, [2] a wrist-band, [3] an arm band, [4] a glove, [5] a ring, [6] a goggle, [7] an eye glass, [8] a helmet, [9] a hat, [10] a belt, [11] a necklace, [12] a bracelet, [13] an earring, [14] an artificial nail, [15] an artificial tooth, [16] a shoe, [17] a pendant, [18] a brooch, [19] other ornaments, or [20] any other devices which may be portably worn by a user.

Moreover, an external device may be fabricated as a "portable device" which a user may readily carry with him or her. Therefore, a portable device may be fabricated as [1] a bag, [2] a backpack, [3] a handbag, [4] a brief case, [5] a luggage, or the like.

It is appreciated that [1] the above external device may be the lock system (60) itself, or [2] that a lock system (60) may constitute only a portion of the above external device. Therefore, the above external device of the above [2] may include not only at least a portion of a lock system (60) but also [2-1] at least a portion of a main system of a terminal or [2-2] electric parts which do not relate to a terminal. For example, the above external device may include an entire (or a selected) portion of a lock system (60) and other electric parts such that the external device may operate [1] not only as a lock system (60) of a terminal [2] but also as a remote controller of a vehicle, a robot, another data processing terminal, another computer, another electrical appliance, or the like. It is also appreciated that the above external device may operationally communicate (or couple) with a terminal by wire or wirelessly.

It is appreciated that various features and configurations of a lock system (60) which are exemplified in this Section apply not only to the terminals of this $1^{st}$ Configuration but also to other Configurations of this disclosure provided hereinabove and hereinafter.

4-3-3. Erasure or Semi-Erasure

To enhance the security of a terminal, to improve its integrity, and to better protect personal data stored therein, a terminal may also run an erase (or semi-erase) operation in one of various erasure timings defined above. A terminal may also run a real-time, intermediate, or ex-post erasure (or semi-erasure), thereby enhancing the security of a terminal, improve its integrity, and preserving private data stored in its main system (10).

In general, when a new mode (e.g., a lock mode) which a user wants to switch to is granted with less access authority than a current mode (e.g., an unlock mode), a terminal may not ask a user to run user authentication operations. Alternatively, a terminal may run the erasure (or semi-erasure) in one of such erasure timings, while running the real-time, intermediate, or ex-post erasure (or semi-erasure).

Because a terminal switches from an unlock mode to a lock mode in this example, potential risks that various outcomes obtained by running unlock operations with a main system (10) in an unlock mode may adversely affect a lock system (60) may be marginal in most cases. However, these features may alleviate concerns of a current user that a $3^{rd}$ party may operate the same terminal in the same unlock mode later, and find out a list of operations which a user ran in an unlock mode or a list of web-sites which a user visited in an unlock mode, a list of files which a user downloaded in an unlock modes, a list of messages or SNS communications which a user exchanged with a $4^{th}$ person in an unlock mode, or the like. Accordingly, a user may prefer that a terminal runs such erasure or semi-erasure whenever he or she switches modes, regardless of the access authorities granted to such modes.

When a terminal includes at least one lock memory unit (80), a lock system (60) may store at least a portion of results which are obtained by running lock operations in a lock mode (i.e., "to-be-stored results" or "stored results") into a lock memory unit (80). A terminal may store such to-be-stored results either actively or passively. It is appreciated that such "to-be-stored results" are generally identical to the "stored results," unless a terminal fails to store all or some of such to-be-stored results and, as a result, the stored results turn out to be only a portion of the to-be-stored results. Accordingly, the "to-be-stored results" and the "stored results" typically refer to the same results, where such "to-be-stored results" mean such results before a terminal actually performs or completes such storing, whereas such "stored results" represent the same result after a terminal completes such storing.

In one example, a lock system (60) may actively store to-be-stored results before a lock system (60) runs such erasure (or semi-erasure) and, therefore, erases all or some of the to-be-erased results (i.e., "erased results"). Because such to-be-stored results have already been stored into a lock memory unit (80), a lock system (60) may run such erasure by erasing all results remaining in a lock system (60). In another example, a lock system (60) may not actively store such to-be-stored results, but a lock system (60) may run a semi-erase operation by selectively erasing such to-be-erased results, while leaving such to-be-stored results in a lock system (60). Accordingly, a lock system (60) may be deemed to passively store such to-be-stored results in a lock memory unit (80). It is appreciated that either a lock system (60) or a main system (10) may select which results to be erased (or stored), where such results will be stored such as, e.g., in a lock memory unit (80) or a main memory unit (40), or the like.

A terminal or a user may select the to-be-erased results or to-be-stored results in various ways. In one example of an ex-post erasure (or semi-erasure), a user may select the results to be erased (or stored) upon terminating a lock viewer (71) or a lock system (60). To this end, a user may mark specific files or folders of such results in a lock mode such that a terminal may thereafter erase (or store) only those marked files or folders. That is, a terminal may erase (or semi-erase) only those marked results, while saving the rest of such results (or vice versa).

When a lock system (60) includes a lock memory unit (71), a lock system (60) may store such to-be-stored results therein. A lock system (60) may instead store such results in a main memory unit (40) (when allowed by a terminal), in a temporary memory sector (e.g., a data buffer, a cache, a clipboard, or a recycle bin) of a main system (10) or a lock system (60), or the like.

A terminal may also assist a user by displaying a list of such results obtained by running lock operations to a user and by allowing a user to mark which files or folders of such results may be erased (or stored). Once a user provides such markings, a terminal may erase (or semi-erase) such marked results in one of various erasure timings. A terminal may instead erase (or store) such results, only when a user confirms such erasure or storing. Accordingly, a terminal may prevent accidental or unintentional erasure (or storage) of desirable (or undesirable) results.

A terminal may allow a user to select [1] which memory units to store such results, [2] how long such results are to be stored, [3] in which mode a user may retrieve such results, or the like. A terminal may also connect to an external server and request the server to erase (or store) such to-be-erased (or to-be stored) results in that server, while optionally displaying whether or not such to-be-erased (or to-be-stored) data have actually been erased (or stored) in the server. This arrangement is particularly helpful when a lock viewer (71) retrieves data or files from the external server and displays such data or files on a display unit in a lock mode. A terminal may also manage a list of all websites or uniform resource locators (URL) which a user has accessed in a lock mode and inform the user of their erasure, with or without a user confirmation.

4-3-4. Launching Different Systems

In general, a terminal is to first launch (or load) a main system (10), and then to operate a main system (10) in an unlock mode. Similarly, a terminal is to launch a lock system (60), and then to operate a lock system (60) in a lock mode. Alternatively, a terminal may first launch one of the main and lock systems (10), (60), and then launch the other of such systems (10), (60). Thereafter, a terminal may shut down one of such systems, while continuing to operate the other system. In this case, a terminal may end up operating both systems (10), (60) for a certain period of time. A typical example of this case is a terminal which displays two independent screens and which operates a main system (10) in one screen, while operating a lock system (60) in another screen. In another alternative, a terminal may launch a main system (10) in a lock mode, with or without launching a lock system (60). In this arrangement, a main system (10) may be deemed to assist a lock system (60) or to rather replace a lock system (60).

When a terminal operates a main system (10) and a lock (60) system simultaneously, there exists a danger that a terminal may accidently allow a lock system (60) to drive some hardware or elements of a main system (10), to retrieve some data stored in a main memory unit (40), or to store such results which are obtained by running lock operations in a lock mode. Because both systems are concurrently operating, a terminal may have to effectively isolate a main system (10) from an entire (or only selected) portion of a lock system (10) as well.

A terminal may launch a lock system (60) or a main system (10) in various ways. In one example, a terminal may launch only one system at a time, but not two at the same time. Therefore, when a terminal of this example switches modes, a terminal first shuts down (or terminates) a lock system operating in the current lock mode, and then launch a new unlock system in an unlock mode. In another example, a terminal may drive at least two different systems at the same time or in an overlapping manner. As a result, when a terminal is to switch from a lock mode to an unlock mode, a terminal may launch a main system (10) while still continuing to operate a lock system (60), may run a mode-switching operation with a main system (10), and then may terminate a lock system (60) during or after switching to an unlock mode. The same arrangement may apply to a terminal which is to switch from an unlock mode to a lock mode.

4-3-5. Miscellaneous

Upon terminating an operation of a lock viewer (71) or a lock system (60), a terminal may run a single operation or a series of preset operations. In other words, when a terminal switches from a lock mode to another mode (including an off-state or a powered-off state), a terminal [1] may only run a mode-switching operation and may wait for another user input, or [2] may run not only the mode-switching operation but also at least one another operation, where such another operation may be determined in various ways.

In one example, before such mode switching, a terminal may [1] ask a user to supply $UI_{THEN}$ and then run an authentication operation after acquiring such $UI_{THEN}$, [2] run an operation for displaying one of multiple lock (or unlock) screens on a display unit, [3] run an operation for connecting to a communication network or a network of internet-of-things, [4] run an operation to drive at least one hardware element of a main system (10) (e.g., a display unit, a camera, a speaker, a microphone, a GPS, a wireless transmitter, a wireless receiver, a sensor for user authenticating, or the like), or [5] run an operation for driving one or more software elements of a main system (10). Accordingly, the nature of such operations is generally related to which mode of operation a terminal is to switch.

Upon receiving a user input in an off-state and while deciding to which mode it switches to, a terminal may run at least one additional operation as well. For example, a terminal may receive a $1^{st}$ user input which includes $UI_{SWI}$ as well as at least one more (user) sub-input such as, e.g., $UI_{THEN}$ or $UI_{ACT}$. When a $1^{st}$ user input includes UI THEN, a terminal runs an authentication operation in response to the user input as described hereinabove. Therefore, details of such operations are omitted herein.

When a user input includes $UI_{ACT}$ (along with $U_{THEN}$ or without $UI_{THEN}$), a terminal may turn on a display unit in response to the $1^{st}$ user input in one of such turning-on timings as defined above. More particularly, a terminal may turn on a main display unit using a main system (10) or a lock system (60), or may automatically turn on a display unit in response to the $1^{st}$ user input.

Once a display unit is turned on, a terminal may automatically display a lock screen on a display unit. When a terminal runs an authentication operation, however, a terminal may run one of many operations. For example, a terminal may [1] keep its display unit turned off until a terminal completes the user authenticating, [2] turn on a display unit and display a lock screen thereon before a terminal completes the authenticating and obtains an outcome therefrom. In the case of [1], a terminal may [1-1] keep a display unit turned off when a user fails such authenticating, [1-2] turn on a display unit and display a lock screen thereon in case of such failure, or [1-3] turn on a display unit and display an unlock screen when a user passes such authenticating. In the case of [2], a terminal may [2-1] turn off its display unit when a user fails such authenticating, [2-2] keep displaying a lock screen when a user fails such authenticating, or [2-3] replace a lock screen with an unlock screen when a user passes the user authenticating.

It is appreciated that various operations of this Section also apply to a terminal which includes an intermediate system operating in an intermediate mode. For example, such operations related to switching from a lock mode to an unlock mode as described above may apply to operations related to [1] switching from a lock mode to an intermediate mode, [2] switching from an intermediate mode to an unlock mode, or [3] switching from a $1^{st}$ intermediate mode granted with less access authority to a $2^{nd}$ intermediate mode with greater access authority. In addition, such operations related to switching from an unlock mode to a lock mode as described above may apply to operations related to [1] switching from an unlock mode to an intermediate mode, [2] switching from an intermediate mode to a lock mode, or [3] switching from the above $2^{nd}$ intermediate mode to the above $1^{st}$ intermediate mode.

Although not included in this first exemplary aspect, a terminal may also include a main system (10) and a lock system (60), but may operate in a hierarchy which defines more than two modes. In one case, a hierarchy may define [1] one lock mode, one intermediate mode, and one unlock mode, [2] multiple lock modes, one unlock mode, and optional intermediate modes, [3] one lock mode, multiple unlock modes, and optional intermediate modes, [4] multiple lock and unlock modes, and optional intermediate modes, [5] only multiple unlock (or lock) modes, or the like, where a terminal may grant each of such multiple lock (or unlock) modes with identical, similar, or different access authorities. As explained above, the above modes may also be arranged in a certain hierarchy in parallel or series manner. When desirable, a terminal may set up multiple hierarchies, and allow a user to first select a certain hierarchy in which various modes are arranged to meet various needs of a user. In any of the above cases, a terminal may switch modes according to one of various arrangements provided herein.

A terminal may operate in the series switching or in the selecting switching as well, thereby allowing a user [1] to switch along various modes defined in a certain hierarchy one after another or successively whenever a user provides a user input, or [2] to jump from one mode to a new mode of his or her choice. Moreover, the hierarchy itself may be circulating and allow a user to switch from an unlock mode to a lock mode. Conversely, the hierarchy may be non-circulating, where a user may not be able to switch to a lock mode anymore, once a user switches to an unlock mode. Accordingly, various methods of using a terminal of this $1^{st}$ Configuration and switching modes using such a terminal in response to a user input including $UI_{SWT}$ may be similar to those of the panels (A) to (H) of FIG. 2.

4-4. 1st Configuration—Operation 2

In a second operation which is another exemplary embodiment of the first exemplary aspect, a terminal (or its proper input unit) receives a $1^{st}$ user input [1] while a terminal is in its on-state (i.e., a display unit is turned on, a terminal is in a powered-on state, and a terminal is communicable) and [2] while a terminal is operating in a lock mode. A terminal may then determine to which mode it is to switch in various ways. It is appreciated that this mode switching of a terminal from an on-state to another mode defined in a hierarchy corresponds to the $2^{nd}$ type mode switching as defined above.

In one example, upon receiving a $1^{st}$ user input which may or may not include any $UI_{SWT}$, a terminal may switch from a lock mode to an unlock mode in response to a $1^{st}$ user input when a terminal adopts the series switching. When a user provides an additional user input thereafter, a terminal may remain in an unlock mode when a hierarchy is non-circulating, or may switch back to a lock mode when a hierarchy is circulating.

In another example, upon receiving a $1^{st}$ user input and acquiring $UI_{SWT-1}$, a terminal may stay in a lock mode or may switch to an unlock mode based upon $UI_{SWT-1}$, as may be the case of the selective switching. When a user provides a $2^{nd}$ input, a terminal may [1] stay in an unlock mode or [2] switch back to a lock mode based on $UI_{SWT-2}$ when a terminal adopts the selective switching.

In either example, a user may readily provide a user input with $UI_{SWT}$, e.g., simply by manipulating at least a portion of a mode-switching input unit whenever he or she wants to switch from a current mode to a new mode. In addition, in either example, a terminal may run such erasure (or semi-erasure) in one of the erasure timings as defined above. A terminal may also run the real-time, intermediate, or ex-post erasure (or semi-erasure), thereby enhancing security of a terminal, improve its integrity, and preserving private data stored therein.

Similar to Operation 1 of the previous Section, a terminal may condition the mode switching upon an outcome of the user authenticating. It is appreciated that a terminal of this Section is (or has been) in a lock mode when it receives a $1^{st}$ user input. It then follows that [1] a terminal may not have to run any authentication operation for launching and operating a lock system (60) and thereafter begin to operate a lock system in a lock mode, or [2] a terminal may have already run the authentication operation, but a terminal has to launch a lock system (60) in a lock mode, for a user fails such user authenticating.

Whichever case it may be, to switch from a lock mode to an unlock mode, a terminal may better run such user authenticating and determine whether a current user is authorized for such mode switching. To this end, a $1^{st}$ user input may include not only UI THEN for user authenticating but also $UI_{SWT}$, depending on whether a terminal adopts the selective switching or the series switching. For example, in case a terminal should adopt the series switching, a terminal may automatically switch from a lock mode to an unlock mode whenever a user passes such authenticating. Therefore, $UI_{THEN}$ of a $1^{st}$ user input may also serve as $UI_{SWT}$ in this case.

When a user fails the authenticating, a terminal may [1] stay in a lock mode while optionally notifying a user of such a failure, [2] ask a user to retry user authenticating while staying in a lock mode, [3] turn off a display unit, or [4] power itself off. However, when a user passes such authenticating, a terminal may switch to an unlock mode and display an unlock screen on a display unit, while launching a main system (10) in one of such launch timings. When a user provides an additional user input thereafter, a terminal may switch back to a lock mode [1] when a terminal adopts the series switching or when a hierarchy is circulating, [2] when $UI_{SWT}$ represents a lock mode and a terminal adopts the selective switching, or the like.

A terminal may also run an erase (or semi-erase) operation in one of various erasure timings as defined above and in one of the real-time, intermediate, or ex-post manner, particularly when a new mode such as an unlock mode is granted with greater access authority than a current mode such as a lock mode. However, a terminal may run erasure (or semi-erasure) when it switches to a new mode granted with greater access authority as well, due to various reasons described hereinabove.

When a terminal runs such semi-erasure rather than erasure, a terminal may erase only selected results which are obtained by running lock operations in a lock mode, while leaving the remainder of such results intact. In addition, a terminal may actively store such to-be-stored results in a lock memory unit (80) or elsewhere of a terminal in one of various storing timings described in the previous Section.

To switch to a new unlock mode, a terminal may launch a main system (10) in various ways. In one example, when a terminal allows a user to launch only one system at a time, but not two at the same time, a terminal may first shut down a lock system (60) operating in the current lock mode, and may then launch a new unlock system (10) in an unlock mode. To the contrary, when a terminal allows a user to launch or to operate multiple systems at the same time, a terminal may keep driving a current (lock) system, while launching a (new) unlock system. Once a terminal completes launching the new unlock system, a terminal may then shut down the old lock system.

Although not included in this first exemplary aspect, a terminal may also operate in a hierarchy in which more than two modes are defined in a certain hierarchy in a parallel or series manner. When desirable, a terminal may set up multiple hierarchies, and allow a user to first select a certain hierarchy in which various modes are arranged to meet various needs of a user. Various methods of using a terminal and various mode switching using such a terminal in response to a user input may be similar to those of the panels (A) to (H) of FIG. 2.

Other features of the Operations 2 of this Section are typically identical or similar to the corresponding features of the Operation 1 of the previous Section, subject to a certain modification, addition, and/or omission, each of which becomes apparent according to detailed contexts thereof. Accordingly, further descriptions of various features of this Operation 2 are omitted here.

4-5. 1st Configuration—Operation 3

In a third operation which is yet another exemplary embodiment of the first exemplary aspect, a terminal (or its proper input unit) receives a $1^{st}$ user input [1] while a terminal is in its on-state (i.e., a display unit is turned on, a terminal is in a powered-on state, and a terminal is communicable) and [2] while a terminal is operating in an unlock mode. A terminal may then determine to which mode it is to switch in response to a $1^{st}$ user input in various ways. It is appreciated that this mode switching of a terminal from an on-state to another mode defined in a hierarchy also corresponds to the $2^{nd}$ type mode switching as defined above.

In one example, upon receiving a $1^{st}$ user input which may or may not include $UI_{SWT}$ therein, a terminal may switch from an unlock mode to a lock mode in response to a $1^{st}$ user input, particularly when a terminal adopts the series switching. When a user provides an additional user input thereafter, a terminal may either stay in an unlock mode when a hierarchy is non-circulating, or switch back to a lock mode when a hierarchy is circulating.

In another example, upon receiving a $1^{st}$ user input, a terminal acquires $UI_{SWT-1}$ therefrom, and [1] may remain in an unlock mode or [2] may switch back to a lock mode depending upon $UI_{SWT-1}$, as may be the case of the selective switching. When a user provides an additional $2^{nd}$ input, the terminal may [1] stay in an unlock mode or [2] switch back to a lock mode, based on $UI_{SWT-2}$ when a terminal adopts the selective switching.

In either example, a user may readily provide a user input including $UI_{SWT}$ therein, e.g., simply by manipulating a mode-switching input unit whenever he or she wants to switch from a current mode to a new mode. In either example, a terminal may run such erasure (or semi-erasure) in one of various erasure timings. A terminal may also run the real-time, intermediate, or ex-post erasure (or semi-erasure), thereby enhancing security of the terminal, improve its integrity, and preserving private data stored therein.

Similar to Operations 1 and 2 of the previous Sections, a terminal may condition the mode switching upon an outcome of the user authenticating. It is appreciated, however, that a terminal of this Section is (or has been) in an unlock mode. Accordingly, it follows that a terminal has already run an authentication operation, e.g., to advance from a lock mode to an unlock mode, and that a user has passed the authenticating. Therefore, a terminal may not need to authenticate a user once more. However, a terminal may require an additional user authenticating when the user desires to run another operation which may require more important or private data such as, e.g., making a financial transaction.

A terminal may also run an erase (or semi-erase) operation in one of various erasure timings as defined above, while running one of the real-time, intermediate, or ex post erasure (or semi-erasure), even when switching to a new mode with less access authority, due to the reasons described hereinabove. A terminal may erase only selected results which are obtained by running lock operations in a lock mode, while storing the remainder of such results intact in a lock memory unit (80) or elsewhere in a terminal in one of various timings described in the previous Section. In addition, a terminal may launch a main system (10) or a lock system (60) in various ways as described above.

Although not explained in greater detail in this $1^{st}$ Configuration, a terminal may also operate in a hierarchy in which more than two modes are defined in a series, parallel, or hybrid arrangement. When desirable, a terminal may set up multiple hierarchies, and allow a user to first select a certain hierarchy in which various modes are arranged to meet various needs of a user. Various methods of using such terminals and switching modes with such terminals in response to a user input may be similar to those of the panels (A) to (H) of FIG. 2.

It is appreciated that a terminal runs the Operation 3 of this Section while it is in a powered-on stare and in an on-state. Accordingly, a terminal may run various operations of this Section while its display unit is or has been turned on. As a result, various operations explained in this Section is not generally conditioned upon a turning-on operation. However, such operations of this Section may condition a turning-off operation in such a way that a terminal may turn off its display unit [1] when a user fails the user authenticating, [2] when a user provides an additional user input but a terminal may not switch modes any more, [2-1] for a hierarchy is not circulating, [2-2] for a user provides a wrong or improper user input, [3] for $UI_{SWT}$ included in a user input does not match any mode listed in a matching list, or the like.

Other features of the Operations 3 of this Section are typically identical or similar to the corresponding features of the Operations 1 and 2 of the previous Sections, subject to a certain modification, addition, and/or omission, each of which becomes apparent according to detailed contexts thereof. Thus, further descriptions of additional features of this Operation 3 are omitted here.

4-6. 1st Configuration—Operation 4

In a fourth operation which is yet another exemplary embodiment of the first exemplary aspect, a terminal (or its proper input unit) receives a $1^{st}$ user input while a terminal is powered off. In other words, a display unit of a terminal has been turned off, and a terminal itself has not been communicable when a terminal receives a $1^{st}$ user input. Accordingly, a terminal is deemed to not be in any of a lock mode, an intermediate mode, or an unlock mode, and a terminal is deemed to not have been driving any unit or any element of a lock system (60), an intermediate system, or a main system (10).

In a $1^{st}$ example, a user may desire to just power on his or her terminal, regardless of whether or not a user has any intention to advance to a certain mode. In other words, a user may be satisfied with just powering on a terminal. Therefore, in response to the $1^{st}$ user input, a terminal may [1] power itself on but keep its display unit turned off (i.e., switching to an off-state), or [2] power itself on, and also turn on a display unit (i.e., switching to an on-state). In the case of [2], the terminal may [2-1] launch a lock system (60) in one of various launching timings, while displaying a lock screen on the display unit, or [2-2] launch a main system (10) while displaying an unlock screen thereon.

A terminal may also run at least one authentication operation in this example as well. In this case, a terminal may condition various operations (e.g., turning on a display unit, launching a lock or main system, or displaying a lock or unlock screen on a display unit) upon an outcome of the user authenticating, where further details of such operations of this $1^{st}$ example have been described hereinabove and, therefore, omitted herein.

In a $2^{nd}$ example, a user may [1] not only desire to power on a terminal [2] but also desire to advance to a lock mode such that a user can run various operations with a lock system (60) in the lock mode. This user will be satisfied when he or she can seamlessly advance to a lock mode in response to a single user input. Accordingly, in response to the $1^{st}$ user input, a terminal may power itself on and switch into a lock mode.

In case a user should not mind showing his or her own lock screen to whoever would look at a lock screen in a lock mode, a terminal may power itself on, turn on its display unit, and automatically display a default lock screen which may include various user interfaces displayed thereon. It is appreciated that a terminal may run all of such operations in response to a single user input.

However, when the user does mind such, a terminal may run an authentication operation and confirm whether or not a current user may be authorized to switch to a lock mode. Therefore, in response to a single user input, a terminal may power itself on, and then run an authentication operation. To this end, a user input may include therein not only $UI_{ACT}$ to turn on a display unit but also $UI_{THEN}$ to run such user authenticating. Alternatively, a terminal may be configured to turn on a display unit and to display a lock screen in response to a $1^{st}$ user input which is received in its powered-off state. In this case, the $1^{st}$ user input includes $UI_{THEN}$ but may not have to include any $UI_{ACT}$, for a terminal turns on its display unit without having to acquire $UI_{ACT}$.

When a user passes the authenticating, a terminal may show a lock screen and display various user interfaces thereon, while launching a lock system (60) in one of various launching timings such as, e.g., before, during or after turning on a display unit. Thereafter, a user may run various lock operations with a lock system (60) in a lock mode, while obtaining results from such running.

When a user fails such authenticating, a terminal may run one of various operations. For example, a terminal may [1] keep itself powered-off, [2] keep its display unit turned off, [3] turn on a display unit and display a lock screen thereon, while not displaying any user interfaces thereon, [4] turn on a display unit and display a lock screen with user interfaces thereon, while not granting such user interfaces to drive any hardware or software elements of a lock or main system (60), (10), even when a user manipulates such interfaces, or the like.

In a $3^{rd}$ example, a user may [1] not only desire to power on the terminal [2] but also desire to advance to an unlock mode and to run unlock operations with a main system (10) in an unlock mode. The user will be satisfied when he or she can seamlessly advance to an unlock mode in response to a single user input.

In case a user should not mind showing the user's own unlock screen to whoever would look at the screen in an unlock mode, a terminal may power itself on, may turn on its display unit and, thereafter, may automatically display a home screen which includes various user interfaces displayed thereon. Because a terminal runs all of such operations in response to a single user input, a user may enjoy a seamless operation.

However, when a user does mind such, a terminal may run an authentication operation and confirm whether or not a current user is authorized to switch to an unlock mode. Therefore, in response to a single user input, a terminal may power itself on, and run an authentication operation. When a user passes such authenticating, a terminal may display a home screen which includes various user interfaces thereon, while launching a main system (10) in one of such launching timings such as, e.g., before, during or after turning on a display unit. When a user fails such authenticating, a terminal may [1] remain in a powered-off state, [2] keep its display unit turned off, [3] turn on a display unit and display a lock screen, while not displaying any user interfaces thereon, [4] turn on a display unit, display a lock screen with the user interfaces, while not granting the user interfaces to drive any hardware or software elements of a lock or main system (60), (10) even if a user provides a user input thereto, or the like.

As described above, a terminal may spend more time in completing the user authenticating than just turning on a display unit. Accordingly, even when a user passes such authenticating, it may be only a certain period of time after a terminal turns on a display unit. In this case, a terminal may turn on a display unit in response to a user input, display a lock screen thereon, and then [1] keep the lock screen when a terminal learns that a user fails the user authenticating, or [2] replace the lock screen with a home screen after a terminal learns that a user passes the user authenticating.

4-7. $1^{st}$ User Input and Mode-Switching (User) Sub-Input

In another exemplary embodiment of the first exemplary aspect, a terminal may receive multiple user inputs one of which includes $UI_{SWT}$ for switching from one mode to another. It is appreciated that the user input which includes $UI_{SWT}$ therein may not include any other (user) sub-inputs or may also include other (user) sub-inputs such as, e.g., $UI_{THEN}$ or $UI_{ACT}$ and that inclusion of other sub-inputs along with $UI_{SWT}$ generally depends upon a circumstance when a user wants to switch modes. It is also appreciated that a user may provide a terminal with such multiple user inputs either concurrently or sequentially.

In a $1^{st}$ example when a terminal has been powered off and when a user only wants to power on a terminal by providing a $1^{st}$ user input thereto, the $1^{st}$ user input may not have to include any of $UI_{ACT}$, $UI_{THEN}$, or $UI_{SWT}$. For example, a $1^{st}$ user input may not have to include $UI_{ACT}$, for a terminal may be configured to turn on its display unit anyway after being powered on. In addition, when a user only wants to launch a lock system in a lock mode after a terminal is powered on, a terminal already knows which mode it is to switch to and, therefore, a $1^{st}$ user input may not have to include $UI_{SWT}$ therein. Moreover, because a lock mode is the mode granted with the least access authority, a terminal may not have to run any authentication operation and, accordingly, a $1^{st}$ user input may not have to include $UI_{THEN}$ therein.

However, when a user wants to limit access to his or her own lock mode, a $1^{st}$ user input may have to include $UI_{THEN}$ therein such that a terminal acquires $UI_{THEN}$ from a $1^{st}$ user input, runs an authentication operation, and determine whether a current user is authorized to switch to a lock mode based thereon. In addition, when a user wants to advance to a certain mode of a certain hierarchy directly from a powered-off state and when a hierarchy defines multiple different modes therein, a $1^{st}$ user input may have to include $UI_{SWT}$ so that a terminal may acquire $UI_{SWT}$ from a $1^{st}$ user input, and may direct a user to a correct mode, once a terminal is powered on and its display unit is turned on.

In a $2^{nd}$ example when a terminal is powered on but its display unit has been turned off (i.e., an off-state), a user may provide a $1^{st}$ user input to a terminal with an intention to run some operations in one of various modes. Because this example applies to a case in which a user has already provided a user input previously to power a terminal on, the $1^{st}$ user input is a user input which is provided to a terminal after it has already received a 0th user input (i.e., a display unit is or has been turned off but a terminal has been powered on and, therefore, communicable in response to a 0th user input).

In one case of the $2^{nd}$ example, a user may provide a $1^{st}$ user input to check some routine data. In this case, a $1^{st}$ user input may not have to include any of $UI_{THEN}$ or UI SW', for a terminal may only turn on a display unit in a lock mode and display routine, non-personal data on a lock screen. In addition, when a terminal is configured to display a lock screen whenever it receives a user input in an off-state, a $1^{st}$ user input may not even have to include $UI_{ACT}$ at all.

However, a user may instead want to switch to a lock mode by providing a $1^{st}$ user input to a terminal. In this case, a $1^{st}$ user input may include $UI_{ACT}$ and $UI_{SWT}$ therein so that a terminal turns on its display unit in response to $UI_{ACT}$ and switch to a lock mode in response to $UI_{SWT}$. In addition, a $1^{st}$ user input may have to include $UI_{THEN}$ therein when a user wants to limit access to his or her own lock mode by others. However, when a terminal is configured to turn on its display unit and to automatically advance to a lock mode, a $1^{st}$ user input may have to include neither $UI_{ACT}$ nor $UI_{SWT}$.

In a $3^{rd}$ example where a terminal is powered on, its display unit has been turned on (i.e., an on-state), and a user has been operating a terminal in a current mode (i.e., one of multiple modes defined in a hierarchy), a user may provide various user inputs to a terminal for various purposes such as, e.g., running operations in a current mode, or switching to a new mode. It is appreciated that followings relate to a case when a user desires to switch from a current mode to a new mode and that a $1^{st}$ user input is the one provided to a terminal operating in a current mode.

When a user provides a terminal with a $1^{st}$ user input with an intention to switch to a new mode, a $1^{st}$ user input may not have to include any $UI_{ACT}$, for a display unit has already been turned on. A $1^{st}$ user input may not have to include $UI_{THEN}$ either, when a terminal grants a new mode with less access authority than a current mode. Moreover, a $1^{st}$ user input may not have to include $UI_{SWT}$ when a terminal may switch its modes in the series switching, for a terminal may switch modes successively along a hierarchy, regardless of detailed nature of a $1^{st}$ user input.

However, a $1^{st}$ user input may have to include $UI_{ACT}$ when a new mode may require turning on a $2^{nd}$ display unit in addition to a main display unit. A $1^{st}$ user input may also have to include $UI_{THEN}$ when a terminal grants a new mode with greater access authority than a current mode or when a user desires the user authenticating whenever a terminal switches modes. Furthermore, when a terminal operates in a hierarchy defining numerous modes therein, a $1^{st}$ user input may have to include $UI_{SWT}$ such that a terminal may lead a user to a correct new mode.

As manifest in the above $1^{st}$, $2^{nd}$, and $3^{rd}$ examples, a $1^{st}$ user input provided by a user to a terminal which is in its powered-off state (e.g., in the $1^{st}$ example), or which operates in its off-state (e.g., in the $2^{nd}$ example), or in its on-state (e.g., in the $3^{rd}$ example), a $1^{st}$ user input may not have to include therein any (user) sub-input at all. Alternatively, in any of such examples, a $1^{st}$ user input may have to include at least one or all (user) sub-inputs such as, e.g., $UI_{ACT}$, $UI_{THEN}$, and $UI_{SWT}$, only to switch modes.

Accordingly, it is appreciated that the nature of a $1^{st}$ user input and the nature of the (user) sub-inputs included therein input typically depends upon circumstances and the user's intention. By the same token, a terminal [1] may incorporate a single main input unit in a main system (10) or [2] may instead incorporate various input units in a main or lock system (10), (60) according to such circumstances or user's intentions in such a way that [1] a terminal may enhance its security, [2] a terminal may improve its integrity, [3] a terminal may better protect privacy of data stored or residing in its main system, and [4] a user may be able to enjoy seamless features provided by the terminal.

It is also appreciated that a terminal may switch modes by receiving various user inputs which are received by various input units of a terminal. In one example, a user may provide a $1^{st}$ user input which includes $UI_{SWT}$ to a mode-switching input unit (25) but not to a main input unit (20). In another example, a user may provide a $1^{st}$ user input to either of a mode-switching input unit (25) or a main input unit (20). In another example, a user may provide a user input which not only includes one of $UI_{ACT}$ and UITNEN but also $UI_{SWT}$ to any suitable input unit which includes a sensor which may acquire $UI_{SWT}$ therefrom. In another example, a user may not have to provide a separate user input including $UI_{SWT}$, but a terminal may receive another user input which may also serve as a user input with $UI_{SWT}$.

In addition, when a terminal receives a $1^{st}$ user input, a terminal may also automatically run certain operations according to the circumstances or to control settings. In other words, a terminal may recognize $UI_{ACT}$ or $UI_{THEN}$ as $UI_{SWT}$ based on various circumstances as described hereinabove and as will be explained hereinafter. As a result and as described above, a terminal may run a single operation or multiple operations in response to a $1^{st}$ user input, regardless of how many (user) sub-inputs are included therein. Put in different words, a terminal of this disclosure may utilize such features to provide a user with improved seamless features.

When a terminal includes a mode-switching input unit (25) and when a user provides a $1^{st}$ user input including $UI_{SWT}$ therein, a terminal may switch modes in various ways. For example, a terminal may switch modes [1] only upon receiving at least one proper user input which is actively provided by a user, [2] upon receiving at least one user input which is passively provided by a user (e.g., actively acquired by a terminal), or [3] only based on a setting of a terminal which may (or may not) be altered by a user once it is set by a manufacturer, a distributor or a terminal.

A terminal may also switch modes, particularly from a current mode granted with greater access authority to a new mode granted with less access authority, without necessarily having to acquire $UI_{SWT}$ from a $1^{st}$ user input. Accordingly, a terminal may switch modes, e.g., [1] upon elapsing a certain period of time after a terminal has been in a current mode but does not receive a subsequent user input thereafter [2] upon elapsing a certain period of time after a main system (10) runs the last operation in a current mode, [3] upon detecting a certain event of unauthorized entries (or attempts) to a main system (10) (e.g., a hacking, an authorized access or entry, tainting of a main memory unit or a main system, altering a certain unit of a main system, or the like), or [4] upon detecting an occurrence (or an attempt) of an incident which is specified by a terminal or a user.

A terminal may allow a user to manipulate (or provide a user input to) a mode-switching input unit (25) even when a display unit is turned off. For example, a user may select which system a terminal should launch either before, during or after turning on a display unit. A user may then render a terminal start to launch a desired system in a certain mode in response to a $1^{st}$ user input. When a terminal defines several different modes in a hierarchy, this arrangement may prove beneficial, for a user may launch a desired system in a desired mode, instead of navigating through a hierarchy of different modes. In this arrangement, a terminal may acquire $UI_{SWT}$ directly from a $1^{st}$ user input in such a way that a terminal may provide more seamless operations to the user.

This embodiment may, however, be subject to an outcome of running an authentication operation (vice versa). For example, a terminal may be configured to proceed to an unlock mode and to also launch a main system (10) in response to a $1^{st}$ user input. In this arrangement, a terminal may also continue to switch to a lock mode when a user fails such user authenticating. In addition, when a user provides a specific command to a terminal, a terminal may proceed to an unlock mode and launch a main system (10), whether or not a user passes such user authenticating. This embodiment may prove advantageous when a terminal includes a button-type mode-switching input unit (25).

4-8. Lock Memory Unit and Erasure (Semi-Erasure)

In another exemplary embodiment of the first exemplary aspect, a lock system (60) may include an optional lock memory unit (80). As described above, one objective of various terminals of this disclosure is to physically or operationally isolate a lock system (60) from a main system (10), thereby enhancing the security of a main system (10), improving the integrity thereof, and protecting data stored therein. In addition, another objective of various terminals of this disclosure is to not leave behind any (or at least some) trace of results obtained by running various lock operations in a lock mode. To this end, a terminal may run such erasure (or semi-erasure) onto a lock system (60), more particularly, a lock system (60) may run such erasure (or semi-erasure) onto its lock memory unit (80) or a remainder of a lock system (60).

In one example, a lock system (60) may not include any designated lock memory unit (71) therein. Because a lock viewer (71) may only display on a display unit [1] various texts, files, images or web pages which may be available to a lock system (60) or [2] such results which are obtained by running lock operations in a lock mode, a lock system (60) may not have to store any new data (such as the above results) therein anyway. Accordingly, a terminal may not need to run any separate erase (or semi-erase) operation onto a lock system (60). However, a terminal may still have to run such erasure (or semi-erasure) to erase all (or some) of such results which may be stored or reside in a temporary memory sector of a lock or main system (60), (10). As described above, a terminal may also recruit a main CPU unit (30) or a main O/S (34) to drive a lock viewer (71) in a lock mode. In this case, some results obtained by running lock operations in a lock mode may be stored or reside in a main system (10), particularly in a temporary memory sector of a main system (10). In this case, a terminal may still run such erasure (or semi-erasure) onto such sectors as well.

In another example, a lock system (60) may include therein at least one designated lock memory unit (71) into which a terminal may store such results obtained by running lock operations in a lock mode, e.g., in a remnant format. Accordingly, a terminal may erase or semi-erase such results with any prior art methods such as, e.g., overwriting, encrypting or other software or hardware methods. In the alternative, a lock system (60) may store selected (or all) portions of such results in a lock memory unit (71) permanently. As described above, a terminal may also run such erasure (or semi-erasure) in a real-time, interim, or ex post arrangement in one of various erasure timings as defined above.

A terminal may erase or semi-erase such results adaptively, e.g., by running an "adaptive erasure" (or "semi-erasure"), when a terminal may monitor, e.g., a potentially dangerous file, a flagged content (e.g., an illegal or obscene text or image) in a lock memory unit (71) or elsewhere in a lock system (60), an unauthorized attempt to access at least one unit of a main system (10), or the like. A terminal may provide a user with a list of such files, contents, or sources, and may run such erasure (or semi-erasure) upon confirmation by the user.

During the semi-erasure, a terminal (or a user) may select which results to be erased, and may then store all of such results remaining in a lock memory unit (71) or in a temporary memory sector of a lock system (60) or main system (10), as far as a terminal may retrieve such results therefrom. Alternatively, a user may manually select which results to be stored (or erased), or a terminal may adaptively select which results to be stored (or erased). A terminal may then erase all other results remaining in a lock system (60) or in the temporary memory sector of a main system (10).

A terminal or a user may select which results to be erased or to be stored in the real-time, interim or ex post arrangement, either manually or adaptively, as described above. A terminal may also adaptively store certain results when a terminal may monitor, e.g., a certain content or website in which a user stays for a period of time which is longer than a reference period, a certain content coinciding with a user preference, or the like. A terminal may also run such erasure (or semi-erasure) while storing such to-be-stored data in one of various "timings" which are similar to such erasure timings but in which a terminal stores such results instead of erasing them.

As described above, a terminal may store those selected results in a lock memory unit (80) or in a temporary memory sector of a lock or main system (60), (10). However, a terminal may prevent such memory units or sectors from driving the remaining units of a main system (10), from storing such results into a main memory unit (40), or the like. By the same token, a terminal may prevent a user who operates a lock system (60) in a lock mode from accessing data which are stored in a main memory unit (40), from transferring data stored in a memory unit of one system to another memory unit of another system, or the like.

4-9. Timings of Launching Various Systems

In another exemplary embodiment of the first exemplary aspect, a terminal may switch from an unlock mode or an intermediate mode to a lock mode by, e.g., launching a lock system (60) and beginning to operate such a system (60) in a lock mode in various timings. This arrangement may prove particularly useful for a user who wants to switch back to a lock mode from an unlock (or intermediate) mode, [1] without having to power off a terminal and then to power in on again, or [2] without having to turn off its display unit and then to turn it on again. Accordingly, whenever a user is not confident whether the operation he or she is to run may adversely affect a main system (10) of a terminal, a user may readily launch a lock system (60) and then switch back to a lock mode in various launch timings.

As described above, "launch timings" are defined similar to the erasure timings and relate to those timings for launching a lock (or main) system with respect to the mode switching. Accordingly, such launch timings may include launching a lock or main system, e.g., [1] concurrently with such mode switching, [2] immediately after the mode switching, [3] after such mode switching but before a user provides another user input, [4] upon receiving a user input which includes a sub-input for launching a lock (or main) system (i.e., running a launch operation), [5] concurrently with or immediately after running an authentication operation, or [6] immediately before, concurrently with, or immediately after turning on (or off) a display unit of a terminal.

In addition, a launch timing [6] of the above paragraph may include other timings related to turning on a display unit, i.e., various turning-on timings. Accordingly, the launching timings may include launching a lock (or main) system, e.g., [6-1] "concurrently with" receiving a user input including $UI_{ACT}$ therein, [6-2] "immediately after" receiving such a user input, where the "immediately" is defined above, [6-3] after receiving a user input which includes $UI_{ACT}$ but "before" a user provides another user input, or [6-4] before, concurrently with, (immediately) after, or within a certain period of time after detecting a "failure" of a user authenticating. Therefore, examples of such cases include [1] when a terminal in its off-state turns on a display unit, and launches a lock system in a lock mode in response to $UI_{ACT}$, [2] when a terminal in its off-state switches to an unlock mode, and switches back to a lock mode when a certain period of time has elapsed and when a user has not provided a user input during the period, or [3] when a terminal in its off-state receives a user input, acquires $UI_{THEN}$ in the off-state, and then turns on a display unit as well as launches a lock system in a lock mode when a user fails such authenticating.

4-10. User Benefits

Contrary to the main system (10) which includes at least one main CPU unit (30), main memory unit (40), main input unit (20), and main output unit (50), a terminal of this Configuration 1 includes a lock system (60) which in turn includes at least one lock viewer (71) and an optional lock memory unit (80), along with at least one optional lock input unit, output unit, or the like. Because the main function of a lock viewer (71) is to view or to browse data like a prior art viewer or browser, a lock viewer (71) is inherently incapable of storing any results obtained by running various lock operations into a lock memory unit (80) or a main memory unit (40). As a result, a terminal of this Configuration 1 may not have to run any erasure or semi-erasure.

In this context, this lock system (60) is useful in reviewing documents or advertisements which are pre-stored therein or which may be obtained from an external provider (or website) via an internet. This lock system (60) is also useful in browsing various websites which offer an educational or advertising material via an internet. More particularly, because a lock system (60) may run such erasure (or semi-erasure) in one of such erasure timings, a user may be relieved from any concern about [1] leaving any results or lists of operations run in a lock mode to a next user, or [2] accidently spoiling or contaminating a main system (10) by such results.

A lock system (60) may incorporate an optional lock memory unit (80) from which a user may retrieve data or into which a user may store results obtained from running lock operations in a lock mode. In addition, a terminal may allow a user to connect to an external memory device such as, e.g., a USB memory device, an external memory disk or chip, another computer, or another data processing device. Accordingly, a terminal may allow a user to use external resources, without having to incorporate everything in a terminal and, therefore, without having to increase a weight, a volume, and manufacturing cost of the terminal.

4-11. 1st Configuration—Variations or Modifications

Various data processing terminals of this $1^{st}$ Configuration as exemplified in FIGS. 5A to 5C may also operate in different configurations, arrangements, or sequences. Therefore, variations or modifications of the terminals (including their units and their hardware or software elements) of this $1^{st}$ Configuration, and their variations or modifications may further include the followings.

4-11-1. Erasure by Overwriting

Various data processing terminals of this $1^{st}$ Configuration may enhance their security, improve their integrity, and better protect data stored therein by, e.g., [1] providing different modes of operation in a hierarchy in which a terminal operates, [2] physically or operationally isolating their main systems from their lock systems, and [3] running the erasure or semi-erasure as described above.

In another exemplary embodiment of the first exemplary aspect, a terminal may erase an entire portion (i.e., run an "erase" operation or run such "erasure") of certain results which are obtained by running lock operations in a lock mode and which may reside or may be stored in a lock system (60). In the alternative, a terminal may erase only a selected portion (i.e., run a "semi-erase" operation or run such "semi-erasure") of such results in one or more of such erasure timings. Therefore, a terminal may entirely or at least partly prevent contamination or degradation of its main system (10) by such results. In addition to erasing such results, a user may preserve his or her privacy as well by, e.g., erasing [1] a list of operations which he or she has run in a lock mode, [2] a list of websites which a user has visited in a lock mode, or [3] a list of contents which he or she has downloaded while running lock operations in a lock mode.

A data processing terminal may run an erase operation in different ways. In one example, a terminal may run various "software-based erase operations" by, e.g., [1] overwriting irrelevant or meaningless data over at least a portion of the to-be-erased results, or [2] encrypting such to-be-erased results before keeping or storing such results in a lock (or main) memory unit. In another example, a terminal may run various "hardware-based erase operations" by, e.g., [1] using a volatile memory unit, [2] degaussing a memory unit, or the like. In the former of the hardware-based erase operation, i.e., [1] of the above, a terminal may stop electrical power supply to a volatile memory unit when or after a terminal may switch modes. As a result, any result stored or residing in a volatile memory unit is lost automatically. In the latter [2] of the hardware-based erase operation, a terminal (or a user) may generate a strong magnetic field and degauss a memory unit with magnetic fluxes emanating from such field. It is appreciated that such degaussing must be performed in a precise manner not to adversely affect other portions or sectors of a memory unit as well as other units of a terminal. It is appreciated that a semi-erase operation is an operation which is run onto only a portion of such to-be-erased results residing in a lock system and, therefore, its software-based or hard-ware-based mechanisms are identical to those of an erase operation.

As explained above, a terminal may erase such to-be-erased results which may reside or may be stored in a memory unit by overwriting meaningless or irrelevant data (to be referred to as "null data") thereover. A terminal may also write such null data over all (or some) sectors (or portions) of a memory unit where such to-be-erased results reside, where examples of such null data may include, but not limited to, [1] a stream of 0's, 1's, or their combination, [2] a stream of other numbers, [3] a stream of other meaningless random or pseudo-random data, [4] a stream of other characters or data selected by a terminal or a user, or the like.

In another exemplary embodiment of the first exemplary aspect, a terminal may run an erase (or semi-erase) operation [1] in different extents onto those results or [2] in different ranges. For example, a terminal may run such erase operation in different extents by running, e.g., [1] a single-pass overwriting operation, [2] a double-pass overwriting operation, or [3] a multiple-pass overwriting operation. Details of such overwriting are well known in the relevant art and, therefore, are omitted herein.

A terminal may also run an erase operation in different ranges. For example, a terminal may run [1] a "full-disk overwriting" operation, [2] a "sector-by-sector overwriting" operation, [3] a "file-by-file overwriting" operation, or [4] a "data-by-data overwriting" operation.

In the full-disk overwriting erasure, a terminal purges all results stored or residing in all sectors (or portions) of a memory unit, while excluding certain sectors which may contain an O/S, a BIOS, or the like. Unless a lock system (60) includes its own O/S, the full-disk overwriting typically means erasing an entire lock memory unit (80), or all temporary memory sectors of a lock system (60). In the sector-by-sector overwriting erasure, a terminal may run an erasing operation one sector after another. Therefore, a terminal purges results in a certain sector (or portion) of a memory unit, while leaving results residing or stored in the remaining sectors (or portions) intact. In the file-by-file overwriting erasure, a terminal may instead erase such results by the file, i.e., one file after another Therefore, a terminal purges certain files of such results which are stored or residing in a memory unit, while leaving other files intact. In a data-by-data overwriting erasure, a terminal purges certain data of such results one after another, while leaving other data intact.

In another exemplary embodiment of the first exemplary aspect, a terminal may run an erase (or semi-erase) operation in different timings as well. For example, a terminal may run one of the above overwriting operations [1] in real time, i.e., running a "real-time" erase (or semi-erase) operation, [2] interim, i.e., running an "interim" erase (or semi-erase) operation, [3] ex post, i.e., running an "ex post" erase (or semi-erase) operation, or the like. Details of such erasure (or semi-erasure) are provided in Section 2-2 and, therefore, omitted herein.

A terminal may run such erasure (or semi-erasure) on demand, i.e., an "on-demand erasure (or semi-erasure)" such as, e.g., when a user actively provides an "erase user input" or an "erase command" to a proper input unit (through a software or hardware element). Marking some of the results as to-be-erased results may be a type of an on-demand erasure. A terminal may also run such erasure [1] upon detecting a non-action by a user for a period of time longer than a threshold period, [2] upon detecting unauthorized attempts by a current user or by a $3^{rd}$ party to access a main system (10), to retrieve data therefrom, to store data thereinto, to otherwise modify or otherwise affect at least one unit of the main system, or the like.

When such to-be-erased results may be stored or residing in at least two different memory units or in different sectors of a single memory unit, a terminal may run such erasure with respect to such memory units or sectors sequentially, i.e., by running such erase operations one memory unit after another, or one sector after another. Alternatively, a terminal may run such erasure concurrently, i.e., by running such erasure over at least two memory units (or sectors), with a temporal overlap therebetween. It is noted that a terminal may manipulate a file manager to run such erase operations or may resort to any other prior art methods.

As explained above, a terminal may also erase such to-be-erased results by encryption. To this end, a terminal may first encrypt such results [1] after such results are obtained, or [2] before storing them in a memory unit. A terminal may then perform a single-pass overwriting which is generally enough to erase such results without leaving any remnant data. When desirable, a terminal may perform a double- or multiple-pass overwriting as well. Accordingly, a terminal may prevent or minimize such remanence problems.

A user may also select which results are to be erased or stored in a memory unit, where a user may select the to-be-erased results manually (e.g., file by file, or folder by folder) through his or her own action (or non-action). Alternatively, a terminal may automatically or adaptively select such to-be-erased results based upon various criteria such as, e.g., a type or a nature of an operation which generates such results, a type of such results, a content included in such results (e.g., obscene, violent, or anti-social), a user setting (or preference) set by a terminal or a user, statistics of user's past or current activities in a lock or unlock mode, other criteria selected by a user, a terminal or a manufacturer, or the like. To this end, a terminal may employ various prior art big data algorithms or artificial intelligence algorithms.

Therefore, a terminal (or a user) may ensure that any results obtained by running non-reliable operations in a lock mode can be completely (or partly) erased upon each and every mode switching, where a new mode may correspond to a mode which is granted with greater access authority than a current mode. Unless expressly conflicting therewith, various features of the above "erase" operations are similarly to or identically applied to the "semi-erase" operations and, therefore, details of such semi-erase operations are omitted herein.

4-11-2. Erasing all Results or Semi-Erasing Some Results

A data processing terminal of this $1^{st}$ Configuration may protect the security or integrity of its main system by physically or operationally isolating its main system (10) from its lock system (60), either partly or completely. In addition, a terminal may completely or partly prevent those results stored or residing in a lock system from adversely affecting, contaminating, or damaging its main system (10), e.g., by running various erase (or semi-erase) operations in one of such erasure timings as defined above. Various terminals of another exemplary embodiment of the first exemplary aspect exemplify such features.

For example, a terminal or a user may erase an entire (or only a selected) portion of results which are obtained by running various lock operations with a lock system (60) in a lock mode. A user may then ensure that such results stored or residing in a lock memory unit (80) (or sector) of a lock system (60) may not adversely affect or degrade any units of a main system (10) of a terminal. In addition, a user may conveniently erase a trace of operations which a user has run using a lock system (60) in a lock mode, and may conveniently erase results which a user downloads with a lock system (60).

In another example, users may readily use either a lock system (60) or a main system (10) depending on each user's different walk of life. Such users may also readily utilize different hierarchies and different modes defined therein for different purposes as well. For example, a user may pick and choose a $1^{st}$ hierarchy (defining a lock mode, an intermediate mode, and an unlock mode) or a $2^{nd}$ hierarchy (defining a lock mode, a $1^{st}$ unlock mode, and a $2^{nd}$ unlock mode) for different purposes. Whereby, a terminal may ensure that a lock or main system (60), (10) operating in one mode of one hierarchy may not adversely affect another system operating in another mode of the same or different hierarchy. More particularly, a terminal may (almost always) run such erasure (or semi-erasure) whenever a terminal may switch from a current mode granted with less access authority to a new mode with greater access authority, while a terminal may not need to run such erasure (or semi-erasure) when a terminal may switch modes in a reserve direction.

A terminal (or a user) may erase such results by many prior art methods such as, e.g., driving certain hardware or software elements of a lock (or main) system (60), (10), e.g., [1] by overwriting meaningless or irrelevant null data over the to-be-erased results, or [2] by encrypting such to-be-erased results after being obtained or before storing, and then performing such overwriting. For simplicity of illustration, all of the above [1] and [2] are to be referred to as an "active erasure (or semi-erasure)" hereinafter.

Conversely, a terminal may include a volatile memory unit which loses all results stored therein once an electric power supply is terminated. In addition, a terminal may erase results in a lock system (60) when a user does not take any action for a period of time longer than a threshold period. Because such erasure does not usually involve an active action exercised by a user, such are to be referred to as a "passive erasure (or semi-erasure)" or "inactive erasure (or semi-erasure)" hereinafter.

A terminal may combine features of such "erasure" and "semi-erasure" in various ways as well. In one example, a terminal may adaptively run such semi-erasure to automatically erase certain results based upon the above criteria, while optionally allowing a user to manually run such erasure when desirable. In another example, a terminal may allow a user to select either "erasure" or "semi-erasure" for each result stored in a lock system (60), each result obtained from running lock operations in a lock mode, each data category (e.g., texts, images, files, alpha-numerical tables, voice recordings, or video clips), each website which a user has accessed in a restricted mode, or the like.

4-11-3. Saving Some or All Results

As described above, a terminal may run such "erasure" or "semi-erasure" upon (or in response to) switching from one mode to another. More particularly, while running such "semi-erasure," a terminal may select certain results which are to be excluded from being erased. Therefore, in another exemplary embodiment of the first exemplary aspect, a terminal may store at least a portion of results which reside or are stored in a lock system (60) when such to-be-stored results may not be deemed to adversely affect a main system (10) either in a lock mode or in an unlock mode.

In one example, a lock system (60) may temporarily (or permanently) store such to-be-stored results in a lock memory unit (80) which is physically or operationally isolated from a main memory unit (40) or other units of a main system (10). As a result, a terminal may entirely or at least partially prevent a lock memory unit (80) and those results stored or residing therein from adversely affecting a main memory unit (40) or other units of a main system (10). Similarly, a terminal may prevent a memory unit of a certain system or results stored or residing therein from adversely affecting a memory (or another) unit of another system. In other words, due to such physical or operational isolation, a user can fully use each system, while completely (or at least partly) preventing a $1^{st}$ system operating in a $1^{st}$ mode and results obtained by running various operations with the $1^{st}$ system in a $1^{st}$ mode [1] from contaminating or adversely affecting any hardware or software element of a $2^{nd}$ system operating in a $2^{nd}$ mode, [2] from adversely changing a physical configuration of a $2^{nd}$ system, [3] from adversely modifying operations and their steps of a software element of a $2^{nd}$ system, or the like.

In another example, a terminal may erase only selected results obtained by running lock operations in a lock mode while storing the rest of such results (i.e., to-be-saved results) in a lock memory unit (80) or in another memory unit (or sector) of a terminal. The terminal may run such semi-erasure in one of such erasure timings.

In another example, a terminal may store different results for different periods of time. For example, a terminal may store some results only temporarily (e.g., only for a preset period) so that those results will be eventually erased automatically (or manually). In another example, a terminal may store some results permanently [1] in a non-volatile memory unit or [2] in a volatile memory while maintaining an electrical power supply thereto. In another example, a terminal may store some results [3] until the next mode switching from one mode granted with less access authority to another mode with greater access authority, [4] until a terminal receives a user input to run an erase (or to semi-erase) operation onto some results, or the like. A terminal may thereafter erase such results concurrently with or after switching to a different mode.

Alternatively, a terminal may store some results semi-permanently, e.g., in a combination of such temporary storing and permanent storing, and erase some results as described above. A terminal may store some results conditionally based upon various criteria such as, e.g., a setting selected by a terminal or a user, $UI_{SWT}$, a non-action by a user for a certain period of time, or the like. A terminal may also store some results until (or after) the mode switching, until (or after) a certain event occurs, or the like.

A terminal may store such to-be-stored results in various hardware elements such as, e.g., in a lock memory unit (80), in an external memory unit which may (or not) be provided as an add-on device, in a memory unit of an external device or another terminal, or the like. A terminal may store such to-be-stored results in a memory unit of a cloud storage system or in a designated portion of a main memory unit (40) of a main system (10). A terminal may also store such results in any temporary memory sectors provided in any of the above units or systems. When an add-on device is recruited as an external memory unit, the add-on device may be utilized as a lock memory unit, may instead be utilized as a supplementary main memory unit, or the like.

One example of the temporary memory sectors is a prior art data buffer, where a data buffer refers to at least one sector or portion of a lock (or main) memory unit for temporarily storing results while they are moved from one place of a memory unit to another place. A data buffer may be [1] a fixed memory location in a memory unit (or another medium) or [2] a virtual location in the memory unit (or another medium). Another example of the temporary memory sector is a prior art cache which may act as a data buffer.

Another example of the temporary memory sectors is a prior art clipboard which is a type of a data buffer (e.g., a paste buffer) and which may be a sector (or a portion) of a memory unit (or another medium). A data buffer is a short-term data storage between documents or (software) applications via, e.g., a copy operation, a paste operation, or the like. Another example is a prior art recycle bin which also occupies at least a sector (or portion) of a memory unit (or another medium) and which may be used to temporarily store data which have been deleted in a file manager but that has not yet been erased permanently from the file system.

Such temporary memory sectors (or units) may be provided in a main memory unit (40) or a lock memory unit (80) or in other parts of a terminal. Such temporary memory sectors (or units) may generally be implemented as an internal unit of a terminal or may instead be provided as an external (memory) unit of another terminal or computer, as an external memory device (e.g., a USB memory device), or as an add-on device (e.g., an external memory device).

A terminal may temporarily store some of the results by, e.g., storing such results wherever they are generated, sending such results to a temporary memory sector (or portion) of a memory unit or other units of a main or lock system, or the like. Thereafter, a terminal may erase such results whenever it sees fit, e.g., by overwriting, encrypting first and then erasing, terminating a power supply, or the like. A terminal may conditionally store some results as well by, e.g., storing some results wherever they are generated, transmitting some results to a temporary memory sector (or portion), or the like. A terminal may then decide whether or not to store (or erase) some results for a certain period based on various criteria such as, e.g., a user input, a (user) sub-input accompanied thereby, a type or a nature of such results, a user preference or setting, a user action or non-action, attempts by an unauthorized user to access at least one accessible hardware or software elements of a main system, or the like.

In another example, a terminal may also store such results in various timings. It is appreciated that such timings for storing at least a portion of such results generally coincide with the erasure timings. Therefore and as used herein, "storing timings" are these timings which are related to storing at least a portion of such results and the mode switching, where examples of such storing times may include storing such a portion of the results [1] concurrently with such mode switching (e.g., at least one step of such a storing operation overlaps with at least one step of a mode-switching operation), [2] immediately after such mode switching, where the "immediately" has been defined above, [3] after such mode switching but before a user provides another user input, [4] upon receiving a user input which includes therein a (user) sub-input for such storing, or the like, where examples if such mode switching have been defined in Section 1-4, while examples of such erasure timings have been provided in Section 2-2.

Such storing times may include other timings which are related to such storing and user authenticating, where examples of such storing times may include storing such a portion of the results [1] concurrently with running an authentication operation (e.g., upon determining whether a current user passes or fails), [2] immediately after running an authentication operation, [3] immediately before, concurrently with, or immediately after turning on (or off) a display unit of a terminal, [4] immediately before, concurrently with, or immediately after powering off (or on) a terminal, or [5] concurrently with or immediately after receiving a user input with a (user) sub-input for running such erasure (or semi-erasure).

In addition, a terminal may store such a portion of such results in a real-time, interim, or ex post arrangement as well. For example, a terminal may run a "real-time storing" in such a way that the terminal runs such storing as a user runs one lock operation after another, that a terminal stores data after data, file after file, folder after folder, or the like. A terminal may rather run an "interim storing" at every preset intervals, at every intervals selected by a user, or at every instances when, e.g., results obtained by running such lock operations exceed a certain size. A terminal may instead run an "ex post storing" in such a way that a terminal runs such storing once a user finishes a session of running lock operations in a lock mode, [1] regardless of whether a user may still operate a terminal in a lock mode or [2] regardless of whether a user still operates a terminal in a current mode.

Before, concurrently with, or after one of such storing timings, a terminal may erase unselected (but probably not all) results obtained by running lock operations in a lock mode in one of such erasure timings. Accordingly, a terminal may attain various goals such as, e.g., enhancing the security of a main system (10) of a terminal by preventing alternation or modification or by preventing hacking of a main system (10) by an unauthorized user, improving the integrity of a main system (10), preserving private user data stored or residing in a main memory unit (40), or the like. When dealing with multiple sets of results, a terminal may store (or erase) such sets of results in various ways such as, e.g., concurrently (i.e., in parallel and with at least one temporal overlap therebetween), sequentially (i.e., one after another) with a temporal gap therebetween, or the like.

As described above, a terminal may run such storing or erasing not only in a 1$^{st}$ hierarchy which includes a lock mode and an unlock mode, but also in a 2$^{nd}$ hierarchy with multiple lock modes and an unlock mode, in a 3$^{rd}$ hierarchy with a lock mode, multiple unlock modes, in another hierarchy with such lock modes, unlock mode, and at least one intermediate mode, or the like, where the above examples applies to at least two or all of such different modes.

4-11-4. Hierarchies and Modes

Although such data processing terminals of this 1$^{st}$ Configuration operate in a hierarchy which defines a single lock mode and a single unlock mode, such terminals may also operate in different hierarchies which define different modes therein, which arrange such modes in different arrangements, or the like. Accordingly and in another exemplary embodiment of the first exemplary aspect, a terminal may operate in various hierarchies, where each hierarchy defines a certain number of different or identical modes and where a terminal may grant each of such modes with identical, different, or comparable access authorities. Accordingly, once selecting a hierarchy, a terminal may operate in each of multiple modes defined in a hierarchy one at a time.

As described above, a terminal may also operate in multiple modes concurrently, particularly when the terminal may provide multiple screens, while operating different systems in different modes in each of such screens. It is appreciated that following examples of this Section applies to a terminal which operates one system in one mode at a time. However, such examples may apply to each of multiple systems operated by a single terminal but in multiple screens provided by the terminal.

Returning to the embodiment of this Section, a terminal may accomplish a certain level of security and integrity in each mode, while a user may enjoy a certain level of privacy in each mode as well. In addition, a terminal may switch its modes from one to another along a certain hierarchy so that a user may select a current mode, a new mode, and then a 2$^{nd}$ next mode based upon such access authorities which he or she desires. It is appreciated that access authorities granted to such multiple modes are typically defined in a relative context such as, e.g., based upon a scope or an extent of authorities to access to drive certain hardware or software elements of a main system of a terminal along a certain hierarchy.

To this end, a terminal may establish various hierarchies each of which defines at least two modes therein. In addition, a terminal may grant identical, similar, comparable or different access authorities to each mode, and may grant a user to drive certain units, or certain hardware or software elements, depending upon which mode a user operates a terminal and, therefore, depending upon which of a lock, intermediate, or main system a user is operating. Accordingly, a user may run different number or types of operations in each of such modes, and may use each mode for different purposes, while enhancing the security of a main system of the terminal, improving the integrity thereof, and better protecting user data stored in the terminal.

Similarly, a terminal may provide various hierarchies and may allow multiple users to operate the terminal in a certain hierarchy. Because a terminal may set up a hierarchy and may grant identical, similar, comparable or different access authorities to each mode defined in the hierarchy, assigning a user to operate a terminal in a certain hierarchy may correspond to granting a user to operate the terminal with certain access authority in each mode defined in the hierarchy. As a result, each user may operate a terminal in his or her own hierarchy, may operate a terminal in his or her own modes, or the like. As a result, the security of a main system of a terminal can be enhanced, the integrity of the main system can be improved, and data stored therein can be kept personal and do not get exposed to other users who operate a terminal in a different hierarchy or mode.

As defined in Section 1-4, a "mode" refers to an operational state of a data processing terminal, where a user can access a certain number of accessible hardware or software elements of a main system. A "hierarchy" similarly means a set of at least two modes which a terminal actually defines along a line of the access authority or on a domain of the access authority. A terminal grants a preset access authority to access the accessible hardware or software elements of the main system. Because various terms are defined in previous Sections, definitions of terms such as a "forward or backward direction," a "series, parallel, or hybrid arrangement," a "non-circulating or circulating" hierarchy, and a "series or selective switching" arrangement are omitted herein.

Various hierarchies have been exemplified in the previous Sections. However, a few additional hierarchies are further provided herein to explain a "sequence-specific hierarchy" [1] in which a user may not be able to switch to certain modes unless he or she follows a certain path or [2] in which a user may get stuck in a "trap mode" which prevents a current user from switching to at least one of other modes provided in the hierarchy.

Figure 6A:
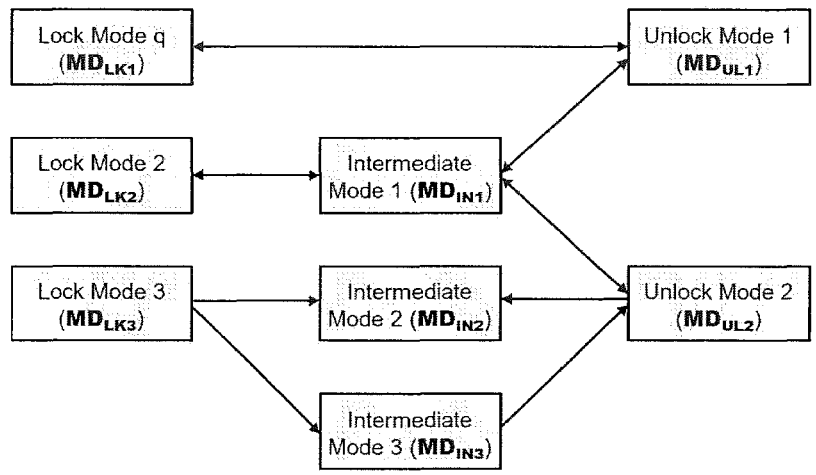
FIGS. 6A and 6B are schematic diagrams of exemplary sequence-specific hierarchies.

FIG. 6A shows a schematic diagram of an exemplary sequence-specific hierarchy, where the hierarchy defines three lock modes ($MD_{LK1}$, $MD_{LK2}$, and $MD_{LK3}$), three intermediate modes ($MD_{IN1}$, $MD_{IN2}$, and $MD_{IN3}$), and two unlock modes ($MD_{UL1}$ and $MD_{UL2}$). It is appreciated that a terminal may grant [1] each of such lock modes with identical, similar, or different access authorities, [2] each of three intermediate modes with identical, similar, or different access authorities, [3] each of such unlock modes with identical, similar, or different access authorities, or the like. Based on whether a terminal operates in a series switching or selective switching, a terminal may switch modes according to various paths and directions of the arrows shown in the hierarchy.

In one case, a 1$^{st}$ user may provide $UI_{SWI}$ to a terminal and may switch from an off-state to one of multiple lock modes, $MD_{LK3}$. When a terminal allows the mode switching along a forward or backward direction, a user may switch modes while roaming around each mode in a hierarchy, either by the series or selective switching. For example, a 1$^{st}$ user may switch modes along the path from $MD_{LK3}$ to either of $MD_{IN2}$ or $MD_{IN3}$, then to $MD_{UL2}$, to $MD_{IN1}$, and then to either of $MD_{LK2}$ or $MD_{UL1}$. In addition, a 1$^{st}$ user may further switch modes from $MD_{UL1}$ to $MD_{LK1}$. A 2$^{nd}$ user who advances to $MD_{LK1}$ from an off-state may similarly be able to switch to all modes defined in the hierarchy, except $MD_{LK3}$, for the hierarchy does not allow a user to switch modes in a backward direction from $MD_{IN2}$ or $MD_{IN3}$ to $MD_{LK3}$ (e.g., those arrows between $MD_{LK3}$ and $MD_{IN2}$ and between $MD_{LK3}$ and $MD_{IN3}$ are one-way arrows). A 3$^{rd}$ user who advances to $MD_{LK2}$ from an off-state cannot switch to $MD_{UL3}$ either.

In other words, by manipulating various paths connecting different modes, location of the paths, and directions of mode switching in each of such paths, a terminal may manipulate a hierarchy in such a way that a user may (or may not) be able to switch to a certain mode, depending upon in which mode a user starts to navigate a hierarchy. In this context, such a hierarchy is referred to as a "sequence-specific hierarchy" hereinafter. As a result, even though a certain mode is explicitly defined in a hierarchy, a user cannot switch to a certain mode, unless a user enters a hierarchy in a correct mode.

This sequence-specific hierarchy may prove useful in many circumstances. In one case, when a user desires to use $MD_{LK3}$ to himself alone, and does not want others to operate in $MD_{LK3}$, a user may set up $UI_{SWT-3}$ in such a way [1] that he or she can switch to $MD_{LK3}$ but [2] that other users who do not know an existence of $UI_{SWT-3}$ can neither advance to $MD_{LK3}$ from the off-state nor switch from other modes of the hierarchy. In another case, even when an intruder may successfully hack a terminal and advances to a certain mode, a terminal may effectively prevent the intruder from switching to $MD_{LK3}$, unless the intruder may be lucky in advancing to a correct mode. Therefore, a user may utilize the sequence-specific hierarchy, e.g., by hiding a "hidden mode" in a safe location of a hierarchy, while trapping unwary intruders in other modes from which the intruder cannot switch to the hidden mode. A user may set up the hidden mode as an unlock mode or as a lock mode.

Figure 6B:
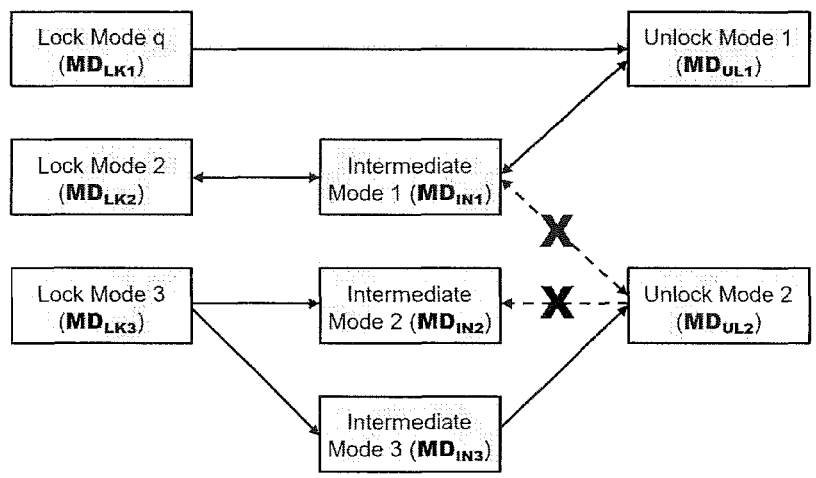

FIG. 6B is a schematic diagram of another exemplary sequence-specific hierarchy. Similar to that of FIG. 6A, a hierarchy of FIG. 6B also defines three lock modes, three intermediate modes, and two unlock modes, while a terminal may grant each of such lock, intermediate, or unlock modes with identical, similar, or different access authorities. Based on whether a terminal operates in a series switching or selective switching, a terminal may switch modes according to the hierarchy.

Although the hierarchies of FIGS. 6A and 6B define the same modes therealong, the hierarchy of FIG. 6B does not define paths between $MD_{IN1}$ and $MD_{UL2}$ and between $MD_{IN2}$ and $MD_{UL2}$. As a result, a $1^{st}$ user who begins to operate a terminal in $MD_{LK1}$ or $MD_{LK2}$ or a $2^{nd}$ user who is currently in $MD_{IN1}$ or $MD_{UL1}$ can never switch to such modes defined in a lower part of a hierarchy such as, e.g., $MD_{LK3}$, $MD_{IN2}$, $MD_{IN3}$, and $MD_{UL2}$. Similarly, a $3^{rd}$ user who starts to operate a terminal in $MD_{LK3}$ or a $4^{th}$ user who is currently in $MD_{IN2}$, $MD_{IN3}$, or $MD_{UL2}$ can never switch to various modes which are defined in an upper part of the hierarchy such as, e.g., $MD_{LK1}$, $MD_{LK2}$, $MD_{IN1}$, and $MD_{UL1}$. As used herein, a user who is currently in either of the upper or lower part of such a hierarchy are referred to as being "trapped" in those modes of the upper or lower part of the hierarchy, and such a hierarchy is referred to as a "trapping hierarchy" which is synonymous with a "sequence-specific hierarchy" hereinafter.

A terminal may take advantage of this trapping hierarchy for various purposes, e.g., for enhancing the security of a terminal and for preserving the privacy of data stored in a main system of the terminal. A terminal with this feature may even be able to block an intruder who has been lucky to advance to a lock (or intermediate) mode from switching to a more unrestricted mode (e.g., an unlock mode), and to prevent the intruder from accessing the hardware or software elements of a more unrestricted system (e.g., a main system). Therefore, by carefully curtailing details of a hierarchy and connection paths among various modes thereof, a terminal may effectively prevent a hacker from advancing to a certain hidden mode.

As described above, a terminal may employ various hierarchies in each of which various different, comparable, similar or identical modes may be defined. Even when two hierarchies define the same number of modes and arrange such modes in an identical arrangement, such seemingly identical modes of each hierarchy [1] may be granted with different access authorities or [2] may be connected to different modes by different paths with arrows pointing in different directions. In other words, setting a certain hierarchy, defining a certain number of modes therein, and arranging such modes in a series, parallel or hybrid manner are typically a matter of choice of a person who designs operations of various hardware or software elements of a terminal.

In addition, although various features of the series, parallel, and hybrid hierarchies have been provided above, selecting a suitable hierarchy may also be user dependent such that a user may establish a suitable hierarchy based on his or her needs. Therefore, a series hierarchy may be generally useful when a user is the only one authorized user of a terminal. A user may then set up multiple modes of different access authorities in a series mode such that a user may switch from one mode with less (or more) access authority to another with more (or less) access authority in a sequence defined by the hierarchy.

As described above, when multiple users share the same terminal, a parallel or hybrid hierarchy may prove useful. In one example, each user may want to use at least one mode as his or her own mode, while [1] without sharing the mode with other users or [2] without allowing others from switching to such a mode, [3] regardless of how much access authorities the terminal may grant to each user. By having his or her own mode, each user may better preserve his or her own privacy, while a terminal may also enhance its security and integrity.

This does not necessarily mean that a single user may not want to have a parallel or hybrid hierarchy, because a single user may use, e.g., three comparable or similar modes in a parallel hierarchy, while using a $1^{st}$ mode for work, a $2^{nd}$ mode for a hobby, and a $3^{rd}$ mode for his or her personal matters. Although a simple hierarchy may be generally useful for a single user, a rather complicated hierarchy may also be useful when a single user desires to use a terminal for various independent fields.

In this respect, various modes of operation as described in this disclosure apply not only to the data processing terminals such as, e.g., hand-phones or smart-phones, but also to a network for communications. For example, when a group of users shares a certain network while each user may use his or her own terminal, a parallel or hybrid hierarchy each defining therein multiple modes may also be helpful for enhancing security or integrity of a terminal as well as for preserving privacy of each user's data stored in the network. A parallel or hybrid hierarchy may also prove powerful in preventing a hacker from accessing other modes which are individually used by others.

In general, there is nothing like a standard hierarchy or the best hierarchy, which not only solves every possible concern but also meets all requirements or needs. In addition, although it is generally a common sense to set up a hierarchy starting from a mode granted with the least access authority, then a next mode granted with more access authority, and then ending with the last mode with the greatest access authority, this sequence may not hold everywhere. As described above, a user may set up a hierarchy which defines a certain number of modes which are in turn arranged according to the needs of the user.

In the same context, a terminal may facilitate a user to readily set up his or her own hierarchy and conveniently use the hierarchy. To this end, a terminal may provide a sample hierarchy kit and allow a user to customize it based on his or her own needs. For example, a terminal may display a 5-by-5 matrix hierarchy defining therein a total of 25 modes each of which is connected to each and every adjacent mode. Using the 5-by-5 sample matrix, a user may [1] delete modes which he or she does not need, [2] delete unnecessary connection paths therebetween, [3] add new modes, [4] add new connection paths, or [5] adjust existing connection paths to allow himself or herself to switch to certain modes. In another example, a terminal may instead provide a set of basic components of a hierarchy such as, e.g., rectangular or square blocks each representing a mode, connecting paths with at least one arrowhead which represents a direction of mode switching, or the like. A user may then customize a hierarchy based thereon, like building a block with Lego pieces.

In addition, when a certain hierarchy defines more than, e.g., five modes, and defines complicated connecting paths therebetween, remembering details of the hierarchy and multiple modes defined therein may well exceed a memory capacity of an ordinary user. In this case, it is natural that a user may not be able to remember in which mode to start to operate a terminal, to which mode he or she has to switch to run an operation with a proper access authority, or the like. To assist such a user, a terminal may display details of a hierarchy. For example, a terminal may [1] display a structure or an arrangement of a hierarchy, [2] display details of connection paths among multiple modes of the hierarchy, [3] provide detailed sequence of mode switching within the hierarchy, [4] inform a user which mode he or she is currently in, [5] provide all modes to which a user can switch from a current mode, [6] provide a list of the hardware or software elements of a main or lock system which a user can drive in a current mode or in the new mode, or the like. A terminal may also provide a user with such information from [1] to [6], by displaying visual images on a display unit or a notice unit, or by generating audible or tactile signals with a notice unit, where details of such notice units have been provided in greater detail in Section 2-7.

4-11-5. Mode Switching Made Easy

In another exemplary embodiment of this first exemplary aspect, various data processing terminals and their related methods of this disclosure may enable a user to conveniently switch from one mode to another mode. To this end, a terminal may include at least one input unit which includes a designated sensor for acquiring at least one "mode-switching (user) sub-input" or $UI_{SWT}$ from a user input. As a result, a user may switch from a current mode to a new mode by providing a single user input to a terminal, without having to turn off a display unit and then turning it on again, like a user has to do with a prior art data processing device.

In one example of this exemplary embodiment, when a user provides a single user input (i.e., providing $UI_{SWT}$ once), a "mode-switching input unit (25)" of a terminal may acquire $UI_{SWT}$ with its sensor. Upon acquiring $UI_{SWT}$, a sensor may generate and send a control signal to a terminal, more particularly, a main CPU unit (30) or a main O/S (34). When desirable, a mode-switching input unit (25) may verify [1] whether acquired $UI_{SWT}$ is authentic, [2] whether acquired $UI_{SWT}$ matches any mode listed in a matching list, or the like. Upon receiving or recognizing the control signal, a main CPU unit (30) or a main O/S (34) may switch from a current mode to a new mode which is adjacent to a current mode in the forward (or backward) direction in a hierarchy. In general, a terminal adopting the series switching follows this suit.

When a terminal adopts the selective switching, it may consult a "matching list" upon receiving a control signal or $UI_{SWT}$. Because the matching list matches each of multiple $UI_{SWT}$'s with each of multiple modes defined in a hierarchy, a terminal may select a new mode as designated (or matched) by the control signal or $UI_{SWT}$, and may switch modes accordingly. As a result, the user can switch from a current mode (including an off-state or a powered-off state) to a new mode (including an off-state or a powered-off state) by providing $UI_{SWT}$ once.

A terminal may receive a user input and then acquire $UI_{SWT}$ therefrom with various input units. In one case, a terminal may include a separate mode-switching input unit (25) which is different from an activation input unit or an authentication input unit. A mode-switching input unit (25) may [1] only receive a user input which includes $UI_{SWT}$ but no other (user) sub-inputs therein, [2] receive a user input which includes $UI_{SWT}$ along with other (user) sub-inputs, [3] receive multiple user inputs at least one of which includes $UI_{SWT}$, while other user inputs may optionally include $UI_{ACT}$, $UI_{THEN}$, or $UI_{AUX}$, or [4] receive multiple user inputs at least two of which include multiple $UI_{SWT}$'s, along with other optional user sub-inputs. A mode-switching input unit (25) may also be implemented into a main system (10) or a lock system (60). In this context, a mode-switching input unit (25) may be viewed [1] as a hardware element of a main system (10), [2] as a hardware element of a lock system (60), or [3] as not being an element of the main or lock system (10), (60).

Conversely and in another case, a single input unit may receive a single user input or multiple concurrent (or sequential) user inputs at least one of which includes therein $UI_{SWT}$ and may optionally include at least one another (user) sub-input. To this end, a single input unit [1] may serve as a mode-switching input unit as well as an activation input unit and may acquire $UI_{SWT}$ and $UI_{ACT}$ therefrom, [2] may serve as a mode-switching input unit as well as an authentication input unit and may acquire $UI_{SWT}$ and $UI_{THEN}$ therefrom, or [3] may serve as an almighty input unit and may acquire $UI_{SWT}$, $UI_{ACT}$, and $UI_{THEN}$ therefrom. Accordingly, a single input unit of [1] may include two sensors for acquiring $UI_{SWT}$ and $UI_{ACT}$, another input unit of [2] may include two sensors for acquiring $UI_{SWT}$ and $UI_{THEN}$, and almighty input unit of [3] may include three sensors for acquiring $UI_{SWT}$, $UI_{ACT}$, and $UI_{THEN}$.

The single input unit of the above paragraph may be fabricated in various configurations as well. In one case, the single input unit may be provided as a composite article which may be an assembly of multiple input units, where multiple sensors of such multiple input units are disposed in an arrangement capable of acquiring such (user) sub-inputs. The single input unit may rather be provided as a unitary article in which multiple sensors are incorporated inside the article or exposed on a surface thereof. Various arrangements of this paragraph offer various benefits to a user. More particularly, because a user can provide multiple sub-inputs to a single input unit with a single user input (e.g., a single manipulation of such an input unit), a terminal may provide seamless operations to a user.

In another case, a terminal may switch modes in response to various $UI_{SWT}$'s. In one case when a terminal may include at least one mode-switching input unit (25), a terminal may switch modes when a user supplies [1] $UI_{SWT}$ which matches one mode of a hierarchy or which is included in a matching list, [2] $UI_{SWT}$ designated to multiple operations, where one of such operations is a mode-switching operation, [3] a user effort designated as $UI_{SWT}$, or [4] multiple quick efforts designated as $UI_{SWT}$.

In another case, a terminal may switch modes without necessarily acquiring $UI_{SWT}$ from any user input at all. An exemplary case of this arrangement is when the mode switching may be conditioned upon occurrence of certain events such as those associated with the turning-on timings, the erasure timings, the launch timings, or the storing timings. A terminal may instead monitor and use a "non-action" by a user as one of such certain events, where a non-action may refer to an event [1] when a user may not perform a certain action (such as, e.g., not providing any $UI_{SWT}$ within a certain period of time), [2] when a user remains in a certain step of an operation for more than a certain period, [3] when a user does not respond to a request by a terminal, [4] when a user responds to a request by a terminal but such response is wrong or incorrect, [5] when the circumstance of [4] happens and a user does not rectify his or her error within a certain period, or the like.

When a user provides multiple user inputs at least one of which includes at least one $UI_{SWT}$, a mode-switching input unit (25) may receive such user inputs concurrently or sequentially, and may acquire $UI_{SWT}$ therefrom. A terminal or a mode-switching input unit (25) may also acquire other (user) sub-inputs which are included in the user input, and generate at least one control signal for each sub-input. Based upon $UI_{SWT}$ or the control signal designated to (or matching with) $UI_{SWT}$, a terminal may switch from a current mode to a new mode, whether a terminal may receive such a user input in a powered-off state, in an off-state, or in an on-state.

In another case, a terminal may (or may not) run at least one authentication operation along with running a mode-switching operation. In one case, a terminal may not run any authenticating when it switches, e.g., from an unlock mode to a lock mode or vice versa. In another case, a terminal may run an authentication operation when it switches, e.g., from a lock mode to an unlock mode or vice versa. When desirable, a terminal may also run authenticating when it switches from one mode to another, regardless of the access authorities granted to such modes.

In another case, when multiple users share a single terminal, a terminal may run at least one authentication operation in various "timings" as well. For example, a terminal may run such authenticating [1] only when a user switches from a $1^{st}$ mode granted with less access authority to a $2^{nd}$ mode with greater access authority, [2] whenever a user may switch modes regardless of access authorities granted thereto, [3] only when a new user who is granted with less access authority takes over a terminal from a current user granted with greater access authority, [4] whenever a different user takes over a terminal, regardless of access authorities granted to such users, [5] whenever a preset event occurs as described above, or the like.

A terminal may run the same authentication operation in each of such timings or may instead run at least one different authentication operations. For example, a terminal may [1] run fingerprint authenticating in a $1^{st}$ mode switching but run an iris (or retina) authenticating in a $2^{nd}$ mode switching, or [2] run a fingerprint authenticating when a $1^{st}$ user wants to operate a terminal, but run a face authenticating when a $2^{nd}$ user wants to do so.

Such examples of the two preceding paragraphs may apply to a group of multiple users who are using their own terminals in a single secured network. By implementing at least one identical or different authenticating, the security and integrity of the network and those of the terminals may be enhanced, and user privacy may also be preserved. A terminal may acquire various (user) sub-inputs to run an authentication operation as well as to run a mode-switching operation by, e.g., acquiring $UI_{THEN}$ from a $1^{st}$ user input but acquiring $UI_{SWT}$ from a separate, $2^{nd}$ user input which may be concurrent or sequential with respect to a $1^{st}$ user input.

Alternatively, a terminal may receive a single user input including both of $UI_{THEN}$ and $UI_{SWT}$, optionally along with $UI_{ACT}$, $UI_{AUX}$, or the like.

In another case, a terminal may designate various input units to receive various user inputs at least one of which includes at least one $UI_{SWT}$, or may designate at least one of such input units to acquire $UI_{SWT}$. In one case, a terminal may designate a single input unit for acquiring single $UI_{SWT}$ or multiple, different $UI_{SWT}$'s either concurrently or sequentially. Alternatively, a terminal may designate each of multiple input units to receive a single user input which in turn includes a single identical (or different) $UI_{SWT}$, or multiple user inputs including identical (or different) $UI_{SWT}$'s or the like.

In another example of this exemplary embodiment, various data processing terminals and related methods of this disclosure may enable a user to switch modes by providing a direction-sensitive (or direction-insensitive) $UI_{SWT}$, thereby allowing a user to switch modes in either a forward or backward direction in a certain hierarchy. Accordingly, a terminal may switch from a current mode to a new mode in response to [1] a direction-sensitive $UI_{SWT}$ or [2] a direction-insensitive $UI_{SWT}$, where a direction-sensitive $UI_{SWT}$ carries information whether the mode switching is in a forward or backward direction.

In one case, a user may provide a user input by manipulating a mode-switching input unit (25) (or other input units) while manipulating a direction of such user input as well. When the input unit receives a user input, its sensor may acquire specific $UI_{SWT}$ based not only on the nature of such manipulation but also on a direction of such manipulation. A terminal may then select one of multiple $UI_{SWT}$'s from the direction, and may switch modes accordingly. As a result, this configuration is helpful for a user who operates a terminal in the selective switching, for a user may seamlessly provide a desirable $UI_{SWT}$ with a single effort.

In another case, the above configuration may be helpful for a user operating a terminal in the series switching as well. That is, a user may manipulate a direction of a user input and provide $UI_{SWT}$ which may control the mode switching in a forward or backward direction. As a result, a user may switch from a current mode to a neighboring mode in either the forward or backward direction.

In another example of this exemplary embodiment, various data processing terminals and related methods of this disclosure may enable a user to provide multiple (identical or different) $UI_{SWT}$'s with a single user input, multiple concurrent user inputs, or multiple sequential user inputs. In general, a user may provide multiple $UI_{SWT}$'s to a terminal which may operate in the series switching. Upon acquiring such $UI_{SWT}$'s, a terminal may switch to a new mode which is separated from the current mode by the same number of $UI_{SWT}$'s. For example, when a user provides a terminal operating in the series switching with three sequential $UI_{SWT}$'s, a terminal may then switch to a new mode which is a $3^{rd}$ adjacent mode from a current mode in a forward direction, or to a new mode which is three blocks away from a current mode in the same direction.

In another example of this exemplary embodiment, various data processing terminals and related methods of this disclosure, a terminal may be configured to select a new mode by simply consulting a "matching list" which matches each of multiple $UI_{SWT}$'s with each of multiple modes defined in a certain hierarchy. For example, when a terminal receives $UI_{SWT}$ and when a terminal operates in the selective switching, a terminal may locate an entry (i.e., one of multiple pre-defined modes which is intended by a user) which corresponds to one of $UI_{SWT}$'s which the user provided to the terminal.

Accordingly, a terminal sets up a matching list for a certain hierarchy operation which may define such modes. In case when a terminal defines multiple hierarchies, a terminal may define multiple matching lists each of which is used by each hierarchy. Alternatively, a terminal may define a single matching list in which all modes defined in all hierarchies may be matched to each of multiple $UI_{SWT}$'s. It is appreciated, however, that when a terminal operates in the series switching, a terminal may not require the matching list.

It is appreciated that a matching list [1] may match a single $UI_{SWT}$ with a single mode of operation (i.e., 1-to-1 matching), [2] may match a matching list may match multiple $UI_{SWT}$'s with a single mode (i.e., m-to-1 matching), [3] may assign a single $UI_{SWT}$ to multiple modes (i.e., 1-to-n matching), or [4] may instead match multiple $UI_{SWT}$'s to multiple modes (i.e., m-to-n matching).

In general, a terminal adopts the arrangement [1] of the preceding paragraph, for this arrangement may be straightforward and free of confusion. However, the arrangement [2] of the preceding paragraph may also be useful when a user operates a terminal preferentially in one mode. For example, when a user switches to a preset mode most frequently, a terminal may be configured that manipulating a mode-switching input unit in three of four directions switches to the preset mode, while manipulating the input unit in the last direction may switch to another mode.

The arrangement of the above [3] may be useful when a terminal sets up multiple modes which are related to each other in some traits. For example, when a user performs multiple projects for work, the user may set up different modes in each of which the user may only drive a certain hardware or software element, may access only certain data stored therein, or the like.

When a user provides a user input and a terminal acquires a single $UI_{SWT}$ therefrom, a terminal may display a list of multiple modes in such a way that a user may then select one mode from a list of such related modes, e.g., by displaying a list of different modes of operation to which the user may switch. Thereafter, a user may provide additional $UI_{SWT}$ and may switch to the mode of his or her selection. This arrangement may be useful in relieving a burden from a user in memorizing a hierarchy and various modes defined therein. Alternatively, a terminal may be configured such that, once a terminal displays a list of different modes, a user may be able to provide additional $UI_{SWT}$ concurrently, and that a $1^{st}$ user input and a $2^{nd}$ user input with additional $UI_{SWT}$ can be a single, concurrent user input.

In another example of this exemplary embodiment, various data processing terminals may condition the mode switching with other operations run by a terminal. Examples of such operations may include, e.g., [1] running an authentication operation, [2] running a turning-on operation, [3] launching a lock, intermediate, or main system, [4] running an erase (or semi-erase) operation, or the like.

4-11-6. Mode Switching Embodied Easy

In another exemplary embodiment of this first exemplary aspect, a data processing terminal may be configured to embody such mode switching in a manner which is most convenient to a user, while maintaining seamless features related to such mode switching. As described below, embodying the mode switching operations and configurations therefor may be accomplished by incorporating necessary hardware or software elements into various terminals of this disclosure.

More particularly and as described above, a data processing terminal of this disclosure may include a mode-switching input unit which is designated to receive a user input with $UI_{SWT}$. As a result, a user may not have to manipulate multiple prior art input units or may not have to manipulate a single prior art input unit more than once. In addition, a terminal may combine a mode-switching input unit with another input unit and may acquire $UI_{SWT}$ concurrently with $UI_{ACT}$ or $UI_{THEN}$. Accordingly, a terminal may provide a user with benefits of seamless features, with which a user may run multiple operations while providing a single user input to a terminal.

In one example of this exemplary embodiment, a terminal may include at least one hard button-type mode-switching input unit (25) which can acquire $UI_{SWT}$ therewith. FIGS. 7A to 7D are top views of exemplary mode-switching input units which are incorporated into various locations of a terminal as hard buttons or hardware elements.

Figure 7A:
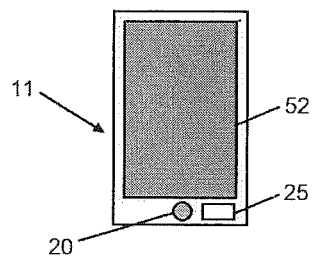
FIGS. 7A to 7D are top views of exemplary mode-switching input units which are incorporated into various locations of a terminal as hard buttons or hardware elements.

FIG. 7A exemplifies a terminal which includes a display unit (52), a main input unit (20), and a mode-switching input unit (25) on its front surface. A main input unit (20) may receive a $1^{st}$ user input and include one or more sensors which may be shaped, sized, or configured to acquire [1] an activation (user) sub-input ($UI_{ACT}$) or [2] an authentication (user) sub-input ($UI_{THEN}$). A mode-switching input unit (25) may include a sensor for acquiring a mode-switching (user) sub-input ($UI_{SWT}$), and may be positioned adjacent to a main input unit (20).

A user may press, contact, or otherwise move (or touch) at least a portion of a main input unit (20) of a terminal (11) which is in its off-state, thereby providing a $1^{st}$ user input to a terminal (11). Upon receiving a $1^{st}$ user input, a terminal (11) may acquire $UI_{ACT}$ from a $1^{st}$ user input, turn on its display unit (52), and launch a lock system in a lock mode. When desirable, a terminal (11) may also run an authentication operation upon acquiring $UI_{THEN}$, either before or concurrently with turning on a display unit (52). A user may run various lock operations in a lock mode as well.

When a user wants to switch to a new mode, a user may consult a hierarchy which defines various modes in which a user may operate a terminal (11). For example, a user may first select a new mode by considering, e.g., whether a hierarchy defines such a mode. If so, a user may select $UI_{SWT}$ which matches a new mode, and provide a $2^{nd}$ user input which accompanies that $UI_{SWT}$. To this end, a user may manipulate at least a portion of a mode-switching input unit (25), e.g., by pressing, pushing, rotating, pivoting, contacting, touching, or otherwise moving such a portion of the input unit (25).

Upon receiving a $2^{nd}$ user input, a sensor included in a mode-switching input unit (25) acquires $UI_{SWT}$ from a $2^{nd}$ user input, where detailed hardware configuration typically depends on a nature or type of a $2^{nd}$ user input such as, e.g., [1] pressing, pushing, pivoting, rotating, tilting or otherwise applying a force to at least a portion of a mode-switching input unit (25), or [2] contacting or touching at least a portion of the input unit (25) without necessarily applying a force thereon. In response thereto, a terminal (11) may run a mode-switching operation and, as a result, may switch from a current mode to a new mode. When a terminal (11) operates in the series switching, a user may provide a certain number of $2^{nd}$ user inputs, where the number is the same as a distance from a current mode to a new mode along the hierarchy. When a terminal (11) operates in a selective switching, however, a user may provide a single $2^{nd}$ user input which includes therein $UI_{SWT}$ which matches an intended new mode.

A terminal may run such erasure (or semi-erasure) in one of various erasure timings, thereby erasing an entire (or selected) portion of results obtained by running lock operations with a lock system in a lock mode, thereby preventing such results from adversely affecting a main system. A terminal may use a mode-switching input unit (25) as a notice unit by displaying various information related to such mode switching on the input unit (25). Alternatively, a terminal may utilize a display unit (52) as a notice unit as well.

When desirable, a terminal (11) may be configured to receive the $1^{st}$ and $2^{nd}$ user inputs concurrently. In one case, a user may provide a $1^{st}$ user input to a main input unit (20) as well as a mode-switching input unit (25) concurrently, while using two different fingers or a single finger and providing two different (user) sub-inputs to such input units (20), (25). In this configuration, a terminal may allow a user to switch to a mode from an off-state, not necessarily switching through a lock mode. In another example, a user may manipulate a main input unit (20) and a mode-switching input unit (25) with the same finger, thereby providing the $1^{st}$ and $2^{nd}$ user inputs concurrently.

Alternatively, a mode-switching input unit (25) may receive a $1^{st}$ user input while a terminal is in its off-state, and may acquire $UI_{SWT}$ therefrom, thereby providing a user with a seamless operation of switching to a desired mode by simply receiving a single user input from a user. To this end, a terminal may keep a sensor of a mode-switching input unit (25) activated both in its off-state and in its on-state, e.g., by supplying an electrical power thereto. Alternatively, a terminal may include a prior art proximity (or motion) sensor and provide the electrical power to a sensor of the input unit (25) only when a user body part (or a non-user object) approaches the input unit (25). Accordingly, a terminal may maintain a response time of a mode-switching input unit (25) within a certain threshold, while minimizing energy consumption.

When a user intends to switch modes while operating a terminal (11) in a certain current mode, a terminal may readily switch modes, for a terminal has already been in its on-state. In this case, a terminal may receive a user input, acquires $UI_{SWT}$ therefrom, and switch modes accordingly. Further details are omitted for simplicity of illustration.

Figure 7B:
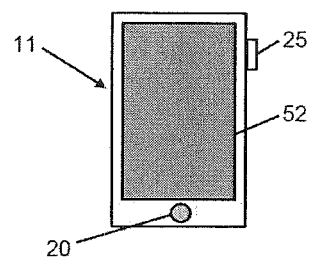

FIG. 7B shows another exemplary terminal (11) which includes a display unit (52), and a main input unit (20) on its front surface. Unlike that of FIG. 7A, however, a terminal (11) includes a mode-switching input unit (25), not on its front surface but on its right edge. Therefore, a user may operate a terminal (11) in the same way as the one of FIG. 7A, except that a user may provide $UI_{SWT}$ onto a mode-switching input unit (25) disposed on the right edge of a terminal (11). Similar to the operations of the terminal of FIG. 7A, a user may provide the $1^{st}$ and $2^{nd}$ user inputs concurrently or sequentially.

It is appreciated that a user may manipulate a main input unit (20) and a mode-switching input unit (25) of the terminal (11) of FIG. 7A with a single body part such as, e.g., a thumb or an index finger. Accordingly, a user may readily concurrently provide $UI_{SWT}$ along with $UI_{ACT}$ (or $UI_{THEN}$) in a single user input. Contrary to such input units of FIG. 7A, a main input unit (20) and a mode-switching input unit (25) of FIG. 7B are separated from each other by a certain distance. However, a user may still readily concurrently provide $UI_{SWT}$ along with $UI_{ACT}$ (or $UI_{THEN}$) in a single user input, e.g., by manipulating a main input unit (10) with a finger of a right hand, while manipulating a mode-switching input unit (25) with a finger of a left hand. Other configurational or operational features of the terminal of FIG. 7B are similar or identical to those of the terminal of FIG. 7A.

Figure 7C:
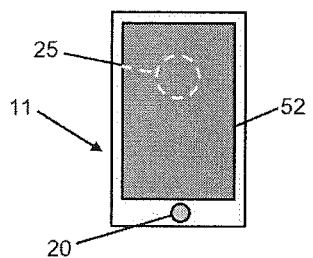

FIG. 7C shows another exemplary terminal (11) which includes a display unit (52), and a main input unit (20) on its front surface. Unlike that of FIG. 7A, however, a terminal (11) includes a mode-switching input unit (25), not on its front surface but on its rear surface. Therefore, a user may operate a terminal (11) in the same way as the one of FIG. 7A, except that a user provides $UI_{SWT}$ onto a mode-switching input unit (25) disposed on the rear surface of a terminal (11). Because a main input unit (20) is disposed on the front surface, while a mode-switching input unit (25) on the opposite surface, a user may have to use different fingers to provide two different user inputs, one of which does not include $UI_{SWT}$ but another of which includes $UI_{SWT}$. Similar to the operations of those terminals of FIGS. 7A and 7B, a user may provide different user inputs either concurrently or sequentially. Other configurational or operational features of the terminal of FIG. 7C are similar or identical to those of the terminals of FIGS. 7A and 7B.

Figure 7D:
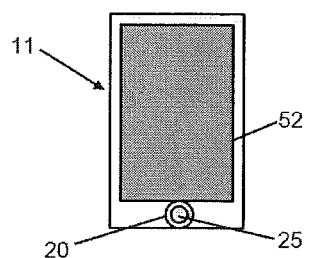

FIG. 7D shows another exemplary terminal (11) which includes a display unit (52), a main input unit (20), and a mode-switching input unit (25) on its front surface. Unlike that of FIG. 7A, however, a terminal (11) includes a mode-switching input unit (25) adjacent to a main input unit (20). For example and as shown in the figure, a mode-switching input unit (25) may be disposed in a center portion of a main input unit (20), [1] where a main input unit (20) may define a hole in its center and a mode-switching input unit (25) may be disposed in the center hole, [2] where a mode-switching input unit (25) may be positioned on a top portion of a main input unit (20), [3] a main input unit (20) and a mode-switching input unit (25) may be formed as a unitary article, or the like. Since a main input unit (20) and a mode-switching mode input (25) are disposed adjacent to each other, a user may readily provide the $1^{st}$ and $2^{nd}$ user inputs concurrently and, accordingly, may also provide $UI_{SWT}$ along with $UI_{ACT}$ or $UI_{THEN}$ concurrently. Other configurational or operational features of the terminal of FIG. 7D are similar or identical to those of the terminals of FIGS. 7A to 7C.

Various mode-switching input unit may be provided in different shapes or sizes, and couple with the main input unit in different configuration. In one example, a mode-switching input unit may be configured to move with a main input unit when a user manipulates at least a portion of a main input unit. In this manipulation, a terminal may be configured to receive only a $1^{st}$ user input and to acquire only $UI_{ACT}$ or $UI_{THEN}$, but not $UI_{SWT}$. However, when a user manipulates only a portion of a mode-switching input unit, a terminal may be configured to receive a different user input which includes only $UI_{SWT}$, but neither $UI_{ACT}$ nor $UI_{THEN}$ therefrom.

In another example, a terminal may receive a $1^{st}$ user input, and acquire $UI_{ACT}$ or $UI_{THEN}$ from a movement of a portion of a main input unit, while receiving a $2^{nd}$ user input and acquiring $UI_{SWT}$ from [1] a direction of such a movement, [2] a static or dynamic feature of a force related to a $2^{nd}$ user input, or the like. Alternatively, a terminal may receive a $1^{st}$ user input and acquire $UI_{ACT}$ or $UI_{THEN}$ from a contact between a user body part and a portion of a main unit, while receiving a $2^{nd}$ user input and acquiring $UI_{SWT}$ from [1] a direction of the contact, or [2] a static or dynamic feature of the $2^{nd}$ user input.

In these respects, an exact shape or configuration of the main input unit and the mode-switching input unit may not be material, as far as such input units may be fabricated as separate articles and disposed (or coupled) adjacent to each other or at a preset distance. Such input units may also be fabricated as a unitary article which may include multiple sensors for acquiring $UI_{SWT}$ and at least one of $UI_{ACT}$ and $UI_{THEN}$, or the like.

In another example, a terminal may include a single input unit which may serve as a main input unit and as a mode-switching input unit depending upon circumstances of receiving a user input, where this corresponds to a case in which the main input unit (20) and the mode-switching input unit (25) of FIGS. 7A and 7D are formed as a unitary input unit. In one case, when this input unit receives a user input in its off-state, the input unit may [1] acquire $UI_{ACT}$ when a terminal is to turn on its display unit upon receiving the user input, [2] acquire $UI_{THEN}$ when a terminal is to determine whether or not to turn on its display unit depending on an outcome of the user authenticating, or [3] acquire $UI_{SWT}$ when a terminal may switch to a mode of a user's choice when a terminal turns on its display unit and launches one of a lock, intermediate, or unlock system based on $UI_{SWT}$. In another case, when that input unit may receive a user input in its on-state, the input unit may [1] acquire $UI_{SWT}$ when a terminal is to switch modes based on $UI_{SWT}$, [2] acquire $UI_{THEN}$ when a user desires to switch to a new mode which is granted with greater access authority than a current mode, or the like. Other configurational or operational features of the terminal of FIG. 7D may be similar or identical to those of the terminals of FIGS. 7A to 7C.

Figure 7E:
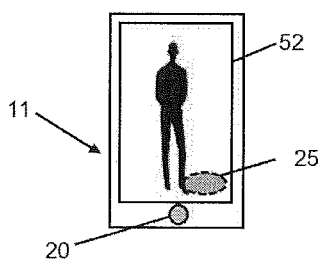
FIGS. 7E and 7F are top views of exemplary mode-switching input units which are incorporated into various locations of a terminal as soft buttons or software elements.
Figure 7F:
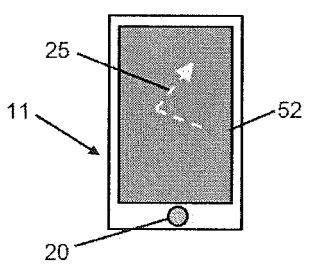

In another example of this exemplary embodiment, a terminal may include at least one soft button-type mode-switching input unit (25) which can acquire $UI_{SWT}$ therewith. FIGS. 7E and 7F are top views of exemplary mode-switching input units incorporated into various locations of a terminal as soft buttons or software elements.

FIG. 7E exemplifies a terminal which includes a display unit (52), a main input unit (20), and a mode-switching input unit (25) on its front surface. A main input unit (20) may receive a $1^{st}$ user input and may include one or more sensors which are shaped, sized, or configured to acquire $UI_{ACT}$ or $UI_{THEN}$. A mode-switching input unit (25) may be provided as a soft button, positioned on a front surface of a terminal (11), and may include therein a sensor for acquiring $UI_{SWT}$ from a proper user input.

A user may manipulate at least a portion of a main input unit (20) when a terminal (11) is in its off-state, thereby providing a $1^{st}$ user input thereto. Upon receiving a $1^{st}$ user input, a terminal (11) may [1] acquire $UI_{ACT}$ from a $1^{st}$ user input and turn on its display unit, or [2] acquire $UI_{THEN}$ and run an authentication operation. When a terminal (11) may launch a lock system in a lock mode, a user may run various lock operations in a lock mode. In whichever mode it may be, once a terminal (11) begins to operate, a terminal (11) may typically operate in its on-state and, therefore, may typically turn on its display unit (52). A terminal (11) may then display a mode-switching input unit (25) as a soft button on a display unit (52).

When a user wants to switch to a new mode, a user may consult a hierarchy which defines various modes in which a user may operate a terminal (11). For example, a user may first select a new mode to switch to from a current mode. In doing this, a user may consider whether a hierarchy defines such a mode. If so, a user may select $UI_{SWT}$ which matches a new mode, and may manipulate at least a portion of the soft button-type mode-switching input unit (25), thereby providing a terminal (11) with a $2^{nd}$ user input which includes $UI_{SWT}$ therein. Because a mode-switching input unit (25) is a soft button-type, a user may touch or press at least a portion of a mode-switching input unit (25) such as, e.g., a GUI displayed on a display unit.

Upon receiving a $2^{nd}$ user input, a sensor of a mode-switching input unit (25) may acquire $UI_{SWT}$ from a $2^{nd}$ user input, where the sensor may monitor changes in electrical capacitance when a mode-switching input unit (25) is provided as a GUI on a touchscreen-type display unit. In response thereto, a terminal (11) may run a mode-switching operation and, as a result, may switch from a current mode to a new mode. When desirable, a user may provide a user input including $UI_{SWT}$ and at least one of $UI_{ACT}$ and $UI_{THEN}$ concurrently, using a single finger, multiple fingers, another single body part, or multiple body parts.

Being a soft button, a terminal (11) may not display a mode-switching input unit (25) in an off-state, and a user may not find or see a mode-switching input unit (25) until a terminal (11) turns on its display unit. As a result, a user may only switch modes once a terminal (11) switches from an off-state to an on-state.

Alternatively, a terminal (11) may also provide a mode-switching input unit (25) in an off-state in various ways. In one case, when a terminal (11) includes multiple display units, a terminal (11) may display a mode-switching input unit (25) on one (minor) display unit, while keeping other display units in their off-state. As defined above, a terminal (11) in this arrangement may be deemed in its off-state, for a major display unit remains turned off. In another case, when a terminal (11) forms multiple segments, a terminal (11) may display a mode-switching input unit (25) only on a (minor) segment, while keeping other segments in their off-state. Such a terminal (11) is also deemed to be in its off-state, for a major segment remains turned off. In another case, a terminal (11) may keep its display unit (11) turned off, while displaying a mode-switching input unit (25) as one of such routine data. Because a terminal (11) does not display any text or image other than the routine data, such a terminal (11) is also deemed in its off-state. In another case, a terminal (11) may keep a mode-switching input unit (25) activated even in an off-state, e.g., by supplying an electrical power to a sensor of the input unit (25) in an off-state and rendering such a sensor ready in the off-state. In each of such cases, a user may readily locate a mode-switching input unit (25) in an off-state, and may easily provide $UI_{SWT}$ to a mode-switching input unit (25).

A terminal (11) may incorporate a mode-switching input unit (25) in any location of a display unit (52) such that a user may provide a user input with $UI_{SWT}$ anywhere over a display unit (52). This arrangement may not need a top-of-the-notch technology, for any prior art touchscreen may receive a user input and acquire $UI_{SWT}$ when $UI_{SWT}$ may correspond [1] to a certain movement of a user's body part (or a non-user object) over the screen, [2] to a certain force or its static or dynamic features, [3] to a certain image of a user's body part, or the like. Alternatively, a terminal (11) may incorporate a mode-switching input unit (25) in a fixed location of a display unit (52), where configurational or operational features of the input unit (25) are identical to those of the above arrangement. In addition, the mode-switching input units exemplified in FIGS. 7A to 7D may also be provided as soft buttons or software elements. Other configurational or operational features of the terminal of FIG. 7E may be similar or identical to those of the terminals of FIGS. 7A to 7D.

FIG. 7F exemplifies a terminal which includes a display unit (52), a main input unit (20), and a mode-switching input unit (25) on its front surface. A main input unit (52) is the same as the one of FIG. 7E, whereas a mode-switching input unit (25) is fabricated not as a soft button but as a sensor incorporated into a display unit (52). More particularly, the sensor of a mode-switching input unit (25) may monitor a contact with (or a movement of) a capacitive or conductive object thereon, as is commonly the case with a prior art touchscreen.

In operation, a user may provide a terminal (11) with a $1^{st}$ user input by manipulating a portion of a main input unit (20) in an off-state. In response to receiving a $1^{st}$ user input, a terminal (11) may [1] acquire $UI_{ACT}$ from a $1^{st}$ user input and turn on its display unit, or [2] acquire $UI_{THEN}$ and run an authentication operation. When a terminal (11) may launch a lock system in a lock mode, a user may also run various lock operations in a lock mode. While a user runs such lock operations, a terminal (11) in its on-state may display a mode-switching input unit (25) as a soft button on the display unit (52).

When a user wants to switch to a new mode, a user may consult a hierarchy, and select a new mode to switch to from a current mode. A user may select $UI_{SWT}$ which matches a new mode, and manipulate a portion of a display unit (52) which may correspond to a soft button-type mode-switching input unit (25), thereby providing a $2^{nd}$ user input with $UI_{SWT}$ thereto. For example, a user may move his or her finger or stylus on a display unit (52) by providing a certain pattern of movement as the $2^{nd}$ user input.

Upon (or in response to) receiving a $2^{nd}$ user input, a sensor of a mode-switching input unit (25) acquires $UI_{SWT}$ from a $2^{nd}$ user input, where the sensor may monitor changes in electrical conductance or capacitance caused by a contact or a movement by a user's finger or stylus. In response thereto, a terminal (11) may switch to a new mode. Other configurational or operational features of the terminal of FIG. 7F may be similar or identical to those of the terminals of FIGS. 7A to 7E.

In another example of this exemplary embodiment, a mode-switching input unit may employ various prior art capacitive sensing techniques which are based upon capacitive coupling and which can detect and measure anything which is conductive or which has a dielectric constant different from that of air. In general, capacitive sensors incorporated into a touchscreen of a prior art data processing device or a prior art data processing pad can detect a proximity, a position, a displacement, or an acceleration. Therefore, various data processing terminals of this disclosure may adopt such prior art sensors to acquire $UI_{SWT}$ from a user input.

Currently available capacitive sensing techniques include, e.g., surface capacitance technology, and projected capacitance technology. In the surface capacitance technology, a sensor includes an insulator, and only one side of the insulator may be coated with a conductive material. Upon applying a small electrical voltage to the material, uniform electrostatic field is developed. Due to sheet resistance of the surface, each corner may have different effective capacitances. Thereafter, when a conductor (e.g., a finger of a user or a conductive tip of a non-user object) touches an uncoated surface, a capacitor is dynamically formed on the surface. A controller of a sensor can then determine a location of a touch, indirectly from a change in the capacitance as measured from the four corners of the sensor, where the larger the change in capacitance becomes, the closer the touch is to that corner.

A PCT (i.e., projected capacitance technology or projected capacitive touch technology) is another capacitive technology which allows more accurate and flexible operation, e.g., by etching at least one conductive layer. For example, an X-Y grid is formed either by etching one layer to form a grid pattern of electrodes or etching two separate, parallel layers of a conductive material with perpendicular lines or tracks to form the grid, where this configuration is comparable to a pixel grid commonly found in conventional liquid crystal displays (LCD). A greater resolution of PCT allows a user to operate even without any direct contact or touch by a user such that the conducting layers can be coated with further protective insulating layers and operate even under screen protectors, or behind weather and vandal-proof glass. Because a top layer of a PCT is a glass, the PCT can be a more robust solution compared with the prior art resistive touch technology. Depending upon its implementation, an active or passive stylus can be used instead of or in addition to a finger.

The PCT is also classified into a mutual-capacitance technology and a self-capacitance technology. A sensor of mutual-capacitance technology includes a capacitor at each intersection of each row and each column. For example, a 12-by-16 array would have 192 capacitors each of which is independent of other capacitors. When an electrical voltage is applied to such rows or columns, bringing a finger or a tip of a stylus near a surface of a sensor may change local electric field which then reduces mutual capacitance. The change in capacitance at every individual point on the grid can be measured to accurately determine a location of a touch or contact, by measuring voltage in another axis. Therefore, mutual-capacitance technology allows multi-touch operation where multiple fingers, palms or styli can be accurately tracked at the same time. In contrary, a sensor of self-capacitance technology may include the same X-Y grid as mutual-capacitance sensors, but columns and rows of the self-capacitance sensor may operate independently. With self-capacitance, an electrical current senses a capacitive load of a finger on each column or row. This produces a stronger signal than mutual-capacitance sensor, but it is unable to resolve more than one finger accurately, which may result in "ghosting" or misplaced location sensing.

As defined above, "multiple quick efforts" refer to multiple quick actions performed by a user and such multiple quick efforts may be deemed as a "single user input" when certain conditions are met, where such conditions have been enumerated in Section 1-12. A user may exercise such multiple quick efforts to provide $UI_{SWT}$ as well and followings include a few examples.

In one case, a user may move an index finger and a middle finger (or a thumb) together in a certain pattern to provide certain $UI_{SWT}$. In another case, a user may move two fingers concurrently, where a $1^{st}$ movement of a $1^{st}$ finger is a $1^{st}$ $UI_{SWT}$ for switching to a $1^{st}$ mode, while a $2^{nd}$ movement of a $2^{nd}$ finger denotes a $2^{nd}$ $UI_{SWT}$ for obtaining a certain access authority while operating in a $1^{st}$ mode. In another example, a user may move two fingers, where a terminal obtains a sum of a $1^{st}$ vector movement of a $1^{st}$ finger and a $2^{nd}$ vector movement of a $2^{nd}$ finger.

Various prior art hardware and software elements are available to embody this arrangement of such multiple quick efforts, where examples of such elements can commonly be found in various prior art touchscreen-type input units of smart-phones, trackpads, or other data processing devices. As used in the related industry, it is appreciated that an arrangement of such "multiple quick efforts" includes not only such technology for detecting multiple contact points or movements of such contacts as described above but also another prior art technology such as, e.g., a "gesture-enhanced single-touch" arrangement, where the latter technology may include those technologies for [1] acquiring $UI_{SWT}$ from a gesture of a user performed while contacting a display unit (52) or [2] acquiring $UI_{SWT}$ from another gesture of a user performed while not contacting a display unit (52) but in such a distance that a mode-switching input unit (25) may still be able to monitor such gesture from the changes in electrical conductance or capacitance. It is appreciated that, although such is not a gesture-enhanced single-touch, a terminal may acquire $UI_{SWT}$ by analyzing an image of a user gesture taken by a camera.

In addition, a mode-switching input unit (25) may acquire a single $UI_{SWT}$ or multiple $UI_{SWT}$'s from such contacts, movements of such contacts, or above multiple quick efforts by employing different technologies. For example, a mode-switching input unit can acquire $UI_{SWT}$ (or multiple $UI_{SWT}$'s) from pressure-sensitive sensors which may be formed as a coating which flexes differently depending on how firmly it may be pressed.

A mode-switching input unit may also use resistive technologies for acquiring $UI_{SWT}$ (or multiple $UI_{SWT}$'s) from the such contacts, movements of such contacts, or multiple quick efforts. In general, the resistive technologies may include analog (or digital) resistive technologies, or in-cell resistive technologies.

In addition, a mode-switching input unit may use optical touch technologies to acquire $UI_{SWT}$ (or multiple $UI_{SWT}$'s) from such contacts, movements, or multiple quick efforts, where such optical touch technologies may function when a finger (or a non-user object) contacts a surface and causes lights to scatter. Such reflection may be monitored with a sensor or a camera which sends data to a software element which dictates a response to such contacts, movements of such contacts, or efforts, depending upon the type of reflection to be measured. Such optical touch technologies may include, e.g., optical imaging technology, infrared (IR) technology, rear diffused illumination (DI) technology, infrared grid technology, digital waveguide touch (DWT) technology, infrared (IR) optical waveguide technology, diffused surface illumination (DSI) technology, laser light plane (LLP) technology, in-cell optical technology, or frustrated total internal reflection (FTIR) technology.

Prior art capacitive sensing techniques have been used in various touchscreen-type input units, touch pads, or other touch-based (or contact-based) input units for the past few decades, with the resolution ever improving year after year. In addition, the resistive or optical sensing techniques have also been successfully used in the art. Because there are ample references how such prior art techniques work, how to use such techniques in prior art input units, and how to design hardware and software elements of such conventional input units, prior art capacitive, resistive or optical sensing techniques can be readily incorporated to various mode-switching input units of this disclosure as described above and below.

One example is an article which is entitled "How to design capacitive touch and proximity sensing technology into your Application," which is written by Mike Salas and Andres Marcos at Silicon Laboratories Inc., Austin, Tex., USA, which provides technical details of such capacitive sensing techniques, overviews of other sensing techniques, comparisons of different techniques, and the pros and cons of each technique, and which can be obtained in http://www.low-powerdesign.com/PDF/How-to-Design-Capacitive-Touch-and-Proximity-Sensing-Technology-into-Your-Application.pdf. Another one is an article which is entitled "Multi-touch Technologies," which is written by Gennadi Blindmann at Impressum, Munich, Germany, which provides technical details on such capacitive, resistive, optical, wave, and force-based sensing techniques, and which can be obtained in http://www.multi-touch-solution.com/en/knowledge-base-en/.

Accordingly, more configurational and operational details of hardware and software aspects of various mode-switching input units employing the above techniques are omitted herein, for such details are within an ordinary capability of one of ordinary skill in the relevant art. In addition, similar techniques may also be applied to other input units of various terminals of this disclosure which may be used to acquire $UI_{ACT}$ or $UI_{THEN}$, details of which are also omitted herein.

It is appreciated in FIGS. 7A to 7F that various terminals (11) may run an authentication operation in one of the mode-switching timings when required. Accordingly, a terminal may run such authenticating [1] only when a terminal may switch to a new mode which is granted with greater access authority than a current mode, [2] only when a terminal may switch to a new mode granted with less access authority than a current mode, or [3] whenever a terminal switches mode. It is also appreciated in FIGS. 7A to 7F that various terminals (11) may run an erase (or semi-erase) operation in one of the erasure timings, while saving at least a portion of results obtained by running various lock operations in a lock mode in one of such storing timings.

As manifest in each examples of the above embodiment, various terminals offer the benefits of allowing a user to switch modes simply by manipulating various mode-switching input units. Therefore, a user can easily switch from one mode to another while keeping a terminal in its on-state, without having to turn off a display unit and then turning it again. In addition, such terminals may offer the benefit of improved seamless operations, e.g., by allowing a user to advance to a desired mode simply by providing a single user input even when a terminal has been in an off-state or a powered-off state.

In another exemplary embodiment of this first exemplary aspect, a data processing terminal may include various mode-switching input units which can allow a user to provide various $UI_{SWT}$'s more conveniently and readily. More particularly, a terminal may fabricate a mode-switching input unit by employing suitable hardware or software elements thereto. FIGS. 8A to 8E are top views of exemplary mode-switching input units which are incorporated into various locations of a terminal as various hardware or software elements.

Figure 8A:
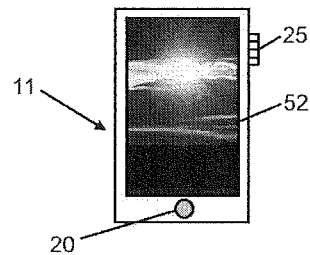
FIGS. 8A to 8E are top views of exemplary mode-switching input units incorporated into various locations of a terminal as various hardware or software elements.

In one example of this exemplary embodiment, a terminal includes a mode-switching input unit which can allow a user to switch either in a forward or backward direction along a hierarchy. FIG. 8A exemplifies a terminal (11) which includes a display unit (52), a main input unit (20), and a mode-switching input unit (25) which is disposed on a right side of a terminal (11), where a mode-switching input unit (25) may be fabricated as a hard button or as a soft button.

In one example, a user can move a hard button-type mode-switching input unit (25) upwardly or downwardly, thereby providing different $UI_{SWT}$'s depending on a direction of the movement. In another example, a user can swipe his or her finger (or a non-user object) upwardly or downwardly over a soft button-type mode-switching input unit (25), thereby providing different $UI_{SWT}$'s depending upon a direction of the movement.

Although not shown in the figure, a terminal (11) may include different types of multiple mode-switching input units (25) as far as such input units (25) may acquire different $UI_{SWT}$'s, where examples of such prior art input units may include, but not limited to, a toggle switch which is actuated by a lever in two directions, a rotatable switch which can rotate or pivot in a clockwise or counter-clockwise direction, or the like. A terminal (11) may also include a set of identical or different switches as a mode-switching input unit (25). Alternatively, a mode-switching input unit (25) may include another capacitive, resistive, or optical sensor which does not move but which may sense [1] contacts with a user body part or [2] changes in a position of such contacts (i.e., movements).

In operation, a user may provide a $1^{st}$ user input to a mode-switching user input (25) when a terminal is in its on-state by, e.g., [1] pressing, sliding or otherwise moving a portion of the input unit (25 upwardly, [2] moving an entire portion of the input unit (25) upwardly, or [3] contacting the input unit (25) and sliding his or her finger upwardly along a stationary input unit (25). A mode-switching input unit (25) may acquire $UI_{SWT}$ from a $1^{st}$ user input, and send a control signal to a terminal (11). In response thereto, a terminal (11) may switch from a current mode to a new mode which is assigned to $UI_{SWT}$, where a new mode may typically be a mode which is granted with greater access authority.

A user may instead provide a different $1^{st}$ user input to a mode-switching input unit (25) by, e.g., [1] pressing, sliding or otherwise moving a bottom portion of a mode-switching input unit (25) downwardly, [2] moving an entire portion of the input unit (25) downwardly, or [3] contacting the input unit (25) and sliding a finger downwardly along a stationary input unit (25). A mode-switching input unit (25) may then acquire a $1^{st}$ $UI_{SWT}$ therefrom, and a terminal (11) may switch from a current mode to a new mode which matches $UI_{SWT}$, where a new mode may typically be a mode which is granted with less access authority.

In other words, a user may switch modes either in a forward direction (i.e., to a new mode with greater access authority) or in a backward direction (i.e., to a new mode with less access authority) depending upon detailed nature of a hierarchy, simply by manipulating a direction of movements of a mode-switching input unit (25) or a direction of movements of his or her body part with respect to the input unit (25). Accordingly, a terminal (11) may provide a user with such operational flexibilities.

When a terminal (11) is in its off-state when a user provides a user input, a $1^{st}$ user input may be the one which includes $UI_{ACT}$ therein, whereas a $2^{nd}$ user input is the one with $UI_{SWT}$, for a user may desire to run various lock operations in a lock mode with a lock system before he or she may switch to an unlock mode. However, when a user wants to switch to an unlock mode from an off-state, a user may provide a $1^{st}$ user input to a main input unit (20), while providing a $2^{nd}$ user input to a mode-switching input (25) concurrently or sequentially. In this case, the types of the $1^{st}$ and $2^{nd}$ user inputs may be [1] identical to or [2] different from each other.

Examples of [1] may include, [1-1] pressing and moving both of the input units (20), (25) with the same finger or different fingers, or [1-2] contacting but not moving either input unit (20), (25) with the same finger or different fingers. To the contrary, examples of [2] may include, [2-1] pressing a main input unit (20) but only touching a mode-switching input unit (25), [2-2] talking to a main input unit (20), while pressing a mode-switching input unit (25), [2-3] making a gesture and providing an image thereof to a main input unit (20), while sliding a finger along a mode-switching input unit (25), or the like. It is appreciated that a user may provide such $1^{st}$ and $2^{nd}$ user inputs concurrently (when feasible) or sequentially (usually the $1^{st}$ user input, followed by the $2^{nd}$ user input).

In another example, a user who operates a terminal (11) in an unlock mode (i.e., in an on-state) may want to switch to a lock mode. A user may then provide a new user input with $UI_{SWT}$ to a terminal which may acquire $UI_{SWT}$ therefrom and switch to a lock mode. As described above, a terminal may run such erasure (or semi-erasure) in one of such erasure timings. Other configurational or operational features of the terminal of FIG. 8A may be similar or identical to those of the terminals of FIGS. 7A to 7F.

Figure 8B:
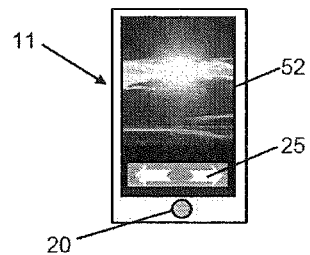

FIG. 8B also exemplifies a terminal (11) which includes a display unit (52), a main input unit (20), and a mode-switching input unit (25) which is rather displayed on a display unit (52) as a soft button such as, e.g., a GUI. More particularly, a mode-switching input unit (25) includes two arrows each pointing in opposite directions such that a user may swipe a finger to the right (or left) and provides one (the other) of two different $UI_{SWT}$'s when a user wants to switch to a new mode granted with greater (or less) access authority than a current mode.

In operation, when a terminal (11) is in its off-state, a user provides a $1^{st}$ user input with $UI_{ACT}$ or $UI_{THEN}$ such that a terminal (11) may run a turning-on operation on its display unit (52) or run an authentication operation. Once a terminal (11) turns on a display unit (52), a terminal (11) may also display a mode-switching input unit (25) on a screen of a display unit (52). By swiping a finger in a right ($UI_{SWT-R}$) or left ($UI_{SWT}$) direction, a sensor of a mode-switching input unit (25) may acquire either $UI_{SWT-R}$ or $UI_{SWT-L}$, and switch to a new mode granted with greater or less access authority than a current mode.

It is appreciated that the mode-switching input units (25) of FIGS. 8A and 8B are generally suitable to terminals operating in the series switching, for $UI_{SWT}$'s provided to such terminals may render such terminals switch to an adjacent mode either in a forward direction or in a backward direction. Of course, such mode-switching input units (25) may also be modified to be used with the terminals operating in the selective switching. Other configurational or operational features of the terminal of FIG. 8B may be similar or identical to those of the terminals of FIGS. 7A to 7D and those of the terminal of FIG. 8A.

Figure 8C:
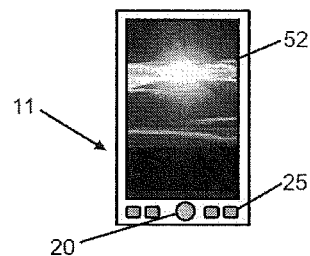
Figure 8D:
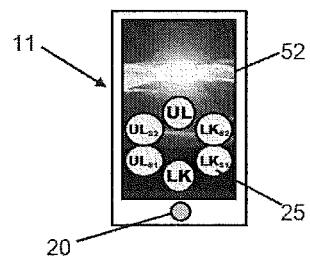

In another example of this exemplary embodiment, a terminal may include at least one hard or soft button-type mode-switching input unit capable of visually assisting a user in providing a suitable $UI_{SWT}$ to the terminal. FIGS. 8C and 8D are top views of exemplary mode-switching input units which are incorporated into various locations of a terminal as soft buttons or software elements. As will become manifest below, these mode-switching input unit may be viewed as a notice unit as described above.

FIG. 8C exemplifies a terminal (11) including a main input unit (20), a display unit (52), and a mode-switching input unit (25) which is disposed on a bottom portion of a front surface of the terminal (11). More particularly, a mode-switching input unit (25) may include multiple sub-units each of which may correspond to one mode of operation defined in a hierarchy. In this context, four sub-units of the mode-switching input unit (25) of FIG. 8C exemplifies that a hierarchy may define four different modes therein such as, e.g., [1] one lock mode, two intermediate modes, and one unlock mode, [2] two lock modes, one intermediate modes,

[3] two lock modes and two unlock modes, [4] one lock mode and three unlock modes, or [5] three lock modes and one unlock mode.

As exemplified in the figure, the sub-units of the input unit (25) are arranged in a row, where two sub-units are incorporated on a right side of the main input unit (20), whereas other two are disposed on a left side thereof. Therefore, based on which sub-unit is manipulated (or receives a user input), a mode-switching input unit (25) acquires one of multiple $UI_{SWT}$'s corresponding to the manipulated sub-unit, and a terminal (11) may switch from a current mode to a new mode which matches $UI_{SWT}$.

In operation and when a mode-switching input unit (25) and its sub-units are provided as hard buttons, a user may provide a $1^{st}$ user input directly to one of such sub-units when a terminal (11) is in its off-state. A terminal (11) may [1] turn on a display unit (when a $1^{st}$ user input includes $UI_{ACT}$), [2] run an authentication operation (when a $1^{st}$ user input includes $UI_{THEN}$), or [3] advance to one of multiple modes defined in a hierarchy from an off-state. Accordingly, this configuration is suitable for the selective switching. When a $1^{st}$ user input does not include $UI_{SWT}$, a terminal (11) may first advance to its on-state and a default mode (e.g., a lock mode), and a user may then provide a $2^{nd}$ user input including $UI_{SWT}$, thereby switching mode from the default mode to a new mode assigned to such $UI_{SWT}$.

It is appreciated that multiple sub-units of a mode-switching input unit (25) are provided as separate parts, and also exposed on a top surface of a terminal (11). As a result, when a mode-switching input unit (25) and its sub-units are provided as soft buttons, a user may still manipulate a mode-switching input unit (25) in the same ways as he or she manipulates the hard button-type input unit (25) of the preceding paragraph. Accordingly, further details are omitted herein.

After a terminal (11) begins to operate a lock (or unlock) system in a lock (or unlock) mode, a user may desire to switch to another mode. In this case, a user may provide another user input which includes $UI_{SWT-2}$ therein, by manipulating one of such sub-units of a mode-switching input unit (25). In response thereto, the input unit (25) may acquire $UI_{SWT-2}$ therefrom, and switch to a new mode which matches $UI_{SWT-2}$.

As described above, a terminal (11) may run an erase (or semi-erase) operation in one of such erasure timings, thereby erasing such results obtained by running lock (or unlock) operations in a lock (or unlock) mode before, concurrently with, or after such mode switching. Accordingly, when a terminal may switch from a lock mode to an unlock mode, such results may be erased by a terminal and may not be able to contaminate a main system anymore. Conversely, when a terminal may switch from an unlock mode to a lock mode, such erasure may erase a list of operations which a user has run in an unlock mode or another list of websites which a user has visited in an unlock mode, thereby preventing other users from finding out the activities of a user in an unlock mode.

Although not shown in the figure, a terminal (11) may employ different types of mode-switching input units (25) as far as such input units (25) may acquire different $UI_{SWT}$'s based on which sub-unit is manipulated by a user, where examples of such conventional input units may include, but not limited to, an array of switches, a keypad-type switch, an array of soft keys, or the like. A terminal (11) may also use a cluster of identical or different switches as a mode-switching input unit. A mode-switching input unit may also include an array of capacitive sensors which does not move but which can sense a contact by a user (or a non-user object) or movements of such contacts by a user.

Multiple sub-units of a mode-switching input unit (25) may be arranged in various arrangements. In one case, such sub-units may be arranged in a column or in an arrangement different from the row or column. Such sub-units may be also disposed close to each other as a cluster, or at least one of such sub-units may be disposed at a distance from the rest of the sub-units such as, e.g., along a different edge, in an opposite corner, or the like. Alternatively, at least one of the sub-units may be disposed on a surface of a terminal (11) or along an edge thereof, while the rest of such sub-units may be disposed on a different surface or along a different edge.

A terminal (11) may allow a user to provide the same user input (or same $UI_{SWT}$) to each sub-units of the mode-switching input unit (25). Alternatively, a terminal (11) may require a user to provide different $UI_{SWT}$'s to each of such sub-units. In this case, the input unit (25) may not recognize any $UI_{SWT}$ when a user happens to provide [1] wrong $UI_{SWT}$ to a correct sub-unit or [2] correct $UI_{SWT}$ to a wrong sub-unit. For example, when a user fails [1] to use a correct finger on a certain sub-unit, [2] to press a certain sub-unit for a correct period of time, [3] to press a certain sub-unit with a force of correct magnitude, or [4] to contact a certain sub-unit at a correct angle, a mode-switching input unit (25) may treat such as a wrong user input and may not switch modes in response thereto. Therefore, probably at the cost of user inconvenience, a terminal (11) may further enhance the security of its main system, improve the integrity thereof, and better protect data stored therein. Other configurational or operational features of the terminal of FIG. 8C may be similar or identical to those of the terminals of FIGS. 7A to 7D and those of the terminal of FIGS. 8A and 8B.

FIG. 8D exemplifies a terminal (11) including a main input unit (20), a display unit (52), and a mode-switching input unit (25) which is disposed on a center portion of a screen which is displayed on a display unit (52). More particularly, a mode-switching input unit (25) may include multiple sub-units each of which may correspond to each mode of operation defined in a hierarchy. In this context, six sub-units of a mode-switching input unit (25) of FIG. 8D shows that a hierarchy defines six different modes therein such as, e.g., an unlock mode ($MD_{UL}$), two intermediate modes such as a $1^{st}$ and $2^{nd}$ semi-unlock modes ($MD_{ULS1}$ and $MD_{ULS2}$), two other intermediate modes such as a $1^{st}$ and $2^{nd}$ semi-lock modes ($MD_{LKS1}$ and $MD_{LKS2}$), and a lock mode ($MD_{LK}$).

As shown in the figure, various sub-units of the input unit (25) are arranged in a circle, where $MD_{UL}$ and $MD_{LK}$ are disposed on a top and a bottom of the circle, while other four intermediate modes are arcuately arranged along a periphery of a circle. Such an arrangement may connote that access authorities granted to each mode of the hierarchy may be proportional to a vertical position of the mode. Accordingly, the $2^{nd}$ semi-unlock mode ($MD_{ULS2}$) may have greater access authority than the $1^{st}$ semi-unlock mode ($MD_{ULS1}$), while the $2^{nd}$ semi-lock mode ($MD_{LKS2}$) may have greater access authority than the $1^{st}$ semi-lock mode ($MD_{LKS1}$). Similarly, $MD_{ULS2}$ and $MD_{LKS2}$ may have the similar access authorities, where actual access authorities granted to such modes may differ from each other, depending on a detailed distribution of such access authorities in the hierarchy.

The configuration of FIG. 8D offers various benefits to a user. First, a user may visually verify which modes are defined in a certain hierarchy and, accordingly, may learn to which modes a user may switch. Secondly, a user may visually identify which mode he or she is in. To this end, a terminal (11) may highlight a current mode in a shape, a size, an arrangement, an orientation, or a color (such as, e.g., a hue, contrast, or the like) which is different from those of other modes. In addition, a user may easily find out how much access authority the user may be granted by a terminal once he or she switches to a new mode.

A terminal (11) may provide further benefits to a user by allowing him or her to manipulate such sub-units of a mode-switching input unit (25). In one case, a terminal may allow a user [1] to add a new mode to a hierarchy, [2] to delete an existing mode from the hierarchy, [3] to change an existing mode with a new mode, or the like. In another case, a terminal may allow a user to modify an arrangement of a hierarchy in such a way that a user may [1] change an order of at least two modes, [2] change the access authority granted to each mode, or the like. In another case, a terminal may allow a user [1] to add a new connecting path between two modes, [2] to delete an existing path between two modes, or the like. Because the above configuration provides a visual view of a hierarchy and its arrangement, a user may readily manipulate the hierarchy and its modes, simply by manipulating such sub-units of a mode-switching input unit (25) displayed on a display unit (52).

A terminal (11) may allow a user to provide the same user input (or same $UI_{SWT}$) to each sub-units of a mode-switching input unit (25) or may require a user to provide different $UI_{SWT}$'s to at least two of such sub-unit. As is the case with that of FIG. 8D, this arrangement may enhance the security of a main system of a terminal (11), improve the integrity thereof, and better protect data stored therein. Other configurational or operational features of the terminal of FIG. 8C may be similar or identical to those of the terminals of FIGS. 7A to 7D and those of the terminal of FIGS. 8A to 8C.

Figure 8E:
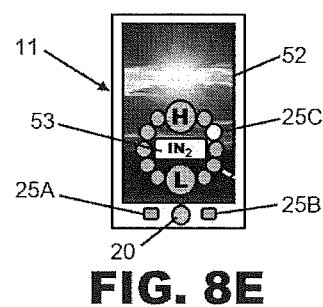

In another example of this exemplary embodiment, a terminal may include at least one hard or soft button-type mode-switching input unit (25) capable of providing further details of a hierarchy and visually assisting a user in providing a suitable $UI_{SWT}$ to the terminal. FIG. 8E is a top view of an exemplary mode-switching input unit which is incorporated into various locations of a terminal as soft buttons or software elements.

FIG. 8E exemplifies a terminal (11) including a main input unit (20), a display unit (52), and a mode-switching input unit which includes two sub-units (e.g., two hard buttons), one (25A) on a left side of the main input unit (20), while the other (25B) on a right side of the main input unit (20). The mode-switching unit may also include multiple sub-units provided as soft buttons (25C) such as, e.g., twelve GUIs which are disposed on a center portion of a display unit (52) and arranged in a circle. In this context, twelve GUIs (25C) of the mode-switching input unit (25) of FIG. 8E denote that the terminal (11) may operate in a hierarchy which defines twelve modes therein, where the twelve modes may include therein [1] at least one lock mode, at least one intermediate, and at least one unlock mode, [2] at least one lock mode and at least one unlock mode, without any intermediate mode, or the like.

As shown in the figure, various GUIs of the mode-switching input unit are arranged in a circle, where MDH and MDL are disposed on a top and a bottom of the circle, while other ten intermediate modes are arranged along a periphery of the circle. This arrangement connotes that, similar to that of FIG. 8D, access authorities granted to each mode of the hierarchy may be proportional to a vertical position of the mode. Once a user touches a certain GUI, a terminal (11) may switch modes in the selective switching, by switching from a current mode to a new mode which matches the GUI which the user selects and which, accordingly, may not necessarily be a mode adjacent to the current mode in a hierarchy.

A user may manipulate the hard button-type sub-units (25A) and (25B) to switch modes in the series switching as well. For example, a user may switch modes in a clockwise direction when the user manipulates the sub-unit (25A), while in a counter-clockwise direction when the user manipulates the sub-unit (25B). To assist a user, such sub-units (25A), (25B) may include arrows representing in which direction a terminal (11) switches modes.

In operation and when twelve GUIs are provided as soft button-type sub-units, a user may provide a $1^{st}$ user input directly to a main input unit (20) in its off-state. A terminal (11) may turn on a display unit (when a $1^{st}$ user input includes $UI_{ACT}$), may run an authentication operation (when a $1^{st}$ user input includes $UI_{THEN}$), or may advance to one of multiple modes defined in a hierarchy from an off-state.

Once a terminal (11) turns on a display unit (52) (i.e., in an on-state), a terminal (11) may display a certain hierarchy in which a terminal (11) is to operate in a current session. In addition, a terminal (11) may highlight a mode in which it operates, where such a mode may be a lock mode or another default mode, along with optionally displaying a name of a current mode in a preset location (53) of a screen of a display unit (52). When a $1^{st}$ user input does not include $UI_{SWT}$, a terminal (11) may first advance to its on-state and a default mode (e.g., a lock mode), and thereafter a user may provide a $2^{nd}$ user input including $UI_{SWT}$, thereby switching mode from the default mode to a new mode assigned to such $UI_{SWT}$.

When a terminal (11) sets up multiple hierarchies, such a terminal (11) may select a default hierarchy while displaying various modes defined therein. Alternatively, a terminal (11) may allow a user to select one of such hierarchies, or the like. In this latter case, a terminal may receive a $1^{st}$ user input, and may then acquire a certain (user) sub-input which designates a certain hierarchy.

When a mode-switching input unit includes multiple soft button-type sub-units (25C), a user may not be able to see such soft buttons when a terminal (11) is in its off-state. In this case, a $1^{st}$ user input may include $UI_{ACT}$ or $UI_{THEN}$, but may not include $UI_{SWT}$. Therefore, a user may only be able to provide $UI_{SWT}$ in his or her $2^{nd}$ user input. As described above in conjunction with FIGS. 8C to 8E, however, a terminal may allow a user to visually identify such soft buttons in an off-state, and to provide a user input including $UI_{SWT}$ even when a terminal (11) is in its off-state. Alternatively, a terminal (11) may [1] allow the sub-units (25A), (25B) of a mode-switching input unit to receive a $1^{st}$ user input which may include $UI_{SWT}$ or [2] configure a main input unit (20) and at least one of such sub-units (25A), (25) as a unitary article, while receiving a $1^{st}$ user input including $UI_{SWT}$ with the unitary article. Accordingly, a terminal (11) may acquire $UI_{SWT}$ as well as one of $UI_{ACT}$ or $UI_{THEN}$ concurrently from a $1^{st}$ user input.

Once a terminal (11) begins to operate in a certain mode, a user may provide an additional user input which includes $UI_{SWT-2}$ therein, by manipulating one of such sub-units of a mode-switching input unit (25). In response thereto, the input unit (25) may acquire $UI_{SWT-2}$ therefrom, highlight the GUI for the new mode, display a name of the new mode, and then switch to the new mode corresponding to $UI_{SWT-2}$ from a current mode. As described above, a terminal (11) may run an erase (or semi-erase) operation in one of such erasure timings, may store at least a portion of results obtained by operating a lock (or intermediate) system in one of such storing timings, or the like.

A terminal (11) may allow a user to switch modes either by manipulating the soft button-type sub-units (25C) or by manipulating the hard button-type sub-units (25A), (25B), whichever may be convenient to a user. In the alternative, a terminal (11) may allow a user to switch modes only with the hard button-type sub-units (25A), (25B), where the soft button-type sub-units (25C) may not be incorporated into a display unit (52). In this case, a display unit (52) simply displays a hierarchy, while highlighting a current mode or while displaying a name of the current mode. In another alternative, a terminal (11) may allow a user to switch modes only with the soft button-type sub-units (25C), where the hard button-type sub-units (25A), (25B) may be deleted or may be used as different input units.

Similar to that of FIG. 8D, the configuration of FIG. 8E also helps a user visually verify which modes are defined in a certain hierarchy and, therefore, helps the user determine to which modes he or she may switch. A user may also visually identify which mode he or she is in. To this end, a terminal (11) may highlight the GUI which corresponds the current mode, as shown in the figure, where such highlighting may include display the current mode [1] in a color which is different from the color of the rest of such modes, [2] brighter than the rest of such modes, [3] in a size bigger than that of the rest of such modes, [4] in an orientation which is different from that of the rest of such modes, or [5] rotating or changing sizes while the rest of such modes do not move at all.

A terminal (11) may also display a name of a current mode in a certain location (53) of a terminal. In addition, a terminal (11) may also assist a user to easily find out how much access authority the user may be granted once the user switches to a new mode [1] by a color coding (e.g., assigning a brighter color to a mode with greater access authority), [2] by a size coding (e.g., making a mode with greater access authority bigger than other modes), [3] blinking a mode with greater access authority faster than other modes, or the like.

A terminal (11) may provide further benefits to a user by allowing him or her to manipulate such sub-units of a mode-switching input unit (25), where details of such manipulations are similar to those of the terminal of FIG. 8D. In addition, a terminal (11) may allow a user to provide the same user input (or same $UI_{SWT}$) to each sub-unit (e.g., each hard button or soft button) of a mode-switching input unit (25) or may require the user to provide different $UI_{SWT}$'s to each sub-unit. Other configurational or operational features of the terminal of FIG. 8E may be similar or identical to those of the terminals of FIGS. 7A to 7D and those of the terminal of FIGS. 8A to 8D.

In another exemplary embodiment of this first exemplary aspect, a data processing terminal may grant various access authorities to each of multiple modes of operation defined in a certain hierarchy. Such terminals may adopt various prior art access control algorithms or authorization algorithms, and may grant a user with certain privileges to drive certain hardware or software elements of a main system of a terminal in such modes. When desirable, such terminals may also adopt the above access control algorithms in conjunction with various user authentication algorithms.

In one example of this exemplary embodiment, a terminal may use $UI_{SWT}$ similarly as a prior art authorization credential for accessing certain hardware or software elements of a main (or lock) system of a terminal. Upon receiving $UI_{SWT}$, a terminal may compare $UI_{SWT}$ with a database such as, e.g., an "access control list" which is qualitatively similar to a matching list as defined above. When $UI_{SWT}$ is consistent with the access control list, a terminal may grant a user to switch to a certain mode of operation. A terminal may also employ two-factor authorization means as commonly used in many prior art access control devices. When $UI_{SWT}$ is not consistent with the access control list, a terminal may deny a user to advance to or to switch to the mode of operation. In addition, when a user in a certain mode attempts to access and drive a certain hardware or software element, a terminal may authorize such accessing and driving when the user has the access authority to do so, or may deny the user to access or drive such an element.

A typical example of the above access control list may be a matching list which has been described above and which may include various access control data therein. In one case, a $1^{st}$ matching list may include at least two sets of data, where a $1^{st}$ data set includes multiple $UI_{SWT}$'s, where a $2^{nd}$ data set includes multiple modes of operation defined in a certain hierarchy, and where the $1^{st}$ matching list may match at least one of $UI_{SWT}$'s with at least one of multiple modes (or vice versa) based on, e.g., a 1-to-1, m-to-1, 1-to-n, or m-to-n matching. As a result, in response to $UI_{SWT}$ provided by a user, the terminal may switch to a new mode which is designated by $UI_{SWT}$.

In another case, a $2^{nd}$ matching list may include at least two sets of data, where a $1^{st}$ data set includes multiple $UI_{SWT}$'s, and a $3^{rd}$ data set includes multiple hardware and software elements of a main (or lock) system which a terminal grants a user to drive in a mode designated by $UI_{SWT}$, and where the $2^{nd}$ matching list may match at least one of multiple $UI_{SWT}$'s with at least one of such hardware or software element. Accordingly, once a user begins to operate a terminal in a certain mode designated by $UI_{SWT}$, a user may be deemed to be automatically assigned to a certain set of the hardware or software elements which he or she can drive. A terminal may not provide any user interface designated to the rest of the hardware and software elements and, therefore, may deny user access to such elements. In the alternative, even when a user may be able to manipulate a user interface, a terminal may deny such access when the user interface is the one of the hardware or software element which a user is not allowed to drive in such a mode. A terminal may be configured to consult this $2^{nd}$ matching list along with the $1^{st}$ matching list or, alternatively, may combine this $2^{nd}$ matching list with the $1^{st}$ matching list such that the combined matching list may include three sets of data such as, e.g., the $1^{st}$ data set, the $2^{nd}$ data set, and the $3^{rd}$ data set as exemplified above.

In another case, a $3^{rd}$ matching list may include at least two sets of data, where a $1^{st}$ data set includes multiple $UI_{SWT}$'s, and a $4^{th}$ data set includes multiple functions accomplished by driving each of such hardware elements or multiple options executed by driving each of software elements, and where the $3^{rd}$ matching list may match at least one of multiple $UI_{SWT}$'s with at least one of such functions or options. For example, the $4^{th}$ data set may include [1] whether a user in a $1^{st}$ mode may take a picture while driving its automatic resolution enhancement function, [2] whether a user in a $2^{nd}$ mode may drive a financial transaction software application without having to authenticate himself or herself, [3] whether a user in a $3^{rd}$ mode may wire money in an amount exceeding $1M dollars, [4] whether a user in a $4^{th}$ mode may access a certain set of personal or financial data, or the like. As is the case with the $2^{nd}$ matching list, a terminal may consult this $3^{rd}$ matching list along with the $2^{nd}$ or the $1^{st}$ matching list or, may combine this $3^{rd}$ matching list with the $1^{st}$ and/or $2^{nd}$ matching lists.

Another example of such an access control list of this exemplary embodiment may be a list or matrix including various access control data related to various hierarchies, a type of mode switching (e.g., a series switching or a selective switching) which are selected by a terminal or a user, or the like. Therefore, such a list or matrix may include various access control data such as [1] a matching list of at least two sets of the above data sets of the previous example, or [2] a matching list which includes the $1^{st}$ data set as well as a $5^{th}$ data set which may include [1] a list of available hardware or software elements in a certain mode (or in response to a certain $UI_{SWT}$). [2] a list of at least one mode to which a user may switch from a current mode (or an inactive state), or the like.

Based on the above matching lists and $UI_{SWT}$ which is provided by a user and acquired by a proper sensor of a mode-switching input unit, a terminal may determine whether or not a current user may be granted to switch from a current mode to a new mode. When $UI_{SWT}$ is found in the matching list and satisfies other requirements, a terminal grants a user to switch to a new mode which is designated to $UI_{SWT}$. However, [1] when $UI_{SWT}$ is not found in the matching list, [2] when $UI_{SWT}$ corresponds to the mode to which a user cannot switch from a current mode, or [3] when $UI_{SWT}$ cannot satisfy other optional requirements for an intended mode switching, a terminal may deny the user to switch to a new mode. In such a case, a terminal [1] may stay in a current mode, [2] may switch to a default mode (e.g., a lock mode), [3] may turn off its display unit and switch to an inactive state, or the like. It is appreciated that the above matching list may include a different set of data or more sets of such data which are related to the access control, as long as a terminal can determine whether it should grant a user to switch from a current mode to an intended new mode.

In another example of this exemplary embodiment, a terminal may utilize various GUIs as the above access control means or authorization means, and may grant a user with access authority to drive certain resources of a terminal such as, e.g., certain hardware or software elements of a main (or lock) of a terminal.

In one example, when a terminal in a $1^{st}$ mode (e.g., an off-state) receives a user input and acquires $UI_{SWT}$ therefrom, a terminal may switch to a new $2^{nd}$ mode and display a new screen. More particularly, a terminal may display an array of GUIs which a user can drive in a $2^{nd}$ mode. In general, such GUIs may represent, e.g., [1] certain hardware elements which a user can drive and manipulate in a $2^{nd}$ mode, [2] certain software elements (or applications) which a user can drive and execute in a $2^{nd}$ mode, [3] certain options and/or functions which a user can use while driving such hardware or software elements in a $2^{nd}$ mode. Because such GUIs of the hardware or software elements which a user cannot drive in a $2^{nd}$ mode are not displayed on the screen anyway, a user cannot drive such elements in the $2^{nd}$ mode.

When a user has not provided a correct $UI_{SWT}$ or a mode-switching input unit has not acquired proper $UI_{SWT}$, a terminal may take one of multiple remedial actions. For example, a terminal [1] may stay in a $1^{st}$ mode, with or without notifying a user of a failure of providing proper $UI_{SWT}$, [2] may switch back to a lock (or default) mode, with or without such notifying, [3] may give off a visual or audible alarm, [4] may switch to its off-state, with or without such notifying, or [5] may switch to a powered-off state, with or without such notifying. Therefore, when a user switches from a current mode with less access authority to a new mode with greater access authority by providing correct $UI_{SWT}$, a terminal may display a new screen including more GUIs thereon, [1] by removing an old screen for a current mode and displaying a new screen for a new mode, [2] by keeping an old screen and adding new GUIs to the old screen, or the like. Conversely, when a user switches from a current mode with greater access authority to a new mode with less access authority either after providing correct $UI_{SWT}$ or due to a failure of providing correct $UI_{SWT}$, a terminal may display a new screen with a less number of GUIs, by [1] removing an old screen for a current mode and displaying a new screen for a new mode, [2] keeping an old screen while deleting from the old screen some GUIs which a user cannot drive anymore in the new mode, or the like.

In another exemplary embodiment of this first exemplary aspect, a data processing terminal may supervise access controls granted to each of multiple modes of operation defined in a certain hierarchy. Such terminals may adopt various prior art computer security engineering technologies [1] to grant a user with pre-determined privileges to drive the hardware or software elements of a main (or lock) system of a terminal in each mode or [2] to grant each mode with certain privileges to drive only certain hardware or software elements of a main (or lock) system, depending on users or regardless of an identity (e.g., an administrator or not) of a user.

Because various computer security engineering technologies and their algorithms are well known in the art, details to be omitted herein. However, some of such technologies and algorithms are available in a textbook which is entitled "Security engineering—a guide to building dependable distributed systems," written by Ross Anderson, and published by John Wiley & Sons in January 2001 (ISBN-10: 0471389226). More particularly, refer to Chapter 4 "Access control" (pp. 62~64) and various references included therein.

4-11-7. Notifying Modes and Switching

From time to time, even a correct user happens to provide a wrong user input or may provide a correct user input which, however, carries unintended $UI_{SWT}$ therein. As a result, a terminal may switch to an incorrect new mode or may not switch its mode at all. Such incorrect switching may not only cause an inconvenience on the part of a user, but also require a user to take an extra remedial effort to switch from an incorrect current mode to a correct new mode. In this respect, various data processing terminals of this disclosure may offer benefits to a user by providing the user with various notice signals and by informing him or her of various information regarding, e.g., [1] which mode of operation a user is currently in, [2] which $UI_{SWT}$ a user has provided, [3] to which new mode a terminal will switch, [4] what types of access authority a user will be granted in a new mode, [5] which hardware or software elements a user may (or may not) drive once a user switches to a new mode, or the like.

Such terminals may provide further benefits to a user by allowing the user to confirm whether he or she has provided correct $UI_{SWT}$, i.e., whether the user has provided $UI_{SWT}$ which is designated to a mode which the user has intended. In general, switching modes according to certain $UI_{SWT}$ and informing a user of a new mode (or a user finds that he or she is in a wrong mode) may not be practically helpful, for the user may have to provide another user input with correct $UI_{SWT}$ anyway when the user finds that he or she moves to an unintended mode.

Accordingly and in another exemplary embodiment of the first exemplary aspect of this disclosure, a terminal may be configured to provide various information about such modes or access authorities before the terminal actually switches to a new mode. As far as a user can readily identify that the he or she is providing unintended $UI_{SWT}$ such the mode switching, the user can rectify his or her mistake before such mode switching.

In one example of this exemplary embodiment, when a user provide a terminal with a $1^{st}$ user input to switch from a current mode to a new mode, the terminal may acquire $UI_{SWT}$ from the $1^{st}$ user input, and may display information about the new mode designated by $UI_{SWT}$ on a display unit, preferably before switching to a new mode. In this case, a user may easily find out whether or not he or she has provided correct $UI_{SWT}$ to switch to an intended new mode.

When a user confirms that he or she has provided correct $UI_{SWT}$, the user may not take any action for a preset period, and the terminal may automatically switch to a new mode designated to $UI_{SWT}$. In this context, the non-action by a user may then be deemed as an additional user input which may be concurrent with the $1^{st}$ user input or which may be sequential with respect to the $1^{st}$ user input. When the user finds out that he or she has provided wrong $UI_{SWT}$, however, the user may provide a $2^{nd}$ user input with correct $UI_{SWT}$ by manipulating the mode-switching input unit, before the terminal switches to an unintended mode. Therefore, a user may readily switch to an intended mode without having to first switch to a wrong new mode, to find out that he or she is in an unintended mode, and to provide correct $UI_{SWT}$, thereby switching to a correct new mode. In general, such a $2^{nd}$ user input may be a sequential user input which follows the $1^{st}$ user input.

In another example of this exemplary embodiment, a terminal may rather allow a user to continue to provide a $1^{st}$ user input with $UI_{SWT}$ for at least a minimum period of time. In this case, a user may manipulate at least a portion of a mode-switching input unit with the user's body part (or a non-user object), and then maintain such contact with the mode-switching input unit. A terminal then acquires $UI_{SWT}$ and displays information regarding a new mode designated by $UI_{SWT}$ on a display unit, while the user may continue to press, touch, or otherwise manipulate the mode-switching input unit.

When a user confirms that he or she has provided correct $UI_{SWT}$, a user may take off a body part (or non-user object) from the mode-switching input unit. In response to sensing a loss of contact with the user, the terminal may automatically switch to a new mode designated to $UI_{SWT}$. In this context, such taking off the body part (or non-user object) may be deemed as an additional user input which may be concurrent with the $1^{st}$ user input. When a user finds out that he or she has provided wrong $UI_{SWT}$, however, the user may provide an additional user input with correct $UI_{SWT}$ while maintaining the contact between his or her body part (or a non-user object) and the mode-switching input unit, e.g., by sliding his or her finger from one GUI to another GUI while keeping such a contact, thereby switching to an intended mode without having to switch to a wrong new mode and then to switch to a correct new mode.

In another exemplary embodiment of the first exemplary aspect of this disclosure, a terminal may inform a user of various information regarding, e.g., a current mode, an acquired $UI_{SWT}$, an intended new mode, access authorities granted to a current mode or to an intended new mode, or the like. To this end, a terminal may use its various hardware or software elements. A user may then readily find out [1] whether the user has provided a correct user input or correct $UI_{SWT}$, [2] how much access authority a terminal has granted in a current mode, [3] how much access authority a terminal will grant in a new mode designated to $UI_{SWT}$ which he or she has just provided (or is currently providing), [4] which hardware or software elements a user may be able to drive in a current mode or in a new mode (i.e., scopes and depth of access authorities) designated to $UI_{SWT}$ which the user has just provided (or is now providing), [5] how much (or less) additional access authority a user will additionally gain (or lose) when a terminal switches from a current mode to a new mode designated to such $UI_{SWT}$, or the like.

To embody the above features, a terminal may provide various notice signals which may be related to various features of such access authorities, e.g., by providing [1] visual notice signals, [2] audible notice signals, [3] tactile notice signals, or a combination of such [1] to [3]. A terminal may also employ any other methods as far as such methods [1] may inform a user of certain information, [2] may grab a user's attention, or the like. A terminal may generate such signals by recruiting a main display unit, or a main output unit (e.g., its speaker or a vibrator) each of which is usually incorporated in a main system of a terminal as commonly seen in prior art data processing devices. Alternatively, a terminal may include an additional output unit which in turn includes an additional display unit, speaker, or vibrator each of which may be dedicated to generating such signals.

By informing a user of a current mode, an intended new mode, a new mode designated to $UI_{SWT}$ provided by a user, access authorities granted in such modes, or other detailed information about such modes, a user may easily find out whether or not he or she has provided (or is providing) correct $UI_{SWT}$. In addition, a user may find out which operations he or she can or cannot run in the new mode, and determine whether or not to stay in a current mode or to switch to a new mode. Accordingly, the above features may provide a user with an improved accuracy in operating a terminal, a chance to make an informed decision or to correct his or her mistake, and more convenient seamless operations.

A terminal may generate one of such notice signals regarding a new mode before the terminal actually switches to a new mode. Alternatively, a terminal may generate one of such signals while a user is providing $UI_{SWT}$ to a sensor of a mode-switching input unit but [1] before the user finishes providing such $UI_{SWT}$, [2] before the user takes his or her finger off from the sensor of the mode-switching input unit, [3] before the user takes off a stylus off from such a sensor, [4] before the user finishes providing his or her images to the terminal, or [5] immediately after the user finishes one of the above [1] to [4], where the immediacy has been defined above. Of course, a terminal may display various information regarding a new mode before the mode switching as exemplified in the previous exemplary embodiment of this first exemplary aspect.

Accordingly and in another exemplary embodiment of the first exemplary aspect of this disclosure, a terminal may inform a user of the information by displaying at least one "visual notice signal" on a display unit or its equivalent. For example, a display unit may display a text or an image which may represent [1] a current mode, [2] a new mode designated by $UI_{SWT}$, [3] a correct mode (if a terminal may read a mind of a user) or a guessed correct mode (e.g., estimated based on a user habit or by an AI algorithm), [4] access authorities granted to each mode, [5] hardware or software elements which a user may drive in a new mode, [6] hardware or software elements which a user may be able to drive in a new mode (or which a user may not drive anymore in a new mode), [7] other detailed information of such modes, or the like.

To this end, a display unit may display on its screen (or elsewhere) various visual notice signals examples of which may include, but not limited to, an icon, a text, an object, a video clip, or an image, as far as such signals may deliver one of various information described above. Additional visual notice signals may also include, but not limited to, a color (e.g., a color of an icon, a text, an object, a video clip, an image, a background, or the like), a brightness thereof, a hue thereof, a contrast thereof, a shape or a size thereof, its pattern, its position, its arrangement, and a combination of the above. By displaying such visual notice signals on a display unit, a terminal may help a user check which mode he or she is in, what he or she can (or cannot) do in such a mode, whether or not he or she provided a correct mode-switching (user) sub-input, or the like.

It is appreciated that a terminal may display such visual notice signals on a display unit. To this end, a terminal may recruit at least one pre-existing hardware element and may drive the element for generating various notice signal. In the alternative, a terminal may incorporate at least one additional hardware element to generate such visual notice signal. Followings exemplify some features for generating such visual notice signals.

Figure 9A:
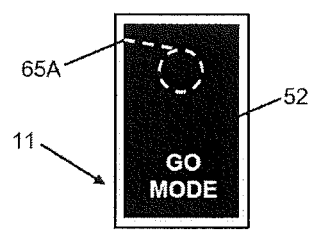
FIGS. 9A to 9D are top views of various notice units for generating various notice signals.

In one example of this exemplary embodiment, a terminal may recruit at least one of hardware elements of a main system and may use that element as a notice unit capable of generating various visual notice signals, while manipulating a color, brightness, hue, shapes, sizes, arrangements or orientations of such signals. FIG. 9A exemplifies a display unit of a main system which may also be recruited as a notice unit and display various texts (e.g., a name of a current mode or a new mode), images, or icons each representing a currently engaged mode or a new mode designated by $UI_{SWT}$ which is being provided (or has been supplied) by a user. A terminal [1] may display such notice signal on a notice unit (65A) which is a designated portion of a display unit (52) or [2] may display such notice signal in different portions of the display unit (52) in different timings, where in the case of [2], an entire display unit (52) may be deemed to be recruited as a notice unit (65A).

Although not shown in FIG. 9A, a notice signal may include [1] a list of various hardware or software elements which a user may (or not) drive in a current (or new) mode, [2] a list of options or functions which a user may (or not) use in a current (or new) mode, or [3] a list of such hardware or software elements which a user may additionally drive (or may not any longer) drive after the mode switching. A terminal may only display a name or a type of $UI_{SWT}$, an entire (or only a related) portion of a hierarchy, a list of modes to which a user may switch from a current mode, or the like.

It is appreciated that a terminal (or its display unit) [1] may blink the notice signals to attract attention of a user, or [2] may change a shape or size of the notice signals, a color or a position thereof. It is also appreciated that a terminal may use only a portion of a screen of a display unit (52) in order to provide such visual notice signals. Accordingly, while displaying the notice signals in a certain portion of a display unit (52), a terminal may display the routine data (e.g., a date and a time, a message informing incoming emails or texts, an alarm for upcoming events, or the like) on another portion thereof.

In addition, a terminal may display the notice signals not on a major display unit (52) of a main system, but on a minor display unit (when available) [1] which may include a screen smaller than that of a major display unit (52), [2] which may only display such notice signals in black and white, [3] which may be cheaper than the major display unit (52), or the like. A minor display unit may be disposed on the same surface of a terminal in which the main display unit (52) is positioned. In the alternative, a display unit may include multiple segments, where a primary segment may be used as a main display unit (52), while a minor segment may be used as a notice unit capable of providing such visual notice signals (or vice versa). Other configurational or operational characteristics of the notice unit (65A) of FIG. 9A may be similar or identical to those of other notice units of FIGS. 7A to 7F or FIGS. 8A to 8E.

Figure 9B:
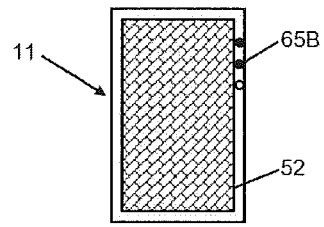

In another example of this exemplary embodiment, a terminal may include a notice unit which does not recruit a main display unit to display various visual notice signals. To this end, a notice unit may include one or more lighting elements (e.g., prior art lamps, LEDs, or the like) and may inform a user of various information of a current (or new) mode, access authorities granted to such modes, or lists of hardware or software elements which a user may (or may not) drive in such modes. FIG. 9B exemplifies a notice unit (65B) which may include multiple lighting elements arranged in, e.g., a vertical array of LEDs incorporated along a left edge. Such LEDs of the notice unit (65A) may inform a user of various information by, e.g., [1] turning on or off certain LEDs, [2] blinking certain LEDs, [3] manipulating a color or brightness of such LEDs, [4] turning on or blinking the LEDs in a certain sequence, [5] manipulating durations of on-periods or off-periods of such LEDs, or [6] controlling temporal gaps between such turning on or blinking A terminal may include any number of LEDs in almost any location on or around a terminal as far as a user can readily monitor such LEDs. It is appreciated that such LEDs may be identical to each other or that at least two of such LEDs may have different shapes, sizes, colors, brightness, orientations, or the like.

Because a notice unit (65B) generates visual notice signals related to $UI_{SWT}$, a terminal may include the notice unit (or its lighting elements) adjacent to a mode-switching input unit such that a user may readily know whether he or she has provided correct $UI_{SWT}$ to a terminal while manipulating such an input unit. Alternatively, when a user does not have to continue to look at the input unit while providing $UI_{SWT}$, a terminal may include the notice unit away from the mode-switching input unit. For example, such lighting elements may be disposed on, around or close to an activation input unit, an authentication input unit, or another input unit.

As exemplified above, when a terminal includes a touch-screen-type display unit, the display unit (or its portion) may be used as a notice unit or as the lighting elements of such a unit for generating the visual notice signals. Alternatively or in addition, different hardware elements of a terminal as conventionally included in a prior art data processing device may be recruited as the lighting elements as far as such elements may generate the visual notice signals and inform a user of a current mode, a new mode, their access authorities, or operations which a user may run in such modes. Further configurational or operational characteristics of the notice unit (65B) of FIG. 9B may be similar or identical to those of other notice units of FIGS. 7A to 7F, FIGS. 8A to 8E, and FIG. 9A.

Figure 9C:
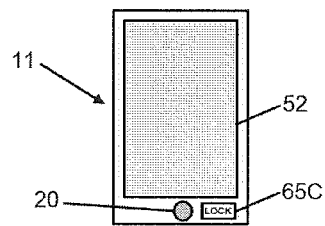

In another example of this exemplary embodiment, a terminal may include at least one notice unit which may include multiple sub-units each of which may correspond to one of various notice units as exemplified in FIGS. 9A to 9C.

be identical to a main display unit in its configuration but which may be much smaller (or simpler) than the main display unit. FIG. 9C exemplifies a notice unit (65C) which may operate as an additional display unit capable of displaying visual notice signals thereon. Accordingly, the notice unit (65C) may display various information which can be provided by a notice unit (65A) of FIG. 9A or may display such information in a simpler format. Alternatively, the notice unit (65C) may display various information which can be provided by a notice unit (65B) of FIG. 9B. In this respect, a notice unit (65C) of FIG. 9C may be deemed [1] as a smaller version of a notice unit (65A) which is a portion of a main display unit (52) of FIG. 9A, or [2] as an advanced version of the notice unit (65B) of FIG. 9B.

As shown in FIG. 9C, a notice unit (65C) may be disposed next to a main input unit (20) and may display such information regarding a current (or new) mode, access authorities granted to such modes, various hardware or software elements drivable in such modes, various operations which a user may run in each of such modes, or the like. Of course, the notice unit (65C) may be disposed in other locations on or around a terminal as far as the user may readily monitor such notice signals.

A terminal may manipulate a notice unit (65C) to display such information in various timings. For example, a notice unit (65C) may display the visual notice signals [1] concurrently with, [2] immediately after, or [3] within a certain period of time after such mode switching. Alternatively, a notice unit (65C) may display such visual notice signals before a terminal may switch modes. In one case, a terminal may switch modes only after a user confirms to which new mode the terminal may switch. In another case, a user may keep manipulating a mode-switch input unit (25), and a notice unit (65C) may display such notice signals thereon. When $UI_{SWT}$ displayed on the notice unit is correct, a user may take off his or her body part (or a non-user object) from such an input unit (25), and thereafter a terminal may switch modes. When $UI_{SWT}$ displayed thereon is wrong, a user may move the body part (or a non-user object) over the mode-switching input unit (25) while maintaining a contact with the mode-switching input unit (25). Such arrangements may provide the benefit of providing a seamless operation as well as obviating a user from switching to an unintended mode and only thereafter switching to an intended mode by providing an additional user input with correct $UI_{SWT}$. Further configurational or operational characteristics of the notice unit (65C) of FIG. 9C may be similar or identical to those of other notice units of FIGS. 7A to 7F, FIGS. 8A to 8E, or FIGS. 9A and 9B.

Figure 9D:
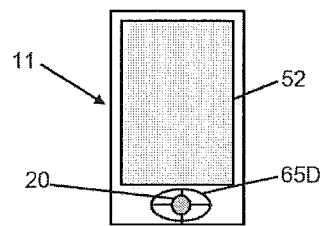

In another example of this exemplary embodiment, a terminal may employ a different visual element to provide various notice signal to a user in a manner similar to those of FIGS. 8D and 8E. FIG. 9D exemplifies another notice unit which includes multiple sub-units (65D) and generates various visual notice signals with such sub-units. As in the figure, a notice unit includes four sub-units (65D) which are shaped and sized to be disposed around a main input unit (20). Each sub-unit (65D) may receive a user input including $UI_{SWT}$, where the user input may include $UI_{ACT}$ or $UI_{THEN}$. More particularly, the sub-unit (65D) may include prior art lighting elements (e.g., LEDs) similar to those of FIG. 9B, or may include prior art display element similar to that of FIG. 9C.

As a result, each sub-unit (65D) of a notice unit may turn on or off, blink, change colors or display texts about $UI_{SWT}$ which is provided by a user such that a user may receive information regarding a current (or new) mode, a hierarchy of multiple modes, access authorities granted to each modes defined in the hierarchy, operations which a user may run in such a mode, or the like. A terminal may include any desired number of such sub-units (65A) which in turn may be implemented in almost any locations on or around a terminal, as far as a user may easily notice such notice signals. In one case, a terminal may include a single sub-unit (65D) which may then be similar to a notice unit (65C) of FIG. 9C. In another case, a terminal may include multiple LED's as the sub-units (65D), where such sub-units (65D) may be similar to a notice unit of FIG. 9B. Other configurational or operational characteristics of the notice unit (65D) of FIG. 9D may be similar or identical to those of other notice units of FIGS. 7A to 7F, FIGS. 8A to 8E, or FIGS. 9A to 9C.

In another example of this exemplary embodiment, a terminal may include a mode-switching input unit which a user may move and change a position, an orientation, or an arrangement with respect to a main input unit of a terminal. Alternatively, a terminal may include another mode-switching input unit which a user may rotate and, therefore, change an orientation or an angle with respect to a main input unit of a terminal. A user of this mode-switching input unit may easily monitor in which mode a user is currently operating a terminal, particularly when a user may use the input unit to switch between two or three modes. The input unit may optionally include at additional visual or text mark printed thereon or therearound when a terminal operates in a hierarchy which defines more than three modes. Because each mark may be configured to represent each of such multiple modes, a user may easily find out in which mode he or she is currently engaged.

Referring to various notice units as exemplified in FIGS. 9A to 9D as well as their equivalents, a terminal may synchronize various $UI_{SWT}$'s with various visual notice signals generated by such notice units. In one example, a user may supply $UI_{SWT}$ by applying a force to a mode-switching input unit (25), contacting at least a portion of the mode-switching input unit (25), or otherwise manipulating at least a portion of such an input unit (25) as described above. When a user continues to manipulate the input unit (25) for a certain period of time, a terminal may receive a user input, acquire $UI_{SWT}$ therefrom, generate one of such visual notice signals which match the acquired $UI_{SWT}$, and display such visual notice signals on the notice unit (65). Upon confirming that such visual notice signals match a user's intention (e.g., $UI_{SWT}$ acquired by the input unit is correct $UI_{SWT}$), a user may stop manipulating the input unit. In response thereto, a terminal confirms that $UI_{SWT}$ acquired by the input unit, and then switches (or advance) to a new mode based on $UI_{SWT}$.

However, when a user finds out that the visual notice signals do not match an intended new mode, he or she may correct his or her manipulation of a mode-switching input unit (25), until confirming that a terminal acquires and displays intended $UI_{SWT}$ on a notice unit (65). Alternatively, a terminal may switch to a lock (or restricted) mode or may turn off a display unit, without giving a user any chance of rectifying his or her error.

In another exemplary embodiment of the first exemplary aspect of this disclosure, a terminal may inform a user of the information by displaying at least one "audible notice signal" with a speaker or its equivalent. For example, a display unit may make sounds which may represent [1] a current mode, [2] a new mode designated by $UI_{SWT}$, [3] a correct mode (if a terminal may read a mind of a user) or a guessed correct mode (e.g., estimated based on a user habit or by an AI algorithm), [4] access authorities granted to each mode,

[5] hardware or software elements which a user may drive in a new mode, [6] hardware or software elements which a user may be able to drive in a new mode (or which a user may not drive anymore in a new mode), [7] other detailed information of such modes, or the like.

For example, a notice unit may be configured to generate multiple audible signals each of which is matched to each of multiple modes of operation defined in a certain hierarchy. Of course, a terminal may match each of such audible signals with each of such modes in a 1-to-1, m-to-1, 1-to-n, or m-to-n matching. As a result, in response to $UI_{SWT}$, the terminal may switch to a new mode which is designated by UISWI. Once such audible notice signals are generated by a notice unit, a user may listen to such signals and then determine which mode the user is currently operating a terminal, to which new mode a terminal switches, how much access authorities are granted to a user in such modes, how many operations a user can run in each of such modes, or the like.

A notice unit may generate various audible notice signals in such a way that a user can differentiate each of such signals, primarily based on various static or dynamic features of such audible notice signals. Therefore, a terminal may manipulate various wave characteristics of such audible notice signals, where examples of such characteristics may include, e.g., [1] a volume or an amplitude of such signals, [2] a frequency or a tone thereof, [3] a period thereof, [4] a length or a duration thereof, [5] presence or absence of any temporal gap between such signals (e.g., whether such signals are continuous sounds or beeps), or the like. When the audible notice signal is composed of a train of multiple audible pulses, such characteristics may include, but not limited to, [1] a number of such pulses included in a train, [2] magnitudes or amplitudes of such pulses in the train, [3] lengths or durations of such pulses, [4] a number of temporal gaps present therein, or the like.

A terminal may drive such a notice unit in a voice command mode, in which a mode-switching input unit may be able to acquire $UI_{SWT}$ from an audible command from a user, may generate an oral notice signals, or the like. Accordingly, a user may provide $UI_{SWT}$ to a terminal by speaking thereto, and may confirm $UI_{SWT}$ which he or she has provided or which is acquired by a mode-switching input unit by listening to an oral instruction from a terminal, or the like.

A terminal may recruit various hardware elements as a notice unit of this embodiment, as far as such elements can readily generate such audible notice signals. For example, a terminal may use a prior art speaker which is incorporated into a main output member of a terminal. A terminal may include an extra speaker for generating such audible notice signals. In addition, a terminal may couple to an add-on device which includes a speaker or another sound generating hardware element therein.

A terminal may also drive a speaker of a main output unit or an additional speaker and may generate a beep or a train of beeps. For example, such a notice unit may generate a single beep in different magnitudes, tones, or durations, thereby informing a user of $UI_{SWT}$, a current (or new) mode, access authorities in each of such modes, hardware or software elements drivable in such modes, or the like. A notice unit may also manipulate various static or dynamic features of such audible notice signals so that the notice unit may generate a human voice, a musical instrumental sound, a metal sound, a smooth sound, a coarse sound, or the like.

A terminal may instead generate a train of beeps while manipulating various features of such a train of beeps to inform a user which mode a user is currently operating, to which mode a terminal is to switch (or advance), or the like. For example, a terminal may manipulate a duration of such a train, a number of beeps included in the train, durations of such beeps in the train, a number of temporal gaps between such beeps, durations of such gaps, a ratio of one of such features to another, or a spatial or temporal average of such features.

In another exemplary embodiment of the first exemplary aspect of this disclosure, a terminal may inform a user of the information by displaying at least one "tactile notice signal" with a vibrator or its equivalent. For example, a display unit may make vibrations which may represent [1] a current mode, [2] a new mode designated by $UI_{SWT}$, [3] a correct mode (if a terminal may read a mind of a user) or a guessed correct mode (e.g., estimated based on a user habit or by an AI algorithm), [4] access authorities granted to each mode, [5] hardware or software elements which a user may drive in a new mode, [6] hardware or software elements which a user may be able to drive in a new mode (or which a user may not drive anymore in a new mode), [7] other detailed information of such modes, or the like.

To this end, a terminal may include a notice unit which can drive various prior art hardware elements such as, e.g., an electrical vibrator, a mechanical vibrator, an electromechanical vibrator, or other tactile elements each of which is capable of generating vibrations or other tactile signals. Of course, a terminal may match each of such tactile signals with each of multiple modes defined in a hierarchy in a 1-to-1, m-to-1, 1-to-n, or m-to-n matching. By generating tactile notice signals such as, e.g., a vibration, a train of multiple vibrations, or a touch, with a notice unit, a terminal may inform a user which current mode a user is currently in, which new mode a user desires to switch (or advance) to (e.g., $UI_{SWT}$ intended by a user), which new mode a terminal switches to (e.g., $UI_{SWT}$ acquired by a mode-switching input unit), access authorities granted in such modes, operations which a user may run in such modes, or the like.

A user may then sense such signals and find out in which mode he or she is to switch based on such tactile signals or various static or dynamic features thereof (e.g., a strength or an amplitude, a length or a duration, a pulse train of multiple tactile signals, a number of such signals included therein, a number of temporal gaps therein, or the like). A user may also sense a frequency of such tactile signals to find out which mode he or she is in, which mode a terminal switches to, or the like. A terminal may recruit a prior art vibrator which is commonly incorporated into a main output member as a tactile notice unit. Alternatively, a terminal may include a separate vibrator which can generate vibrations.

It is appreciated that various notice units capable of generating visual, audible or tactile notice signals do not have to be disposed inside a terminal. In other words, a terminal may recruit a wearable device worn by a user such that, when a terminal sends a control signal to a wearable device, the device generates corresponding visual, audible or tactile notice signals to a user, and delivers such signals to a user, where examples of such wearable devices may include, but not limited to, a watch, a wrist-band, an arm band, a glove, a ring, a goggle, an eye glass, a helmet, a hat, a belt, a necklace, a bracelet, an earring, a nail, a shoe, and any other devices which may be portably worn by a user. In the alternative, a terminal may couple with an add-on device which is not wearable by a user, and to render such a unit to generate such notice signals.

As described above, a terminal may operate in each of multiple modes of operation which are defined in a certain hierarchy. Accordingly, a terminal may also generate various notice signals each of which represents each hierarchy in such a way that a user can easily find out in which hierarchy a user is to operate a terminal and which modes are defined in a hierarchy. It is appreciated that a mode-switching input unit (or a main input unit) may generate various control signals which are designated to multiple modes.

A terminal may include one of the above notice units to generate such visual, audible, or tactile notice signals. Alternatively, a terminal may generate such notice signals with a notice unit as well as with a mode-switching input unit. In another alternative, a terminal may combine a notice unit with a mode-switching input unit when desirable.

A terminal may also synchronize the notice units with various mode-switching input units in such a way that a user may receive such visible, audible or tactile notice signals from the notice units [1] upon or immediately after a user provides $UI_{SWT}$ to the terminal, [2] before switching to a new mode which is designated to $UI_{SWT}$, [3] while a user continues to manipulate a mode-switching input unit, or the like. As a result, a user may be able to readily confirm which $UI_{SWT}$ he or she has provided, whether $UI_{SWT}$ acquired by a terminal matches a new mode intended by a user, whether or not to make a remedial action in case an acquired $UI_{SWT}$ does not match an intended new mode, or the like.

4-12. Interchangeability

Although the foregoing embodiments and examples of this $1^{st}$ Configuration have been explained with a focus on a data processing terminal which operates in a hierarchy which defines therein a single lock mode and a single unlock mode, all foregoing embodiments and examples equally apply to other data processing terminals operating in a hierarchy which defines any number of unlock, intermediate, or lock modes, where each of such modes may be granted by a terminal with identical, similar, comparable or different access authorities.

In this context, a terminal may operate in a hierarchy which defines at least one intermediate mode along with at least one lock mode and at least one unlock mode. It then follows that a terminal may advance from an off-state or a powered-off state directly to an intermediate mode, without having to advance to a lock mode. By the same token, a terminal may switch from an intermediate mode directly to an off-state or a powered-off state, without having to pass through a lock mode. In addition, a terminal may switch from an intermediate mode to either an unlock mode or a lock mode. As a result, any operational features of this $1^{st}$ Configuration related to switching from an off-state or a powered-off state to a lock mode also apply to switching from an off-state or powered-off state to an intermediate mode. Similarly, any operational features of this $1^{st}$ Configuration which are related to switching from a lock mode to an off-state or a powered-off state also apply to switching from an intermediate mode to an off-state or a powered-off state.

It is appreciated that various features of a certain example of a certain embodiment of this $1^{st}$ Configuration [1] may equally apply to a different example of the same embodiment of the same $1^{st}$ Configuration, [2] may equally apply to a different example of a different embodiment of the same aspect, or [3] may equally apply to a different example of a different embodiment of a different aspect explained hereinabove or hereinafter, within the extent that such features do not contradict each other.

In addition, configurational or operational variations (or modifications) of various terminals described in various embodiments or examples of this first exemplary aspect (i.e., the $1^{st}$ Configuration) may be interchangeable with other various embodiments or examples of other exemplary aspects of this disclosure. Therefore, certain features of one embodiment or example of this first exemplary aspect may be applied to another embodiment or example of the same aspect or of a different aspect.

Moreover, other configurational or operational features, their variations or modifications of various terminals of this first exemplary aspect [1] may apply to, [2] may be incorporated into, [3] may replace, [4] may be replaced by, or [5] may be combined with corresponding features of other aspects, embodiments, or examples of this disclosure which have been described throughout this disclosure, as long as such application, incorporation, replacement, or combination does not contract each other.

5. 2nd Configuration—Lock System with Lock CPU Unit

In the second exemplary aspect of this disclosure which corresponds to the $2^{nd}$ Configuration of this disclosure, a terminal may include at least one main system and at least one lock (or intermediate) system. It is appreciated that a main (or lock) system includes therein at least one main (or lock) unit and that each main (or lock) unit includes at least one main (or lock) hardware or software element therein. As a result, each main (or lock) unit may run a certain operations, thereby performing specific functions.

Similar to that of Section 4, a main system of this $2^{nd}$ Configuration may operate in an unlock mode, and include at least one [1] main CPU unit, [2] main input unit, [3] main output unit, and [4] main memory unit, along with other optional main units. A lock system of this $2^{nd}$ Configuration may operate in a lock mode, and include [1] at least one lock CPU unit, [2] at least one lock memory unit, and [3] at least one optional lock viewer, along with other optional lock units such as a lock input unit. By including a lock CPU unit therein, a lock system of this $2^{nd}$ Configuration may run at least one operation, completely (or partly) independent of a main system. In addition, by including a lock CPU unit, a lock system may not need to include any lock viewer, particularly when a lock CPU unit may run operations which can be run by the lock viewer.

Depending upon a capability of a lock CPU unit, a lock system may not need any configurational or operational assistance from a main system in running lock operations in a lock mode. That is, a lock system may run lock operations with its own lock CPU unit, without having to drive a main CPU unit or a main O/S of a main system. It then follows that physically or operationally isolating various units of a lock system from such units of a main system of a terminal of this $2^{nd}$ Configuration is generally more feasible than in the case of that of the previous $1^{st}$ Configuration.

Due to the presence of a lock CPU unit, a lock system of this $2^{nd}$ Configuration can drive more units, thereby capable of running more diverse lock operations, while performing more diverse functions. As a result, various terminals of this $2^{nd}$ Configuration can provide a user with the enhanced security, the improved integrity, and the heightened privacy. Details of such lock and main systems of various terminals of this $2^{nd}$ Configuration are provided below, while omitting those features identical to those of the $1^{st}$ Configuration.

Figure 10A:
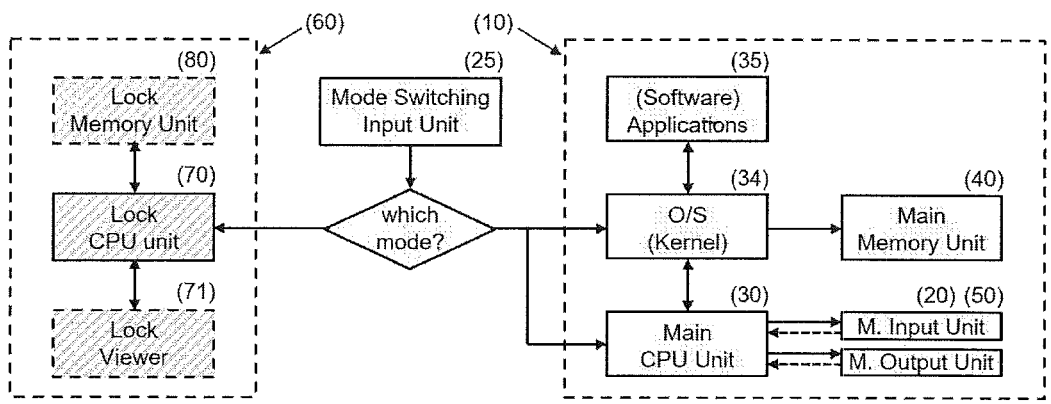
FIGS. 10A and 10B are block diagrams of an exemplary data processing terminal including at least one lock CPU unit according to the second exemplary aspect of this disclosure.

FIG. 10A is a block diagram of an exemplary data processing terminal of the $2^{nd}$ Configuration of this disclosure. More particularly, FIG. 10A exemplifies a terminal including a single main system (10) and a single lock system (60), where such systems and their respective units are depicted in a context of multiple abstract layers, and where various units may physically or operationally couple with each other as represented by various lines with arrows.

Various lines which connect such units of FIG. 10A show "paths" of physical or operational coupling between various units such as, e.g., a command signal, data transfer, manipulation, or the like. It is appreciated that such paths of FIG. 10A are only exemplary and that many other units may be connected by additional paths. For example, the main CPU unit (30) and main O/S (34) may drive other units of FIG. 10A. Not all paths are included in this figure, however, for simplicity of illustration, and further paths among various units of the figure will to be explained in greater detail in conjunction with other details of the main system and the lock systems of a terminal of this $2^{nd}$ Configuration.

5-1. 2nd Configuration—Main System

In one exemplary embodiment of the second exemplary aspect (i.e., a $2^{nd}$ Configuration) of this disclosure, a main system (10) of a terminal may include various units and various hardware or software elements as have been described in conjunction with the main system of the $1^{st}$ Configuration. It is appreciated that each unit of the main system (10) may include at least one of such hardware or software element.

For example and as shown in FIG. 10A, a main system (10) may include at least one main input unit (20), at least one main CPU unit (30), at least one main O/S (34), at least one main (software) application (35), at least one main memory unit (40), and at least one main output unit (50), where each main unit of a terminal of this $2^{nd}$ Configuration is identical or similar to that of the terminal of the $1^{st}$ Configuration.

More particularly, a main CPU unit (30) may include a CPU, a firmware, and an assembler, similar to that of the $1^{st}$ Configuration. In addition, each unit of a main system (10) of this terminal is similar or identical to the corresponding unit of the main system of a terminal of the $1^{st}$ Configuration, and may also be similar or identical to another corresponding unit of a terminal of other exemplary aspects of this disclosure. Therefore, details of various units of the main system (10) are omitted herein.

However, by including a lock CPU unit (70) therein, a lock system (60) of the $2^{nd}$ Configuration may not need to recruit a main CPU unit (30) or a main O/S (34) to drive a lock viewer (71) or an optional lock memory unit (80). Accordingly, details of the main system (10) of a terminal of this $2^{nd}$ Configuration may differ from that of the $1^{st}$ Configuration to that extent as will be explained in greater below. Except such differences, other details of the main system (10) of this $2^{nd}$ Configuration may be similar or identical to those of the main system of the $1^{st}$ Configuration, or to those of other main systems of other terminals as described in other exemplary aspects of this disclosure, subject to certain modifications, additions or omissions each of which will become apparent based on detailed contexts.

5-2. 2nd Configuration—Lock System

In another exemplary embodiment of the second exemplary aspect, a terminal may also include at least one lock system (60), in addition to the main system (10). A lock system (60) may include a lock CPU unit (70), an optional lock viewer (71), and other optional lock units such as, e.g., a lock memory unit (80), an optional lock O/S (not included in the figure), and an optional lock output unit (not included in the figure).

A lock CPU unit (70) may include at least one [1] lock CPU, [2] lock firmware, and [3] lock assembler, and may perform various functions in a lock mode, where such functions may be similar or identical to those functions performed by a main CPU unit (30) operating in an unlock mode. Accordingly, depending upon which hardware or software elements are to be included in a lock CPU unit (70), a lock system (60) may serve [1] simply as a lock viewer as described in the above $1^{st}$ Configuration, [2] as a simplified version (i.e., having less functionality) of a main system (10) of the $1^{st}$ or $2^{nd}$ Configuration, or [3] as a system which is simpler than the main system (10) of the $1^{st}$ or $2^{nd}$ Configuration but which has more functionality than the lock system of the $1^{st}$ Configuration.

Alternatively, a lock (60) system may include a lock CPU unit (70) which is different from a lock viewer (71) as described in FIG. 10A. Although not shown in the figure, a lock system (60) may include a lock O/S which may work along with a lock CPU unit (70) and which helps a user drive at least one hardware or software element of a lock system (60).

As described above, a lock CPU unit (70) generally includes a lock CPU which may carry out basic instructions of a computer program by performing basic arithmetic, logical, control, or I/O operations. A lock CPU unit (70) may optionally include a lock firmware and a lock assembler, where a lock firmware may provide control, data monitoring or data manipulation to various hardware elements of a lock system (60), while a lock assembler may create an object code, store tedious calculations and manual address updates after program modifications, or the like, just like a prior art CPU, firmware, assembler, or the like.

Alternatively, a lock CPU unit (70) may be configured to include a minimum functionality of a prior art CPU, firmware, or assembler. In other words, a lock CPU unit (70) may carry out only some of such basic instructions, or may provide only partial control, partial data monitoring, or partial data manipulation to various hardware elements of a lock system (60). In general, the more functionality a lock CPU unit (70) may be equipped with, the more operations a lock CPU unit (70) can run, and the more functions a lock CPU unit (70) can perform. In this respect, the lock system (60) of a terminal of the $1^{st}$ Configuration which may only include a lock viewer may be deemed as a lock system with the minimum functionality.

A lock system (60) may optionally include a lock O/S which is equipped with at least minimum functionality of a main O/S (34) or that of another prior art O/S and which may manage various hardware or software elements of a lock system (60). As a result, a lock system (60) with a lock CPU unit (70) and a lock O/S may also provide services to software elements of a lock system (60) such as, e.g., driving such elements, allocating processor time or memories thereto, or driving I/O hardware elements of a lock system (60).

Therefore, it is appreciated that incorporating a lock CPU unit (70) differentiates a lock system (60) of this $2^{nd}$ Configuration from the one of the $1^{st}$ Configuration. Therefore, a lock system (60) of this $2^{nd}$ Configuration may run an operation, without getting a main CPU unit (30) or a main O/S (34) involved. In addition, a lock system (60) of this $2^{nd}$ Configuration may even be able run certain operations, without acquiring any prior authorization from a main CPU unit (30) or a main O/S (34).

By incorporating such a lock CPU unit (70) (or a lock O/S), a terminal manufacturer or an application developer may incorporate such lock systems (60) along with their lock CPU units (70) into a terminal, without having to obtain a pre-approval or pre-consent from an O/S provider. As a result, a terminal of this $2^{nd}$ Configuration may allow a user to select and launch a lock system (60), even before launching a main system (10), thereby partly or completely isolating a main system (10) from a lock system (60), either physically or operationally.

A lock system (60) may also include a lock viewer (71) which is similar to that of the $1^{st}$ Configuration. Such a lock viewer (71) may be a limited-functionality (software) application which may not allow a user to edit, create or modify data, or files. For example, a lock viewer (71) may correspond to various prior art viewers or browsers such as, e.g., file viewers, image viewers, web browsers, or other prior art viewers. A lock CPU unit (70) may drive a lock viewer (71) by including therein, e.g., a driver capable of driving the lock viewer (71), or a lock O/S. Other configurational or operational features of the lock viewer (71) of this $2^{nd}$ Configuration may be similar or identical to those of the lock viewer of the $1^{st}$ Configuration.

It is appreciated that whether or not to include a lock viewer (71) in a lock system may generally depend upon functionality of a lock CPU unit (70). For example, when a lock CPU unit (70) cannot run all operations which a lock viewer (71) can run, a terminal may need to include a lock viewer (71), for a lock system (60) without a lock viewer (71) cannot run anyway all the operations which a lock viewer (71) could have run.

However, when a lock CPU unit (70) can run each and every operation which a lock viewer (71) can run in a lock mode, a terminal may not include a lock viewer (71), and obviate such redundancy. However, including a lock viewer (71) despite such redundancy may offer a few benefits to a user. First, by including a lock viewer (71) in addition to a lock CPU unit (70), a user may be able to drive a lock viewer (71) even when a lock CPU unit (70) may get contaminated or begin to malfunction. The reverse holds as well such that a user may drive a lock CPU unit (70) as a file viewer, an image viewer, or a web browser.

Secondly, a terminal may maximize isolation of a main system (10) from a lock CPU unit (70). For example, without a lock viewer (71), a terminal may have to operationally couple a lock CPU unit (70) with a main system (10), e.g., when it may be desirable to allow any unit of a main system (10) to drive any unit of a lock system (10). However, when a lock system (60) accidently introduces malicious viruses thereinto while running lock operations, such viruses may have the greater chance of migrating into a main system (10) when the more main units tend to drive a lock unit. Accordingly, when a terminal assigns more viewing takes to a lock viewer (71) and less viewing tasks to a lock CPU unit (70), a terminal may minimize operational coupling between a main system (10) and a lock CPU unit (70), thereby decreasing a chance of contaminating a main system (10).

A lock system (60) may include an optional lock memory unit (80) which is similar to that of the $1^{st}$ Configuration. Accordingly, a lock memory unit (80) may store all (or only some) results which are obtained by running lock operations in a lock mode. To this end, a user may manually mark to-be-stored results, thereby saving such results from an erase (or semi-erase) operation. As a result, the to-be-stored may remain in a lock system (60), even after a terminal switches to a new mode. A terminal may rather adaptively select the to-be-stored results based on other criteria such as, e.g., a type or content of such results, a period of time in which a user handles such results, a period of time in which a user remains in a certain website, a user preference, user statistics, use statistics, or the like.

A lock memory unit (80) may primarily serve to temporarily (or permanently) store various results obtained by running lock operations in a lock mode. A terminal may ensure that such lock operations run by a lock system (60), results obtained or downloaded in a lock mode, or results stored or residing in a lock system (60) may not adversely affect or contaminate a main memory unit (40) or other units of a main system (10). Accordingly, when a terminal allows a user to drive a lock viewer (71), to store such results in a lock memory unit (80), and to retrieve data therefrom, a terminal [1] may isolate a main system (10) from at least one unit of a lock system (60), [2] may prevent a user from storing such results which are stored or residing in a lock system (60) into a main memory unit (40) of a main system (10), or [3] may run an erase (or semi-erase) operation onto such results in one of various erasure timings.

A lock system (60) may include an optional lock input unit such as, e.g., at least one mode-switching input unit (25) which may be designated to receive a user input which in turn includes UISW therein. To this end, a mode-switching input unit (25) may include a sensor for acquiring $UI_{SWT}$ from the user input. A mode-switching input unit (25) may be fabricated as a hardware element which is different and separate from a main input unit (20), or may be combined with at least one of various input units such as, e.g., an activation input unit (for acquiring $UI_{ACT}$), an authentication input unit (for acquiring $UI_{THEN}$), or a main input unit (20) which may acquire at least two different (user) sub-inputs. A lock (or main) system (60), (10) may then drive a mode-switching input unit (25) in a lock (or unlock) mode.

As described in the $1^{st}$ Configuration, a mode-switching input unit (25) may be [1] disposed away from a main input unit (20) (e.g., one input unit on a right edge of a terminal, while another input unit on a front surface), [2] disposed next to a main input unit (20), [3] provided as a unitary article with a main input unit (20), or the like. In addition, a mode-switching input unit (25) may be regarded as a hardware element of a main system (10), as that of a lock system (60), or as that of a terminal itself.

A lock system (60) may include an optional lock output unit (90) which may display static or dynamic images or may play sounds resulting from running various lock operations in a lock mode. It is appreciated that, instead of implementing an additional lock display unit or a lock speaker, a lock system (60) may recruit a main display unit or a main speaker of a main system (10) to display such images or to play sounds in a lock mode.

As described above, a terminal may use a lock system (60) of the $2^{nd}$ Configuration which may operate entirely or partly independent of a main system (10). Instead of being incorporated into a terminal, a lock system (60) may fabricated as a separate article which a user may releasably couple with a terminal and which a user may operate as a lock system (60) of a terminal. To this end, a lock system (60) may be fabricated [1] as an external "USB-type device" which may include a lock CPU unit, a lock memory unit, or another lock unit, [2] as an "external memory chip (or card)" which may include at least one lock unit, [3] a "portable memory chip (or card)" which may include at least one lock unit (70), or [4] any other prior art memory chip, card, or device which may include at least one lock unit. It is appreciated that each of such external lock systems (60) may include a lock O/S or a lock memory unit (80) with a space for storing data therein.

A terminal may also use a lock system (60) of this $2^{nd}$ Configuration which may be incorporated into a wearable device worn by a user, where examples of such wearable devices have been provided above. It is appreciated that When desirable, a lock system (60) incorporated into the add-on device or the wearable device may be operationally coupled to a terminal or with its main system (10) wirelessly.

As will be explained below, a main system (10) may drive at least one hardware or software element of a lock system (60) in an unlock mode, e.g., when a terminal switches from an unlock mode to a lock mode. In contrary, a lock system (60) may drive at least one hardware or software element of a main system (10) in a lock mode, e.g., when a terminal switches from a lock mode to an unlock mode. Such features may help a terminal switch mode more easily, more quickly, or more seamlessly.

When a lock system (60) includes a lock CPU unit (70) with limited functionality, a lock system (60) may have to recruit on a main CPU unit (30) or a main O/S (34) to drive a certain hardware or software element of a lock system (60) or a main system (10). Of course, such dependency may make it difficult for a lock system (60) to recruit or to drive some hardware and/or software elements of a lock system (60), not to mention those of a main system (10).

In this respect, a lock CPU unit (70) may offer the benefit of allowing a lock system (60) to drive a hardware or software element of a main system (10), rather independently of a main CPU unit (30), main O/S (34), or other units of a main system (10). It is appreciated that readiness of driving such elements or units of a main system (10) by a lock system (60) may depend on a scope or a depth of such functionalities equipped into a lock CPU unit (70). However, a lock system (60) with a lock CPU unit (70), regardless of the extents of such functionality, may operate and function differently from a lock system without any lock CPU unit. When a lock system (00) includes a lock O/S with at least minimum functionality, a manufacturer of a terminal or its distributor may also install a main O/S (34) along with a lock O/S in such a way that a user may select an order of launching a main O/S (34) and lock O/S, either concurrently or sequentially. With this arrangement, a terminal may launch a lock system entirely independent of a main CPU unit (30), of a main O/S (34), or entirely of a main system (10).

A terminal of this $2^{nd}$ Configuration may also offer the benefit of enabling a lock system (60) to readily store at least a portion of results therein, not necessarily into a main memory unit (40). A lock system (60) may store at least a selected portion of results in various temporary memory sectors such as, e.g., a data buffer, a cache, a clipboard or a recycle bin. A lock system (60) may also use not only a user space but also a kernel space of a lock CPU unit (70) to store important results obtained by running lock operations in a lock mode.

As mentioned hereinabove, a lock CPU unit (70) of this $2^{nd}$ Configuration may bring in vast flexibility in utilizing a lock system (60) as well as a terminal as a whole. Other details of this lock CPU unit (70) are provided below, while other configurational or operational features of the lock system (60) of this $2^{nd}$ Configuration are similar or identical to those of the lock system of the previous $1^{st}$ Configuration.

5-3. Operations

In another exemplary embodiment of the second exemplary aspect, a terminal which includes the above main system (10) and lock system (60) may run various operations and perform various functions. In a first operation of this exemplary embodiment, when a display unit is turned off (i.e., an off-state), a terminal may receive a $1^{st}$ user input and determine to which mode it may switch based on $UI_{SWT}$ included in a $1^{st}$ user input. Because of the presence of a lock CPU unit (70), a terminal may [1] allocate functionality to run various operations in a lock mode only to a lock CPU unit (70) or [2] distribute such functionality to both of a lock CPU unit (70) and a main CPU unit (30). A terminal may also allocate such functionality only to a lock O/S or to a main O/S (34).

Similarly, a terminal may allocate various data storage tasks in a lock mode [1] only to a lock memory unit (80) or [2] to both of a lock memory unit (80) and a main memory unit (40). A terminal may assign a task of running an erase (or semi-erase operation) [1] to a lock CPU unit (70), [2] to both of a lock CPU unit (70) and a main CPU unit\(30), [3] to a lock O/S, or [4] to both of a lock O/S and a main O/S (34). Accordingly, a terminal may erase all (or only selected) results stored or residing in a lock system (60).

A lock system (60) with a lock CPU unit (70) and a lock memory unit (80) may be fabricated in various shapes, sizes, or configurations. For example, a terminal may incorporate all of such lock units therein, while isolating its main system (10) physically or operationally from such lock units. In another example, all or some of such lock units may be fabricated as an external or portable unit which may be added onto or releasably couple with a terminal as explained above. When multiple terminals are linked to each other, a lock system of one terminal may serve as a lock system of another terminal, with or without running a user authentication operation in at least one of such terminals.

In a second operation of this exemplary embodiment, when a display unit is turned on (i.e., in an on-state) and when a terminal operates in a lock mode, a terminal may receive a $1^{st}$ user input. A lock CPU unit (70) or a main CPU unit (30) may determine to which mode it may switch based on $UI_{SWT}$ included in a $1^{st}$ user input. In addition, a lock memory unit (80) or a main memory unit (40) may store an entire (or a selected) portion of results obtained by running various lock operations in a lock mode.

Having been operating in a lock mode, a terminal has been operating a lock system (60) when it receives a $1^{st}$ user input. Accordingly, a lock system (60) drives various lock units to receive a $1^{st}$ user input, to acquire $UI_{SWT}$ therefrom, to switch modes, and optionally to run such erasure (or semi-erasure). In addition, a lock system (60) may also run user authenticating, as far as a terminal provides its lock CPU unit (80) or its lock O/S with enough functionality. Otherwise, a terminal may recruit at least one main unit to supplement a lock system (60) to run such operations.

In a third operation of this exemplary embodiment, a terminal may receive a $1^{st}$ user input while operating in an unlock mode. It then follows that a terminal has been in an on-state, while a display unit has been turned on. A lock system (60) may acquire $UI_{SWT}$ from a $1^{st}$ user input, and a terminal may determine whether to remain in an unlock mode or to switch to a new mode which may be [1] a more unrestricted mode (e.g., another unlock mode) to which a terminal may grant more or less access authority, [2] a restricted mode (e.g., a lock mode) to which a terminal may grant less access authority, [3] a comparable mode to which a terminal grants less access authority in one respect but more access authority in a different respect, or the like. Because a terminal includes not only a lock CPU unit (70) but also a main CPU unit (30), either or both CPU units (70), (30) may determine [1] whether a terminal may stay in a current mode or switch to a new mode, [2] which results in a lock system (60) may be erased or stored, or the like. A terminal may also recruit either or both memory units (80), (40) to store such results which are obtained by running lock operations in a lock mode.

Further details in operating the data processing terminal of this $2^{nd}$ Configuration may be similar or identical to those of operating the terminal of the $1^{st}$ Configuration, and may also be similar or identical to those of operating other terminals of other exemplary aspects of this disclosure, subject to certain modifications, additions or omissions each of which become apparent based on detailed context.

5-4. $1^{st}$ and $2^{nd}$ User Inputs

In another exemplary embodiment of the second exemplary aspect, a terminal may receive various user inputs one of which includes $UI_{SWT}$, optionally along with $UI_{THEN}$ or $UI_{ACT}$ as described above. In response to receiving a $1^{st}$ user input (or upon acquiring one of such sub-inputs), a terminal may [1] keep a display unit turned off (i.e., an off-state), [2] display a lock screen while (or after) launching a lock system (60) and switching to a lock mode, [3] display an unlock screen while (or after) launching a main system (10) and switching to an unlock mode, or [4] display a default screen while (or after) launching a default system and switching to a default mode, where the default mode may be one of various intermediate modes. A terminal may instead run different operations in response to a $1^{st}$ user input as well.

Therefore and in a $1^{st}$ example of this exemplary embodiment, a terminal may receive a $1^{st}$ user input including $UI_{ACT}$ (with or without $UI_{THEN}$ or $UI_{SWT}$) in its off-state. In a $1^{st}$ case in which a terminal does not employ any user authentication, a $1^{st}$ user input does not have to include $UI_{THEN}$. As a result, a terminal may turn on its display unit in response to $UI_{ACT}$, and launch a lock system (60) in a lock mode. Thereafter, a terminal may authenticate a user or switch modes upon (or in response to) receiving a $2^{nd}$ user input.

In a $2^{nd}$ case where a $1^{st}$ user input includes $UI_{ACT}$ and $UI_{THEN}$, a terminal may run an authentication operation in response to a $1^{st}$ user input, while keeping a display unit turned off. When a user fails the user authenticating, a terminal may keep a display unit turned off, and remain in an off-state. However, when a user passes such authenticating, a terminal may turn on its display unit, and switch to an unlock mode.

In a $3^{rd}$ case in which a $1^{st}$ user input also includes $UI_{ACT}$ and $UI_{THEN}$, a terminal may turn on a display unit upon (or in response to) a $1^{st}$ user input, and launch a lock system (60) in a lock mode. When a user fails the user authenticating, a terminal may stay in a lock mode. When a user passes such authenticating, a terminal may switch to an unlock mode.

It is appreciated in the $1^{st}$ case that a terminal conditions such mode switching upon turning on a display unit. In the $2^{nd}$ and $3^{rd}$ cases, a terminal conditions such mode switching on an outcome of such user authenticating. It then follows that a terminal may switch modes without having to acquire $UI_{SWT}$. Alternatively, it is deemed that such $UI_{ACT}$ or $UI_{THEN}$ may serve as $UI_{SWT}$ in such cases.

In a $2^{nd}$ example of this exemplary embodiment, a terminal may receive a $1^{st}$ user input including $UI_{ACT}$ and $UI_{THEN}$ (with or without $UI_{SW1}$) in its off-state. In a $1^{st}$ case, a terminal may run an authentication operation, and then [1] keep a display unit turned off when a user fails such authenticating, or [2] turn on its display unit when a user passes such authenticating.

In a $2^{nd}$ case, a terminal may turn on a display unit in response to $UI_{ACT}$, launch a lock system (60), and display a lock screen on a display unit. A terminal may run an authentication operation [1] before, [2] concurrent with, or [3] after such turning on. When a user fails the user authenticating, a terminal may [1] turn off its display unit, or [2] stay in a lock mode. When a user passes such authenticating, a terminal may switch to an unlock mode and display an unlock screen on a display unit.

It is appreciated in the $1^{st}$ and $2^{nd}$ cases that a terminal may condition such mode switching upon an outcome of the user authenticating. It then follows that, similar to the terminals of the $1^{st}$ example of this embodiment, a terminal may switch modes without having to acquire $UI_{SWT}$. Alternatively, it is deemed that such $UI_{ACT}$ or $UI_{THEN}$ may serve as $UI_{SWT}$ in such cases.

In a 3ed example of this exemplary embodiment, a terminal may receive a $1^{st}$ user input including $UI_{SWT}$, $UI_{ACT}$, and $UI_{THEN}$ in its off-state. In a $1^{st}$ case, a terminal may turn on a display unit, to run an authentication operation concurrently therewith, and then to advance to a certain mode of operation depending on an outcome of such user authentication. Accordingly, a terminal may switch to, e.g., a lock mode or an unlock mode depending on whether a user fails or passes the authenticating. When desirable, a terminal may switch modes concurrently with such turning-on operation or user authenticating. In general, this case corresponds to the series switching, although this case may also apply to the selective switching.

In a $2^{nd}$ case, a terminal may turn on a display unit, to run an authentication operation concurrently therewith, and to advance to a certain mode of operation depending not only upon an outcome of the user authenticating, but also on $UI_{SWT}$. Accordingly, when a user passes the authenticating, a terminal may switch to one of seven different modes based on $UI_{SWT}$. In general, this case may correspond to the selective switching.

In a $3^{rd}$ case, a terminal may turn on a display unit, and then may run such authenticating or mode switching, after a certain period of time. Accordingly, in this case, the turning-on operation is sequentially followed by the user authenticating or mode switching. In addition, when a mode which is intended by a user is a restricted mode or a more restricted mode, a terminal may forgo the user authenticating. It is appreciated, however, that a terminal may preferably run such turning-on operation, an authentication operation, and a mode-switching operation, for a terminal already acquires all three sub-inputs for running such operations.

In a $4^{th}$ example of this exemplary embodiment, a terminal may also operate according to the above examples when a user provides a $1^{st}$ user input when a terminal is powered-off. A few differences of this example from the above three examples is [1] that an input unit which receives the $1^{st}$ user input may be a power-on input unit, [2] that the power-on input unit may also include at least one additional sensor for acquiring $UI_{SWT}$ or $UI_{THEN}$, and [3] that a $1^{st}$ user input may not necessarily include $UI_{ACT}$, for a powering-on operation may generally lead to launching a lock system in a lock mode.

In a $4^{th}$ example of this exemplary embodiment, a terminal may receive a $1^{st}$ user input including $U_{SWT}$, $UI_{ACT}$, and $UI_{THEN}$ in its on-state (i.e., a powered-on state and an on-state). Upon receiving a $1^{st}$ user input applied to a mode-switching input unit, a terminal acquires $UI_{SWT}$ therefrom, and then switches from a current mode to a new mode designated by $UI_{SWT}$ in one of such mode-switching timings. When a terminal switches from a current mode with less access authority to a new mode with more access authority, a terminal may run an additional authentication operation as described above.

Further details in operating the data processing terminal of this $2^{nd}$ Configuration using various user inputs are similar or identical to those of operating the terminal of the 1$^{st}$ Configuration, and may also be similar or identical to those of operating other terminals of other exemplary aspects throughout this disclosure, subject to certain modifications, additions or omissions each of which become apparent based on detailed context.

5-5. Lock CPU Unit

In another exemplary embodiment of the second exemplary aspect, a lock system (60) may include at least one lock CPU unit (70) details of which have been described above. In general, a lock CPU unit (70) of a lock system (60) may be deemed [1] as a unit similar or identical to a main CPU unit (30) of a main system (10), [2] as a unit which is similar to a main CPU unit (30) but with limited functionality, or [3] as a unit capable of running at least one operation which may not be run by a main CPU unit (30).

Depending upon its configuration, a lock system (60) may include a lock O/S (with or without kernels) [1] which is similar or identical to a main O/S (34), [2] which is similar to a main O/S but provided with limited functionality, [3] which can run at least one operation which a main O/S (34) may not run, or the like. A terminal may drive an optional lock O/S along with a lock CPU unit (70) when desirable.

It is appreciated that a bottom-line requirement of a lock CPU unit (70) is to run various lock operations in a lock mode. Therefore, a lock CPU unit (70) may be deemed as a simplified (or abbreviated) version of a main CPU unit (30). To this end, a terminal may provide a lock CPU unit (70) with minimum functionalities which may be enough to run those lock operations. The same applies to an optional lock O/S in such a way that a terminal may provide a lock O/S with minimum functionalities enough [1] to run such lock operations or [2] to help a lock CPU unit (70) to run such operations.

To the contrary, some users may rather desire to run sophisticated operations with a lock system (60) in a lock mode, while desiring to erase (or semi-erase) such results obtained by running such sophisticated operations. The sophisticated operations may include, e.g., [1] a financial transaction with user's banks in Bahamas or in the Cayman Islands, [2] a communication with user's less-significant others or more-significant others, or the like, where a user may not want to leave behind any trace for his or her own activities exercised in a lock mode.

In such cases, a terminal may provide a lock system (60) with enough access ability with which a lock system (60) may drive all of its hardware and software elements and, occasionally some (or all) of such elements of a main system (10). To this end, a terminal may provide a lock CPU unit (70) with enough functionalities to run such operations in a lock mode. The same applies to an optional lock O/S in such a way that a terminal may provide a lock O/S with sufficient functionalities enough [1] to run such lock operations or [2] to help a lock CPU unit (70) to run such operations.

A lock CPU unit (70) may run various operations which may also be run by a lock viewer of the 1$^{st}$ Configuration, may run other operations which a lock viewer of the 1$^{st}$ Configuration 1 may not be able to run due to a lack of functionality or access authority. A lock CPU unit (70) may also serve as a unit which is subordinate to a main CPU unit (30) of a main system (10), where this lock CPU unit (70) [1] may collaborate with a main CPU unit (30), [2] may call a main CPU unit (30) or other units of a main system (10) for such collaboration, or [3] may drive various hardware or software elements of a lock system (60) or a main system (10).

In another exemplary embodiment of the second exemplary aspect, a terminal may dispose various lock units of a lock system (60) in various configurations. In a 1$^{st}$ example of this exemplary embodiment, a terminal may include an entire lock system (60) and all lock units thereof such that an entire portion of a main system (10) as well as an entire portion of a lock system (60) coexist inside a terminal. In this example, a main system (10) may be physically or operationally isolated from a lock system (60) as described above or below.

In a 2$^{nd}$ example of this exemplary embodiment, at least one unit of a lock system (60) may be implemented into a portable device or an add-on device which may releasably couple with a terminal. As a result, at least one of a lock CPU unit (70), an optional lock O/S, an optional lock memory unit (80), or a lock viewer (71) may reside in the portable or add-on device (to be abbreviated as an "add-on device" hereinafter).

In a 1$^{st}$ case of this 2$^{nd}$ example, a lock CPU unit (70) may be incorporated into a terminal, while an add-on device may include a lock memory unit (80) and other optional units of a lock system (60). As a result, a lock CPU unit (70) disposed in a terminal may run lock operations, while optionally retrieving those data or results from a lock memory unit (80) incorporated into an add-on device or while storing the results obtained by running lock operations in a lock mode into a lock memory unit (80).

A lock O/S may be implemented into a terminal along with a lock CPU unit (70), or may be incorporated into an add-on device with a lock memory unit (80). A lock memory unit (80) may also be implemented into an add-on device or into a terminal. Similarly, a terminal may implement a lock input unit such as a mode-switching input unit (25) into a terminal or into an add-on device. When a lock system (60) includes a lock output unit such as a lock display unit or a lock speaker, a lock output unit may be incorporated into a terminal or into an add-on device as well.

A lock CPU unit (70) (or a lock O/S) may run such erasure (or semi-erasure) [1] onto such results which may be stored or reside in a lock memory unit (80) of an add-on device, [2] onto such results which may reside in temporary memory sectors of a lock CPU unit (70) disposed in a terminal, or [3] both of [1] and [2]. In other words, a lock system (60) may treat an add-on device as a disposable device which can be replaced by a new add-on device, particularly when an old add-on device is contaminated or damaged by malicious viruses which may have been downloaded into an old add-on device while running lock operations in a lock mode in a prior session or in a current session.

In addition to the enhanced security, improved integrity, and better protection of data stored in a main system (10), the above arrangement offers an additional benefit to a user such as, e.g., providing a hub-and-spoke-type arrangement. For example, a single lock CPU unit (70) implemented into a terminal may couple with each of multiple, external add-on devices one at a time. Therefore, a user may select a proper add-on device, couple the add-on device with a terminal, and then run various lock operations based on the user's needs or purposes. Alternatively, a user may couple a 1$^{st}$ add-on device with a terminal for business, may couple a 2$^{nd}$ add-on device for family matters, and may couple a 3$^{rd}$ add-on device for strictly personal matters.

When a lock CPU unit (70) sends results (obtained by running lock operations in a lock mode) to an add-on device or retrieves such results from an add-on device, a terminal may have to ascertain that such results [1] may not adversely affect a lock CPU unit (70), [2] may not adversely affect a main system residing in a terminal, or [3] may not adversely other add-on devices when such devices couple with a lock CPU unit (70) disposed inside a terminal.

As briefly described above, a terminal may run such erasure (or semi-erasure) in various ways. In one example, a lock CPU unit (70) may run such erasure (or semi-erasure) [1] only onto an add-on device, [2] only onto a portion of a lock system (60) which is implemented into a terminal, [3] onto a portion of a main system (10) when the portion has been called by a lock system (60) to run lock operations, [4] onto both of [1] and [2], or [5] onto all of [1] to [3]. Because a terminal may not erase such results residing in an add-on device in [2], this arrangement may offer the benefit of [2-1] keeping the results obtained by running lock operations in a lock mode into each add-on device and, therefore, [2-2] allowing a user to continue to run such lock operations while using such results remaining in a lock system (60) in a following session. In addition, a main CPU unit (30) may run such erasure as exemplified in the above [1] to [4] as well.

In a $3^{rd}$ example of this exemplary embodiment, an entire lock system may be incorporated into an external add-on device in such a way that an add-on device itself may be viewed as a separate and self-sufficient lock system (60) which can run various lock operations in a lock mode, store desirable results therein, or run such erasure (or semi-erasure) by itself. This arrangement offers the benefit that a user may couple each of multiple add-on devices one at a time, and may run various lock operations in a certain mode with each of such multiple ad-on devices. To this end, a terminal may include a port through which an add-on device may communicate with a terminal. Alternatively, a terminal may communicate with a terminal wirelessly.

In a $1^{st}$ case, a user may couple a terminal with a $1^{st}$ add-on device which may be designated to operate in a lock mode. As a result, a user may run various lock operations in a lock mode, while driving certain hardware or software elements of a lock system (60) which reside in an add-on device or while optionally driving at least one element of a main system (10) via a main CPU unit (30), e.g., by requesting a main CPU unit (30) to drive such an element. A user may instead couple a terminal with a $2^{nd}$ add-on device which may be designated to operate in an intermediate mode such as, e.g., semi-lock mode. In this case, a user may run intermediate operations while recruiting at least one hardware or software element of a lock (or main) system.

Because each add-on device may be designated to operate only in a certain mode, a terminal may readily isolate a main system (10) from a lock system (60) and from their various lock units residing in other add-on devices either physically or operationally. In addition, even when one add-on device is contaminated or infected by malicious codes, a terminal and its main system (10) does not incur any damages at all, due to such effective isolation.

As far as an add-on device includes [1] a lock CPU unit (70) equipped with requisite functionalities for running lock operations and [2] an optional lock memory unit (8) equipped with at least minimum storage capacity, an add-on device may also be produced at a very competitive price as well. Furthermore, a user may carry a few of such add-on devices and pick one for each different purposes or uses. Of course, an add-on device [1] may also be fabricated as a wearable device or [2] may be incorporated into a wearable device examples of which have been provided above.

When at least a portion of a lock system (60) is incorporated into a portable device (e.g., a wearable device), a terminal may run such erasure (semi-erasure) in different erasure timings. In a $1^{st}$ case, a terminal may run such erasure (or semi-erasure) [1] when a user resumes to operate a main system (10) incorporated into a terminal, after finishing operating a lock system (60) which is incorporated into the device, [2] when a user finishes processing such results obtained by running lock operations in a lock mode, [3] when a certain event occurs where examples of such events may include [3-1] when a terminal may detect malicious viruses in the device, [3-2] when a terminal may detect malfunction of the device, [3-3] when a user may obtain such results which may exceed a preset capacity of the device, or [3-4] when a user may operate the device for a period longer than a preset period, or the like.

In a $2^{nd}$ case, a terminal may also run such erasure (or semi-erasure) [4] when a user provides a user input [4-1] for putting the device into sleep, or [4-2] for turning off a display unit or a notice unit included in the device, or [4-3] for powering off the device, [5] when a user uncouples the device from a terminal [5-1] while keeping the device in a powered-on state (e.g., in an on-state or an off-state) or [5-2] for switching to a powered-off state, or the like. Accordingly, it is appreciated that various timings enumerated in this paragraph and preceding paragraphs also qualify as "erasure timings" hereinafter. Of course, a terminal may also run such erasure (or semi-erasure) [1] in a real-time arrangement, [2] in an interim arrangement, or [3] in an ex post arrangement.

A lock CPU unit (70) may run lock operations in a lock mode by driving software applications which may reside in a lock system (60) or a main system (10), thereby performing specific functions which may be designated to such applications. When desirable, a main CPU unit (30) may call a lock CPU unit (70) for many purposes such as, e.g., [1] storing data into a lock memory unit (80), [2] retrieving results from a lock memory unit (80), [3] running operations by driving software applications which may reside in a lock system (60) and performing specific functions assigned to such applications, or [4] driving a hardware or software lock element. In addition, a lock CPU unit (70) may call a main CPU unit (30) or a main O/S (34) [1] to drive a main memory unit (40), [2] to drive a main output unit (50), [3] to drive a main input unit (20), or the like. In this case, a terminal may allow a main system (10) to confirm whether a lock CPU unit (70) operating in a certain mode may have proper access authority to do so, and to reject such a request when it does not.

In any of the above examples, a lock CPU unit (70) may run such erasure (or semi-erasure), or may instead call a main CPU unit (30) to run such erasure (or semi-erasure) with a main CPU unit (30) [1] concurrently or [2] sequentially. Accordingly, in the case of concurrent erasure, a lock CPU unit (70) and a main CPU unit (30) run such erase (or semi-erase) operations, where one operation run by a lock CPU unit (70) overlaps at least a portion of another operation run by a main CPU unit (30) in at least one common clock cycle of a terminal. In the case of sequential erasure, a lock CPU unit (70) may erase some but not all results, and then remaining results are erased by a main CPU unit (30).

A main system (10) may also strictly control an access to any unit of a main system (10) by, e.g., [1] preventing all units of a lock system (60) from driving any unit of a main system (10) (i.e., any main unit), [2] preventing at least one but not all units of a lock system (60) from driving any main unit, or [3] preventing such results obtained from running lock operations in a lock mode from being stored into any main unit. As far as a main system (10) tightly controls such accesses, a main CPU unit (30) may [1] call a lock CPU unit (70) or [2] allow a lock CPU unit (70) to drive a certain hardware or software element of a main system (10), or [3]

allow a lock system (60) to call a main CPU unit (30) which may in turn drive the element of a main system (10), without having to worry about potential contamination or degrading of a main system (10) or about potential hacking.

Because a terminal typically grants more access authority in an unlock mode than in a lock mode, a main CPU unit (30) may store data into a lock memory unit (80), without necessarily requiring any user authorization. In one case, a main CPU unit (30) may store some data into a lock memory unit (80) when a memory space of a main memory unit (80) is or runs down to a very low level. A terminal (or a user) may do so as well, [1] when certain data would rather be stored in a lock memory unit (80) than in a main memory unit (40), [2] when data downloaded from an unknown website may pose security concerns, or [3] when a user may not want to store those results in a main memory unit (40) which may be accessible to a $3^{rd}$ party or which may be shared with other users.

A main CPU unit (30) may also modify or alter at least a portion of a lock system (60), even without having to obtain authorization from a user or a main O/S (34) for many reasons. For example, a terminal may manipulate or modify at least a portion of a lock system (60) [1] when an entire (or a certain) portion of a lock system (60) may be contaminated by a virus or by hacking and, therefore, a terminal may have to repair a lock system (60), [2] when a terminal (or a user) desires to load a new (software) application to a lock system (60), or [3] when a main CPU unit (30) needs to store data or results into a lock memory unit (80), or the like.

Although a terminal does not grant a lock system (60) as much access authority as it does to a main system (10), a terminal may even allow a lock CPU unit (70) to change or modify at least a portion of a main CPU unit (30) or at least a portion of another unit of a main system (10), when situation may require a lock CPU unit (70) to call a main CPU unit (30) or to drive certain units of a main system (10) directly or indirectly through a main CPU unit (30). In one case, a lock CPU unit (70) may call a main CPU unit (30) to run a specific operation by executing a software application which may be included in a lock system (60). A lock CPU unit (70) may call a main CPU unit (30) or a main memory unit (40) to retrieve results from a main memory unit (40) while operating in a lock mode, to store such results into a main memory unit (40), or the like. In addition, a lock CPU unit (70) may call a main memory unit (40) either directly or indirectly [1] to modify a certain memory sector, [2] to delete some data therefrom, or the like.

When a terminal allows a user operating in a lock mode granted with less access authority to access a system which operates in another mode granted with more access authority, such access may prove to be detrimental to an integrity or security of a terminal, particularly when a user who is operating a lock system while running various lock operations of visiting unreliable websites may switch to an unlock mode. Therefore, a terminal (or a user) may have to restrict a certain access attempted by a user, and allow an access only in pre-determined situations or only with certain authentications or authorizations.

In all examples of this Section, a terminal may designate only on of a main CPU unit (30) and a lock CPU unit (70) to run such erasure (or semi-erasure) either by wire or wirelessly. More particularly, running such erasure (or semi-erasure) may be recommended when a CPU unit disposed in a terminal is to run such operations onto a unit which is incorporated into an external device such as, e.g., an add-on device, a portable device, or a wearable device. In addition, such devices may include a rechargeable battery or at least a capacitor which may be able to supply electrical power to run such operation. Various features of this paragraph may also be applicable whenever at least one unit of a lock system (60) may be incorporated into such an external device.

In all examples of this Section, a terminal may run such erasure (or semi-erasure), while erasing not only such results but also those software applications implemented into a lock system, whether such applications may be implemented [1] into a portion existing inside a terminal or [2] into another portion of an external device such as an add-on device, a portable device, or a wearable device. When a terminal erases such applications or even at least a portion of a lock O/S by, e.g., through a "formatting" or an "initialization" of at least a portion of a lock system (60), a terminal may have to reload such applications or a lock O/S before a user launches a lock system (60) to run lock operations. To this end, a terminal may equip a main CPU unit (30) or a main O/S with functionalities capable of formatting or initializing [1] at least a portion of a lock memory unit (80) or [2] at least one temporary memory sector of a lick system (60) or a main system (10). In addition, a terminal may allow a main CPU unit (30) or a main O/S (34) to reload [1] such software applications, [2] various drivers of such applications, or [3] a lock into a lock system.

Other configurational or operational features of such lock and main CPU units of this $2^{nd}$ Configuration are similar or identical to those of the lock and main CPU units of the $1^{st}$ Configuration. Further configurational or operational features of such lock and main CPU units of this $2^{nd}$ Configuration are also similar or identical to those of various lock and main CPU units of other remaining aspects of this disclosure, subject to certain modifications, additions or omissions each of which may become apparent based on detailed context.

5-6. Lock Memory Unit

In another exemplary embodiment of the second exemplary aspect, a terminal may include at least one lock memory unit (80) which mainly serves to temporarily, conditionally or permanently store such results related to or resulting from running various lock operations in a lock mode. A lock memory unit (80) may be generally called by a lock CPU unit (70) and may store such data or results thereinto, to send data or results to a lock CPU unit, or the like.

A lock memory unit (80) may be fabricated similar to other prior art memory devices and may be incorporated into a terminal like other prior art memory devices. As described above, however, a lock memory unit (80) may be provided as an add-on device which may be completely designated as a lock memory unit (80). Alternatively, an add-on device may include a lock memory unit (80), and may also optionally include a lock CPU unit (70), a lock viewer (71), or the like. Alternatively, a portion of a lock memory unit (80) may reside in a terminal, while the remaining portions of a lock memory unit (80) may be included in the add-on device. A lock memory unit (80) may also be fabricated as a portable device or a wearable device, examples of which are provided above.

As explained above, a main system (10) or its main CPU unit (30) may call a lock memory unit (80) for various purposes. For example, a main system (10) may call a lock memory unit (80) [1] to store $1^{st}$ results originating from a main system (10) or [2] to store $2^{nd}$ results originating from a lock system (60), where the $1^{st}$ results are obtained by running various unlock operations in an unlock mode, while the 2nd results are obtained by running such lock operations in a lock mode.

As explained above, when a main system may (10) physically or operationally couple with a lock memory unit (80), a main system (10) may take precautionary steps in such a way that a lock system (60) may not transmit any result contaminated with viruses or malicious codes to a main memory unit (40) or other units of a main system (10). When a main system (10) requests a lock memory unit (80) to store certain results, a lock memory unit (80) may store such results [1] permanently, [2] for a preset period of time, or [3] for another period pre-selected by a main system or a user.

Conversely, a lock system (60) may call a main memory unit (40) for various purposes as well. In one example, a lock memory unit (80) may directly or indirectly (e.g., via a main CPU unit or a main O/S) call a main memory unit (40) [1] to store results originating from a lock system (60) or obtained by running lock operations in a lock mode, or [2] to execute certain applications which reside in a main system (10) using data stored in or obtained by a lock system (60). When a lock system (60) is physically or operationally coupled to a main memory unit (40) or another unit of a main system (10), a terminal may have to ensure [1] that a lock system (60) may not transmit any result contaminated with viruses to a main memory unit (40) or other units of a main system (10), or [2] that a lock system (60) may not modify a configuration or an operation of a main system (10), may not delete existing data or application from a main system (10), may not add new data or application to a main system (10).

It is appreciated that various terminals of this disclosure may allow a user to run as many operations as he or she may want with a lock system (60) in a lock mode, without having to worry about security, integrity, and privacy of a main system (10). To this end, a terminal may run such erasure (or semi-erasure) in one of such erasure timings, thereby cleaning up any trail of malicious viruses or potentially hazardous codes, thereby preventing such viruses or codes from migrating into such main units and from degrading or contaminating a main system (10) of a terminal.

However, some malicious codes or viruses may be more persistent than others, and may have successfully migrated into a main system (10), even after such erasure (or such semi-erasure). To remove the viruses or codes, a terminal may "format" or "initialize" an entire portion of a lock memory unit (80) or even a lock system (60) as a whole in various timings. Therefore, a main (or lock) system (10), (60) may even initialize at least a portion of a lock CPU unit (70) or lock applications from time to time, e.g., [1] after running such erasure (or semi-erasure) for more than a certain number of times, [2] upon finding certain viruses or malicious codes, [3] upon detecting malfunctions of at least one unit of a lock system (60), [4] upon detecting certain contamination of a lock memory unit or any unit of a main system, or the like.

Other configurational or operational features of such lock and main memory units of this 2nd Configuration may be similar or identical to those of the lock and main memory units of the 1st Configuration. In addition, further configurational or operational features of such lock and main memory units of this 2nd Configuration may also be similar or identical to those of the lock and main memory units of other remaining aspects of this disclosure, subject to certain modifications, additions or omissions each of which may become apparent based on detailed context.

5-7. Lock Output Unit

In another exemplary embodiment of this second exemplary aspect of the disclosure, a terminal may include an optional lock output unit capable of outputting results which may reside in a lock or main system (60), (10) or which may be obtained by running various lock operations in a lock mode. A lock output unit may output such results in various ways such as, e.g., [1] outputting various visual signals (e.g., displaying images or playing video clips) on a main or lock display unit), [2] outputting various audible signals (e.g., playing sounds or beeps with a main or lock speaker), [3] outputting various tactile signals (e.g., generating vibrations with a main or lock vibrator), [4] causing or actuating movements of at least one portion of a terminal, or the like.

Figure 10B:
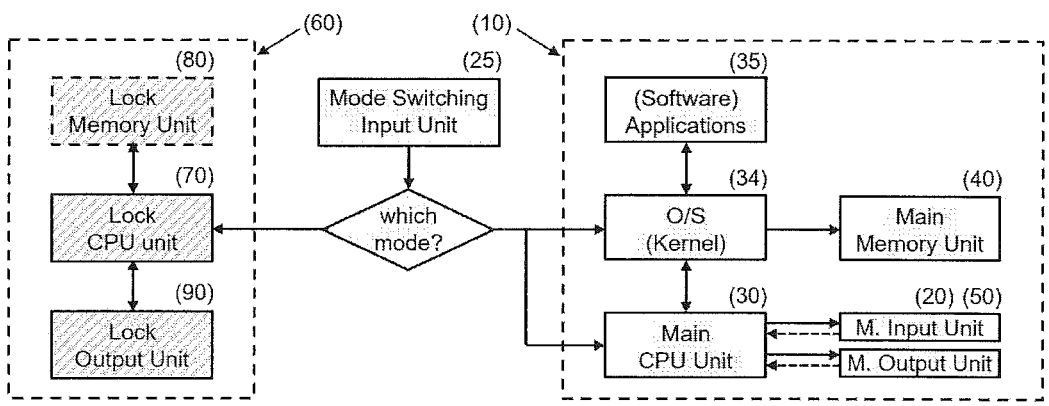

FIG. 10B shows a block diagram of another exemplary data processing terminal of the 2nd Configuration of this disclosure. More particularly, FIG. 10B exemplifies a terminal including a single main system (10) and a single lock system (60), where a main system (10) is identical to that of FIG. 10A, while a lock system (60) includes at least one lock CPU unit (70), at least one lock output unit (90), and other optional lock units such as a lock memory unit (80).

It is appreciated that a lock output unit (90) is typically an option, for incorporating an additional display unit, additional speaker, or additional vibrator (or actuator) into a terminal may not only increase a volume and a weight of a terminal but also increase its cost of manufacture. Therefore, a terminal may rather recruit a main display unit, a main speaker, a main vibrator or a main actuator of a main system (10) as a lock output unit (90). In other words, providing a redundant configuration such as incorporating an additional lock output unit (90) which is separate from a main output unit (50) is generally a matter of choice of one of ordinary skill in the relevant art.

Alternatively, a user may include a lock output unit (90) into an add-on device in such a way that a user may [1] view images, [2] listen to sounds or music, or [3] feel vibration (or actuation) with an add-on device. When a lock output unit (90) is incorporated into a prior art wearable device, a terminal may also recruit any output device of such a device as a lock output unit as well.

When desirable, a terminal may incorporate an additional output unit inside a terminal and recruit such as a lock output unit. For example, a terminal may include an additional display unit, speaker, vibrator or actuator and use such as a lock output unit. In this case, a terminal may determine whether or not a lock output unit may access a main system, e.g., its main memory unit, output unit, or the like. In this aspect, various notice units described above may be viewed as or may be recruited as a lock output unit as well.

Like a main output unit is typically driven by a main CPU unit (30), a lock output unit may also be driven by a lock CPU unit (70). When a terminal does not include a separate lock output unit but may rather recruit at least a portion of a main output unit as a lock output portion, the lock output portion may be driven by either a lock CPU unit (70) or a main CPU unit (30) or, by both of such lock and main CPU units (70), (30). In this case, a terminal may have to deliver data to be displayed from a lock system (60) to a lock output portion of a main system (10), while ensuring such data may not adversely affect, contaminate or spoil any unit of a main system (10) as well.

Other configurational or operational features of such lock and main output units of this 2nd Configuration are similar or identical to those of the lock and main output units of the 1st Configuration. Other configurational or operational features of such lock and main output units of this 2nd Configuration may also be similar or identical to those of the lock and main output units of other remaining aspects of this disclosure, subject to certain modifications, additions or omissions each of which may become apparent based on detailed context.

5-8. Erasure or Semi-Erasure

In another exemplary embodiment of this second exemplary aspect of the disclosure, a terminal may run an erase (or semi-erase) operation in one of various erasure timings, for removing results obtained by running various lock operations in a lock mode. A terminal may assign a main CPU unit (30) to run such erasure (or semi-erasure), may assign a lock CPU unit (70) to run such, or may allow both of the lock and main CPU units (70), (30) to run such erasure (or semi-erasure), either concurrently or sequentially. When a lock system (60) may not include a lock memory unit, a terminal may grant a lock system (60) with only limited functionality such as, e.g., displaying texts or images, playing video clips or audible sounds, searching a web, or the like. Because this lock system (60) may not be able to store any results therein, a terminal may not have to run any separate erasure (or semi-erasure), although a terminal may still have to run such erasure or semi-erasure to remove any potential remnant data from a lock system (60).

When a lock system (60) includes a lock memory unit (80), a main system (10) or a lock system (60) needs to run such erasure (or semi-erasure), for some results may inevitably end up residing in a lock memory unit (80), in another unit of a lock system (60), or in another memory sector of a lock system (60). Even after such results may be deleted, there still remain data remanence problems. Accordingly, a terminal may run such erasure (or semi-erasure) whenever there remain risks of such results from adversely affecting a main system (10) of a terminal. Other details of such erase (or semi-erase) operations may be similar or identical to those of the 1$^{st}$ Configuration, or to those of such erasure (or semi-erasure) discussed in other exemplary aspects of this disclosure and, therefore, are omitted here.

By running a semi-erase operation, a main (or lock) system (10), (60) may erase such to-be-erased results, while storing the remaining to-be-saved results [1] only into a lock memory unit (80), [2] only in a main memory unit (40), or [3] in both of such memory units (80), (40). In this case, a user may manually select which results are to be erased or to be stored either permanently, only temporarily or conditionally. As described, a terminal may adaptively determine which results are to be erased or saved.

When a terminal stores such results only in a lock memory unit (80), a terminal may prevent a user or a lock system (60) from storing the results into a main memory unit (40). However, a terminal may rather allow a main CPU unit (30) to retrieve data from a lock memory unit (40), or to store such retrieved data from a lock memory unit (80) into a main memory unit (40). When a lock system (10) is to store such results into a main memory unit (40), a lock system (60) may obtain an authorization from a terminal or by a user.

As described above, a terminal may run such erasure (or semi-erasure) and may remove potentially hazardous viruses from such results obtained by running lock operations in a lock mode. In addition, even if a lock system (60) may not detect any danger from such results, a user may still have another reason to run such erasure (or semi-erasure), particularly when a user does not want to disclose [1] which websites a user has visited, [2] which lock operations he or she has run in a lock mode, or [3] which results he or she has obtained by running such lock operations in a lock mode. Accordingly, a user may run such erasure or semi-erasure not only for enhancing security and improving integrity, but also for maintaining privacy in operating a terminal.

In another exemplary embodiment of this second exemplary aspect of the disclosure, a terminal may provide a user with a status of such erasure (or semi-erasure), and may receive instructions or a feedback from a user as well. To this end, a terminal may monitor various steps related to such erase (or semi-erase) operation, and communicate with a user about such monitored steps.

In one example of this exemplary embodiment, a terminal may inform a user about running such erasure (or semi-erasure) by, e.g., [1] informing a user when such erasure (or semi-erasure) starts, [2] informing a user when such erasure (or semi-erasure) finishes, [3] displaying results obtained by running an erase (or semi-erase) operation, or the like. With such information, a user can make sure that all (or some selected) data or results obtained by running various lock operations in a restricted mode has been erased. As described above, a terminal may allow a user to put a mark onto those to-be-erased results or onto those to-be-saved results.

In another example of this exemplary embodiment, a terminal may monitor presence of malicious viruses and also detect such from such results. In one case, upon detecting any suspicious data or files, a terminal may automatically run such erasure (or semi-erasure), while sending an optional warning signal to a user. It is appreciated that this arrangement may be similar to a "real-rime erasure (or semi-erasure)" as defined above.

It is appreciated that a real-time erasure may disrupt continuity of operation and may make it inconvenient of a user to run lock operations in a lock mode. However, a real-time erasure (or semi-erasure) may serve to inform a user that a certain lock operation has invited suspicious data or results into a lock system (60) and that such an operation (or a website which a user accesses) has to be stopped or otherwise rectified.

In another case when a terminal detects any suspicious data or files, a terminal may wait for a user response. Upon receiving a consenting user input, a terminal may run such erasure (or semi-erasure). When a user does not consent to run such erasure (or semi-erasure), however, a terminal may resume to operate in a lock mode, and thereafter run such erasure or semi-erasure. It is appreciated that this arrangement may be similar to an "interim erasure (or semi-erasure)" or an "ex post erasure (or semi-erasure)" as defined above.

It is appreciated that an interim or ex post erasure may not disrupt continuity and make it comfortable of a user to continue to run lock operations in a lock mode. However, when suspicious data or files begin to deteriorate or contaminate a lock memory unit (80) or another unit of a lock system (60), a main system (60) or a terminal may be put into danger. Accordingly, a terminal may run such interim or ex post erasure along with a real-time erasure, thereby mitigating risks involved with only running such interim or ex post erasure.

In another example of this exemplary embodiment, a terminal may monitor such results, and may reformat or initialize a lock memory unit (80) or even an entire lock system (60), upon detecting serious breaches in security or integrity of a main system (10) or in privacy of data stored in a main system (10). A terminal may reformat or initialize a lock memory unit (80) or a lock system (60) in various arrangements.

In one case, upon detecting severe breaches, a terminal may automatically start to reformat or initialize a lock memory unit (80) or an entire lock system (60), with or without necessarily sending a warning signal to a user. This arrangement may be referred to as a "real-rime initialization" which may be similar to a "real-rime erasure (or semi-erasure)" as defined above.

In another case, upon detecting such breaches, a terminal may send a warning signal as well as another signal of recommending reformatting or initialization, and wait for a user response. Upon receiving a consenting user input, a terminal may reformat or initialize a lock memory unit (80) or other units of a lock system (60). However, when a user does not consent to such formatting or initialization, a terminal may resume to operate in a lock mode, and thereafter runs a reformatting or initialization operation. In this respect, this arrangement may be referred to as an "interim initialization" or "ex post initialization."

Other operational features of the erasure (or semi-erasure) of this $2^{nd}$ Configuration are similar or identical to those of the erasure (or semi-erasure) of the $1^{st}$ Configuration. Other configurational or operational features of the erasure (or semi-erasure) of this $2^{nd}$ Configuration may also be similar or identical to those of the erasure (or semi-erasure) of other remaining aspects of this disclosure, subject to certain modifications, additions or omissions each of which may become apparent based on detailed context.

5-9. 2nd Configuration—Variations or Modifications

Various terminals of this $2^{nd}$ Configuration may be configured and to operate according to other arrangements or sequences. Such variations or modifications of such terminals of this $2^{nd}$ Configuration are generally similar or identical to those of such terminals of the $1^{st}$ Configuration and, therefore, omitted.

Although the foregoing embodiments examples of this $2^{nd}$ Configuration and second exemplary aspect typically relate to various data processing terminals which may operate in a hierarchy defining a single lock mode and a single unlock mode, all foregoing embodiments and examples may equally apply to other terminals operating in another hierarchy defining any multiple modes of operation each of which is granted by a terminal identical, similar, comparable or different access authority. Accordingly, the foregoing embodiments and examples may equally apply to a terminal which may operate while switching between two modes, three modes, or more than three modes, where at least one mode is an unlock mode of the foregoing illustration, while at least one another mode is a lock mode of the foregoing illustration.

Configurational or operational variations (or modifications) of such terminals described in various embodiments or examples of this second exemplary aspect (i.e., the $2^{nd}$ Configuration) may be interchangeable with other various embodiments or examples of other exemplary aspects of this disclosure. Accordingly, certain features of one embodiment or example of this second exemplary aspect may be applied to another embodiment or example of the same aspect or of a different aspect.

Moreover, other configurational or operational features, their variations or modifications of the terminals of this second exemplary aspect [1] may apply to, [2] may be incorporated into, [3] may replace, [4] may be replaced by, or [5] may be combined with corresponding features of other aspects, embodiments, or examples of this disclosure which have been described throughout this disclosure, as long as such application, incorporation, replacement, or combination does not contract each other.

6. 3rd Configuration—Embedded Lock System

In the third exemplary aspect of this disclosure which corresponds to the $3^{rd}$ Configuration of this disclosure, a terminal may include at least one main system (with at least one main unit) and at least one lock system (with at least one lock unit). Similar to that of Section 4 or Section 5, a main system of this $3^{rd}$ Configuration operates in an unlock mode, and includes at least one [1] main CPU unit, [2] main input unit, [3] main output unit, and [4] main memory unit, with other optional main units. A lock system of this $3^{rd}$ Configuration operates in a lock mode, and may include [1] at least one lock CPU unit and [2] at least one lock memory unit, along with other optional lock units such as, e.g., a lock viewer, a lock input unit, a lock output unit, or the like.

Contrary to the lock systems of Section 4 and Section 5, however, a lock system of this $3^{rd}$ Configuration may not be completely isolated from a main system. Rather, a lock system may be physically coupled or integrated into a main system in such a way that a certain unit of a main system may constitute an integrated unit with a corresponding unit of a lock system. As a result, a terminal of this $3^{rd}$ Configuration may also be regarded that an integrated unit (or a unitary article) of a terminal may include therein at least one main unit and an entire (or a selected) portion of a lock unit, where a main unit and a lock unit may be disposed adjacent to each other. As used herein, a main system and a lock system which has the above physical configuration are collectively referred to as an "embedded system" hereinafter. Because a terminal may typically provide a lock system with limited functionality, a lock system is to be regarded as being "embedded" into a main system.

Due to such physical coupling between a certain main unit and a corresponding lock unit, a terminal may be fabricated in a more compact shape or size. Although some units of a main system and a lock system may form an integrated unit, a terminal still employs various means to ensure such operational isolation between a main system and a lock system, thereby maintaining the enhanced security, improved integrity, and heightened privacy. In addition, a manufacturing process for such a terminal may also be optimized, e.g., [1] by dividing a single microchip into two portions, while using a $1^{st}$ portion as a main CPU unit and a $2^{nd}$ portion as a lock CPU unit, [2] by dividing another chip into two portions, while using a $1^{st}$ portion as a main memory unit and a $2^{nd}$ portion as a lock memory unit, or the like.

Details of such lock and main systems of various terminals of this $3^{rd}$ Configuration are provided below, while omitting those features identical to those of the $1^{st}$ Configuration.

6-1. 3rd Configuration—Main System

In one exemplary embodiment of a third exemplary aspect of this disclosure, a terminal includes at least one main system which in turn includes various main units each of which may include therein at least one hardware or software element. Such a main software element [1] may be embedded into a main hardware element or [2] may be provided as separate codes of computer programs such as, e.g., a part of a main O/S or a (software) application.

Figure 11:
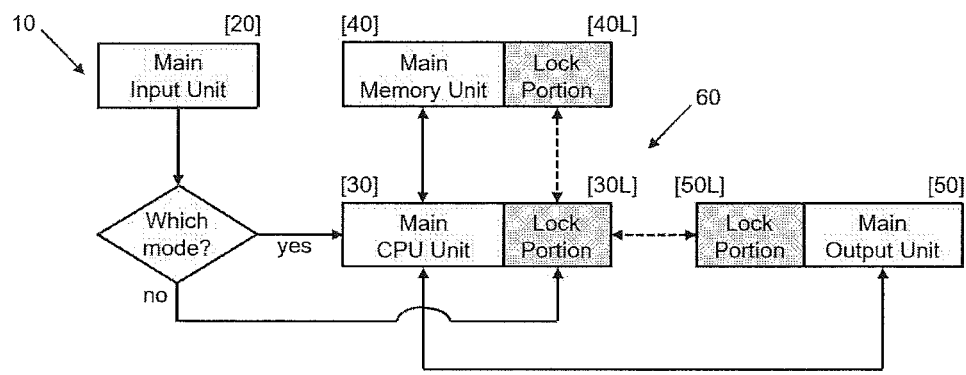
FIG. 11 is a block diagram of an exemplary data processing terminal fabricated in an embedded configuration according to the third exemplary aspect of this disclosure.

FIG. 11 is a block diagram of an exemplary data processing terminal of this third exemplary aspect of this disclosure fabricated in an embedded configuration. In particular, FIG. 11 describes a main system in a context of multiple abstract layers, where an exemplary main system (10) includes at least one main CPU unit (30), at least one main input unit (20), at least one main memory unit (40), at least one main output unit (50), at least one main (software) application (35), at least one main operating system (i.e., or an O/S) (34) which may include at least one main kernel (optional), and other optional units (51).

A terminal also includes a main input unit (20) capable of receiving a user input which in turn includes various (user) sub-inputs. It is appreciated that a main input unit (20) is a single input unit of a terminal. It then follows that a main input unit (20) of a terminal of this $3^{rd}$ Configuration may also serve as a mode-switching input unit and acquire $UI_{SWT}$ from a user input applied to a main input unit (20).

A terminal of this $3^{rd}$ Configuration includes a lock system (60) which may in turn include at least one lock CPU unit (30L), at least one lock memory unit (40L), and at least one lock output unit (50), along with other optional lock units (not included in the figure). Similar to that of the $2^{nd}$ Configuration, a lock system (60) may include a lock CPU unit (30L) and, accordingly, may not need to recruit a main CPU unit (30) or a main O/S (34) to run various lock operations in a lock mode. Other configurational or operational details of a main system (10) of a terminal of this $3^{rd}$ Configuration may be similar or identical to those of the main system of the $2^{nd}$ Configuration, or to those of other main systems of other terminals as described in other exemplary aspects of this disclosure, subject to certain modifications, additions or omissions each of which will become apparent based on detailed contexts.

6-2. 3rd Configuration—Lock System

In another exemplary embodiment of this third exemplary aspect of the disclosure and as depicted in FIG. 11, a terminal includes a lock system (60) which is embedded into a main system (10). More particularly, like units of a lock system (60) may be respectively embedded into like units of a main system (10) in such a way that a terminal may be viewed to include [1] an "integrated CPU unit" which is an assembly of a main CPU unit (30) and a lock CPU unit (30L), [2] an "integrated memory unit" which is another assembly of a main memory unit (40) and a lock memory unit (40L), and [3] an "integrated output unit" which is an assembly of a main output unit (50) and a lock output unit (50L).

As manifest in the figure, a main input unit (20) is the single input unit of a terminal of this $3^{rd}$ Configuration and, therefore, a main input unit (20) may have to serve as a mode-switching input unit capable of acquiring $UI_{SWT}$ from a user input. To this end, the main input unit (20) may also have to include at least one sensor for acquiring $UI_{SWT}$. In this context, the main input unit (20) may be viewed as an integrated input unit which is an assembly of a main input unit and a mode-switching input unit.

It is appreciated that various lock units of a lock system (60) of this $3^{rd}$ Configuration may be viewed as only a portion of the like integrated units and, therefore, that each unit of a lock system (60) may be referred to as a relevant portion of each integrated unit. Accordingly, such lock units of this $3^{rd}$ Configuration are to be referred to as a "lock CPU portion" (30L), a "lock memory portion" (40L), and a "lock output portion" (50L) hereinafter.

6-2-1. Total Embedding

In one exemplary configuration of this exemplary embodiment of this third exemplary aspect, an entire portion of a lock system (60) is embedded (or integrated) into a main system (10). For example, a terminal in FIG. 11 is an embodiment of this configuration, where an integrated CPU unit includes at least one main CPU unit (30) and at least one lock CPU portion (30L). An integrated memory unit also includes at least one main memory unit (40) and at least one lock memory portion (40L). Similarly, an integrated output unit includes at least one main output unit (50) and at least one lock output portion (50L). Therefore, even though each unit may be viewed as an integrated, assembled, or unitary unit, a $1^{st}$ portion of each integrated unit may run operations in an unlock mode, whereas a $2^{nd}$ portion may run operations in a lock mode. In this context, such lock portions of a lock system (60) are embedded into a main system (10) in a distributed arrangement.

More particularly, an integrated CPU unit may define therein at least two different portions, sectors, or spaces, where $1^{st}$ portion may serve as a main CPU unit (30), whereas a $2^{nd}$ portion may serve as a lock CPU portion (30L). An integrated CPU unit may be readily fabricated according to various prior art methods.

In one example, a single silicon wafer may be operationally (but not physically) divided into at least two portions, while maintaining an overall configuration of a single wafer. A manufacturer may provide electric circuitry on a $1^{st}$ portion of a wafer using prior art semiconductor fabrication techniques. A manufacturer may also provide additional circuitry onto a $1^{st}$ portion, thereby forming an assembler, a firmware, and a kernel. A manufacturer may then load a main O/S and various main (software) applications into a $1^{st}$ portion, thereby providing a main CPU unit (30).

A manufacturer may provide different electric circuitry on a $2^{nd}$ portion of a wafer by employing similar prior art semiconductor fabrication techniques as well, and add other additional circuitry thereinto. A manufacturer may load an optional lock O/S or other lock (software) applications to a $2^{nd}$ portion, thereby fabricating a lock CPU portion (30L).

By including two different portions on a single semiconductor chip, an integrated CPU unit may serve not only as a main CPU unit (30) but also as a lock CPU portion (30L), while maintaining its physical configuration as a single article. Although different portions are provided on the same wafer in this example, such portions may not generally communicate with each other. Alternatively, a terminal may prevent a $2^{nd}$ portion (e.g., a part of a lock system) from driving a $1^{st}$ portion (e.g., a part of a main system). Accordingly, a terminal may maintain the enhanced security, improved integrity, and heightened privacy.

In another example, a manufacturer may rather fabricate an integrated CPU unit by physically integrating two separately processed wafers. For example, a manufacturer may individually provide electric circuitry onto two independent and uncoupled wafers using prior art semiconductor fabrication techniques. A manufacturer may also form additional circuitry onto each wafer, thereby fabricating a $1^{st}$ wafer as a main CPU unit (30) and a $2^{nd}$ wafer as a lock CPU portion (30L). Thereafter, a manufacturer may mechanically or physically couple such wafers by mechanically or chemically binding a $1^{st}$ wafer to a $2^{nd}$ wafer, or vice versa. In one case, two separate wafers [1] may be attached to each other [1-1] side by side, [1-2] one over the other, or [1-3] one around the other, [2] may be placed on a common substrate and then may be attached to the substrate, thereby forming an integrated unit, or [3] may fixedly couple with each other using other conventional methods such as, e.g., an adhesive, a glue, or the like.

A manufacturer may load a main O/S or main (software) applications onto a $1^{st}$ wafer, thereby implementing at least one software element into a main CPU unit (30). An optional lock O/S or other applications may also be loaded onto a $2^{nd}$ wafer, thereby implementing such software elements into a lock CPU portion (30L). It is appreciated that a manufacturer may load such software elements before physically integrating such wafers or after such integration. As a result, an integrated chip may serve as both of a main CPU unit (30) and a lock CPU portion (30L). Although an integrated CPU unit is an assembly of two separate microchips, such a unit has an appearance of a unitary, integrated article.

More particularly, a lock CPU portion (30L) may be fabricated in various configurations, particularly with respect to a main CPU unit (30). For example, a lock CPU portion (30L) may be fabricated as an add-on device to a main CPU unit (30), where each of a main CPU unit (30) and a lock CPU portion (30L) may form separate hardware elements, where a lock CPU portion (30L) may be placed proximate or next to a main CPU unit (30), where a lock CPU position (30L) may be positioned away from a main CPU unit (30) by a certain distance or a height, where both of a main CPU unit (30) and a lock CPU portion (30L) may be electrically coupled to each other by wire or wirelessly, or the like.

Although a main CPU unit (30) and a lock CPU portion (30L) are provided as an integrated CPU unit consisting of at least two separate chips or portions, a terminal may need to physically or operationally isolate one unit (or portion) from the other, thereby maintaining the improved integrity and the security as well as preserving high privacy as described above. To this end, a terminal may not provide any physical, optical, electrical or magnetic connection between a main CPU unit (30) and a lock CPU portion (30L), thereby preventing or at least minimizing any electrical, optical or magnetic communication or interferences therebetween. In addition, a terminal may isolate a main O/S or a main (software) application of a main CPU unit (30) from a lock O/S or a lock (software) application implemented into a lock CPU portion (30L).

Similar to the above integrated CPU unit, an integrated memory unit may define therein at least two different portions, where one portion may serve as a main memory unit (40), while another portion may serve as a lock memory portion (40L). This integrated memory unit may be fabricated by various prior art methods similar to those for an integrated CPU unit and, therefore, details are omitted herein. Similar to an integrated CPU unit, a terminal may physically or operationally isolate a main memory unit (40) from a lock memory portion (40L), thereby maintaining the improved integrity, the enhanced security, and the heightened privacy as described above. Other details of fabricating or operating this integrated memory unit may be similar or identical to those of an integrated CPU unit and, therefore, details are omitted herein.

6-2-2. Partial Embedding

In another exemplary configuration of this exemplary embodiment of this third exemplary aspect, at least one but not all units of a lock system (60) may be embedded (or integrated) into a main system (10). For example, a lock system (60) may include two different lock CPU portions such as a lock CPU unit and a lock CPU portion. In addition, a lock CPU unit is not embedded into a main CPU unit and, therefore, physically isolated from a main CPU unit. However, a lock CPU portion is integrated into a main CPU unit and forms an integrated article with a main CPU unit.

In other words, a lock system (60) includes a lock CPU unit which is physically isolated from a main CPU unit and which may not be disposed inside, on, under, beside or proximate to a main CPU unit. As a result, a lock CPU unit may be physically isolated from a main CPU unit and, therefore, may not form an integrated article. However, a lock CPU portion forms an integrated article with a main CPU unit as described above.

A lock CPU unit may also physically or operationally couple with a lock CPU portion, and a lock system (60) may concurrently or sequentially synchronize a lock CPU unit and lock CPU portion when running various lock operations in a lock mode. As a result, a lock system (60) may drive various hardware or software elements of a lock system in synchronization, and may coordinate such hardware or software elements of a lock system to collaborate with a certain unit of a main system.

Similar to a lock CPU unit and a lock CPU portion, a lock system (60) may include a lock memory unit as well as a lock memory portion, where a lock memory unit is physically isolated from a main memory unit and may not be disposed inside, on, under, beside or proximate to a main memory unit. That is, a lock memory unit may not physically couple with a main memory unit and, therefore, may not form an integrated article with a main memory unit. However, a lock memory portion may form an integrated article with a main memory unit as described above.

A lock system (60) may also physically or operationally couple a lock memory unit with a lock memory portion in such a way that a lock system (60) may concurrently or sequentially synchronize a lock memory unit with a lock memory portion, e.g., to retrieve data therefrom or to store data thereinto. As a result, a lock system (60) may coordinate synchronized collaboration [1] between a lock memory unit and a lock memory portion, and [2] between a lock memory unit (or portion) and a main memory unit (40).

It is appreciated that a lock CPU (or memory) unit may not have to be disposed proximate to a lock CPU (or memory) portion and that a lock CPU (or memory) unit may not have to be incorporated inside a terminal. For example, a lock CPU (or memory) unit may be fabricated as [1] an add-on device, [2] a portable device, or [3] a wearable device, where examples of such devices have been enumerated above.

A terminal may completely prevent a lock CPU (or memory) unit from accessing a main CPU (or memory) unit, by physically or operationally isolating a lock CPU (or memory) unit from a main CPU (or memory) unit, or the like. Depending upon the needs of a terminal (or a user), however, a lock CPU (or memory) unit may share at least some memory sectors, some portions of an O/S, some applications, or the like, as far as a terminal may maintain its improved integrity, enhanced security, and privacy preservation as described above. To this end, a terminal may prevent a lock CPU (or memory) unit from driving a main CPU (or memory) unit, may allow a lock CPU (or memory) unit to drive a main CPU (or memory) unit only when a terminal may have to authenticate or otherwise authorizes a user, or the like.

A terminal may also include a redundant configuration. For example, a terminal may include a lock CPU unit which is embedded into a main CPU unit as well as an extra CPU unit which is disposed outside a main CPU unit. A terminal may then recruit an extra CPU unit as a redundant main (or lock) CPU unit, when a main (or lock) CPU incurs a significant damage and, therefore, may not be able to perform its intended function.

To this end, a terminal may store essential computer codes such as, e.g., a main O/S, at least a portion of a main O/S, a kernel, or at least a portion of a kernel, into an extra CPU unit in such a way to configure the extra CPU unit to be a duplicate of a main CPU unit or a lock CPU unit. Alternatively, a terminal may implement only a portion of a main CPU unit or a lock CPU unit into an extra CPU unit. Therefore, when a main (or lock) CPU unit is contaminated or neutralized by malicious viruses, a terminal may run an extra lock CPU unit to replace the damaged CPU unit, with or without having to initialize the damaged main (or lock) CPU unit.

By the same token, a terminal may also include an extra memory unit which may be utilized as a redundant memory unit and which may function as a back-up memory unit to a main (or lock) memory unit. Accordingly, a terminal may configure a back-up memory unit as a replica of a main (or lock) memory unit (i.e., the same configuration) and may store the same data into a back-up memory unit as a main (or lock) memory unit. In the alternative, a terminal may store only essential data into a back-up memory unit. In addition, a back-up memory unit may store such data in real time (i.e., storing such data concurrently with a main or lock memory unit), at the end of a certain session, at certain intervals, or the like.

When a terminal includes both of a main CPU unit and a lock CPU unit, it may be inevitable that a lock CPU unit may be subservient to or dependent upon a main CPU unit in such a way that, e.g., a lock CPU unit may not operate while a main CPU unit operates. It is appreciated, therefore, that a main CPU unit may allow a lock CPU unit to operate while running lock operations, storing results obtained by running the lock operations into a lock memory unit, or the like. In one example, a main CPU unit may hold its operation after activating a lock CPU unit which runs a certain lock operation. When a lock CPU unit finishes running such lock operations, a lock CPU unit holds its operation after calling a main CPU unit to resume its operation. Alternatively, after monitoring that a user finishes such running by a lock system, a terminal may suspend operating a lock CPU unit while resuming its operation.

However, when a terminal displays two separate screens on a display unit and allows a user to operate one system in each screen, a main CPU unit may concurrently operate with a lock CPU unit. For example, a user may launch a main system in a major screen, while launching a lock system in a minor screen, just like opening two windows in two screens on a display unit of a computer. A user may then operate such systems in such screens one after another, as he or she operates a computer which opens two screens in its display unit. Accordingly, details of this arrangement is omitted herein.

6-3. 3rd Configuration—Lock Units vs. Main Units

In another exemplary embodiment of this third exemplary aspect of this disclosure, the CPU units and memory units may be fabricated in various configurations in a total embedding configuration such as, e.g., an integrated configuration where a lock CPU portion (30L) may form an integrated CPU unit with a main CPU unit, while a lock memory portion (40L) may form an integrated memory unit with a main memory unit (40). However, in a terminal with a partial embedding configuration, a lock CPU (or memory) unit may be provided as an article which may be physically or operationally isolated from an integrated CPU (or memory) unit, where a lock CPU (or memory) portion is embedded into an integrated CPU (or memory) unit.

Following configurations exemplify various totally embedded CPU units and totally embedded memory units. It is appreciated that such configurations may readily apply to partly embedded CPU units and memory units.

A terminal may include a single chip which includes therein a main CPU unit (30) and a lock CPU portion (30L), where such a chip is fabricated as an integrated CPU unit. A lock CPU portion (30L) may run a less number of operations than a main CPU unit of the $1^{st}$ or $2^{nd}$ Configuration. Alternatively, a lock CPU portion (30L) may run a similar or identical number of operations as a main CPU unit of the $1^{st}$ or $2^{nd}$ Configuration, while [1] with similar or identical access authorities to various hardware or software elements of a main system (10) as the main CPU unit of the $1^{st}$ or $2^{nd}$ Configuration, or [2] with less access authorities thereto than a main CPU unit, thereby driving less hardware or software elements (or their functions or options). A terminal may allow a lock CPU portion (30L) to run certain lock operations which may not be run by a main CPU unit (30) in such a way that the certain operation may be only run in a lock mode.

A terminal may allow a lock CPU portion (30L) to download results from a website or to run various operations which are made available by an external source. However, a terminal may be configured to not allow a lock CPU portion (30L) to store any results stored or residing in a lock system (60) into a main memory unit (40) or other units of a main system (10), to not allow only suspicious results residing a lock system (60) into a main system (10), to not allow only certain results into a main system (10), or the like.

A lock CPU portion (30L) and a main CPU unit (30) may be provided in various arrangements. In one example, a lock CPU portion (30L) may share with a main CPU unit (30), [1] an entire main O/S and all (software) applications of a main system (10), [2] an entire main O/S but not all (software) applications of a main system (10), [3] only some selected portions of a main O/S but all (software) applications of a main system (10), [4] only a selected portion of a main O/S and another selected portion but not all (software) applications of a main system (10), or [5] neither a main O/S nor any application residing in a main system (10).

Similarly, a main CPU unit (30) may share with a lock CPU portion (30L), [1] an entire portion of a main O/S and all (software) applications of a lock system (60), [2] an entire portion of a main O/S but not all (software) applications of a lock system (60), [3] only some selected portions of a main O/S but all (software) applications of a lock system (60), [4] only a selected portion of a main O/S and another selected portion but not all (software) applications of a lock system (60), [5] neither a main O/S nor any application residing in a lock system (60), or the like. A terminal may also be equipped with requisite user authentication processes or other authorization processes in proportion to a scope or a depth of such sharing, thereby improving the security or integrity of a terminal (or a main system) and preserving privacy of personal data stored therein.

When a lock CPU portion (30L) and a main CPU unit (30) may operate at least a portion of a main O/S or at least one (software) application of a main system (10), a main CPU unit (30) may manipulate or modify at least a portion of a lock CPU portion (30L), with or without requiring a user authentication or an authorization by a user (or a terminal), while a lock CPU portion (30L) may not manipulate or modify any portion of a main CPU unit (30). Depending upon detailed circumstances, a terminal may allow a lock CPU portion (30L) to run all or some (software) applications of a main system (10), or may allow a main CPU unit (30) to drive all or some (software) applications of a lock system (60) as well.

A terminal may enable a user to adjust a setting with which a user may control whether or not a main CPU unit (30) can override, modify or otherwise manipulate a lock CPU portion (30L), in how much scope and depth a main CPU unit (30) can override, modify or otherwise manipulate a lock CPU portion (30L). Alternatively, a terminal manufacturer or distributor may fix such settings that a user may not modify such after purchase.

Alternatively, a terminal may allow a user to define a desired hierarchy which includes a desired number of modes therein. In addition, a terminal may also allow a user to manually grant suitable access authorities to each mode and to select details paths of a hierarchy along which a user can switch such modes. Based thereon, a terminal may determine whether or not a main CPU unit (30) can override, modify or otherwise manipulate a lock CPU portion (30L), in how much scope and depth a main CPU unit (30) can manipulate a lock CPU portion (30L), or the like.

Each of a main CPU unit (30) and a lock CPU portion (30L) may be implemented into a single unitary chip but a terminal may assign a main CPU unit (30) and a lock CPU portion (30L) to different areas of a chip, thereby physically isolating one from the other. In contrary, a main CPU unit (30) and a lock CPU portion (30L) may share at least one common area on a chip (may not be physically isolated), or may share at least one computer code of a main O/S or a main (software) application (may not be operationally isolated). When desirable, a terminal (or a user) may assign variable areas to a main CPU unit (30) or to a lock CPU portion (30L) in such a way that a certain sector of a semiconductor chip may serve either as a main CPU unit (30) or as a lock CPU portion (30L) as required or commanded by a main O/S or a terminal.

It is appreciated that various lock systems of this embodiment are differentiated from other lock systems of the disclosure in that at least a portion of a lock CPU unit (i.e., a lock CPU portion) is embedded into a main CPU unit of a main system. Because a lock CPU portion and a main CPU unit are positioned in a single integrated chip, a terminal may not physically isolate a main CPU unit from a lock CPU portion. However, a terminal may readily operationally isolate a main CPU unit from a lock CPU portion, simply preventing a lock CPU portion from driving any hardware or software element of a main CPU unit, thereby enhancing the security, improving the integrity, and better preserving personal or private data stored in a main system. Therefore, when a terminal allows a lock CPU portion to drive at least one hardware or software element of a main system, a care has to be taken to prevent a lock CPU portion from accidently damaging or contaminating a main system.

Similar to a lock CPU portion and a main CPU unit, a terminal may integrate a lock memory portion into a main memory unit. A terminal may assign exclusive memory sectors to each of a main memory unit and a lock memory portion such that neither memory unit shares any common memory sector. Alternatively, a terminal may assign either memory unit to a memory sector which may also be driven by a main memory unit, while exclusively assigning (i.e., not overlapping each other) the rest of such memory sectors into either of a main memory unit or a lock memory portion.

As discussed above, a terminal may prevent a lock memory portion from accidently storing or leaving any virus or any damaging or malicious files into a main memory unit, where this concern becomes more important in the latter arrangement of the preceding paragraph. Therefore and in one case, a terminal may run such erasure (or semi-erasure) when a main system starts to drive the overlapping (or non-exclusive) memory sector after a lock system has used the same sector in a lock mode. In another case, a terminal may run such erasure (or semi-erasure) on the common memory sector on every certain interval, at the end of each session, or the like.

When a terminal may store or retrieve various data of different sizes into or out of such memory units, a terminal may assign variable memory sectors to a main memory unit or a lock memory portion in such a way that such memory sectors may serve as a main memory unit or as a lock memory portion as designated by a user or a terminal. Such lock and main memory units may [1] share all memory sectors (or spaces), [2] share some but not all sectors, [3] not share any memory sector, or the like. When such main and lock memory units may share some memory sectors, a main memory unit may retrieve data from (or store data into) at least a portion of a lock memory portion (with or without running an authentication operation), but a lock memory portion may neither retrieve data from nor store data into a main memory unit. Depending upon circumstances, a terminal may allow a lock memory portion to store all or certain results into a main memory unit as well.

A lock memory portion may be provided as an add-on device to a terminal. In this case, a lock memory portion may releasably couple with a certain position of a terminal, where such a portion may be [1] proximate or next to a main memory unit, or [2] away from a main memory unit, and where an exact location of the position may not be material as far as a terminal may easily retrieve results from a lock memory portion which is provided in an add-on device (or store results thereinto). Alternatively, each of such lock and main memory units may instead be provided as a single (or unitary) article. Such an article may include at least one memory sector as a main memory unit and at least one another sector as a lock memory portion. Alternatively, such an article may include memory sectors which may be physically or operationally divided into a main memory unit and a lock memory portion. In another alternative, both memory units may be fabricated separately and may then be combined into a single (or unitary) article as described above.

In general, a terminal may recruit a main display unit or a main speaker to generate visible or audible signals in an unlock mode as well as in a lock mode. Alternatively, a terminal may include a separate lock output (or input) unit which may form a unitary article with a main output (or input) unit, in a manner similar to the lock CPU unit as described above, or which may instead be provided as a separate article and disposed in a suitable location on or around a terminal. Either a lock output (or input) unit or a main output (or input) unit may be of an identical type or a similar type. Other configurational details of such lock CPU portions or lock output (or input) portions may be similar or identical to those of the lock CPU units or lock output (or input) units of the $1^{st}$ or $2^{nd}$ Configuration or to those of such units of other exemplary aspects and, therefore, omitted here.

6-4. 3rd Configuration—Operations

In another exemplary embodiment of this third exemplary aspect of the disclosure, a terminal may operate in various ways while maintaining improved integrity and security as well as preserving privacy of a user. When a display unit is turned off when a terminal is remains in its off-state, a terminal may receive a $1^{st}$ user input and decide whether to advance to a lock mode or an unlock mode, based upon various criteria such as, e.g., $UI_{SWT}$, along with at least one of $UI_{ACT}$ and $UI_{THEN}$. A terminal may [1] turn on its display unit in a lock or unlock mode in response thereto, [2] stay in an off-state when a user fails user authenticating, [3] stay in an off-state when a $1^{st}$ user input or its (user) sub-inputs do not match pre-stored values, or the like.

When a display unit is turned on and when a terminal operates in a lock mode upon receiving a $1^{st}$ user input, a terminal may decide whether to stay in a current lock mode or to switch to an un unlock mode depending on various criteria as described above. As a result, a terminal may [1] stay in a lock mode, [2] switch to a different lock mode, or [3] launch a main system while switching to an unlock mode. When any of $UI_{SWT}$, $UI_{ACT}$, or $UI_{THEN}$ does not match a pre-stored value, a terminal may [1] stay in a current mode, [2] request a user to provide a new user input (along with other sub-inputs), or [3] turn its display unit off.

When a display unit is turned on and a terminal operates in an unlock mode upon receiving a $1^{st}$ user input, a terminal may [1] stay in the current unlock mode when $UI_{SWT}$ matches the current mode, [2] stay in the current mode or switch to a new unlock mode when $UI_{SWT}$ is different from that matched to the current mode, [3] switch to a lock mode when $UI_{SWT}$ is designated to a lock mode, [4] switch to a lock mode when $UI_{SWT}$ does not match a pre-stored value, [5] turn off its display unit and switch to an inactive state when the $1^{st}$ user input or its (user) sub-inputs do not match the pre-stored values, or the like.

As described above, a terminal may switch its modes in various timings as well. For example, a terminal may switch to a new mode [1] upon (or after) receiving a $1^{st}$ or $2^{nd}$ user input, [2] upon (or after) acquiring $UI_{SWT}$ which is actively provided by a user, [3] upon or after a terminal confirms that a user passes an authentication operation, or [4] upon or after a terminal confirms that a user is granted with proper access authorities to switch to (or advance to) a new mode. Further examples of such timings are enumerated as the mode-switching timings in Section 1-21.

Other features of various operations of the terminal of this $3^{rd}$ Configuration may be identical or similar to those features of various operations of other terminals of the $1^{st}$ or $2^{nd}$ Configuration, or to those features of various operations of other terminals of other exemplary aspects disclosed herein and, accordingly, further details are omitted herein.

6-5. 3rd Configuration—Erasure, Semi-Erasure, and Storing

In another exemplary embodiment of this third exemplary aspect of the disclosure, a terminal may maintain the improved integrity and security of its main system while preserving heightened privacy of a user as well, by running such erasure (or semi-erasure) in one of various erasure timings. When a terminal runs such semi-erasure, a terminal (or a user) may select to-be-erased results and to-be-stored results, where such data-to-be-stored results may be stored temporarily, permanently or conditionally in a lock (or main) memory unit or in any other memory sector based on various criteria as described above.

A terminal may run such erasure with either or both of a main CPU unit and a lock CPU portion, where it is not material which CPU portion or unit a terminal selects to run such erasure, where one exception may be when a terminal recruits a main CPU unit (or a lock CPU portion) to run such erasure when a lock CPU portion (or a main CPU unit) may have been damaged. A terminal may run such erasure with either of a main CPU unit or a lock CPU portion on results which are stored or reside in a lock memory unit.

A terminal may also run such semi-erasure with either or both of a main CPU unit and a lock CPU portion. It is generally not material which CPU portion or unit a terminal recruits to run such semi-erasure. A terminal may run such semi-erasure with either of a main CPU unit or a lock CPU portion on results which are stored or reside in a lock memory unit.

In addition, a terminal may also run such semi-erasure while accommodating the circumstances. For example, a terminal may select such to-be-stored results based on [1] a duration in which a user has operated a terminal in a lock mode, [2] a number of websites which a user has accessed in a lock mode, [3] an amount (or a size) of results which a user has generated by running lock operations in a lock mode, [4] a number (or an amount) of contents which a user has generated and which also coincide with preset user preferences, or [5] a number (or an amount) of personal or financial data which a user has processed in a lock mode. Thereafter, the terminal may store such to-be-stored results into a preset memory unit or sector.

As described above, a terminal may run such erasure (or semi-erasure) by writing null (e.g., irrelevant data or meaningless) data over at least a portion of such to-be-erased results (i.e., overwriting), by encrypting the to-be-erased results before storing such in a memory unit, or the like. A terminal may run such erasure (or semi-erasure) for a presser number of times such as, e.g., a single-pass overwriting or a single-pass encrypting, a double-pass overwriting or a double-pass encrypting, a triple-pass overwriting or a triple-pass encrypting, or the like. Accordingly, a terminal may adjust an extent of such overwriting or encrypting based on various needs or depending upon circumstances.

It is appreciated that a user may desire to remove each and every trace of results stored or residing in a lock memory unit or in a lock system as a whole, particularly when he or she has downloaded malicious codes from a suspicious website, or when he or she has accessed a dishonorable website. In this case, a user may control a terminal to run such erasure (or semi-erasure) by a double- or multiple-pass overwriting or by a double- or multiple-pass encrypting. A similar case may happen when a user is to switch to an unlock mode granted with the most access authority and, therefore, the user wants to ensure that all results residing in a lock system must be erased, without leaving any remnant data in a lock memory unit or in any memory sectors, regardless of what kind of operations a user has run in a lock mode, which website the user has accessed in a lock mode, which information a user has sought in such a mode, or the like.

To accommodate such needs or circumstances, a terminal may allow a user to select a mode and an extent of such overwriting or encrypting. In one example, a user may select whether to overwrite or encrypt such to-be-erased results. Thereafter, a terminal may run such erasure or semi-erasure in one of such erasure timings.

In another example, a terminal (or user) may assign a certain point of priority to each of multiple modes defined in a hierarchy such that, e.g. a mode with the least access authority may have "1" point, a mode with the next least access authority may have "1.5" points, . . . a mode with the $2^{nd}$ most access authority may have "11" points, while a mode with the most access authority may have "12" points. Thereafter, a terminal may calculate how many passes (or times) a terminal is to run such overwriting or encrypting based on a difference of the points assigned to a current mode and the points assigned to a new mode.

When a user may switch from a 1-point mode to a 12-point mode, the difference is 11 points and, therefore, a terminal may run such overwriting or encrypting for at least two times. However, when a user switches from a 7-point mode to an 8-point mode, the difference amounts to only 1 point and, therefore, a terminal may run the simplest single-pass overwriting or encrypting. Alternatively, when a user switches from a 10-point mode to a 2-point mode, a terminal may not run any overwriting or encrypting. However, when a current mode is a lock mode, a terminal may establish a threshold point for overwriting or encrypting such as, e.g., 7 points. Thereafter, a terminal may not run any overwriting or encrypting when a user switches from a current mode to a new mode granted with greater access authority but when a difference of such points between a current mode and a new mode is less than 7 points.

In another example, a terminal (or a user) may assign points in proportion to a duration in which a user stays in a certain lock mode, a number of websites which a user accesses in such a mode, a size of results which a user generates by running lock operations in a lock mode, a number (or an amount) of contents which may be obnoxious, illegal or obscene, or a number (or an amount) of personal or financial data which a user uses in a lock mode. Thereafter, a terminal runs such erasure (or semi-erasure) for a certain number of passes which are in turn determined by such a number.

Accordingly, a terminal of such examples may run such erasure (or semi-erasure), while accommodating the needs of a user. Such features may also relieve a user from tasks of determining what kind or what extent of such overwriting or encryption would suit his or her needs.

The above examples may similarly apply to running such erasure (or semi-erasure) onto data which reside or which are stored in a main memory unit or another unit of a main system. This applies to a $1^{st}$ case where a lock system runs such lock operations while recruiting a main CPU unit or a main memory unit. In this case, a terminal may run such erasure (or semi-erasure) in more passes or turns than running such erasure (or semi-erasure) onto results residing or storing in a lock memory unit. Accordingly, when a terminal finishes processing such results in an unlock mode, a terminal may more stringently erase such lock system-related data from a main system than a terminal erases such results from a lock system.

In addition, the above examples may apply to a $2^{nd}$ case where a terminal may store certain results into a main memory unit, but where such results may be stored or may reside in a lock system, more particularly, when such results are obtained by running lock operations in a lock mode. In this case, chances may be very high that some malicious computer codes may legitimately enter a main system. Therefore, when a terminal finishes processing such results in an unlock mode, a terminal may more stringently erase such lock system-related data from a main system than a terminal erases such results from a lock system.

It is appreciated that a terminal of this $3^{rd}$ Configuration includes a lock memory portion which is embedded into a main memory unit and that a lock memory portion may maintain a physical contact with a main memory unit. However, a terminal may still maintain operational isolation between a lock memory portion and a main memory unit for maintaining improved integrity, enhanced security, and better protection of private data stored in a main system of a terminal.

Other configurational or operational features of such erasure, semi-erasure, and storing results with a lock (or main) system of various terminals of this $3^{rd}$ Configuration may be identical or similar to those with lock (or main) systems of various terminals of the $1^{st}$ or $2^{nd}$ Configuration, or to those with different lock (or main) systems of other terminals described in other exemplary aspects of this disclosure.

6-6. 3rd Configuration—Variations or Modifications

Various terminals of this $3^{rd}$ Configuration may be configured and operate according to other arrangements or sequences. Such variations or modifications of such terminals of this $3^{rd}$ Configuration may be generally similar or identical to those of such terminals of the $1^{st}$ or $2^{nd}$ Configuration, or to those of various terminals of other exemplary aspects of this disclosure.

Although the foregoing embodiments or examples of this third exemplary aspect typically relate to various data processing terminals operating between a single lock mode and a single unlock mode, all such embodiments or examples may equally apply to other terminals which operates in any multiple modes each of which may be granted with identical, similar, comparable or different access authority. Therefore, the foregoing embodiments or examples may equally apply to a terminal operating between two modes or among more than two modes, where one mode may be viewed as a lock mode, whereas another mode is an unlock mode.

Configurational or operational variations (or modifications) of such terminals described in various embodiments or examples of this third exemplary aspect (i.e., the $3^{rd}$ Configuration) may also be interchangeable with other various embodiments or examples of other exemplary aspects of this disclosure. Accordingly, certain features of a certain embodiment or example of this third exemplary aspect may be applied to another embodiment or example of the same aspect or of a different aspect.

Moreover, other configurational or operational features, their variations or modifications of the terminals of this third exemplary aspect [1] may apply to, [2] may be incorporated into, [3] may replace, [4] may be replaced by, or [5] may be combined with corresponding features of other aspects, embodiments, or examples of this disclosure which have been described throughout this disclosure, as long as such application, incorporation, replacement, or combination does not contract each other.

7. 4th Configuration—Hybrid Lock System

In the fourth exemplary aspect of this disclosure, various data processing terminals may include at least one main system and at least one lock system. Each main system of such terminals may be similar or identical to that of various terminals of the $1^{st}$, $2^{nd}$, or $3^{rd}$ Configuration in such a way that, e.g., a terminal launches such a main system in an unlock mode, while launching another system (e.g., a lock system) in a restricted mode (e.g., lock mode).

A lock system of this $4^{th}$ Configuration similarly includes at least one lock CPU unit as well as at least one lock memory unit, while optionally including at least one lock output unit or at least one lock input unit. However, a lock system is configured such that at least one of its lock units may be physically or operationally embedded into a main system, whereas at least one of the remaining lock units may be provided as a unit which may be physically or operationally separate from a corresponding unit of a main system. Accordingly, except such an isolated unit(s), the rest of a lock system may be viewed to couple with or to be integrated into a main system, thereby constituting a unitary or integrated unit with a main system. In addition, this lock system may be viewed as a hybrid unit which includes at least one lock unit which may in turn consist of an isolated portion as well as an embedded portion. Following examples represent exemplary configurations and operations of a terminal with a hybrid configuration.

7-1. 4th Configuration—Main System and Lock System

In one exemplary embodiment of a fourth exemplary aspect of this disclosure, a terminal incorporates therein at least one main system and at least one lock system, where each system includes therein various units and where each unit includes at least one hardware or software element as described above. In addition, at least a portion of at least one lock unit of a lock system may be embedded into a main system, while another portion thereof is physically and operationally isolated from a main system. In this respect, various terminals of this $4^{th}$ Configuration may be similar to that of a partially embedded terminal described in Section 6-2-2.

Figure 12:
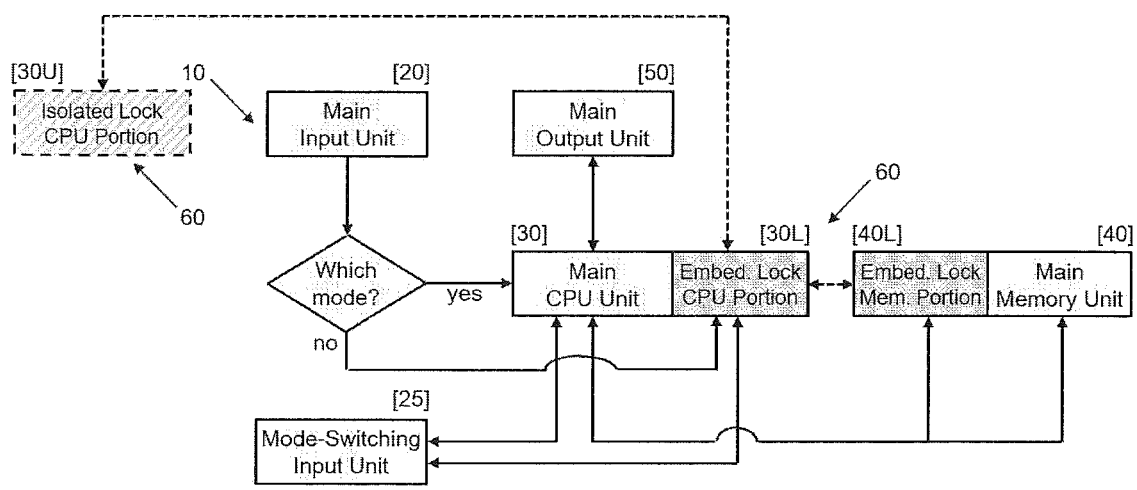
FIG. 12 is a block diagram of another exemplary data processing terminal fabricated in a hybrid configuration according to the fourth exemplary aspect of this disclosure.

FIG. 12 is a block diagram of an exemplary data processing terminal which is provided in a hybrid configuration according to the fourth exemplary aspect (i.e., a $4^{th}$ Configuration) of this disclosure. A main system (10) of a terminal is typically similar to that of the $3^{rd}$ Configuration (e.g., FIG. 11), and may include therein at least one main CPU unit (30), at least one main memory unit (40), at least one main input unit (20), and at least one main output unit (50). Other configurational or operational details of a main system (10) of this $4^{th}$ Configuration are similar or identical to those of the main system of the $1^{st}$, $2^{nd}$, or $3^{rd}$ Configuration, or to those of other main systems of other terminals as described in other exemplary aspects of this disclosure and, therefore, further details are omitted herein.

A lock system (60) includes a lock CPU portion (30L) and a lock memory portion (40L), where the former (30L) is integrated into a main CPU unit (30) and form an integrated CPU unit therewith, whereas the latter (40L) is integrated into a main memory unit (40) and form an integrated memory unit therewith. Unlike a terminal of the $3^{rd}$ Configuration, however, a lock system (60) may include a mode-switching input unit (25), and an isolated lock CPU portion (30U), where a mode-switching input unit (25) may be completely and physically isolated from a main input unit (20), and where an isolated lock CPU portion (30U) may be completely and physically isolated from a main CPU unit (30).

As a result, a terminal may be regarded to incorporate [1] a main CPU unit (30), [2] an embedded lock CPU portion (30L) which may be embedded into a main CPU unit (30) and forms an integrated CPU unit therewith, [3] an isolated lock CPU unit which is physically and operationally isolated from a main CPU unit (30), and which may (or may not) be physically or operationally isolated from an embedded lock CPU portion (30L), [4] a main memory unit (40), [5] an embedded memory portion (40L) which may be embedded into a main memory unit (40) and forms an integrated memory unit therewith, and [6] other optional main units.

Because at least one lock unit includes a $1^{st}$ portion which is embedded into a like main unit and a $2^{nd}$ portion which is physically (and optionally operationally) isolated from a main system, such a terminal may be referred to as having a "hybrid configuration." It is appreciated that a hybrid configuration may be regarded as combining a "total embedding" and a completely "isolated configuration" and that a hybrid configuration may be identical to the above "partially embedding.". For simplicity of illustration, a lock CPU unit of this $4^{th}$ Configuration is deemed to include an insulated (and non-embedded) portion (30U) as well as an embedded portion (30L).

In another exemplary embodiment of a fourth exemplary aspect of this disclosure, a terminal with a redundant configuration may use each of an embedded lock CPU portion (30L) and an isolated lock CPU portion (30U) for various purposes, while allowing each lock CPU portion (30L), (30U) [1] to drive the same or different units of a lock system (60) (or a main system when desirable), [2] to drive the same or different hardware or software elements of a lock system (60) (or a main system when desirable), [3] to run the same or different operations with such elements or units, or [4] to perform the same or different functions by running such operations.

Put in different words, a terminal may configure such embedded and isolated lock CPU portions (30L), (30U) [1] to drive the same hardware or software elements, [2] to drive at least one common element, while allowing each lock CPU portion (30L), (30U) to drive different elements, [3] to drive different elements, without any common element, or the like. As a result, such a terminal may allow the embedded and isolated lock CPU portions (30L), (30U) to run the identical or different operations as well.

As described hereinabove, an embedded lock CPU portion (30L) is embedded into a main CPU unit (30). By being physically coupled to a main CPU unit (30), an embedded lock CPU portion (30L) is generally disposed proximate to a main CPU unit (30). However, an isolated lock CPU portion (30U) may be disposed in various locations inside or outside a terminal. In one case, an isolated lock CPU portion (30U) may also be disposed adjacent to a main CPU unit (30), when a terminal may need an operational isolation but may not stringently require a physical isolation from a main CPU unit (30).

In addition, such lock CPU portions (30L), (30U) may physically or operatively couple in various ways. In one case, a terminal may physically isolate such lock CPU portions (30L), (30U) from each other, e.g., by disposing such portions (30L), (30U) in different locations. In another case, such lock CPU portions (30L), (30U) may be physically located adjacent to each other or may form a unitary article, with or without a main CPU unit (30). A terminal may operationally isolate such lock CPU portions (30L), (30U) from each other, although a terminal may allow such portions (30L), (30U) to communicate with each other through a main CPU unit (30) or other units of a main (or lock) system (10), (60).

By adopting the redundant configurations, a terminal may provide further benefits to a manufacturer or a user. First of all, a terminal may use either of such lock CPU portions (30L), (30U) to drive the same hardware or software elements. Accordingly, a manufacturer may enjoy flexibility in designing the hardware configuration or an O/S design. In other words, by allocating certain tasks to either of such lock CPU portions (30L), (30U), a manufacturer may simplify its design and manufacturing processes. In addition, a user may enjoy flexibility as well in running various operations with either of such lock CPU portions (30L), (30U).

Secondly, when an isolated lock CPU portion (30U) is contaminated or mal-functioning due to malicious viruses, a terminal may take various remedial actions which may be generally more safe than other actions taken by a terminal without a redundant configuration. In one case, a terminal may recruit an embedded lock CPU portion (30L) and use such a portion (30L) as a lock CPU unit. Accordingly, a terminal may obviate the need to use a main CPU unit (30) to run lock operations in a lock mode, thereby minimizing the risks of introducing malicious viruses into a main system (10) while running lock operations in a lock mode. In another case, a terminal may utilize an isolated lock CPU portion (30U) as an embedded lock CPU portion (30U), when the latter may be contaminated or mal-functioning.

Thirdly, a terminal may drive such embedded and isolated portions (30L), (30U) of a lock CPU unit concurrently or sequentially. More particularly, when a terminal drives such portions (30L), (30U), a lock system (10) may run multiple operations seamlessly in a lock mode, thereby providing further benefits to a user. Accordingly, even when a terminal receives a user input which in turn includes multiple (user) sub-inputs, a terminal may concurrently drive such lock CPU portions (30L), (30U) and run various operations seamlessly, without having to recruit a main CPU unit (30). A terminal may also provide a user with additional benefits when a terminal drives such lock CPU portions (30L), (30U) sequentially by, e.g., driving such lock CPU portions (30L), (30U) as an individual processor or an individual core of a multi-core processor, while generating threads of execution either sequentially or concurrently.

Moreover, a terminal may rather dispose an isolated lock CPU portion (30U) into an external device such as an add-on device, a portable device, or a wearable device. Accordingly, the external device may independently serve as an external lock system [1] which can drive a lock viewer disposed in the external device or inside a terminal, [2] which can store results into a lock memory unit disposed in the external device or inside a terminal or which can retrieve results therefrom, [3] which can drive other lock units disposed in the external device or inside a terminal, or the like.

At least one of such embedded and isolated lock CPU portions (30L), (30U) may run such erasure (or semi-erasure) onto a lock memory unit (80) in one of such erasure timings as described above, thereby maintaining the improved security of a main system and preserving the privacy of various data stored therein. Similarly, at least one of such embedded and isolated lock CPU portions (30L), (30U) may run such semi-erasure onto a lock memory unit (80), while storing such to-be-saved results in one of such storing timings as described above. When desirable, a main system (10) may run such erasure (or semi-erasure) onto a lock memory unit (80) or, conversely, at least one of such lock CPU portions (30L), (30U) may run such erasure (or semi-erasure) onto a main memory unit (40).

Except the above differences, various features of such main or lock units of a terminal of this $4^{th}$ Configuration may be similar or identical to those of such units of the terminals of the $1^{st}$, $2^{nd}$, and $3^{rd}$ Configurations, or to those of various units of the terminals of other exemplary aspects of this disclosure. Therefore, further details of various main units are omitted.

7-2. 4th Configuration—Variations or Modifications

Various terminals of this $4^{th}$ Configuration may be configured and operate according to other arrangements or sequences. Such variations or modifications of such terminals of this $4^{th}$ Configuration may generally be similar or identical to those of such terminals of the $1^{st}$, $2^{nd}$, or $3^{rd}$ Configuration or to those of other terminals of other exemplary aspects of this disclosure and, therefore, details are omitted here.

Configurational or operational variations (or modifications) of such terminals described in various embodiments or examples of this fourth exemplary aspect (i.e., the $4^{th}$ Configuration) may also be interchangeable with other various embodiments or examples of other exemplary aspects of this disclosure. Accordingly, certain features of a certain embodiment or example of this third exemplary aspect may be applied to another embodiment or example of the same aspect or of a different aspect.

Moreover, other configurational or operational features, their variations or modifications of the terminals of this fourth exemplary aspect [1] may apply to, [2] may be incorporated into, [3] may replace, [4] may be replaced by, or [5] may be combined with corresponding features of other aspects, embodiments, or examples of this disclosure which have been described throughout this disclosure, as long as such application, incorporation, replacement, or combination does not contract each other.

8. Further Operations

In the fifth exemplary aspect of this disclosure, various data processing terminals may run various operations or perform various functions, may be provided in various configurations or arrangements, and may operate in various sequences which may be different from those operations, functions, configurations, arrangements or sequences as provided hereinabove. For example, such terminals may not (or may) drive certain hardware or software elements of a main (or lock) system, may not (or may) incorporate any new hardware or software elements into a terminal, may not (or may) execute any additional steps, or the like.

Such terminals may also run certain operation in different orders or sequences, may drive certain hardware or software elements under different options, or the like. Following embodiments and examples show exemplary data processing terminals which may be constructed according to the same or different configurations, may run the same or different operations in the same or different orders or sequences, and may perform the same or different functions. Accordingly, the following configurations or operations may readily be incorporated into various terminals, their main systems, their lock systems, or to their various units, each of which have been disclosed hereinabove.

8-1. Hardware and Software Configurations and Implementations

Different types of lock systems, their constituent units, and their hardware or software elements have been disclosed heretofore, particularly in conjunction with the $1^{st}$ to $4^{th}$ Configurations. It is appreciated, however, that such units of various lock systems do not necessarily have to be implemented into or inside various data processing terminals of this disclosure as have been exemplified above.

Therefore and in one exemplary embodiment of a fifth exemplary aspect of this disclosure, various hardware elements of a lock system may be provided as or incorporated into an external device which may physically or operationally couple with a terminal (or its main system). To this end, various lock software elements or a lock O/S may be optionally loaded onto the external unit, where the external unit may include an add-on device, a portable device, or a wearable device.

Accordingly, a lock viewer as exemplified in the $1^{st}$ Configuration, a lock memory unit as exemplified in the $1^{st}$ or $2^{nd}$ Configuration, or an embedded or isolated lock CPU portion of the $3^{rd}$ or $4^{th}$ Configuration may easily be fabricated as (or incorporated into) an external device [1] which may be physically and releasably coupled to a port or a receptacle provided in a terminal, or [2] which may operationally couple with a terminal via wireless communication, without having to make any physical connection. More particularly, an external device may serve as [1] a lock viewer capable of presenting data or files in a format friendly to a user in a lock mode, [2] a lock CPU unit capable of driving various hardware or software elements of a lock system or, when allowed by a terminal, capable of driving various hardware or software elements of a main system, or [3] a lock memory unit capable of providing an extra memory sector to a lock system or to a main system in a restricted mode). An external device may instead serve as a lock system which includes a lock memory unit or a lock CPU unit capable of providing an extra memory sector, providing only a selected (or an entire) functionality of an O/S of a main CPU unit, a certain (software) application, or the like.

A terminal and external device may be releasably coupled to each other in various means to provide physical coupling, with or without an operational coupling. In one example, a terminal may include a receptacle or a port with which a terminal may releasably or fixedly receive an external device. In another example, a terminal may include a mechanical holder with which a terminal may releasably embrace, hold or otherwise couple to an external device. In another example, a terminal and external device may releasably couple with each other by a magnetic coupling, e.g., by disposing a magnet and a ferromagnetic material on or around a terminal and an external device, and by arranging magnetic poles for such coupling. It is appreciated that such magnets or magnetic materials may be disposed in a position which may not interfere with hardware elements of a terminal, e.g., away from a main CPU unit, a main memory unit, an embedded lock CPU portion, or an embedded lock memory portion. As long as an external device may releasably couple with a terminal and communicate with a terminal by wire or wirelessly, detailed mechanisms of such coupling are a matter of choice of one of ordinary skills in the relevant art and, therefore, omitted herein.

It is appreciated that such external devices may be provided as (or incorporated into) a portable device or as a wearable device which may communicate with a terminal wirelessly and serve as a lock memory unit (or portion), a lock CPU unit (or portion), or a lock input (or output) unit. Accordingly, a user may use a terminal, while using a wearable device or add-on device as a lock system. Various lock units may be fabricated as or incorporated into any external devices examples of which have been provided in Section 4-3-2 and others.

Instead of using the external device as a lock unit (or its portion), an external device may instead be used as [1] an authenticating device capable of providing authentication (user) sub-inputs, [2] a mode-switching device capable of providing a mode-switching (user) sub-input, or the like. That is, an external device may provide a terminal with an authentication (user) sub-input or a mode-switching (user) sub-input based on various criteria such as, e.g., [1] when an external device approaches a terminal within a certain distance, [2] when an external device may move at a certain linear or angular speed, in a certain direction, or at a certain acceleration, [3] when an external device receives a certain user input which includes a certain (user) sub-input, [4] when an external device contacts a terminal, or [5] when an external device monitors a certain movement of a user (or a non-user object). Therefore, when a user provides a user input to switch to an unlock mode, a terminal may authenticate a user with his or her fingerprint as well as a presence of an external device (e.g., a watch) around a terminal, a distance from an external device to a terminal, or the like.

An external device may instead be used as, e.g., an anti-authentication device, in such a way that, an external device may prevent a terminal from advancing to a mode with more access authority. For example, when an external device (e.g., a necklace) is disposed within a certain distance, a terminal may prevent a user from [1] switching from a current mode to an unlock mode, [2] switching from a current mode to a new mode granted with more access authority than the current mode, or [3] switching from the current mode to any new mode, regardless of whether or not a user's authentication information or (user) sub-input (e.g., a fingerprint, an iris or voice) is correct. This arrangement may be beneficial to a user, particularly in a situation when a user may not want to access a certain mode of his or her terminal in a certain environment. In this case, a user may hold his or her terminal with his or her hand with a ring. Thereafter, a terminal will not allow the authenticated user from switching to that specific mode, to a specific new mode granted with greater access authority or to any mode, as long as the hand with a ring is not removed away from a terminal more than a preset distance.

In addition, an external device may communicate with a main system disposed inside a terminal through wire or via wireless communication. Accordingly, a terminal may use various wireless communication technologies such as, e.g., a Wi-Fi, a Bluetooth, a Wi-MAX (a world-wide interoperability for microwave access), a WLAN (wireless local area network), an NFC (near field communication), a ZigBee, or the like, where details of such technologies are well known to one of ordinary skill in the art and, therefore, are omitted herein. When desirable, a terminal may use other communication technologies such as, an IR (infra-red) communications or others as commonly used in prior art wireless communication devices.

This configuration may provide various advantages to a user, for a user may prepare multiple USBs (or external memory chips or devices which can couple with a terminal) each of which may be specifically configured to work as a lock viewer, a lock CPU unit, a lock memory unit, or a lock system for only a certain mode of operation, while each of such external devices may not work in a different mode other than the mode pre-selected by a user. By the same token, a user may prepare multiple USBs each of which may be specifically configured to operate only in a certain mode such that a user may use each USP as an individual lock (or unlock) system which is, however, different from those of other USB's. In addition, each of multiple users may prepare his or her own USB which is loaded with desired lock units such that each individual user may run different lock operations in his or her own restricted mode by coupling his or her own USB, without worrying about accidently disclosing his or her private information to other users.

In the above examples, each external device may require a user to provide an authentication (user) sub-input or other authentication information such as, e.g., an external device may include an authentication input unit. In the alternative, a terminal may synchronize the external device with a main system of a terminal in such a way that a main system runs an authentication operation in order to verify whether a user who is coupling the external device to a terminal has a proper access authority, or the like.

In addition, the above external devices may be configured that they may run such erasure (or semi-erasure) on its own (or by a terminal) onto an entire (or only a selected) portion of results stored therein when certain events happen. In one example, an external device may monitor whether or not a current user fails the user authenticating, and then run such erasure (or semi-erasure) when a user fails such authenticating once (or for a certain number of times). In another example, a terminal may monitor whether or not a current user fails user authentication, and then may run such erasure (or semi-erasure) when a user fails such authenticating once (or for a certain number of times). Accordingly, an authorized user may ensure that any unauthorized user may not easily access any data or results stored in such an external device.

In another example, various computer codes may be loaded into an external device fabricated as a "plug-in" in such a way that a main O/S may drive such computer codes contained in a plug-in. As a result, a terminal may use such computer codes by driving them as software applications of a lock system (or a main system). This configuration offers various benefits to a user, for the user may prepare an external device loaded with a certain plug-in which, when coupled to a lock (or main) system, may run additional operations, and perform specific functions which may not be available by an existing main (or lock) O/S or other (software) applications. A terminal may also use various themes, skins or widgets instead of or in conjunction with [1] such plug-ins or [2] other forms of the external devices. As a result, a user may be able to customize various software elements of a main (or lock) system of a terminal. Of course, it is desired that such plug-ins may be compatible with a main (or lock) O/S or (software) applications of a main (or lock) system.

In another example, a terminal may run such erasure (or semi-erasure) onto at least a portion of such results which may be stored or reside in a lock system or which are obtained from running lock operations in a lock mode in various ways and in various "timings" other than those described above, where such a lock system may be disposed inside a terminal or may be provided as (or incorporated into) an external device.

In one case, a terminal may run such erasure (or semi-erasure) onto a lock system as it similarly does onto any lock system in such timings as described above. In another case, a terminal may run such erasure (or semi-erasure) onto a lock system of an external device when a user may intentionally or accidently unplug or uncouple the external device from a terminal, regardless of whether or not a user is finished with operating a lock system or running lock operations in a lock mode. In the latter case, a terminal may run such erasure (or semi-erasure) with an external device and, therefore, the external device may include a minimum power supply as well as a lock CPU unit equipped with a minimum functionality.

In another case, a terminal may run such erasure (or semi-erasure) onto a lock system while using an external device such as, e.g., [1] whenever a user provides a user input commanding a terminal to run such erasure (or semi-erasure), [2] when a user finishes a session after driving certain (software) applications, or [3] when a user finishes driving certain (software) applications. A terminal may run such erasure (or semi-erasure) when a user who operates a lock system which resides in an external device may then [1] start to operate a new system loaded into the same external device, [2] start to operate a new system loaded into a main system, or the like. A terminal may also run such erasure (or semi-erasure) when a user plugs an external device into a terminal or couples an external device to such a terminal.

That is, a terminal may run the erasure (or semi-erasure) for erasing (or semi-erasing) any unnecessary or unreliable results which are stored or reside in an external device and keeping such an external device clear of any malicious computer codes or viruses. Accordingly, a terminal may erase an entire (or only a selected) portion of such results which reside (or are stored) in an external device after running lock operations in a lock mode. Alternatively, a terminal may erase the portion of results which reside (or are stored) in a lock system, whenever a user finishes using an external device in a lock mode, or may erase such a portion before using an external device or during use.

As described above, an external device may include a lock viewer, a lock CPU unit, a lock memory unit, or a lock input (or output) unit of a lock system. It is appreciated that an external device may also be fabricated in different forms. As described in Section 4-3-2, an external device may be fabricated as an add-on device which may be fabricated as [1] a protector of a terminal, [2] its holder, [3] its case, or [4] its cover which may enclose at least a portion of a terminal, [5] a USB-type memory (with or without a driver), [6] an external memory chip (or card) (with or without a driver), [7] a portable memory chip or card (with or without a driver), [8] any other prior art memory chip (or device), or the like.

More particularly and as to the above [1] to [4], an external device may enclose at least a portion of a bottom surface of a terminal when a terminal disposes a display unit on its front surface, or may enclose a different surface of a terminal. An external device may mechanically and electrically couple with a terminal by a port or a connector, or may operationally couple therewith by wireless communication. When an external device may electrically couple with a terminal through electrical contacts, an external device may be powered by a terminal or may receive power wirelessly therefrom. Alternatively, an external device may include its own power supply as well, where the power supply may be a disposable battery, a rechargeable battery, a solar cell, or the like.

In addition, an external device may also be fabricated as [9] a film which can be attached onto a front surface of a terminal such as, e.g., a film which can be releasably coated on such a surface. Because a film is provided as a thin layer, the film may include minimum functionality to operate as a lock CPU unit, a lock memory unit, or a lock input unit. The film may receive electrical power from a power supply of a terminal or wirelessly, may receive power from sun lights or from light rays emanating from a display unit, or may receive thermal energy from a display unit and then convert such into electrical energy. The film may also include its own battery.

In another example, an external device may be formed as an ornamental object of a terminal, where examples of such objects may include, but not limited to, a pendant, a handle, a strap, a tag, a holder, a protector, or anything which may be coupled to a terminal. Other configurational or operational features of such ornamental external device are similar or identical to other external devices such as various add-on devices, portable device, or the portable devices as described in this Section and Section 4-3-2 and, therefore, omitted herein.

8-2. Mode Switching in Inactivated and Unloaded Terminals

In another exemplary embodiment of a fifth exemplary aspect of this disclosure, a terminal switches modes of operation in response a user input which includes a mode-switching user sub-input ($UI_{SWT}$). For example and in operations of each of the above Configurations, a user may provide a $1^{st}$ user input to a main input unit, where a $1^{st}$ user input generally includes an activation user sub-input ($UI_{ACT}$), while a terminal is in its powered-on state and in its off-state (i.e., when a terminal is in its inactive state). In response to the $1^{st}$ user input, a terminal runs an operation of turning on a display unit, and launches a lock system in a lock mode in various turning-on timings as defined above.

It is appreciated that such "turning on" may include [1] an instance when a display unit is actually turned on, [2] an instance when a display unit starts to turn on, or [3] an instance when a terminal starts to prepare such turning on. When desirable (or required), a terminal may optionally run at least one additional operation in a lock mode, where examples of such additional operations may include, e.g., an operation of authenticating a user, or an operation of advancing to a certain mode of operation.

In addition to the turning on, a terminal also prepares to run various operations in one of multiple modes defined in a hierarchy by launching a certain system which is to operate in such a mode. As defined in Section 4-3, a terminal may launch a lock (or main) system in one of various launch timings. More particularly, when a terminal receives a $1^{st}$ user input in its off-state and when a terminal is to switch to a lock mode, a terminal may launch a lock system in various timings such as, e.g., [1] concurrently with such mode switching, [2] (b) immediately after the mode switching, [3] after such mode switching but before a user provides another user input, [4] upon receiving a user input which includes $UI_{SWT}$, [5] immediately before such turning on, [6] concurrently with such turning on, [7] immediately after turning on, or the like. As described above, however, a $1^{st}$ user input does not have to necessarily include $UI_{SWT}$ therein to switch to a certain mode from an off-state, particularly when such mode switching is conditioned upon other operations such as, e.g., an authentication operation.

Once a lock system is launched and begins to operate in a lock mode, a user may run various lock operations. When a user is finished with running such lock operations and wants to switch from a current lock mode to a new unlock mode, a user may provide a $2^{nd}$ user input including a mode-switching (user) sub-input ($UI_{SWT}$) to a mode-switching input unit.

When a user is finished with running such lock operations and wants to switch from a current lock mode to a new unlock mode, a user may provide a $2^{nd}$ user input including a mode-switching (user) sub-input ($UI_{SWT}$) therein to a mode-switching input unit. It is appreciated that the mode-switching input unit may be the same main input unit or may be incorporated into a main input unit which receives the $1^{st}$ user input. Alternatively, a mode-switching input unit may be a separate input unit which may also have a shape, a size, an orientation, a disposition, or an operating mechanism which may be similar to or different from those of a main input unit.

Upon receiving the $2^{nd}$ user input, a terminal selects whether to stay in a current mode or to switch to a new mode. When a terminal confirms $UI_{SWT}$, a terminal may switch to a new mode. However, a terminal may not be able to ascertain $UI_{SWT}$ due to, e.g., an ambiguous user input, an incorrect user input, an undefined $UI_{SWT}$ (e.g., the one which does not match any mode listed in a matching list), an incorrect timing of providing a user input or $UI_{SWT}$, or the like. In this case, a terminal may [1] keep its display unit turned on and do nothing in a lock mode, [2] provide a warning message or a warning signal to a user by displaying such a message or signal on a display (or notice) unit, [3] turn on its display unit and then provide a warning message or signal thereon, [4] provide audible or tactile warning signals to a user while keeping a display unit turned off, or the like.

After a terminal confirms $UI_{SWT}$, a terminal may switch from a current mode to a new mode, while running an erase (or semi-erase) operation, particularly when a new mode is granted with more access authority than a current mode. A terminal may also run such erasure (or semi-erasure) in one of such erasure timings as well. When a terminal runs the semi-erasure, a terminal may [1] just leave to-be-saved results in a lock system, with or without storing such results in a lock memory unit (or sector) or [2] actively store to-be-stored results into a lock memory unit (or sector).

This exemplary embodiment may require an (almost) automatic turning on of a display unit in response to a user input and, therefore, apply to a terminal which does not condition such turning on a display unit upon an outcome from running an authentication operation. That is, this embodiment may not apply to a terminal which runs an authentication operation in an off-state, and then turns on a display unit when a user passes such authenticating, which but does not immediately turn on a display unit when a user fails the authenticating. This conditioning arrangement may still incorporate such erasure (or semi-erasure) as well, e.g., by running such erasure (or semi-erasure) whenever a user attempts to authenticate himself or herself, regardless of whether or not the user passes such authenticating.

In another exemplary embodiment of a fifth exemplary aspect of this disclosure which is similar to the above exemplary embodiment, a terminal may switch modes after authenticating a current user by running at least one authentication operation. Accordingly, a terminal may receive a $1^{st}$ user input with an input unit in its off-state. In response to the $1^{st}$ user input including $UI_{THEN}$, a terminal runs an authentication operation.

When the $1^{st}$ user input also includes $UI_{ACT}$, a terminal may turn on its display unit before, concurrently with or (immediately) after running (or starting to run) an authentication operation. When a terminal finishes turning on a display unit before finishing an authentication operation, it may launch a lock system and display a lock screen (or a different default screen) on a display unit in a lock mode.

When a terminal completes an authentication operation before finishing turning on a display unit, a terminal may still launch a lock system in a lock mode, while displaying a lock screen on a display unit in a lock mode. When a user passes the authenticating, a terminal may launch a main system in an unlock mode and display a home screen, e.g., by replacing an existing lock screen with a home screen or by overlaying a home screen over a lock screen. When the $1^{st}$ user input includes $UI_{SWT}$, a terminal may acquire $UI_{SWT}$ therefrom and, based thereon, switch from a lock mode to a new mode as described above.

When a user fails an authentication operation, a terminal may [1] keep a display unit turned off, [2] turn on a display unit and then display a lock screen on a display unit in a lock mode, or [3] keep a display unit turned off, and then perform the above [2] upon detecting an occurrence of a certain event such as, e.g., [1] when a user keeps providing a single user input (e.g., not completely detaching or removing his or her finger from an input unit) for a period longer than a preset threshold, [2] when a user concurrently provides a new (user) sub-input such as a new $UI_{THEN}$ and or another new (user) sub-input (e.g., moving a body part while maintaining a contact with such an input unit) which may qualify as $UI_{THEN}$, [3] when a user provides multiple sequential user inputs (e.g., repeating to provide the same or different user inputs), or the like. It is appreciated that, when a terminal requires such user authenticating, a terminal may receive a $2^{nd}$ user input which includes $UI_{THEN}$ and then runs an authentication operation based thereon.

When a $1^{st}$ user input does not include $UI_{ACT}$, a terminal may not have to turn on its display unit until it finishes the user authenticating. While waiting for an outcome from such user authenticating, a terminal may [1] keep its display unit turned off, or [2] turn on a display unit in a lock mode, while displaying a lock screen on a display unit. When a user passes the authenticating, a terminal may launch a main system in an unlock mode, while overlaying a home screen over a lock screen or replace a lock screen with a home screen. When a user fails such authenticating, a terminal may [1] keep a display unit turned off, [2] turn on a display unit and display a lock (or default) screen on a display unit in a lock mode, or the like.

Even when a user fails an authentication operation, a terminal may turn on its display unit, based on various criteria. For example, a terminal may turn on a display unit as far as a preset condition is met such as, e.g., [1] when a user manipulates (e.g., presses, touches, or contacts) an input unit more than once, [2] when a user manipulates an input unit for a period longer than a threshold, [3] when a user may not supply a certain user input or any additional user input within a certain period of time, or the like. Alternatively, when a user input includes $UI_{ACT}$, a terminal may be configured to turn on a display unit anyway, even when a terminal may have to run an authentication operation.

8-3. Storing and Processing Results Obtained in Lock Mode

Prior to, concurrently with, or immediately after such mode switching, however, a terminal may run such semi-erasure by erasing to-be-erased results which is stored or which reside in a lock system, [1] while storing to-be-stored results, or [2] while not actively erasing such to-be-stored results. A user may want to keep such to-be-stored results for various reasons such as, e.g., [1] a user may want to review such tobe-stored results in the future, e.g., when a user operates a lock system in a lock mode in the next session, [2] a user may want to run more lock operations in the next session while using such to-be-stored results obtained in a current lock session, or [3] a user may want to process such to-be-stored results after he or she switches to a new mode.

Accordingly and in another exemplary embodiment of a fifth exemplary aspect of this disclosure, a terminal may store some of such results (i.e., to-be-stored results) into a lock (or main) memory unit in various ways. In a $1^{st}$ example, a user may store such to-be-stored results in a lock memory unit or in a temporary memory sector in a lock system. Once switching to an unlock mode, a user may drive a main unit in an unlock mode, and [1] access such to-be-stored results in a lock system, [2] retrieve such tobe-stored results by a main unit, and then [3] process such to-be-stored results with a main system in an unlock mode. In short, a user stores such to-be-stored results into a lock system using a lock system before such mode switching, and thereafter processes such to-be-stored results using a main system in an unlock mode after such mode switching.

In a $2^{nd}$ example, a use may store such to-be-stored results not into a lock system but into a main system (e.g., a main memory unit) using a lock system while still operating in a lock mode. After switching to an unlock mode, a user may [1] access such to-be-stored results in a main system, [2] retrieve such to-be-stored results from a main system, and then [3] process such to-be-stored results with a main system in an unlock mode. In short, a user stores such to-be-stored results into a main system using a lock system in a lock mode, and thereafter processes such to-be-stored results using a main system in an unlock mode after such mode switching.

In a $3^{rd}$ example, a user may still store such to-be-stored results in a main system, but not into a main memory unit but into a temporary memory sector in a main system while operating in a lock mode. After switching to an unlock mode, a user may then [1] access such to-be-stored results from a temporary sector, [2] retrieve such to-be-stored results therefrom, and [3] process such to-be-stored results with a main system in an unlock mode. In short, a user stores such to-be-stored results into temporary memory sector of a main system using a lock system in a lock mode, and thereafter processes such to-be-stored results using a main system in an unlock mode after such mode switching.

In all of such examples, not a user but a terminal may select which results are to be saved, particularly when a terminal may analyze user statistics or external circumstances and predict which results a user may desire to store. In addition, while a user may run various operations described in such examples of this paragraph, a terminal may also run such erasure onto the to-be-erased results in one of such erasure timings.

8-4. Mode Switching in Inactivated but Loaded Terminals

A terminal is inactivated and in an off-state [1] when a user turns off a display unit after use or [2] when a terminal turns off its display unit due to a non-action by a user for a period longer than a certain period of time. A terminal may switch to the off-state from a lock mode as well as an unlock mode. Once inactivated, a terminal typically stops to execute a lock system or a main system. Therefore, when a user starts to operate a terminal again thereafter, a terminal has to launch again a main system in an unlock mode or launch a lock system in a lock mode.

In contrary and in another exemplary embodiment of this fifth exemplary aspect of the disclosure, a terminal may continue to operate in an unlock (or lock) mode, even when a display unit is turned off in its powered-on state. For example, before, while or (immediately) after a display unit is turned off, a terminal may store a certain step of a certain operation which a lock (or main) system has been operating in various ways such as, e.g., [1] by storing a pointer or a location of a pointer of the last step of the operation immediately before such turning off, [2] by storing certain data which may be associated with a lock (or main) system and which may provide information regarding the last step, [3] by storing data related to or resulting from launching such a system, or the like. Of course, a terminal may not completely unload a lock (or unlock) system even while its display unit is turned off.

Thereafter, when a terminal receives a $2^{nd}$ user input and acquires $UI_{SWT}$ therefrom, a terminal may readily and immediately [1] resume operating a lock (or main) system, [2] locate the last step of the operation which the lock (or main) system had been running before its display unit had been turned off, and then [3] continue to run such an operation. That is, a terminal may allow a user [1] to conveniently resume to operate a system which he or she has been operating before turning off a display unit, without having to launch the same system again, and [2] to continue to run the operation which the user had been running before a display unit has been turned off.

A terminal may also resume to operate a lock (or main) system, by not necessarily acquiring $UI_{SWT}$ but by acquiring $UI_{ACT}$ or $UI_{THEN}$. A terminal may also be configured to resume to operate a lock (or main) system which a user has been operating, by providing a user input including $UI_{ACT}$ or $UI_{THEN}$ therein or, alternatively, to resume to operate a lock (or main) system as designated by $UI_{SWT}$ as well. When a new mode designated by $UI_{SWT}$ is different from the mode which the user had been operating, a terminal may have to launch a new system, while terminating the old system which the user had been operating before a display unit had been turned off.

When desirable, before launching one of such systems, a terminal may run the erasure or semi-erasure. This example may be useful, because results which had been stored or residing in a lock system may include contaminated data, viruses or fragments thereof, each of which may be detrimental to the security, integrity or security of a main system.

When desirable, a terminal may stay in an unlock mode when a display unit is turned off. When a user provides a user input while a display unit has been turned off, a terminal may launch a main system and allow a user to operate in an unlock mode. However, an easy entry into an unlock mode may be detrimental to the security or integrity of a main system. Therefore, it may be typically safer for a terminal to first launch (or resume to operate) a lock system instead of a main system.

8-5. Storing and Processing Data Obtained in Unlock Mode

While operating a main system in an unlock mode, a user may encounter situations where a user may [1] have to open unreliable folders, [2] have to access suspicious websites, [3] have to download questionable contents from an internet, or the like. In such situations, a user may desire to perform the above [1] to [3] with a lock system in a lock mode. Despite risks associated therewith, a user may desire to open such folders, access such websites, or download such contents. A user may [4] want to process data which are stored or residing in a main system in a lock mode with a lock system as well. Accordingly and in another exemplary embodiment of a fifth exemplary aspect of this disclosure, a terminal may allow a user to perform any of the above [1] to [4] with a lock system by readily switching to a lock mode.

To this end, a terminal may allow a user to transfer such unreliable folders, internet addresses of such websites, such contents, or such data to a lock system. For simplicity of illustration, such folders, addresses, contents, and data are to be collectively referred to as "main data" hereinafter.

In a $1^{st}$ example of this exemplary embodiment, a user may mark such main data using a main system in an unlock mode. Thereafter, a user may provide a terminal with a $1^{st}$ user input which includes $UI_{SWT-1}$ which is designated to a lock mode. A terminal may transfer such main data to a lock memory unit with a main system in an unlock mode in various timings such as, e.g., [1] concurrently with acquiring $UI_{SWT-1}$, [2] (immediately) after acquiring $UI_{SWT-1}$, [3] (immediately) before switching to a lock mode, or [4] concurrently with switching to a lock mode. After a terminal switches to a lock mode, a user may retrieve such main data from a lock memory unit, and may begin to run various lock operations using a lock system in a lock mode and to process such main data. When a user is finished with processing such main data, a user may provide a terminal with a $2^{nd}$ user input which includes $UI_{SWT-2}$ designated to an unlock mode, thereby switching to an unlock mode.

In a $2^{nd}$ example of this exemplary embodiment, a user may mark the main data with a main system in an unlock mode, and then store such main data into a main memory unit using a main system in an unlock mode. A user may provide a terminal with a user input which includes $UI_{SWT-1}$ designated to a lock mode. After a terminal switches to a lock mode, a user may retrieve such main data from a main memory unit using a lock system in a lock mode, and may begin to run various lock operations and to process the main data. When a user is done with processing such main data, a user may provide a terminal with a $2^{nd}$ user input with $UI_{SWT-2}$ designated to an unlock mode, thereby switching to an unlock mode.

Instead of storing such main data concurrently with marking the main data, a terminal may instead store such main data to a main memory unit with a main system in an unlock mode in various timings such as, e.g., [1] within a certain period of time after a user marks such main data, [2] concurrently with acquiring $UI_{SWT-1}$, [3] (immediately) after acquiring $UI_{SWT-1}$, [4] (immediately) before switching to a lock mode, or [5] concurrently with switching to a lock mode.

It is appreciated in the above $1^{st}$ and $2^{nd}$ examples that the $1^{st}$ and $2^{nd}$ user inputs may not necessarily include different $UI_{SWT}$'s therein, particularly when a hierarchy includes a single lock mode and a single unlock mode, and when a terminal may operate in a series switching. It is also appreciated that a user may mark such to-be-stored results using a lock system in a lock mode, and may then transfer such to-be-stored results as described in Section 4-3, where such to-be-stored results are obtained by running lock operations using a lock system in a lock mode, and where such to-be-stored results may (or may not) relate to such main data. It is also appreciated that a terminal may employ variations or modifications of the above $1^{st}$ and $2^{nd}$ examples to process such main data using a lock system in a lock mode, as far as a lock system may access such main data in a lock (or unlock) mode, may retrieve such main data in a lock mode, and may process such main data in a lock mode.

In all of such examples, not a user but a terminal may select which main data are to be transferred to a lock system, particularly when a terminal may analyze user statistics or external circumstances and predict which main data a user may desire to process in a lock mode. In addition, while a user may run various operations described in such examples of this paragraph, a terminal may also run such erasure onto the to-be-erased results in one of such erasure timings.

8-6. Mode Switching in Activated and Loaded Terminals

In another exemplary embodiment of a fifth exemplary aspect of this disclosure, a terminal may switch modes in various ways upon receiving a $2^{nd}$ user input and acquiring $UI_{SWT}$ therefrom, while a user has been operating a lock (or main) system in a lock (or main) mode.

In the examples of Sections 4-2 and 4-3, a terminal received a $1^{st}$ user input in its off-state, and switched to a lock (or unlock) mode, while launching a lock (or main) system in a lock (or unlock) mode based on [1] $UI_{SWT-1}$ or [2] an outcome of such user authenticating. A user then started to run various lock (or unlock) operations with the lock (or main) system in the lock (or unlock) mode. Thereafter, a user may provide a mode-switching input unit (or a main input unit) with a $2^{nd}$ user input, and acquire $UI_{SWT-2}$ from the $2^{nd}$ user input. In response to thereto, a terminal may remain in the lock (or unlock) mode or may switch to the unlock (or lock) mode by employing various methods.

A terminal may operationally couple a mode-switching operation with an authentication operation. For example, when a user fails such user authenticating, a terminal [1] may remain in a current mode, while not switching to a new mode, [2] may ask a user to provide a new user input, or [2] may turn off a display unit. A terminal may instead stop to operate a lock (or main) system to ensure that a terminal is no longer in a loaded state. As a result, when a user turns on a display unit later, a terminal may not automatically resume to operate a lock system. In addition, regardless of an outcome from an authentication operation, a terminal may turn off a display unit when a preset condition is met (e.g., a user may not press, touch, slide, contact or otherwise manipulate an input unit more than once, for a period longer than a threshold, or the like).

When a user passes an authentication operation, a terminal may switch to a new mode designated by $UI_{SWT}$. A terminal may also run such erasure (or semi-erasure) in one of such erasure timings. It is appreciated that the terminals of this exemplary embodiment may keep their display units turned off in a lock mode. As a result, this embodiment may be useful in saving a battery power.

In another exemplary embodiment of a fifth exemplary aspect of this disclosure, a terminal may receive a $2^{nd}$ user input including $UI_{SWT-2}$ when a terminal which has been in its on-state may start to turn on its display unit in an unlock mode. A terminal may confirm $UI_{SWT-2}$, and switch from a current mode to a new mode, while running such erasure (or semi-erasure) in one of such erasure timings.

A terminal may condition a mode-switching operation upon an authentication operation so that a user who fails such authenticating may not switch from a current unlock mode to any other mode or that a terminal turns off a display unit. Upon such failure, a terminal may switch to a lock mode by launching a lock system or may instead unload an unlock system to ensure that a terminal is no longer in a loaded state. In addition, regardless of an outcome obtained by running an authentication operation, a terminal may turn off a display unit when a preset condition is met (e.g., a user may not press, touch, slide, contact or otherwise manipulate an input unit more than once, for a period longer than a threshold, or the like).

When a user passes such authenticating, a terminal may switch to a new mode designated by $UI_{SWT}$. A terminal may also run such erasure (or semi-erasure) in one of such erasure timings. However, it is appreciated that a terminal may not need to run any erasure (or semi-erasure), for a terminal switches from an unlock mode with the greatest access authority to another new mode with the less access authority. It is also appreciated that many terminals of this embodiment may keep their display units turned off in a lock mode, thereby saving a battery power.

8-7. Mode Switching While Waking Up

After use, a terminal usually puts itself into sleep, with its display unit turned off (i.e., an off-state). When a user tries to use a terminal in its off-state, the user has to switch from an off-state to an on-state, and then begins to operate a terminal by launching a lock or main system in a lock or unlock mode, respectively, and provides user inputs thereto. Accordingly, seamlessly coupling such a waking-up operation with a subsequent operation which a user desires to run in a lock or unlock mode may provide great benefit to a user.

Figure 13A:
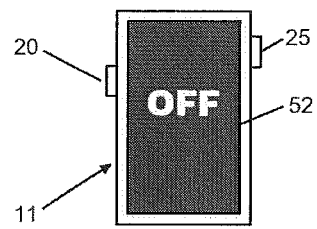
FIGS. 13A and 13D are top views of exemplary terminals illustrating sequences of exemplary seamless waking-up operations.

In another exemplary embodiment of this fifth exemplary aspect of the disclosure, a terminal may seamless couple such waking-up operation with subsequent operations in various ways, while maintaining the enhanced security of a terminal, the improved integrity thereof, and the preservation of personal data stored in a terminal. FIGS. 13A and 13D are top views of exemplary terminals illustrating sequences of exemplary seamless waking-up operations according to this fifth exemplary aspect.

In a $1^{st}$ example, FIG. 13A shows an exemplary data processing terminal (11) which includes a main input unit (25), a mode-switching input unit (20), a (main) display unit (52), and other units which are not included in the figure. It is appreciated that a terminal (11) includes a main input unit (20) and a mode-switching input unit (25) along its left edge and right edge, respectively. Accordingly, a user may hold a terminal in his left or right hand, and manipulates such input units (20), (25) with different fingers. A terminal (11) of FIG. 13A is in its off-state, and its display unit (52) is turned off.

A terminal (11) may assign different tasks to a main input unit (20) and a mode-switching input unit (25). In a $1^{st}$ case, a main input unit (20) is to receive a user input with $UI_{ACT}$ and to acquire $UI_{SWT}$ therefrom, whereas a mode-switching input unit (25) is to receive a user input with $UI_{SWT}$ and to acquire $UI_{ACT}$ therefrom. In this case, a terminal (11) may not be able to acquire $UI_{ACT}$ from a user input applied to a mode-switching input unit (25), and may not be able to acquire $UI_{SWT}$ from a user input applied to a main input unit (20). However, in a $2^{nd}$ case, a main input unit (20) is to receive a user input for powering on or off a terminal, while a mode-switching input unit (25) may receive a user input and acquire $UI_{ACT}$, $UI_{SWT}$, or $UI_{THEN}$ therefrom. To this end, a mode-switching input (25) preferably includes multiple sensors capable of acquiring $UI_{ACT}$, $UI_{SWT}$, or $UI_{THEN}$ from a user input.

It is appreciated that following examples are based on the $2^{nd}$ exemplary case of the above paragraph. It is also appreciated that determining which input unit is to acquire which (user) sub-input is typically a matter of selection, and designing such input units is well within a knowledge of one of ordinary skill in the relevant art of fabricating input units. Therefore, details of other terminals based on the $1^{st}$ exemplary case of the preceding paragraph are omitted herein.

When a user wants to operate a terminal (11), a user may provide the terminal (11) with a $1^{st}$ user input which includes $UI_{SWT}$ therein, by manipulating the mode-switching input unit (25) by contacting, pressing, or otherwise manipulating as least a portion of the input unit (25). In response to receiving the $1^{st}$ user input and acquiring $UI_{SWT}$ therefrom, a terminal (11) may switch from its off-state to an on-state and, more particularly, to an unlock (or home) mode or to a lock mode. The $1^{st}$ user input may also include $UI_{THEN}$ when the terminal (11) runs an authentication operation to switch to an unlock mode or to even advance to a lock mode. The $1^{st}$ user input may also include $UI_{ACT}$ when the terminal (11) requires such $UI_{ACT}$ to turn on a display unit (52).

Figure 13B:
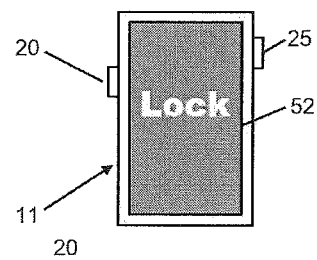

In a $2^{nd}$ example, FIG. 13B is the exemplary terminal (11) of FIG. 13(A) switching to a lock mode from an off-state. In one case, a terminal (11) may always switch to a lock mode whenever it may receive a user input, whether a terminal (11) runs an authentication operation and even when a user passes the user authenticating. In this arrangement, a user may be able to run lock operations with a lock system in a lock mode whenever a user wakes up a terminal (11). Alternatively, a terminal (11) switches to a lock mode when a user fails the user authenticating. In this case, a user may run lock operations as well.

Figure 13C:
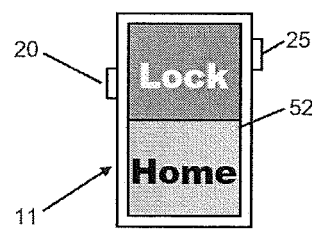
Figure 13D:
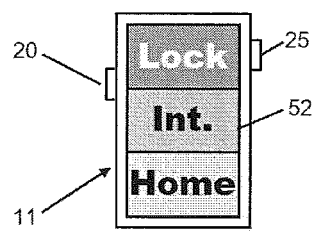

In a $3^{rd}$ example, FIG. 13C is the exemplary terminal (11) of FIG. 13(A) which wakes up and provides an option to a user which mode to switch to. In a $1^{st}$ case when a terminal (11) does not run an authentication operation, a terminal (11) may turn on its display unit (52) and display two GUIs thereon, where a $1^{st}$ GUI is labeled as a "Lock Mode," while a $2^{nd}$ GUI is labeled as a "Home Mode." When a user provides a $2^{nd}$ user input to one of such GUIs, a terminal (11) switches to a lock mode or an unlock mode as designated by the $2^{nd}$ user input.

In this arrangement, a user may have to provide two sequential user inputs to turn on a display unit (52) and to switch to one of the lock and unlock modes, e.g., a $1^{st}$ user input for turning on a display unit (52), and a $2^{nd}$ user input for selecting a mode. However, a terminal (11) may be configured to receive the $1^{st}$ and $2^{nd}$ user inputs concurrently and, therefore, such $1^{st}$ and $2^{nd}$ user inputs may be deemed to be a single user input. This arrangement provides a user with the benefit of concurrently and seamlessly running the turning on and mode switching operations.

In a $1^{st}$ case, a user may contact or press a mode-switching user input unit (25) while a terminal (11) is in its off-state, thereby providing a $1^{st}$ user input thereto. A user continues to contact or press the mode-switching input unit (25) until a terminal (11) displays the above GUIs on a display unit (52). When a user wants to switch to a lock mode, a user may slide a finger or translate the input unit (25) upwardly, thereby providing a $2^{nd}$ but concurrent user input to a terminal (11). Similarly, when a user desires to switch to an unlock mode, a user slides a finger or pushes the input unit (25) downwardly, thereby providing the $2^{nd}$ user input concurrently. As a result, a user may switch to either mode by applying a single user input, for a user has concurrently provided the $1^{st}$ and $2^{nd}$ user inputs, without detaching his or her finger from a mode-switching input unit (25).

In a $2^{nd}$ case, a user may repeat those sequences described in the above $1^{st}$ case, except that a user provides the $1^{st}$ and $2^{nd}$ user inputs differently from the $1^{st}$ case. That is, for a user who holds a terminal (11) with a left hand, a user manipulates (e.g., contacts or presses) a mode-switching input unit (25) with an index finger, and provide the $1^{st}$ user input thereto, similar to such manipulations of the above $1^{st}$ case. While a user continues to manipulate a mode-switching input unit (25) with an index finger, a user [1] may manipulate his thumb to concurrently manipulate a main input unit (20), or [2] may concurrently touch one of such GUIs with his thumb, thereby concurrently providing the $2^{nd}$ user input, or the like.

In a $4^{th}$ example, FIG. 13D is the exemplary terminal (11) of FIG. 13(A) which wakes up and provides a different option to a user which mode to switch to. In a $1^{st}$ case when a terminal (11) does not run an authentication operation, a terminal (11) may turn on its display unit (52) and display three GUIs thereon, where a $1^{st}$ GUI is labeled as a "Lock Mode," a $2^{nd}$ GUI is labeled as an "Intermediate Mode," and a $3^{rd}$ GUI is labeled as a "Home Mode." When a user provides a $2^{nd}$ user input to one of such GUIs, a terminal (11) switches to a lock mode, an intermediate mode, or an unlock mode as designated by the $2^{nd}$ user input.

In this arrangement, a user may have to provide two sequential user inputs to turn on a display unit (52) and to switch to one of the lock and unlock modes. Accordingly, a terminal (11) may be configured to receive the $1^{st}$ and $2^{nd}$ user inputs concurrently as exemplified in the $1^{st}$ and $2^{nd}$ cases of the above $3^{rd}$ example.

A terminal (11) may use this arrangement regardless of how many modes are defined in a hierarchy in which a terminal (11) is to operate. In addition, a terminal (11) may employ different arrangements in such a way that multiple GUIs for multiple modes may be arranged vertically, in parallel, or in a combination thereof. In addition, a terminal may [1] highlight one of multiple GUIs as a user touches the GUI, [2] recommend a certain mode by highlighting a GUI corresponding to the mode, [3] include more information of such modes along with a GUIs, or the like. In this context, such GUIs may be similar to various notice units (or vice versa) as described above.

In a $5^{th}$ example, a terminal may run an authentication operation using $UI_{THEN}$ provided by a user, when a user wants to switch from an off-state to an unlock mode directly. In this case, a user may have to provide a $3^{rd}$ user input including $UI_{SWT}$ therein. However, this step may be combined into one of the steps described in the above $1^{st}$ and $2^{nd}$ cases, whereby a user can concurrently and seamlessly run the turning on, user authenticating, and mode switching.

In a $1^{st}$ case, a mode-switching input unit (25) may acquire $UI_{THEN}$ from a $1^{st}$ user input. Once acquiring such, a terminal (11) may use $UI_{THEN}$ and run an authentication operation at any time. In a $2^{nd}$ case, a main input unit (10) may acquire $UI_{THEN}$ when a user powers a terminal (11) on. Thereafter, a terminal (11) may regard a user authenticated as far as the same user switches to an unlock mode within a certain period of time. In a $3^{rd}$ case, a mode-switching input unit (25) may acquire $UI_{THEN}$ from a $2^{nd}$ user input which is concurrently provided along with a $1^{st}$ input.

Various configurational or operational features of various terminal of this Section may apply to other terminals illustrated in other Sections of this disclosure. Accordingly, such terminals of this Section may turn on their display units in one of various turning-on timings, may launch a lock (or main) system in one of various launch timings, may run such erasure (or semi-erasure) in one of various erasure timings, may switch modes in one of various mode-switching timings, or the like.

8-8. Erasure and Semi-Erasure vs. Access Authorities

In general, various terminals of this disclosure run an erase (or semi-erase operation) to achieve enhanced security, improved integrity, and better protection of data stored in a main system. Therefore, a terminal may run such erasure (or semi-erasure) as a terminal switches from a $1^{st}$ mode granted with less access authority (e.g., a lock mode or other restricted modes) to a $2^{nd}$ mode granted with greater access authority (e.g., an unlock mode or other unrestricted modes). In contrary, a terminal may not run any erasure (or semi-erasure) when a terminal switches from the above $2^{nd}$ mode to the above $1^{st}$ new mode.

In another exemplary embodiment of a fifth exemplary aspect of this disclosure, a terminal may nevertheless run such erasure (or semi-erasure) even when a terminal switches from one mode granted with greater access authority to a new mode granted with less access authority such as, e.g., while switching from an unlock mode to a lock mode, from an unlock mode to another restricted mode, or from a $1^{st}$ restricted mode to a lock mode. In addition, a terminal may run such erasure (or semi-erasure) when it switches from a $3^{rd}$ mode to a $4^{th}$ mode, where a terminal grants each of such $3^{rd}$ and $4^{th}$ modes with the access authorities which may be comparable in scopes, types, or depths in such a way that it may not be feasible to decide which mode may have more access authority than another.

When multiple users share the same terminal, a terminal may also run such erasure (or semi-erasure) when such users take turns, for it may be desirable to give each user his or her own access authority and to preserve each user's own privacy. A terminal may also completely (or partially) prevent each of such from accessing a lock (or main system) of other users. That is, a terminal (or its lock or main CPU unit) may run such erasure (or the semi-erasure) whenever it is desirable to remove an entire (or only a certain) portion of results which are stored or residing in a lock memory unit of a lock system of each user.

As described above, classifying various modes depending upon their access authorities are relative in nature in such a way that a $2^{nd}$ mode may have greater access authorities than a $1^{st}$ mode, but may have less access authority than a $3^{rd}$ mode. Even when such modes granted with distinct and different access authorities may be precisely lined up in an order of increasing access authorities, a terminal may run such erasure (or semi-erasure) [1] only when a new mode is granted with more access authorities than a current mode is, [2] when a new mode is granted with less access authorities than a current mode is, or [3] regardless of the differences between the access authorities of a current mode and a new mode. Therefore, despite various configurations or arrangements which have been disclosed in relation to the erasure or semi-erasure, a terminal manufacturer or a user may implement a variety of such erase or semi-erase operations or may adjust timings of such erasure or semi-erasure as they see fit. In addition, as long as a user does not handle any crucial data in a lock system, frequently running such erasure or semi-erasure may provide a user with greater security, integrity or privacy than otherwise.

8-9. Mode Switching and Displaying Advertisements/Contents

As described above, various terminals of this disclosure may display various lock screens, default screens or home screens in various lock, intermediate, or unlock modes. Therefore and in another exemplary embodiment of a fifth exemplary aspect of this disclosure, a terminal may "run a display operation" for various purposes such as, e.g., [1] to display at least one advertisement or at least one content on a display unit, [2] to allow a user to provide a user input for accessing a website which is included in the advertisement or the content, [3] to allow a user to edit the advertisement or content, [4] to allow a user to make a selection of options provided on the advertisement, content, or website, or [5] to allow a user to store results obtained by such displaying, accessing, editing, or making a selection. As used herein, an "advertisement" refers to an announcement, a notice, and other information, where such advertisements are provided to promote a certain product, a certain service, or a certain event, and where a user viewing or otherwise interacting with such advertisements may be rewarded by an advertisement provider or by another who is related with such advertisements.

In one example, a terminal may display an advertisement on a lock screen, a default screen or even a home screen. In another example, a terminal may display an advertisement when a terminal switches to a certain mode or whenever a terminal switches modes, regardless of access authorities granted to each of such modes by a terminal (or a user). In another example, a terminal may display an advertisement when it may switch from a current mode with greater access authority to a new mode with less authority (or vice versa). In another example, a terminal may utilize an advertisement itself as a lock, intermediate, or home screen. Alternatively, a terminal may display an advertisement as occupying a selected portion but not an entire portion of such a screen, where the advertisement [1] may be disposed in a certain fixed area of a screen, [2] may move around a screen while changing its location, [3] may change its shape or size while being displayed on such a screen, [4] may appear as a pop-up screen of various shapes or sizes, or the like. In another example, a terminal may display an advertisement [1] as long as the same lock, intermediate, or home screen is displayed on a display unit, [2] for a certain period of time, [3] in a certain number of screens, or [4] for a certain number of modes.

It is appreciated that a terminal may drive a display unit to display a screen thereon in one of various "displaying timings" examples of which may include [1] concurrently with or (immediately) after a mode switching of a terminal from a powered-off state to a powered-on state (e.g., powering on a terminal), [2] concurrently with or (immediately) after a mode switching of a terminal from an off-state to an on-state (e.g., waking up a terminal or turning on), [3}] concurrently with or (immediately) after a mode switching from an unlock mode to a lock (or intermediate) mode (or vice versa), [4] concurrently with or (immediately) after a mode switching from an intermediate mode to a lock mode (or vice versa), [5] concurrently with or (immediately) after launching a lock system in a lock mode, or the like.

As described above, a terminal may display an advertisement for a preset period of time, and then remove the advertisement from a screen. In the alternative, a terminal may display an advertisement on a display unit, and may keep the advertisement thereon [1] until a user provides an advertisement with a user input thereto or [2] until a user exercises an active or passive effort onto an advertisement, where a terminal removes an advertisement from a display unit. In either of the above [1] or [2], a terminal may then display a lock (or home) screen in a lock (or unlock) mode, and a user may begin to operate a terminal in such a mode.

In general, an advertisement may have a provider (or a sponsor) who may provide the advertisement in various arrangements and timings. In one example, a terminal may display an advertisement [1] which has been stored in a terminal, e.g., in a lock (or main) memory unit, [1-1] in the past, or [1-2] well before such displaying timings, [2] which has been received from a provider and then stored in a terminal [2-1] in the past, or [2-2] well before such displaying timings, or [3] which is received from a provider in real time when a terminal requests (directly or indirectly) to a provider. In addition, a terminal may generate an advertisement in real time or in one of such displaying timings.

A terminal may display an advertisement "as is" such that a displayed advertisement is the same advertisement as have been stored in a terminal, as have been obtained from a provider, or the like. A terminal may instead revise or edit an advertisement of the above [1] to [3] of the preceding paragraph, and then display the revised advertisement. In addition, a terminal may [1] display a single advertisement on a screen, [2] display multiple static advertisements on the screen, or [3] display a single or multiple advertisements and then change such advertisements over time.

An external provider may provide an advertisement in a one-way arrangement such that a user may view the advertisement but may not interact with the advertisement or with its provider. In contrary, an advertisement may generate results when the user provides a user input to the advertisement, where such results may include, e.g., [1] providing a user with a new screen, [2] providing a user with selections or options, [3] connecting a user to a new website, [4] downloading images, files, or documents, [5] giving a reward to a user, or the like. An advertisement provider may also count a number of user inputs which a user provides to an advertisement, a duration in which a user views an advertisement, or the like, and then change such results based thereon. As a result, the longer a user may view the advertisement or the more user inputs a user may provide to the advertisement, an advertisement provider may [1] give a bigger reward to a user, [2] connect a user to a more prestigious website, or the like.

When a user is done with viewing an advertisement or with interacting with an advertisement or its provider, a terminal may run such erasure (or semi-erasure), thereby erasing an entire (or only a selected) portion of such results which may be stored or reside in a lock system, where such results may be obtained [1] by viewing an advertisement, [2] manipulating an advertisement, [3] by accessing websites provided by an advertisement, [4] by connecting to external links offered by an advertisement, or the like. A terminal may run such erasure (or semi-erasure) in various erasure timings as described above.

When a user wants to store certain results obtained by manipulating or interacting with an advertisement, a user may manually select those to-be-stored results. A terminal may then store such to-be-stored results into a lock memory unit or a main memory unit (when authorized by a terminal), or into a temporary memory sector as described in conjunction with such semi-erasure. Alternatively, a terminal may adaptively select such to-be-stored results based upon, e.g., a number of user inputs which a user provided to an advertisement or items included therein, a duration in which a user stays while viewing an advertisement, other user statistics, or the like. In addition, when a user desires to process such results with a main system in an unlock mode, a terminal may run various operations according to various methods described in Section 4-3.

Similar to obtaining and manipulating an advertisement, a terminal may run a display operation for displaying at least one content on a display unit, accessing a website which is provided by a content, editing or selecting on a content, storing results obtained from manipulating or interacting with such a content, or the like. As used herein, a "content" may mean a drawing, a picture, a character, a text, a video clip, a video game, a still image or a video clips of another object or person, or the like. A content may include illustration of facts, illustration of an opinion, an artistic expression, an aesthetic expression, or images as described above. A terminal may display and use such contents in ways similar or identical to those of an advertisement and, therefore, details thereof are omitted.

8-10. Displaying Advertisements/Contents on Lock Screens

Advertisement providers are those who would put such advertisements on whatever useful space they can find. Accordingly, it is no wonder that advertisement providers have been putting advertisements on various places available in data processing terminals. As such providers start to realize a potential value of a screen of such a terminal, many providers began to place various advertisements on a screen of a terminal whenever possible, particularly whenever a user browses an internet. On the part of a user, however, it is generally not a pleasant experience when a pop-up advertisement hovers around a screen and does not go away while a user delves into important reading or obtaining valuable information therefrom.

Accordingly and in another exemplary embodiment of a fifth exemplary aspect of this disclosure, a terminal may display at least one advertisement on a lock screen in a lock mode. To this end, a terminal may include at least one "advertisement viewer" or an "ad viewer" which may be provided with only limited functionality and which may present data or files in a format which may be friendly to a user. Therefore, an ad viewer may be [1] a prior art file viewers, [2] a prior art image viewer, or [3] a prior art web browser, where a lock viewer of the $1^{st}$ Configuration is an example thereof.

More particularly, an ad viewer may display various advertisements which may be provided in different types or formats. Therefore, an ad viewer may include at least one format translator which may provide various views of data or files by handling, e.g., a different byte order, a code page, a newline style, or the like. An ad viewer may also render HTML markup into a form which is human friendly, or may provide graphic files such as a thumbnail preview, a thumbnail creation, or an image zooming. When desirable, an ad viewer may display not only images but also text on a display unit. In addition, an ad viewer may also play audible signals or generate tactile signals which may be related to such advertisements.

A terminal may drive this ad viewer as it does a lock viewer. Accordingly, a lock system may drive an ad viewer in a lock mode with its lock CPU unit or lock O/S. Alternatively, a main system may drive an ad viewer when a lock system does not include any lock CPU unit, a lock O/S or other applications which can drive an ad viewer. A lock or main system may also run such erasure (or semi-erasure) in one of various erasure timings.

Similar to the case of a lock viewer, a user may select and store a certain advertisement in a lock mode for a later review, e.g., by marking a certain advertisement or by storing a certain advertisement in a lock (or main) memory unit or other memory sectors available in a lock (or main) system. Similarly, a user operating a terminal in a lock mode may select certain results which are obtained by manipulating or editing such advertisements, obtained from a website directed by the advertisement, obtained by downloading files or data therefrom, or the like. A terminal may store such results in one of various storing timings as described above.

An ad viewer may be provided as a separate (software) application which may reside in a lock system and may be driven by a lock (or main) system or which may reside in a main system and may be driven by a main (or lock) system. Alternatively, an ad viewer may be provided as a plug-in application to a lock viewer or other (software) applications residing in a lock (or main) system. An ad viewer may also be provided in an external device which may releasably and operatively couple with a terminal, where an ad viewer may run the erasure (or semi-erasure) in one of various erasure timings. In addition, an ad viewer may run such erasure (or semi-erasure) when a user unplug or uncouple an external device from a terminal (or when a user plugs or couples an external device to a terminal) after, before or during use of an ad viewer as explained in Section 1.

In this respect, an ad viewer may be incorporated into various external devices such that a USB-type memory [1] may include only an ad viewer and its driver, [2] may include an ad viewer and a lock CPU unit which is equipped with a minimum functionality but which can drive the ad viewer, [3] may include an ad viewer, a lock CPU unit, and a lock memory unit, or the like. In the alternative, an external device may recruit at least a portion of a main CPU unit or a main memory unit to supplement those functionalities which lack in a lock system included in such an external device.

A terminal may use an ad viewer to provide various membership services to a user. In one example, an ad viewer may distribute discount coupons only to a certain member selected by certain criteria such as, e.g., [1] a member's status in a membership society, [2] sex, [3] age, [4] an occupation, [5] an income, [6] his or her preference or hobby, [7] a current location, [8] a destination of travel, [9] shopping history or shopping list, [10] a home or work address, [11] a distance or time taken to a certain store [11-1] from a home (or work) address or [11-2] from a current location, [13] a time of the day, [14] a day of the week (or month), [15] a marital status, [16] a size of family or relatives, [17] a temporal proximity to certain holidays, or the like.

In another example, an ad viewer may determine [1] when to start displaying a coupon, [2] how long to display such a coupon, [3] how many coupons to issue, or the like. In another example, an ad viewer may determine how much discount on what kind of merchandise or service to offer, based upon various criteria as described above or other criteria which are rather related not to a member but to a certain merchant or merchandise. In another example, an ad viewer may distribute coupons only on certain instances such as, e.g., [1] on a certain hour of the day, [2] on a certain day of the week (or a month), or [3] on (or before, after) a certain holiday.

To display various advertisements, a terminal may keep multiple advertisements in a central depository of a terminal, where a depository may reside [1] in a lock memory unit of a lock system (or embedded lock portion), [2] in other temporary memory sectors in a lock system (or portion), [3] in a main memory unit, or [4] in an external device. In addition, a terminal may acquire such advertisements in a depository by many ways such as, e.g., by receiving them from a manufacturer of a terminal or a user, by acquiring them a website, by receiving them from a provider of advertisements, or the like.

8-11. Common Display Unit

Each display unit of various terminals of this disclosure has been typically referred to as a main display unit. Alternatively, when a terminal includes a main system and a lock system, a main system may include a main display unit, while a lock system may include at least one lock display unit, where the main display unit and the lock display units may typically refer to separate hardware elements of the terminal. It is appreciated that any lock system which does not include its own lock display unit has to display a screen on a main display unit. However, a lock system including its own lock display unit may display a screen [1] only on its own lock display unit, [2] only on a main display unit, or [3] on both of the lock and main display units.

Accordingly and in another exemplary embodiment of this fifth exemplary aspect, a main display unit may be deemed to be a common hardware element to both a main system and a lock system so that a lock system may be able to drive a main display unit either directly or via a main CPU unit or a main O/S, particularly when a lock system does not include any lock display unit. This may be inevitable because, even when a terminal does not allow a lock system to access any units of a main system, a terminal may have to allow a lock system to [1] directly access or drive a main display unit of the main system when a lock system does not include its own lock display unit, or [2] make a call to a main system which may access and drive a main display unit on behalf of a lock system. In this context, when a terminal is said to include not a "main display unit" but to include simply a "display unit" in this disclosure, such a display unit may be deemed as a hardware element of a main system which may also be driven by a lock system.

8-12. Display Unit and Mode Switching

In another exemplary embodiment of this fifth exemplary aspect, a terminal may include a single display unit which in turn includes multiple segments each of which may be driven only by a main (or lock) system or by both of a main system and a lock system, where all of such segments may have the same shape and the same size or where at least two segments may have different shapes or sizes. In either arrangement, a terminal may drive each segment of a display unit to display the same or different data or images on its own screen and utilize each of such segments for the same or different purposes.

In one example, a terminal may use each of such multiple segments like those sub-units of various notice units in such a way that a terminal may launch a lock (or main) system in a lock (or unlock) mode, while displaying such results obtained therefrom on one of such segments. In other words, a terminal may drive a $1^{st}$ segment of a display unit for displaying results obtained from operating a lock (or main) system in a lock (or unlock) mode, while driving a $2^{nd}$ segment of the same display unit for displaying results obtained from operating a main (or lock) system in an unlock (or lock) mode. Therefore, a user may monitor $1^{st}$ results which are obtained by running various lock operations and displayed on a $1^{st}$ segment, [1] while concurrently monitoring $2^{nd}$ results which are obtained by driving various hardware or software elements of a terminal, [2] while monitoring the $1^{st}$ results displayed on the $1^{st}$ segment, or the like.

In another example, when a user operates the same lock (or main) system in both segments of a display unit, a user may use such multiple segments by consolidating them into a single screen and display a single image on both segments of a display unit. Alternatively, a terminal may use one of such segments of a display unit to display routine data such as, e.g., a date, a time, a message informing an incoming emails or messages, or a status of a hardware or software element of a terminal, where such routine data may typically refer to those data obtainable without running an operation in response to a user input.

In another exemplary embodiment of this fifth exemplary aspect, a terminal may include multiple display units each of which may be driven only by a main system or by both of a main system and a lock system, where all of such display units may have the same shape and the same size or where at least two display units may define different shapes, sizes, or orientations. A terminal may also dispose multiple display units on the same surface of a terminal or on different surface thereof. In either arrangement, a terminal may drive each display unit for displaying the same or different data or images on its own screen, and may use each display unit for the same or different purposes.

In one example, a terminal may use each of such multiple display units like those sub-units of such notice units in such a way that a terminal may launch a lock (or main) system in a lock (or unlock) mode, while displaying such results obtained therefrom on one of such display units. In another example, when a user launches the same lock (or main) system for both display units, a user may also use multiple display units by consolidating them into a single display unit, e.g., by displaying one half of an image on a $1^{st}$ display unit, while displaying another half on a $2^{nd}$ display unit, or the like. Other configurational or operational features of this embodiment may be similar or identical to those of the above embodiment in which a single display unit may include or define multiple segments therein.

8-13. Multiple Operating Systems or CPUs

As described above, a lock system may include a lock CPU unit which may drive a lock viewer, a lock memory unit, or other units of the lock system. Because the terminal include a main CPU unit in addition to such a lock CPU unit, a lock CPU unit may not function properly, unless a main O/S of a main system is designed to take account of the presence of a lock CPU unit. Therefore and in another exemplary embodiment of this fifth exemplary aspect, when a lock system includes a lock CPU unit, a terminal (or its main CPU unit) may make various arrangements to make the best use of a lock CPU unit.

In one example, a terminal may ask a user to select one of such CPU units while a terminal wakes up (e.g., switching from an off-state to an on state) in response to a user input. When a user selects one CPU unit, a terminal may load a lock (or main) system in a lock (or unlock) mode, and may drive a lock (or main) CPU unit, a lock (or main) O/S, and other units of such a system.

In another example when a terminal receives a user input including $UI_{SWT}$ in its on-state, a terminal may similarly ask a user which one of the lock and main CPU units (or the lock and main systems) a user desires to drive (or operate) after the mode switching. When a user selects a main (or lock) system after switching mode to an unlock (or lock) mode from a lock (or unlock) mode, a terminal may switch its mode, and launch a main (or lock) system while executing a main (or lock) CPU unit. When a user selects to drive the same main system (or lock system) after switching from an unlock (or lock) mode to a lock (or unlock) mode, a terminal may keep operating the same system and driving the same CPU unit, while stopping or suppressing execution of another CPU unit.

In another example, a terminal may configure a lock CPU unit and a main CPU unit to collaborate with each other, e.g., to run (or perform) a single identical operation (or function), to synchronize running the same or different multiple operations either concurrently or sequentially, or the like. A terminal may similarly synchronize a lock CPU unit with a main CPU unit (or vice versa) to run such erasure (or semi-erasure), e.g., [1] by running the erasure (or semi-erasure) with each of such CPU units (e.g., a double-pass overwriting or encryption), [2] by running such erasure (or semi-erasure) on different memory unit or different sets of data, or [3] by assigning each CPU unit to run only one of such erasure or semi-erasure.

8-14. Variations or Modifications

Various data processing terminals of this fifth exemplary aspect may be configured and operate according to different configurations, arrangements or sequences. Such variations or modifications of such terminals of this fifth exemplary aspect may be similar or identical to those of such terminals exemplified in the $1^{st}$ to $4^{th}$ Configurations, or to those of other terminals in other exemplary aspects of this disclosure and, therefore, are omitted herein.

Configurational or operational variations (or modifications) of such terminals described in various embodiments or examples of this fifth exemplary aspect may be interchangeable with other embodiments or examples of other exemplary aspects of this disclosure. Accordingly, certain features of a certain embodiment or example of this fifth exemplary aspect may be applied to another embodiment or example of the same aspect or of a different aspect.

Moreover, other configurational or operational features, their variations or modifications of the terminals of this fifth exemplary aspect [1] may apply to, [2] may be incorporated into, [3] may replace, [4] may be replaced by, or [5] may be combined with corresponding features of other aspects, embodiments, or examples of this disclosure which have been described throughout this disclosure, as long as such application, incorporation, replacement, or combination does not contract each other.

9. Interchangeability

Various data processing terminals and methods of constructing or using such terminals have been described above, particularly with reference to various exemplary aspects, their embodiments, examples, and objectives, along with details thereof. Such description is intended only for better understanding various configurational or operational features or characteristics of such terminals and methods. Accordingly, it will be apparent to those skilled in the relevant art that various modifications and variations of such terminals may be made from the above disclosure.

While exemplary aspects, embodiments, examples, and objectives of various data processing terminals have been disclosed herein, it is understood that other modifications or variations are still possible. Therefore, such modifications or variations are not to be regarded as a departure from the spirit and scope of such exemplary aspects, embodiments, examples, and objectives of this disclosure, and all such modifications or variations which would be obvious to one skilled in the art are intended to be included within the above disclosure as well as within the scope of the following claims.

Unless otherwise specified, various features of a certain aspect, embodiment, example or objective of this disclosure may apply interchangeably to corresponding features of other aspects, embodiments, examples or objectives throughout this disclosure. Of course, such interchangeability may be limited when such application, incorporation, replacement, or combination may contract each other.

For example, this disclosure centers around those data processing terminals, their lock (or main) systems, and their CPU units or O/S which operate under a hierarchy defining a single lock mode and a single unlock mode. However, configurational and operational features of such terminals may be expanded to other terminals which operate in a hierarchy which may define at least one addition mode, other than the lock mode and main mode. Therefore, such other terminals may switch mode from a lock mode to an intermediate mode, and then to an unlock mode. In addition, such other terminals may switch back to either a lock mode or an intermediate mode when the hierarchy is circulating. Other features related to the terminals switching between the lock and unlock mode may be applicable to such other terminals which switches among at least three different modes. However, when the above disclosure specifies that a terminal includes only two systems such as a lock system and a main system, a terminal does not include an intermediate system and may not have to operate either system in the intermediate mode.

In another example, this disclosure demonstrates various configurational and operational features of such data processing terminals, their lock (or main) systems, their CPU units or O/S, and methods which may run various operations in response to those $1^{st}$ type mechanical user inputs. However, such features may be expanded to other terminals which run various operations in response to those user inputs of other types. Accordingly, the definition of a single user input which holds for the mechanical user inputs may have to be modified to suit the different nature of other user inputs. In the case of the $5^{th}$ type acoustic user input, a single user input may be defined as a user input which may result from a direct, indirect or other manipulation of at least a portion of a microphone by acoustic waves which are generated by a vocal cord of a user or by other body parts of a user and which does not include therealong a temporal gap which a terminal may regard as a temporal gap.

Various data processing terminals, systems incorporating such terminals, and methods of using the terminals of this disclosure may also incorporate other electronic parts or digital parts which can run various operations for performing various functions similar to those described in this disclosure. As discussed above, however, such terminals may include any program, software, source code, binary code or other instructions as long as such terminals may run one or more operations when such terminals receive various user inputs when such terminals are (or have been) in their off-state and when such terminals may switch their display units from their off states to their on state in response to such user inputs or their (user) sub-inputs.

It is to be understood that, while various aspects, embodiments, and examples of this disclosure have been described in conjunction with detailed description provided hereinabove, the foregoing disclosure is intended to illustrate and not to limit the scope of various data processing terminals, which is defined by the scope of the appended claims. Other aspects, embodiments, examples, advantages, and modifications are within the scope of the following claims as well.

The invention claimed is:

1. A method of operating a smartphone in a lock mode and in an unlock mode, wherein said smartphone includes a lock system, an unlock system, and a display unit, wherein said lock system includes a first number of lock elements one of which is a first lock element capable of performing a first function, wherein said unlock system includes a second number of main elements one of which is a first main element capable of performing said first function, wherein said second number is greater than said first number, and wherein said smartphone drives said lock system in said lock mode and said smartphone drives said unlock system in said unlock mode, said method comprising the steps of:
providing a first access authority to a user for driving said lock elements of said lock system in said lock mode;
providing a second access authority to said user for driving said main elements of said unlock system in said unlock mode;
displaying a lock screen on said display unit in said lock mode;
displaying a graphical user interface of said first lock element on said lock screen in said lock mode;
allowing said user's accessing an external source with said first lock element in said lock mode when said smartphone receives from said user a first user input provided to said graphical user interface, wherein said external source includes at least one content infected by a malicious virus;
allowing said user's downloading from said external source a first result including said content through said accessing in said lock mode, while blocking said first result from accessing said unlock system in said lock mode;
receiving from said user a second user input for switching from said lock mode to said unlock mode; and
erasing a certain portion of said first result at an erasure timing related to one of said receiving said second user input and said switching to said unlock mode, wherein said certain portion of said first result includes said content, whereby said smartphone prevents said infected content included in said first result from infecting said first main element of said unlock system in said lock mode, even when said first lock element is infected by said content in said lock mode.

2. The method of claim 1, wherein said first lock element is an application for performing said first function and wherein said first main element is another application for performing said first function.

3. The method of claim 1, wherein said erasure timing is one of:
a first timing which is after said receiving said second user input but before said switching;
a second timing which is concurrent with said switching;
a third timing which is immediately after said switching; and
a fourth timing which is after said switching but before receiving from said user a third user input, wherein said receiving said third user input is after said receiving said second user input.

4. The method of claim 1 further comprising the steps of:
authenticating said user based on at least a portion of said second user input;
performing said switching when said user passes said authenticating; and
not performing said switching when said user fails to pass said authenticating.

5. The method of claim 4, wherein said smartphone performs said authenticating using at least one of a fingerprint of said user, said user's iris, said user's retina, said user's voice, and said user's face.

6. The method of claim 4, wherein said not performing includes one of the steps of:
remaining in said lock mode after said user fails said authenticating;
turning off said display unit after said user fails said authenticating; and
performing said erasing after said user fails said authenticating.

7. The method of claim 1, wherein said first lock element is one of a web browser application, an email application, a messenger application, an internet-of-things application, and an ad viewer application.

8. The method of claim 7, wherein said content is one of a text, a file, a folder, and data, and wherein said downloading includes at least one of the steps of:
allowing said user to access an internet-of-things network by driving said internet-of-things application and download said content through said internet-of-things network;
allowing said user to access a website by driving said web browser application and download said content from said website; and
allowing said user to download said content by driving one of said ad viewer application, said messenger application, and said email application.

9. The method of claim 1, wherein said downloading includes the step of acquiring said first result by performing one of displaying a file, displaying an image, and accessing a website.

10. The method of claim 1, wherein said erasing includes one of the steps of:
erasing only said content, while not erasing the rest of said first result;
erasing said certain portion which includes said content but not erasing remaining portions of said first result; and
erasing an entire portion of said first result, including said certain portion which in turn includes said content.

11. The method of claim 1, wherein said smartphone receives a fourth user input from said user and wherein said erasing includes one of the steps of:
identifying a portion of said first result which is designated by said fourth user input as said certain portion, and erasing said identified portion; and
identifying a portion of said first result which designated by said fourth user input as a portion which is different from said certain portion, and erasing said first result except said identified portion.

12. The method of claim 1 further comprising the steps of:
erasing said certain portion of said first result while saving the rest of said first result in said lock system; and allowing said user to access said rest of said first result in said unlock mode after said switching to said unlock mode.

13. A smartphone which operates in a lock mode and in an unlock mode comprising:
   a display unit;
   a lock system which said smartphone operates in said lock mode and which displays a lock screen on said display unit in said lock mode; and
   an unlock system which said smartphone operates in said unlock mode and which displays a home screen on said display unit in said unlock mode,
   wherein said lock system includes a first number of lock elements one of which is a first lock element which is a web browser application capable of accessing an external source including at least one content infected by a malicious virus,
   wherein said unlock system includes a second number of main elements one of which is a first main element which is a web browser application capable of accessing said external source,
   wherein said second number is greater than said first number,
   wherein, upon receiving a first user input from a user in an off-state in which said display unit is turned off but said smartphone is powered on, said smartphone turns on said display unit, switches to said lock mode, displays said lock screen on said display unit, and displays a first graphical user interface of said first lock element on said lock screen,
   wherein, upon receiving from said user a second user input provided to said first graphical user interface, said smartphone allows said user to access said external source with said first lock element, and to download a first result which includes said infected content, while blocking said content from accessing said first main element in said lock mode,
   wherein, after generating said first result in said unlock mode, upon receiving from said user a third user input for switching from said lock mode to said unlock mode, said smartphone erases a certain portion of said first result at a mode-switching timing related to one of a first timing of receiving said third user input and a second timing of switching from said lock mode to said unlock mode, and
   whereby said smartphone is capable of preventing said infected content from infecting said first main element of said unlock system in said lock mode, even when said first lock element is infected by said content in said lock mode.

14. The smartphone of claim 13,
   wherein said mode-switching timing is one of a first timing which is before erasing said certain portion, a second timing which is concurrent with said erasing, and a third timing which is after said erasing.

15. The smartphone of claim 13,
   wherein said lock system includes said first lock element and a second lock element, and
   wherein said smartphone displays on said lock screen said first graphical user interface of said first lock element as well as a second graphical user interface of said second lock element.

16. The smartphone of claim 13,
   wherein said first result is one of data, a file, a folder, and a content.

17. The smartphone of claim 13,
   wherein said smartphone runs one of initialization and formatting of said lock system in at least one of a plurality of circumstances so that said smartphone removes said first lock element from said lock system and then reloads said first lock element to said lock system, and
   wherein said circumstances include a first circumstance in which a certain period has passed since one of previous initialization and previous formatting, and a second circumstance in which said smartphone detects said content infected by said virus in one of said first result, said lock elements, and said lock system.

18. The smartphone of claim 13,
   wherein said first result includes at least one of:
   first information related to an address of a website accessed by said web browser application;
   second information related to said website; and
   third information downloaded from said website.

19. The smartphone of claim 13,
   wherein said certain portion is an entire portion of said first result.

20. The smartphone of claim 13,
   wherein said certain portion is not an entire portion of said first result so that said smartphone erases said certain portion but does not erase the rest of said first result in said lock system.

21. The smartphone of claim 20 further comprising a lock memory unit,
   wherein said lock memory unit stores said rest of said first result, and
   wherein said smartphone allows said user to access said lock memory unit in at least one of said lock mode and said unlock mode.

22. The smartphone of claim 21,
   wherein said lock memory unit includes at least one of a data buffer, a cache, a clipboard, a recycle bin, a non-volatile memory element, and a volatile memory element.

23. The smartphone of claim 13,
   wherein said smartphone runs an authentication operation in response to at least a portion of said third user input, and
   wherein said smartphone switches to said unlock mode when said user passes said authentication operation but does not switch to said unlock mode when said user fails said authentication operation.

24. The smartphone of claim 23,
   wherein said third user input includes an information related to at least one of a fingerprint of said user, said user's iris, said user's retina, said user's voice, and said user's face.

25. A smartphone which operates in a lock mode and in an unlock mode comprising:
   a display unit;
   a lock system which said smartphone operates in said lock mode but not in said unlock mode and which displays a lock screen on said display unit in said lock mode; and
   an unlock system which said smartphone operates in said unlock mode but not in said lock mode,
   wherein said lock system is loaded with a first number of lock applications one of which is a first lock application, wherein said first lock application is a web browser application and capable of accessing an external source,
   wherein said unlock system is loaded with a second number of main applications one of which is a first main application which is said web browser application, wherein said second number is greater than said first number, wherein, upon receiving from a user a first user input while said smartphone is in an off-state in which said smartphone is powered on but said display unit is turned off, said smartphone turns on said display unit, displays said lock screen on said display unit, and displays on said lock screen a graphical user interface of said first lock application, wherein, upon receiving from said user a second user input which is applied to said graphical user interface of said first lock application in said lock mode, said smartphone allows said user to access said external source using said first lock application, and to download a first result from said external source, while blocking said first result from accessing said unlock system in said lock mode, wherein, after downloading said first result and upon receiving from said user a third user input in said lock mode, said smartphone switches from said lock mode to said unlock mode at a mode-switching timing, wherein said smartphone erases at least a portion of said first result at an erasure timing which is one of a first timing which is before switching to said unlock mode, a second timing which is concurrent with switching to said unlock mode, a third timing which is immediately after switching to said unlock mode, and a fourth timing which is upon receiving an additional user input from said user, and whereby said smartphone is capable of preventing said at least a portion of said first result from infecting said first main element with a malicious virus in said lock mode as well as in said unlock mode, even when said first lock element is infected by virus in said lock mode.

26. A smartphone which operates in a lock mode and in an unlock mode comprising:

a display unit;

a lock system which said smartphone operates in said lock mode but not in said unlock mode and which displays a lock screen on said display unit in said lock mode; and an unlock system which said smartphone operates in said unlock mode but not in said lock mode, wherein said lock system is loaded with a first number of lock applications which include a first lock application which is a web browser application, wherein said unlock system is loaded with a second number of unlock applications which include a first main application which is said web browser application, wherein said second number is greater than said first number, wherein said lock system displays a graphical user interface of said first lock application on said lock screen in said lock mode, wherein, upon receiving a first user input which is provided to said graphical user interface of said first lock application by said user in said lock mode, said smartphone drives said first lock application, allows said user to access an external source which includes a content which is infected by a malicious virus, and generates a first result related to said external source while preventing said first result from accessing said unlock system in said lock mode, wherein, after generating said first result and upon receiving a second user input from said user in said lock mode, said smartphone switches from said lock mode to said unlock mode, wherein said smartphone erases at least a portion of said first result at an erasure timing which is one of a first timing which is before switching to said unlock mode, a second timing which is concurrent with switching to said unlock mode, a third timing which is immediately after switching to said unlock mode, and a fourth timing which is upon receiving an additional user input from said user, wherein said first lock app remains loaded in said lock system after said smartphone switches to said unlock mode, wherein said smartphone erases said first lock application from said lock system when one of said smartphone and said user finds said first lock application infected by said malicious virus, wherein, after erasing said infected first lock application, said smartphone reloads at least a portion of said first main application into said lock system as a new first lock application, whereby said smartphone is capable of preventing said at least a portion of said first result from infecting said first main application from being infected by said virus, even when said first lock element is infected by virus in said lock mode.

27. A smartphone which operates in a lock mode and in an unlock mode comprising:

a display unit;

a lock system which said smartphone operates in said lock mode and which displays a lock screen on said display unit in said lock mode; and an unlock system which said smartphone operates in said unlock mode and which displays a home screen on said display unit in said unlock mode, wherein said lock system includes a first number of lock applications one of which is a first lock application, wherein said unlock system is loaded with a second number of main applications one of which is a first main application wherein said second number is greater than said first number, wherein said first lock application is capable of performing a first function in said lock mode but not in said unlock mode, wherein said first main application is also capable of performing said first function in said unlock mode but not in said lock mode, wherein said lock system displays a graphical user interface of said first lock application on said lock screen in said lock mode, wherein, upon receiving a first user input which is provided to said graphical user interface of said first lock application by a user in said lock mode, said smartphone drives said first lock application, allows said first lock application to access an external source which includes a content infected by a malicious virus, and allows said first lock application to generate a first result which is related to accessing said external source, while preventing said first result from accessing said unlock system in said lock mode, wherein, after generating said first result and upon receiving a second user input from said user in said lock mode, said smartphone switches from said lock mode to said unlock mode, wherein said smartphone erases a first portion which is infected by said virus from said first result while saving a second portion of said first result one of before, concurrently with, and after switching to said unlock mode, wherein said first lock application remains loaded in said lock system even after said smartphone switches to said unlock mode, wherein said smartphone erases said first lock application from said lock system when one of said smartphone and said user finds said first lock application infected by said malicious virus, wherein, after erasing said infected first lock application, said smartphone reloads at least a portion of said first main application into said lock system as a new first lock application, whereby said smartphone prevents said first portion of said first result from infecting said first main application with said virus, even when said first lock application is infected by virus in said lock mode.

28. A smartphone which operates in a lock mode and in an unlock mode comprising:

a display unit;

a lock system which said smartphone operates in said lock mode but not in said unlock mode and which displays a lock screen on said display unit in said lock mode; and an unlock system which said smartphone operates in said unlock mode but not in said lock mode and which displays a home screen on said display unit in said unlock mode, wherein said lock system is loaded with a first number of lock applications which include a first lock application which is one of a web browser application, an email application, a messenger application, an internet-of-things application, and an ad viewer application, wherein said unlock system is loaded with a second number of unlock applications which includes a first main application which is said one of said web browser application, email application, messenger application, internet-of-things application, and ad view application, wherein said second number is greater than said first number, wherein said lock system displays a graphical user interface of said first lock application on said lock screen in said lock mode, wherein said unlock system displays a graphical user interface of said first main application on said home screen in said unlock mode, wherein a first lock application is capable of performing a certain function in response to a third user input provided by said user to said graphical user interface of said first lock application in said lock mode, wherein a first main application is also capable of performing said certain function in response to a fourth user input provided by said user to said graphical user interface of said first main application in said unlock mode, wherein, upon receiving a first user input from said user, said smartphone drives said first lock application, allows said first lock application to access an external source which includes a content infected by a malicious virus, and generates a first result related to performing said certain function while preventing said first result from accessing said unlock system in said lock mode, wherein, after generating said first result and upon receiving a second user input from said user in said lock mode, said smartphone switches from said lock mode to said unlock mode, wherein said smartphone erases a first portion which is infected by said virus from said first result while saving a second portion of said first result at an erasure timing which is one of a first timing which is before switching to said unlock mode, a second timing which is concurrent with switching to said unlock mode, a third timing which is immediately after switching to said unlock mode, and a fourth timing which is upon receiving an additional user input from said user, and wherein said first lock application remains loaded in said lock system after said smartphone switches to said unlock mode, wherein said smartphone erases said first lock application from said lock system when one of said smartphone and said user finds said first lock application infected by said malicious virus, wherein, after erasing said infected first lock application, said smartphone reloads at least a portion of said first main application into said lock system as a new first lock application, whereby said smartphone prevents said first portion of said first result from infecting said first main application with said virus, even when said first lock application is infected by virus in said lock mode.

\* \* \* \* \*